(12) United States Patent
Cuk

(10) Patent No.: US 6,400,579 B2
(45) Date of Patent: *Jun. 4, 2002

(54) LOSSLESS SWITCHING DC TO DC CONVERTER WITH DC TRANSFORMER

(76) Inventor: Slobodan Cuk, 27682 Gold Dust, Laguna Hills, CA (US) 92653

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,004

(22) Filed: Mar. 24, 2000

(51) Int. Cl.$^7$ ............................................... H02M 3/335
(52) U.S. Cl. ............................ 363/16; 363/97; 323/266
(58) Field of Search ....................... 363/16, 15, 39, 363/40, 45, 95, 97, 131; 323/222, 224, 265, 266, 282, 299, 235

(56) References Cited

U.S. PATENT DOCUMENTS

| | | |
|---|---|---|
| 4,184,197 A | 1/1980 | Cuk et al. |
| 4,257,087 A | 3/1981 | Cuk |
| 5,166,869 A | 11/1992 | Hesterman |
| 5,539,630 A | 7/1996 | Pietkiewicz et al. |
| 5,570,276 A | * 10/1996 | Cuk et al. ...................... 363/16 |
| 5,773,969 A | * 6/1998 | Nakayama et al. .......... 323/330 |
| 5,790,005 A | 8/1998 | Santi et al. |

OTHER PUBLICATIONS

R.D. Middlebrook and Slobodan Cuk, A General Unified Appproach to Modelling Switching–Converter Power Stages, California Institute of Technology, PESC 76 Record, pp. 18–34, Jun. 1976.

Akio Nakamura, Junpei Ohta, "A New Reversed–Biased Choke Coil", TDK–Electronics Company Ltd., Tokyo, Japan, Proceedings of Powercom 9, 1982, pp.1–7 Jul. 1982.

Satoshi Frank Shiraki, "Reducing Magnet Component Size with Reversed Biased Ferrite Core," Hitachi Magnetics Corporation, Edmore, Michigan, pp. 1–5 May 1976.

* cited by examiner

Primary Examiner—Peter S. Wong
Assistant Examiner—Gary L. Laxton
(74) Attorney, Agent, or Firm—A. M. Fernandez

(57) ABSTRACT

Soft switching DC-to-DC converter operates at record high efficiency despite its small size and weight and ultra high overload current capability of several times the nominal load current. Such performance is made possible by use of unique magnetic and switching circuits with special properties. Other desirable performance features are provided concurrently such as: zero ripple current on input and output, low conducted and radiated Electromagnetic interference (EMI) noise, as well as low component stresses for increased converter reliability.

86 Claims, 67 Drawing Sheets

$\Delta v = v_{L1} - v_{L2} = 2v_{L1} = 2v_{L2}$

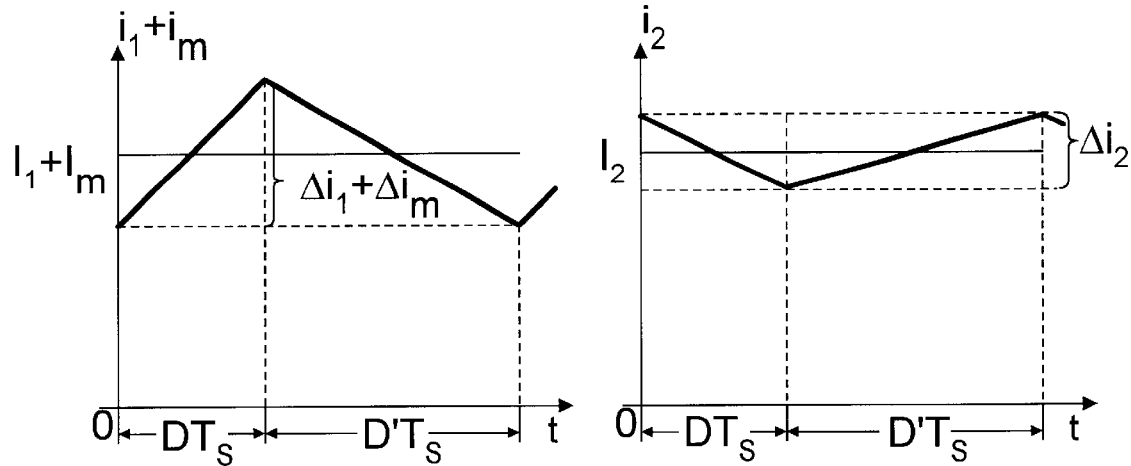
Fig. 45a       Fig. 45b
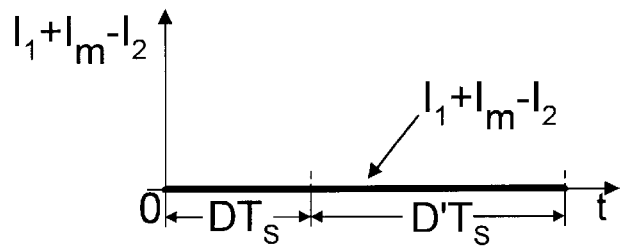
Fig. 45c
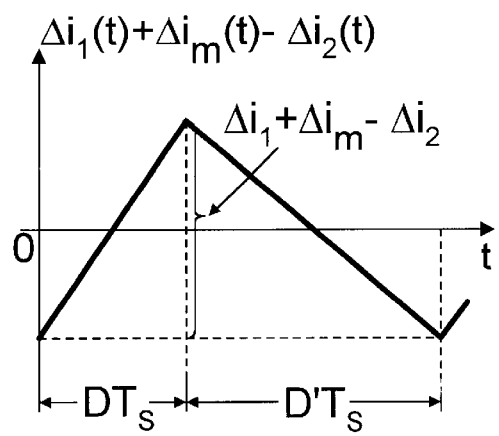 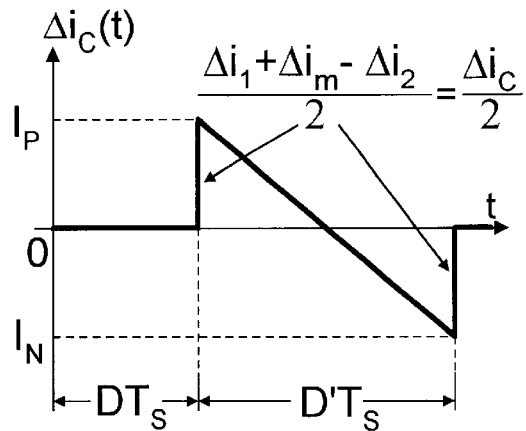
Fig. 45d       Fig. 45e

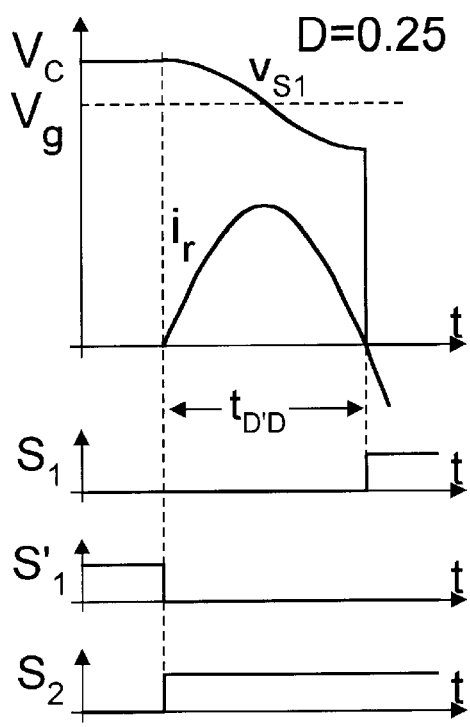
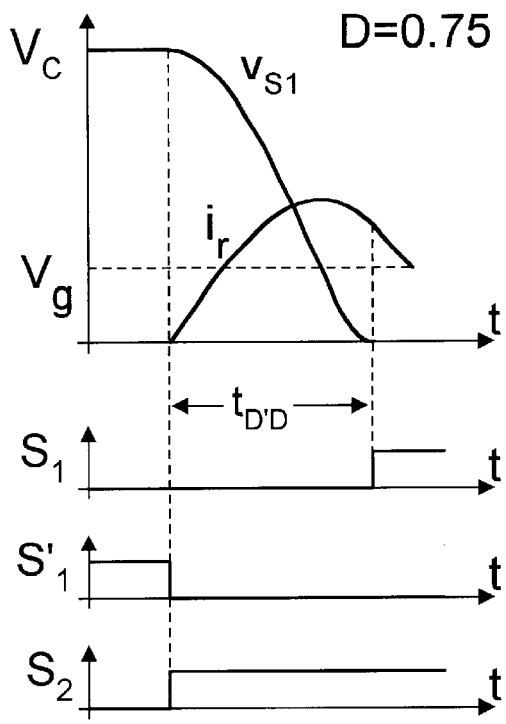
Fig. 53a    Fig. 53b
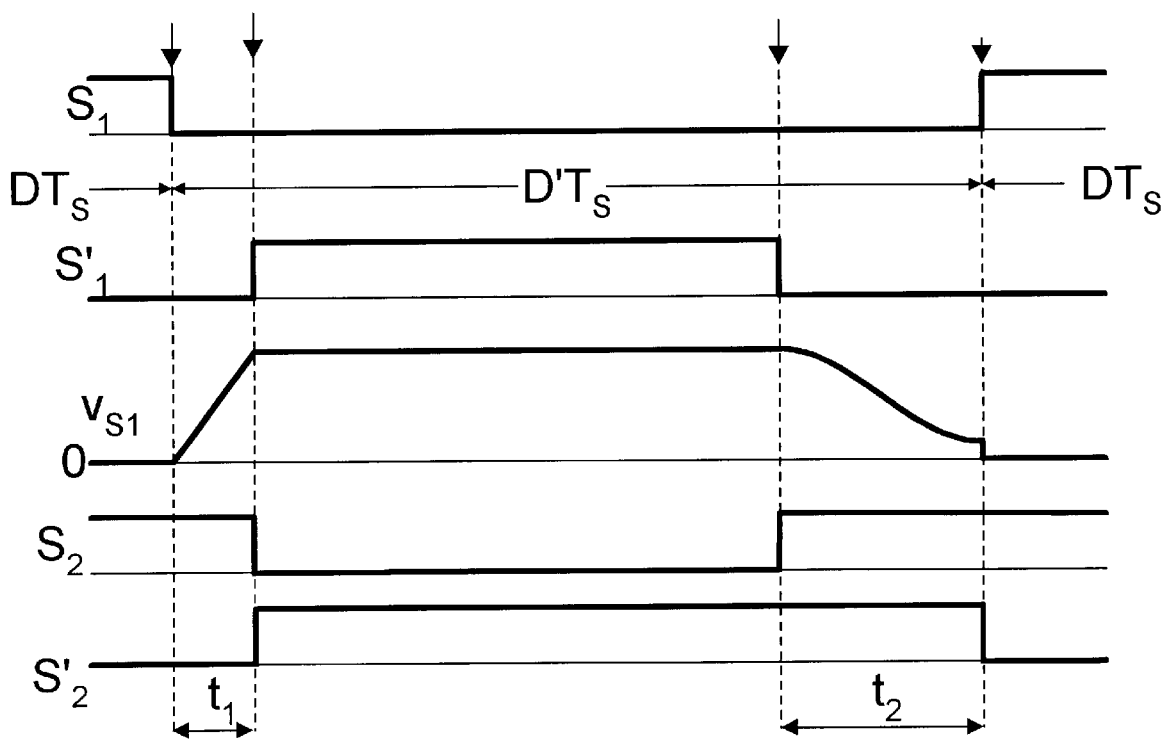
Fig. 53c $V_g$ = 270VDC $V_g$ = 380VDC

US 6,400,579 B2

LOSSLESS SWITCHING DC TO DC CONVERTER WITH DC TRANSFORMER

FIELD OF THE INVENTION

This invention relates to the field of DC-to-DC power conversion and in particular to the class of converters distinguished by ultra high efficiency, high overload capability, small size and weight, high power density at a moderate switching frequency.

BACKGROUND OF THE INVENTION

The following notation is consistently used throughout this text in order to facilitate easier delineation between various quantities:

1. DC—shorthand notation historically referring to Direct Current but now has wider meaning and refers to all Direct electrical quantities (current and voltage);
2. AC—shorthand notation historically referring to Alternating Current but now has wider meaning and refers to all Alternating electrical quantities (current and voltage)
3. The instantaneous time domain quantities are marked with lower case letters, such as $i_1$ and $v_2$ for current and voltage. Often these instantaneous quantities contain a DC component, which is designated with corresponding capital letters, such as $I_1$ and $V_2$.
4. The difference between instantaneous and DC components is designated with $\Delta$, hence $\Delta i_1$ designates the ripple component or AC component of current $i_1$.

Over the last two decades a large number of switching DC-to-DC converters had been invented with the main objective to improve conversion efficiency and reduce the converter size. The past attempts to meet both of these objectives simultaneously have been hampered by the two main obstacles, which up to now seemed to be inherent to all switching DC-to-DC converters:

1. The large DC current bias present in the filtering inductors at either input or output of the converters (as well as the DC-bias current present in the isolation transformer of some of the isolated converters) resulted in a big size of the magnetic components, since an air-gap proportional to the DC current bias must be inserted in the AC flux path in order to prevent magnetic core saturation. This also resulted in a very inefficient use of the magnetic material, which was largely wasted. Even a relatively small air-gap, in the order of 1 mm (40 mils), drastically reduces the total inductance. This loss of inductance was compensated by either an inordinately large increase of the switching frequency (hence increase of losses) or by increasing the size of the magnetic cores, or both.
2. An implementation of soft switching methods to reduce significant switching losses at increased switching frequencies was DC load current dependent and required for its operation an unwanted large output inductor AC current ripple (larger than twice the magnitude of the maximum DC load current) thereby diminishing most of the recovered energy due to increased conduction losses caused by this large AC ripple current.

Magnetic Saturation with DC Current Bias

First, the problem associated with the DC-bias of magnetic components (inductors and transformers) can be best understood with reference to the classical buck converter shown in prior art FIG. 1a and the accompanied output inductor current waveform of FIG. 1b. Since the converter output supplies DC power to the load, the inductor in the buck converter must pass the DC component of the load current, which is $I_{DC}$. Hence, it clearly cannot be designed as an ordinary inductor used in alternating current (AC) applications such as the inductor in FIG. 2a.

Several quantities which are used throughout the text are now described with their defining relationship:

Flux linkage $\lambda$ is the total flux linking all N turns and is $\lambda = N\Phi$ where $\Phi$ is the flux in the magnetic core;

Flux density B is the flux per unit area defined by $B = \Phi/S$ where S is a magnetic core cross-section area.

Inductance L is defined as the slope of $\lambda$–i characteristic, i.e., $L = \lambda/i$;

Duty ratio D of the switch is defined as $D = t_{ON}/T_S$ where $t_{ON}$ is ON time of the switch, and $T_S$ is the switching period defined as $T_S = 1/f_S$ where $f_S$ is a constant switching frequency;

Complementary duty ratio D' of the switch is defined as $D' = 1 - D$.

An AC inductor is wound on magnetic core material in order to dramatically increase its inductance value. For example, typical ferrite core material has at room temperature a relative permeability on the order of $\mu_r \approx 3,000$. Hence the inductance of the coil is magnified by a factor of 3,000 simply by inserting the magnetic core material without any air gap as in FIG. 2a. The corresponding flux linkage "$\lambda$" versus current "i" characteristic is as in FIG. 2b with a high slope illustrating the high inductance value L (maximum attainable with that core material). The flux linkage excursions (caused by the AC current) are symmetrical around the center of the magnetic core operating characteristic. Even if a very small DC current $I_{DC}$ shown in FIG. 2b were to pass through this coil, the magnetic core material would saturate and instead of the desirable large inductive impedance, the inductor would look like a short circuit. Thus, to avoid core saturation, all present switching converters "solve" this DC-bias problem in a "brute-force" way by inserting an air-gap in the magnetic flux path as illustrated in FIG. 3a. This clearly reduces the inductance value proportionally to the inserted air-gap size (the larger the DC current, the bigger air-gap is needed, hence the smaller is the resulting inductance value), as seen by the flux linkage characteristic of FIG. 3b for an un-gapped and gapped core and their corresponding inductances L and $L_g$. Clearly three very detrimental factors did occur:

1. By insertion of the air-gap, the inductance value is drastically reduced. It is not uncommon to see the original un-gapped inductance L reduced by a factor of 100 to 1000 to the inductance $L_g$ with the air-gap included. In order to compensate for this loss of inductance, the switching frequency is radically increased or a much bigger core size is used, or both.
2. The already small AC flux linkage excursions due to the finite and relatively low saturation flux density $B_{SAT}$ of 0.3 T (tesla) for ferrite material, is further significantly reduced due to the presence of the DC-bias in the core. For example, in typical applications, the DC-bias might correspond to a flux density of 0.25 T thus leaving only 0.05 T for the superimposed AC flux excursions. This in turn results in either larger core size requirements or increased switching frequency, or both.
3. The waste of ferromagnetic material is even larger, since the negative part of the saturation characteristic is not utilized at all, and thus another $\Delta B = B_{SAT} = 0.3$ T is also wasted.

The DC-bias problem is not only limited to all inductors used up to now in DC-to-DC converters but is also present in many isolation transformers, such as for example in the popular flyback converter shown in FIG. 4a. This transformer does provide galvanic isolation and the ability to step-up or step-down the voltage through the transformer turns ratio, but contrary to the ordinary AC line transformer, it has a large DC-bias and requires a correspondingly big air-gap as shown in FIG. 4b. Hence the magnetic core is biased in one direction thus limiting the superimposed AC flux excursions as seen in FIG. 5.

Up to now, the detrimental effect of the large DC-bias and hence the large air-gap was introduced qualitatively. Let us now also quantify these effects on an output inductor design example for a 5V, 100 W buck-like converter, having a DC load current $I_2$=20 A, and number of winding turns N=6, which is implemented on a ferrite core having a saturation flux density $B_{SAT}$=0.3 T (tesla) out of which $B_{DC}$=0.2 T is available for the DC-bias and the remaining 0.1 T is allocated for the superimposed AC flux excursions. To support NI=120 ampere-turns the required air-gap is given by formula $l_g=\mu_0 NI/B_{DC}$=30 mils=0.75 mm where $\mu_0=4\pi 10^{-7}$ H/m is the permeability of free space. If L is the inductance without air-gap, and $L_g$ is the inductance with air-gap $L_g$=30 mils, then the ratio of the two inductances is given by $L/L_g=\mu_r l_g/l_m$=50 where $\mu_r$ is the relative permeability of the ferrite material, which for typical materials used in switching converters is $\mu_r$=3000, and $l_m$=4.5 cm is the magnetic path length of the core used. Thus, even at a relatively modest DC current level of only 20 A, the maximum available inductance of a given core is reduced by a factor of 50. The factor by how much presence of ferrite increases the coil inductance above that of an air-core is $\mu_r$ which is 3000 in our example. Then, the ratio of 3000/50=60 is how much the addition of the ferromagnetic material with air-gap increases the inductance of the inductor built with no ferromagnetic material but with the same cross-section. At higher power and especially DC load current levels this becomes progressively much more severe. It is not uncommon for some high power DC converter applications in the kilowatt range to see that after ferromagnetic material was inserted, the inductance increased only by a factor of 2 or 3 over the inductance without any magnetic material due to the large air-gap needed to prevent saturation. Clearly, this is a tremendous waste of the magnetic material which has the ability to increase the inductance 3000 times over that of an air-core coil. This is also the reason, why in switching converters in which isolation transformer has no DC bias, such as in the isolated Cuk converter, the transformer size is several times smaller in size and weight in comparison with the size and weight needed for the input and output inductors, which by far dominate the size and weight of the switching converter and also result in increased losses.

In the above typical example, the loss of the inductance due to insertion of the air-gap in the flux path is compensated either by increasing the core cross-section thus making the converter size substantially bigger, or by increasing the switching frequency by an order of magnitude, or a combination of both. This clearly would rapidly degrade the overall efficiency, even in the presence of soft-switching. Thus, it would be very desirable to either substantially reduce the DC-bias in the magnetic core, or, if possible, to eliminate it entirely.

In the past, there had been a number of attempts to correct this fundamental limitation of DC-to-DC converters, but with a very limited success. One approach was followed by magnetic manufacturers, such as Hitachi and TDK. In the article "Reducing Magnetic Component Size with Reverse Biased Ferrite Core" published in the Proceedings of the Powercon 6 conference, May 1979, author Shiraki (of Hitachi) proposed to add a permanent magnet to the air-gap and hence by proper orientation of the permanent magnet reverse bias the core in the direction opposite to the DC-bias created by the current of the magnetics winding as shown in FIG. 6a. The net effect is that the AC flux excursions are now extended into the negative core flux swing area as seen in FIG. 6c and would allow the core cross-section and volume reduction by up to 50%. The TDK corporation developed a line of PCH cores based on their reverse biased core modification as reported in the Proceedings of Powercon 9, July 1982 in article "A New Reverse Biased Choke Coil" by Nakamura and Ohta of TDK corporation. Note, however, that both approaches are operated with additional air-gap, that is along the reduced, "heavy line" slope as shown in FIG. 6b and FIG. 6c. Hence, the large inductance reduction from its maximum inductance capability of the un-gapped core (dashed line in FIG. 6b and FIG. 6c) is still present. Clearly, the core can only support the designed-in maximum DC-ampere-turns. If that is exceeded, the core will saturate and the overload capability will be lost. Since the permanent magnet provides a fixed reverse bias independent of the DC load current, at no-load current, the core flux is entirely along the negative part of the core flux saturation characteristic (FIG. 6c). In fact, the permanent magnet generates the maximum allowable bias but in the negative (reverse) direction. This will be compared later with the novel DC Transformer switching converter in which there is an automatic self-balancing, such that at any DC load current there is no net DC-bias and no DC flux in the core.

In addition to the above limited performance improvements, the other practical limitations, such as increased cost of the special cores with inserted permanent magnets, the extra loss due to added core loss of the permanent magnet, etc., rendered this approach unattractive, which is by now abandoned by both of these companies.

Another attempt was made to use a special converter circuit configuration instead of a special magnetic core structure to reduce or eliminate the DC-bias problem. Such an approach is disclosed in U.S. Pat. No. 5,166,869 issued to Bryce L. Hesterman for "Complementary Electronic Power Converter" in which a "complementary transformer" is introduced. This transformer combines the input and output inductors into a coupled-inductor configuration in which the DC flux generated by the input inductor DC current is canceled by the flux generated by the output inductor DC current. The main drawback of the proposed converter is that it is capable of producing only the fixed input to output voltage conversion ratio determined by a fixed turns ratio of the two windings. Hence it cannot provide a regulated voltage through pulse-width modulation of the switches even over a limited input voltage range. From another point of view, there are other fixed conversion ratio converters such as 50% driven bridge type converters, which do not need inductors with DC-bias current for either input or output filtering, hence the DC-bias problem is not present.

Thus, a highly desirable objective is to have a switching converter with a variable conversion ratio, capable of handling a wide range of input voltages and provide regulated output, and at the same time either completely eliminate the DC-bias or reduce it substantially.

Another possible approach is to combine input and output inductor windings into a common coupled-inductor structure as shown in FIG. 7a and as was disclosed in U.S. Pat. No. 4,184,197, "DC-to-DC Switching Converter" by S. Cuk and R. D. Middlebrook and U.S. Pat. No. 4,186,437, "DCto-DC Switching Converter with Zero Input and Output Current Ripple and Integrated Magnetics Circuits" by S. Cuk. As described in the above patents, the basic prerequisite for combining the two windings on a common core is to have identical AC voltages across the two inductors before the coupling, and that the AC voltage matching is maintained over a wide operating range of duty ratio D as illustrated by the identical AC voltage waveforms in FIG. 7b (duty ratios $D_1$ and $D_2$) for the converter of FIG. 7a. In practical applications, a small mismatch of the AC voltages could be absorbed gracefully due to the ever-present leakage inductance between the two windings as explained below.

Since the AC voltages are identical, the placement of the two windings on the same core in a coupled-inductor structure imposes the requirement for equal number of turns N (AC voltage ratio equal to turns ratio as in an ideal transformer), because in the simplified model the leakage inductance is not included. The proper understanding of the AC voltage polarity marking in coupled-inductor and integrated magnetic structures (polarity markings with dot-marked ends as in FIG. 7a) and the actual directions of the instantaneous and DC currents relative to these dot markings (currents $i_1$ and $i_2$ and their DC components $I_1$ and $I_2$ in FIG. 7a) is of critical importance for understanding not only previous inventions but is crucial for understanding the present invention.

Note the difference of this coupled-inductor structure and a transformer. The output inductor instantaneous current $i_2$ in the coupled-inductors of FIG. 7a flows into the dot-marked end, whereas in an AC transformer, the secondary current $i_2$ flows out of the dot-marked terminal. Clearly, the air-gaps $g_1$ and $g_2$ of the two corresponding separate inductors of FIG. 8a and FIG. 8b add, resulting in larger total air-gap $g_1+g_2$ for the coupled-inductor core structure of FIG. 9a. Thus, the corresponding DC component $I_2$ of the load current in the coupled-inductor structure also flows into the dot-marked end. Consequently, the generated DC fluxes $\Phi_1$ and $\Phi_2$ add together (FIG. 9a) resulting in a combined flux vs. ampere-turns characteristic of FIG. 9b. Note that due to the larger total air-gap, the total effective permeance P in FIG. 9b (and hence corresponding inductance) is still further reduced from permenaces of the separate cores in FIG. 8c and FIG. 8d.

The main advantage of the coupled-inductor structure is that it can reduce the ripple current on the output side dramatically and even produce zero output ripple current, as first disclosed in U.S. Pat. No. 4,184,197. As disclosed in U.S. Pat. No. 5,790,005 "Low Profile Coupled Inductors and Integrated Magnetics", the inventors E. Santi and S. Cuk have shown that the air-gap position plays the key role in zero ripple current adjustment. When the air-gap is solely placed on the side of input inductor as in FIG. 10a, the total leakage inductance LL effectively appears solely on the output inductor side as in the model of FIG. 10b. Since the converter of FIG. 7a generates identical AC voltages on the input and output inductors, the net AC voltage across this leakage inductance is zero ($\Delta v = v_{L1} - v_{L2} = 0$) leading to zero ripple current ($\Delta i_2 = 0$) in the output inductor.

Note that the ripple current on the input inductor remains relatively large due to presence of the air-gap. The only way to reduce that ripple would be to reduce the air-gap. Thus, one might be tempted to connect on purpose the coupled-inductors of FIG. 9a into the converter of FIG. 7a so that the output inductor dot-marked end is reversed and connected as in FIG. 11a to the junction between diode $CR_1$ and capacitor $C_1$. Note that with such connection the output inductor DC current $I_2$ will flow out of the dot-marked end. Hence, at least for one duty ratio D=0.5, and provided equal number of turns are used on both windings, a complete DC flux cancellation could be accomplished in the coupled-inductors magnetic core. Thus, the air-gap could be eliminated since the DC-ampere-turns of the two windings cancel. However, elimination of the ripple current is not possible even for this single operating point, since the model in FIG. 11b clearly points out that the small residual leakage inductor would now be subject to an AC voltage, which is two times larger than the input inductor AC voltage $v_{L1}$ resulting in huge circulating ripple current for both input and output inductors.

Clearly, what is needed is a special switching converter which inherently has the opposing flow of the DC currents in the input and output inductor windings (into the dot-marked end and out of dot-marked end respectively) and yet the respective AC voltage waveforms at the two inductors windings should be in phase with each other. Further constraint is to have identical or closely matching magnitudes of both AC voltages and DC currents. Yet an additional constraint is to maintain the above relationship over a wide operating range, that is a wide change of the duty ratio D. Note that even the first constraint of opposing DC current flows (for the net DC-ampere-turn reduction, if not complete cancellation) and the in-phase waveforms of the respective AC voltages is not realized in the converter of FIG. 7a as well as in all other Coupled-inductors and Integrated Magnetics structures proposed in the past.

Out of a large number of possible switching converters, with input and output inductors, only a handful of them even meet the pre-requisite for coupling them on a common magnetic core, that is to have identical voltage waveforms. Thus, imposing the additional even more severe constraints, such as opposing DC current flows as well as their matching magnitudes, may appear at first too restrictive and impossible to achieve at all. This, however, is not the case, as this invention will demonstrate.

Soft-Switching Advantages and Drawbacks

Another critical performance characteristic of the switching converters is how well switching losses are reduced, since the drive toward smaller size converters has inevitably pushed switching frequencies to very high levels, such as 100 kHz and beyond, even up to 1 MHz. The resulting increase of the switching losses as well as the generated Electromagnetic Interference (EMI) noise have led to the invention of soft switching methods to keep both of these deficiencies under control. One of the prior art methods which provides soft-switching in basic DC-to-DC converters is explained by C. Henze, H. C. Martin and D. W. Parsley, in "Zero-Voltage Switching in High-Frequency Power Converters Using Pulse-Width Modulation", *IEEE Applied Power Electronics Conference*, (IEEE Publication 88CH2504-9) pp33–40, 1988 record, using the buck converter as an example.

In order to obtain lossless zero-voltage switching at a constant switching frequency, the common transistor-diode pair is replaced with composite, current bidirectional switches S and S' (when one switch is ON the other is OFF and vice versa) realized in practice with MOSFET transistors. MOSFET switches include an anti-parallel "body" diode and a parasitic drain-to-source capacitor, thus they can be modeled as ideal switches S and S' with a diode and capacitor in parallel as in FIGS. 12a–d. The total switching cycle is broken down into 4 intervals by proper drive timing of the two switches S and S' as shown in FIG. 13. Note that with two controllable switches, two well defined transition intervals are introduced during which both switches are OFF. The first transition interval ($t_N$ in FIG. 13), starting when switch S is turning OFF (as in FIG. 12a) is also known as the "natural" transition ($DT_S$ to $D'T_S$ transition, or simply D to D' transition, where D'=1−D), since just by turning OFF the switch S, the naturally positive inductor current (represented by the current source on FIG. 12a) charges the parasitic capacitor $C_S$ of switch S and discharges parasitic capacitor $C'_S$ of switch S' until capacitor $C'_S$ is fully discharged at which time the body diode of switch S' clamps the voltage at zero and prevents reverse charging of capacitor $C'_S$ of switch S'. At that instance, the switch S' can be turned ON with zero switching losses (FIG. 12b), since the charge of $C'_S$ was already relocated to capacitance $C_S$ of the switch S (charged to $V_g$). Now in order to perform the reverse process during the D' to D transition, the reversal, that is a negative inductor current is needed. The simplest method to accomplish this is to design the output inductor to have a large ripple current, such that its peak-to-peak ripple current is at least 2.5 to 3 times the maximum DC load current. As seen in the inductor current waveform in FIG. 13, the instantaneous inductor current will at some point reverse direction (see FIG. 12c) and look like a negative current source with magnitude $I_N$. Just before the end of complementary interval D' the switch S' is turned OFF initiating the so called "forced" transition (since the inductor current was intentionally forced by the circuit design to become negative). During this forced transition interval ($t_F$ in FIG. 13) the opposite occurs: this negative inductor current charges capacitor $C'_S$ of switch S' and discharges capacitor $C_S$ of switch S until its voltage $V_S$ reaches zero. At that instant body diode clamps the voltage on switch S to zero making it possible for switch S to turn ON at zero voltage in a lossless manner. Hence recycling of the charge stored in the parasitic capacitors $C_S$ and $C'_S$ is provided instead of being dissipated each cycle as in "hard-switching".

Even though loss-less switching can be achieved in this very simple manner, and the voltage stresses on the switches are the same as in a basic PWM converter without soft switching, the big disadvantage is that the magnitude of the output inductor ripple current must be at least more than two times greater than the maximum DC load current in order to achieve the soft switching for all operating conditions. Clearly, this soft switching method suffers from the need to create a large ripple current so that a negative instantaneous inductor current is obtained before the end of $D'T_S$ interval in order to accomplish the forced transition. This, in turn, increases the conduction losses and thus diminishes the savings obtained by reduced switching losses. In addition, an increased output capacitor size is needed to absorb this large ripple current and to reduce the output ripple voltage.

An alternative soft switching method which eliminates the need for a large inductor ripple current was proposed by A. Pietkiewicz, S. Cuk, and M. Brkovic in a U.S. Patent No. 5,539,630 "Soft-Switching Converter DC-to-DC Isolated with Voltage Bi-directional Switches on the Secondary Side of an Isolation Transformer" for bridge type converters. In their soft switching half-bridge converter, the primary, high voltage switching transition is aided by the DC load current reflected to the primary and hence does not need any ripple current to implement soft switching on the primary side. This method, however, requires two voltage bi-directional switches on the secondary side (each implemented by a series connection of a MOSFET transistor and a diode), which are, due to higher voltage drops and excessive conduction losses, not well suited for low output DC voltage applications.

A large number of various resonant converters and their derivatives, such as quasi-resonant and multi-resonant converters, have been proposed in the prior art. A resonant converter is a power converter in which one or more switching waveforms (either switch-voltage or switch-current) is distorted into sinusoidal ringing waveform, with either zero-voltage or zero-current crossing, which enables a corresponding zero-voltage or zero-current switching, thereby reducing switching losses. Even though these resonant converters are effective in reducing switching losses, the very nature of their operation substantially increases either RMS currents or voltage stresses on the devices, and hence ultimately increases conduction losses thereby diminishing savings due to reduced switching losses.

From the above review, it is clear that a new soft switching method is needed which reduces the switching losses without introducing all the other undesirable features associated with prior art soft switching methods and thereby preserves the high overall efficiency. This invention introduces such a novel switching converter, which in its basic operation has the inherent capability of zero-voltage soft switching.

Although much progress has been made in the past, two fundamental problems needed to be solved before further substantial improvements in efficiency and size reductions could be made:

1. Presently, switching DC-to-DC converters utilize magnetic components with a large air-gap in order to avoid saturation due to DC currents in their windings and the presence of DC flux. Large loss of inductance is compensated either by an increase of the switching frequency or by an increase of magnetic core size, or both, with consequent direct reduction of efficiency and increase of the magnetic core and consequently the converter size and weight. A converter with a new magnetic circuit is needed that will eliminate DC flux in the core and thus enable magnetics to be built on a ferromagnetic core without any air-gap and without any wasteful DC energy storage. In that case, the ferromagnetic material will be fully utilized in its ability to generate large inductances and effectively provide filtering, even with small size magnetics and at moderate switching frequencies.

2. A number of soft switching methods proposed in the past, while producing beneficial zero voltage switching and reduction of switching losses, typically suffer from increase of conduction losses, or significantly higher voltage or current stresses on the devices compared to their Pulse Width Modulation (PWM) drive, thus ultimately resulting in diminished savings. Therefore, soft switching methods are needed without such detrimental side loss mechanisms.

Novel DC Transformer switching converter and Isolated DC Transformer switching converter described below successfully solve both of the above problems.

SUMMARY OF THE INVENTION

A primary objective of this invention is to provide a switching DC-to-DC converter that, through the use of a new magnetic device, namely a DC Transformer, achieves simultaneously high efficiency, high overload capability, small size and weight, low input and output ripple currents and low EMI noise.

Another objective is to provide a switching DC-to-DC converter using a special magnetic device, a DC Transformer, which combines all magnetic components of the converter onto a single magnetic core to enable zero total DC-ampere-turns, zero DC flux and hence no air-gap in the magnetic core. Conventional separate inductors or Coupled-inductors and Integrated Magnetic structures have large DC flux and thus need to include a large air-gap to prevent saturation of the magnetic core with consequent large loss of inductance and corresponding performance degradation. This DC Transformer without an air-gap in its magnetic path, has high DC output current overload capability, small size and weight, and provides desirable ripple-free DC input and DC load currents. The DC stored energy is also reduced to zero leading to corresponding increase in efficiency.

Yet another objective is to provide further increase in efficiency and reduction of the size of a DC-to-DC switching converter through the use of two kinds of soft-switching operation: a simpler one, designated partial soft switching, with only timing adjustments of the drives for four MOSFET-like semiconductor switches providing substantial switching loss reduction, and more complex one that includes a resonant inductor already present as a leakage inductance of an isolation transformer to further improve efficiency.

These and other objectives are achieved in a DC Transformer switching converter having input, middle and output inductor windings placed on a common magnetic core to form an effective non-isolated DC Transformer.

The standard AC voltage test is then performed to determine the ends of the DC Transformer windings at which AC voltages are in phase, and these ends, designated as dot-marked ends, are connected as follows: input inductor dot-marked end to the input DC source terminal, output inductor dot-marked end to the output DC load terminal, and the middle inductor dot-marked end to the common input terminal and common output terminal. An input capacitor is connected between unmarked ends of the input inductor and the middle inductor. An input switch periodically connects the unmarked end of input inductor to the common input terminal, and operates in phase with an output switch which connects the unmarked end of output inductor to the common output terminal, i.e., both switches are ON for an interval $DT_S$ and OFF for a complementary switching interval $D'T_S=(1-D)T_S$. An output complementary switch periodically connects the unmarked end of the output inductor to the unmarked end of the middle inductor. A branch comprising the complementary input switch (operating in-phase with the complementary output switch) and an auxiliary capacitor in series is then connected to the converter so that the current through the auxiliary capacitor during complementary interval $D'T_S$ is equal to the sum of the input inductor current and the middle inductor current reduced by the output inductor current, with input inductor and middle inductor currents flowing into their dot-marked ends and output inductor current flowing out of its dot-marked end. The implementation of identical number of turns for all three windings will insure zero total DC-ampere-turns and insure that the DC Transformer, which has no air-gap in its magnetic flux path, will provide high DC overload capability. The foregoing precise connections of the DC Transformer to the remaining switching converter circuitry is necessary for full DC Transformer performance.

Galvanic isolation between the source and the load is required in many practical applications. This is accomplished in another embodiment of the present invention by replacing the middle inductor with an isolation transformer, which provides both galvanic isolation as well as an additional voltage-scaling factor of the output DC voltage equal to the ratio of turns of isolation transformer secondary to its primary number of turns. This Isolated DC Transformer retains all of the properties of its non-isolated DC Transformer counterpart, provided the isolation transformer windings retain the dot marking polarity of the middle inductor winding and provided that the number of turns are chosen as follows: input inductor number of turns equal to transformer primary number of turns, and output inductor number of turns equal to transformer secondary number of turns. This will insure that the total DC ampere-turns are zero and that a new magnetic component, the Isolated DC Transformer which has no air-gap in its magnetic flux path, provides the high DC overload capability. The foregoing precise connection of the Isolated DC Transformer to the remaining switching converter structure is necessary, for full performance of the Isolated DC Transformer.

In yet another embodiment of the present invention, a non-isolated DC Transformer switching converter uses only the drive timing of four MOSFET-like switching devices to accomplish partial soft switching to substantially reduce the switching losses of the input high voltage switches which dominate the switching losses. The drive timing is so adjusted as to provide two transition intervals in each switching period $T_S$, during which both an input switch and a complementary input switch are OFF. The first transition interval is initiated when the input switch is turned OFF. When the voltage of the complementary input switch reduces to zero that switch is turned ON with ideally zero switching losses. The second transition interval is initiated when the complementary input switch is turned OFF. When the voltage of the input switch is substantially reduced, it is turned ON with reduced switching losses and a partial soft switching cycle is completed.

In still another embodiment of the present invention, the Isolated DC Transformer switching converter relies on the leakage inductance of the isolation transformer to assist and accomplish full soft switching. The drive timing is so adjusted as to provide two transition intervals in each switching period $T_S$, during which both an input switch and a complementary input switch are OFF. The first transition interval is initiated by turning-OFF of the input switch. When the voltage of the complementary input switch reduces to zero, the complementary input switch is turned ON with ideally zero switching losses. The second transition interval is initiated when the complementary input switch is turned OFF and the output switch is simultaneously turned ON to force the resonant discharge of a parasitic capacitor across the input switch. When it is fully discharged, the input switch is turned ON at zero voltage to result in zero switching losses.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2a demonstrates that a pure AC inductor with no DC current component is implemented with no air-gap in its magnetic core material path and FIG. 2b shows the flux linkage vs. current characteristic of the AC inductor of FIG. 2a.

FIG. 15a illustrates the switched network obtained for an interval $DT_S$ for the converter of FIG. 14a and FIG. 15b illustrates the switched network obtained for a complementary interval $D'T_S$ for the converter of FIG. 14a.

FIG. 16 is a graph showing the linear DC voltage conversion ratio of the present invention of FIG. 14a.

FIG. 17a illustrates a closed loop regulator for the converter of FIG. 14a and

FIG. 17b shows the variable duty ratio D provided by electronic control for the regulation of the output DC voltage of the converter in FIG. 17a.

FIG. 19a illustrates that two DC currents of opposing directions result in zero DC flux and FIG. 19b illustrates a magnetic circuit with two windings with opposing DC currents resulting in zero DC flux in the core, while

FIG. 24b is a graph showing operation on the positive part of magnetics material saturation characteristic for the magnetics of FIG. 24a.

FIG. 29a Another embodiment of the DC Transformer of the present invention of FIG. 21 utilizing the DC Transformer with a small air-gap to adjust for zero ripple current in the output inductor and FIG. 29b shows a simplified equivalent magnetic circuit model for the DC Transformer circuit of FIG. 29a, while

FIG. 35a illustrates another embodiment of the present invention and in

FIG. 36c illustrates the actual placement of the windings on the Isolated DC Transformer for the isolated converter of FIG. 36a.

FIG. 37b shows a new symbol of the Isolated DC Transformer model of FIG. 37a.

FIG. 40 illustrates another embodiment with all MOSFET implementation of the converter in FIG. 36a.

FIG. 45a illustrates the time domain waveform of the sum of input and middle inductor currents of the converter in FIG. 18a, FIG. 45b illustrates the time domain waveform of the output inductor current of the converter in FIG. 18a, FIG. 45c illustrates the total of the three inductors' DC currents of the converter in FIG. 18a, which is equal to zero, and FIG. 45d is a time domain waveform of the three combined ripple currents, while FIG. 45e is a graph of the current in capacitor C of the converter in FIG. 18a which is only present during the D'$T_S$ time interval and consist only of an AC ripple component with a negative part $I_N$ at the end of D'$T_S$ time interval.

FIG. 52b is an equivalent circuit model of the circuit in FIG. 52a.

FIG. 52c is a simplified circuit model of the circuit in FIG. 52b.

FIG. 53a is a graph of waveforms at duty ratio D=0.25 and in

FIG. 53b of waveforms at duty ratio D=0.75.

FIG. 53c is then a timing diagram of the simplified explanation of both soft-switching transition intervals.

DETAILED DESCRIPTION OF THE INVENTION

Switching Converter and Theory of Operation

The unique DC transformer configuration and natural soft-switching feature of the present invention provide together a switching DC-to-DC converter which overcomes the problems of the prior art converters and results in high efficiency, extreme overload capability, and high power density. However, for purposes of easier understanding, the basic operation of the switching converter is first introduced in FIG. 14a without a detailed DC Transformer structure and with ideal single-pole double-throw switches, each switch with two positions S$_1$ and S'$_1$, and S$_2$ and S'$_2$, where "prime" designates the complementary switch positions. The converter consists of the input inductor L$_1$ and output inductor L$_2$ which maintain the continuity of the input and output currents at all operating conditions and hence result in non-pulsating input and output currents. In addition, in the middle of the converter, there is another so-called middle inductor L$_m$ (given that terminology for easier distinction and since it is in the middle of the converter). Its role will be explained later after some analysis reveals its properties. The converter also features three capacitors, an input capacitor C$_1$, an auxiliary capacitor C, and an output capacitor C$_2$. Note that the output capacitor C$_2$ is directly across the output voltage and is included only to make a more effective second-order output filter to further reduce the switching ripple. Thus, while capacitor C$_2$ is always included in the practical implementation for ripple voltage reduction, it is not essential for the converter switching operation and is therefore left out from this analysis and in further discussions. This leaves the auxiliary capacitor C and input capacitor C$_1$, which are involved in the switching process.

Figure 14A:
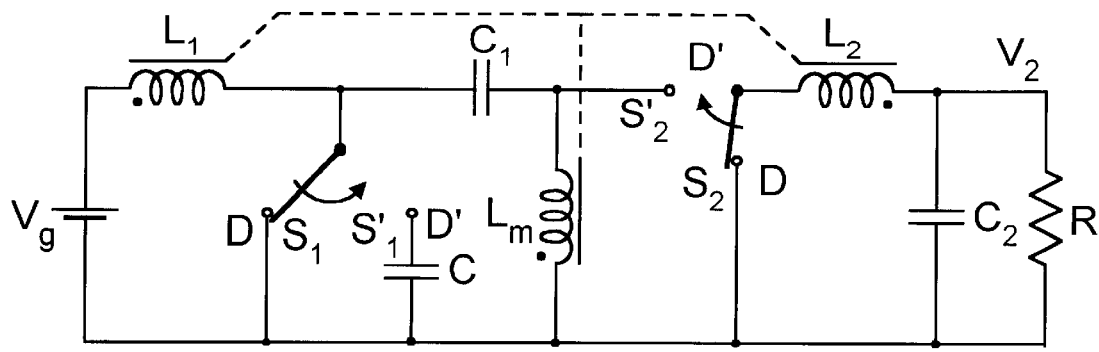
FIG. 14a is a simplified circuit diagram of the present invention using two single-pole, double-throw switches
Figure 14B:
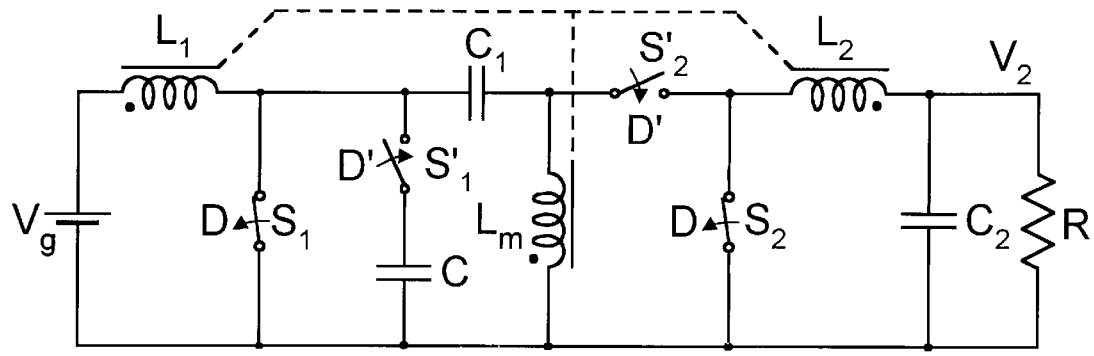
FIG. 14b shows those switches implemented as an input switch $S_1$, complementary input switch $S'_1$, an output switch $S_2$ and a complementary output switch $S'_2$, the synchronized operation of which is shown in FIG. 14c in a timing diagram defining the relative states of the ideal switches in the circuit diagram of FIG. 14b.
Figure 14C:
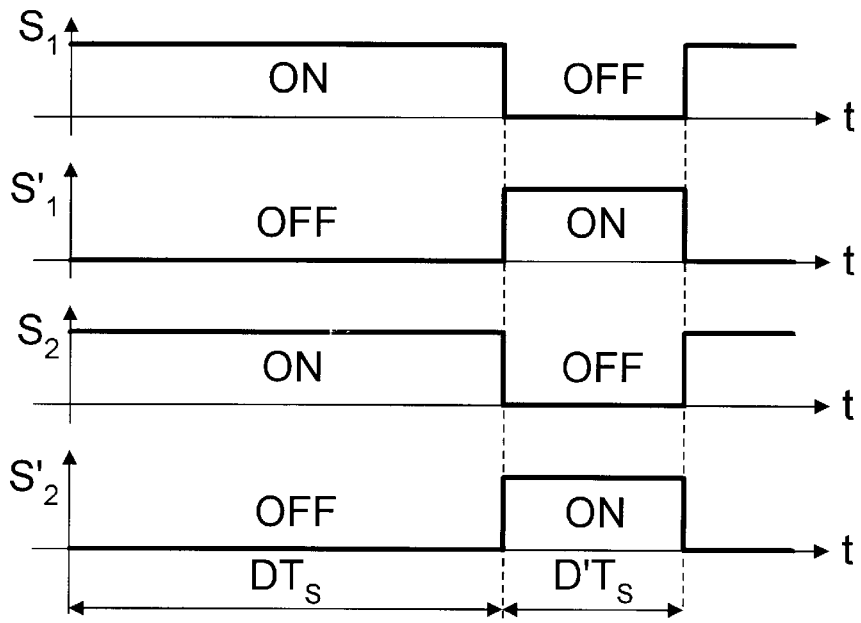

Each of the two single-pole, double-throw switches of FIG. 14a is replaced by two single-pole, single-throw switches to result in converter of FIG. 14b with four switches: input switch S$_1$, complementary input switch S'$_1$, output switch S$_2$, and complementary output switch S'$_2$. As seen in FIG. 14b, the S$_1$ and S$_2$ switches are operated in-phase, that is, in this idealized version, they are operated so that both are turned ON at the same time and kept on for time interval $DT_S$ and then turned OFF at the same time and kept OFF for complementary interval $D'T_S$, where $D'=1-D$ is the complementary duty ratio. Complementary switches $S'_1$ and $S'_2$, as the name suggests, are operated in a complementary way, that is out-of-phase with respect to their counter-parts, switches $S_1$ and $S_2$ respectively as also reinforced with the timing diagram of FIG. 14c. Note that this idealized switching will result in initially "hard-switching" operation of the converter. Nevertheless, this simplified form is sufficient to expose the surprising and unique properties of the new converter, which are at the root of its outstanding performance characteristics: high efficiency and high power density with extreme overload capability.

Figure 1A:
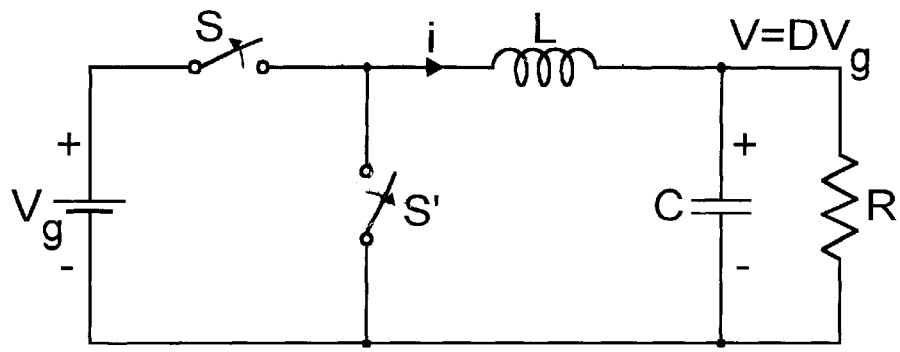
FIG. 1a illustrates prior-art buck converter topology.
Figure 1B:
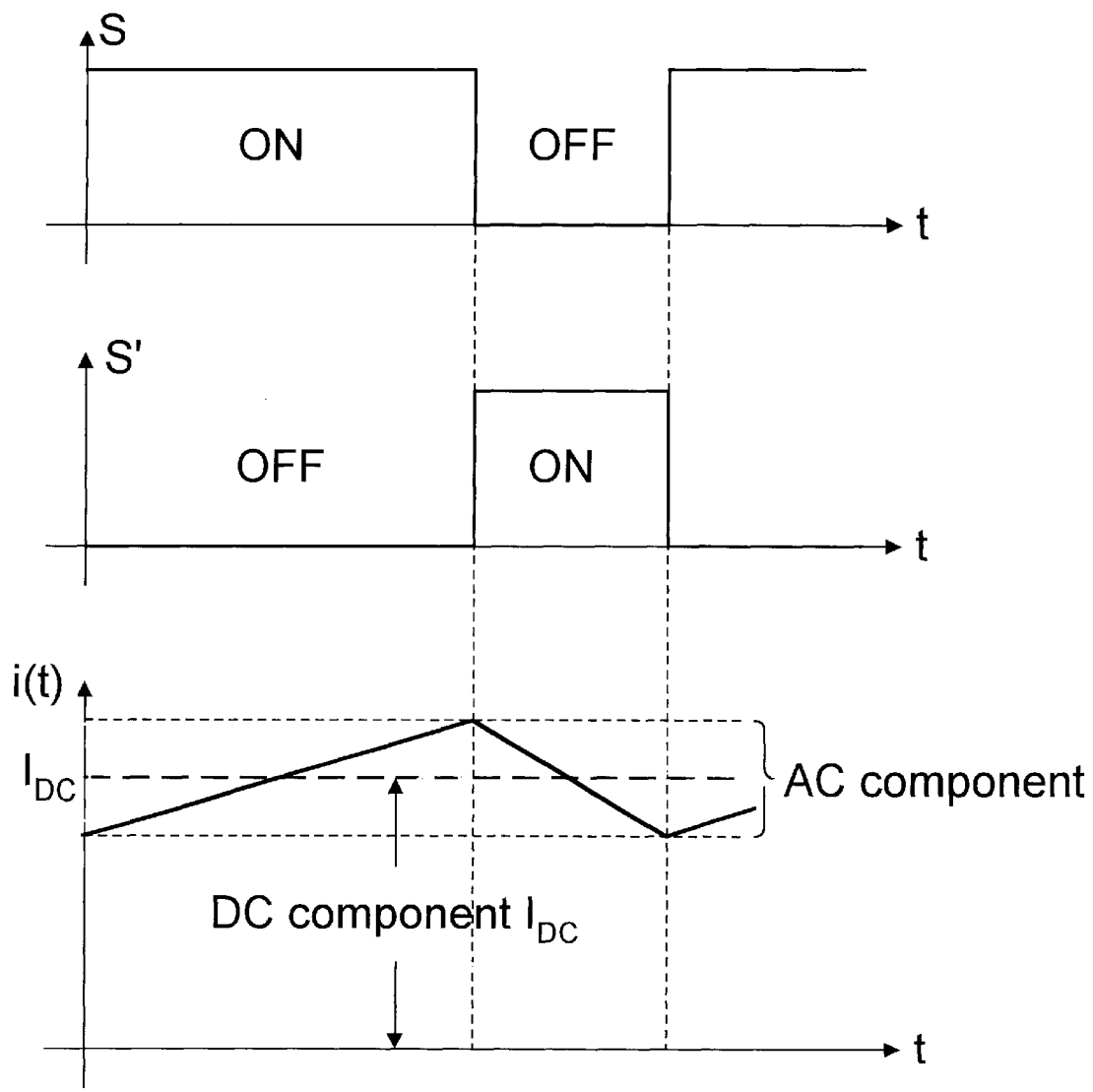
FIG. 1b illustrates an example of the buck converter which demonstrates that the inductors in switching DC-to-DC converters have DC-bias current $I_{DC}$ in addition to the triangular AC ripple current component.
Figure 2A:
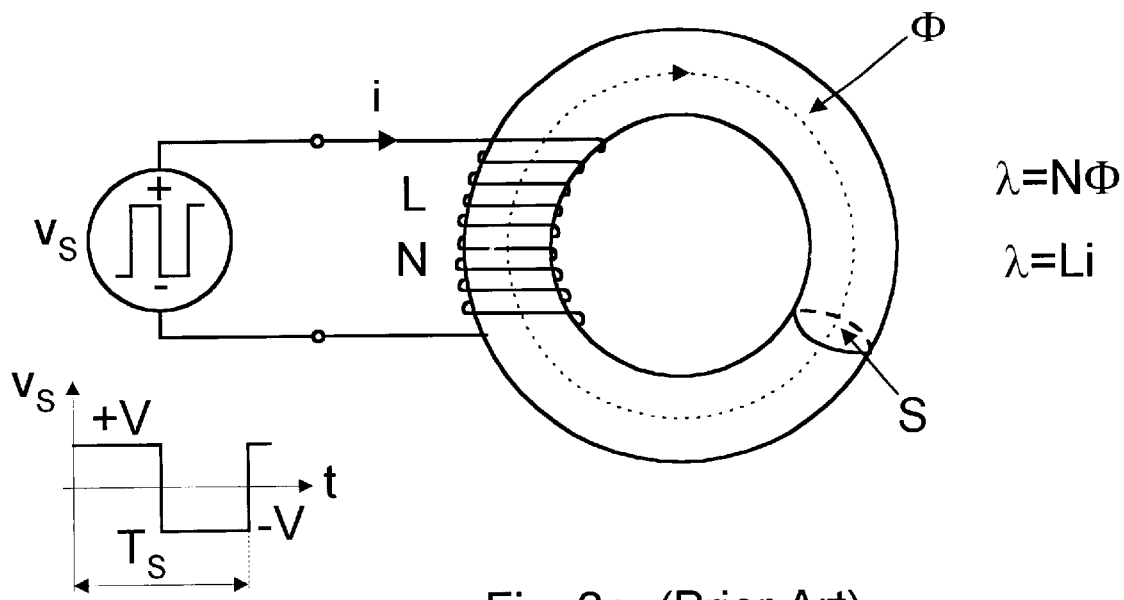
Figure 2B:
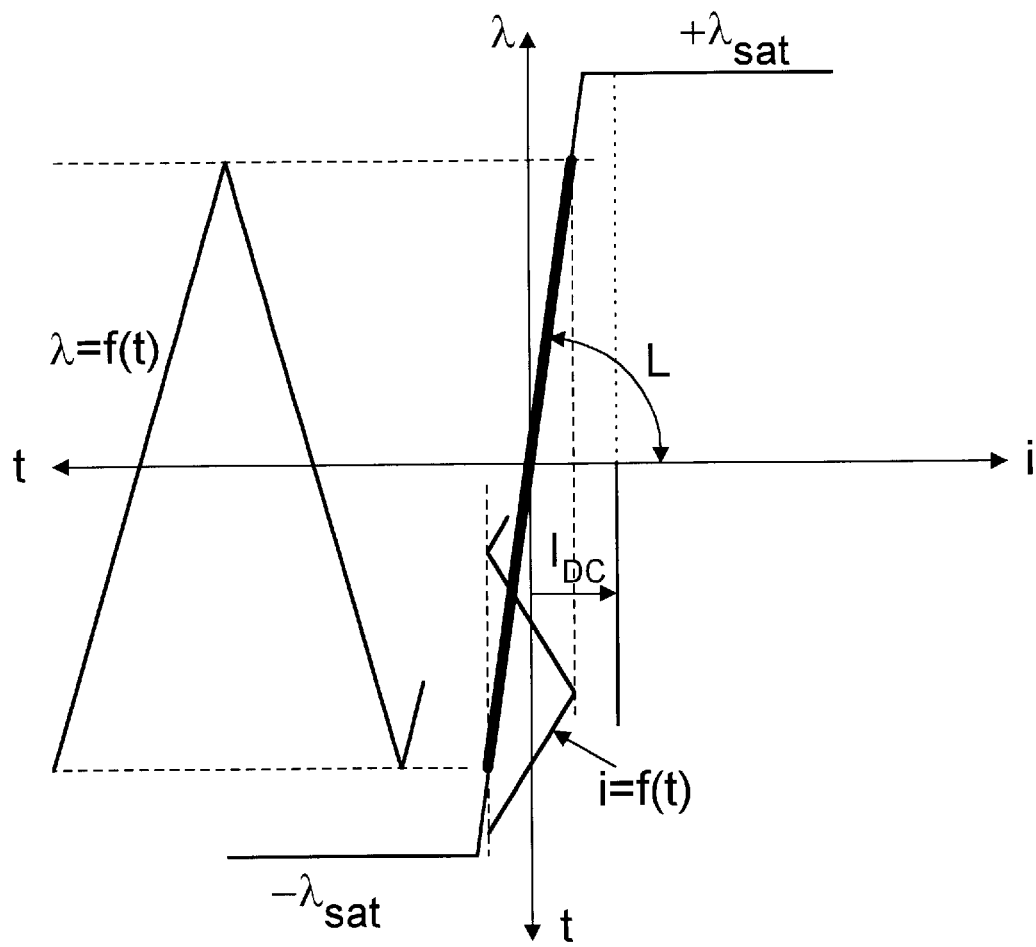
Figure 3A:
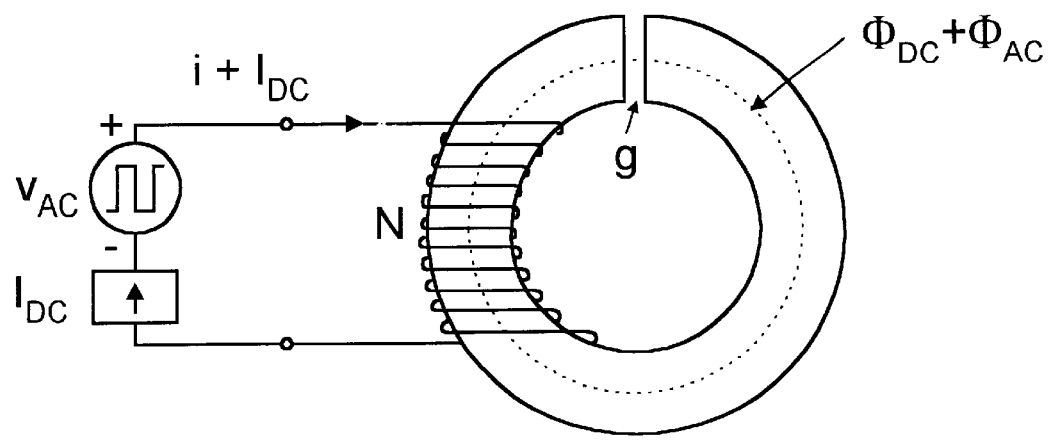
FIG. 3a illustrates that an inductor with a DC-bias current must have an air-gap in the magnetic flux path in order to prevent saturation of the ferromagnetic core material and FIG. 3b shows the large reduction of the un-gapped core inductance L to the inductance $L_g$ with the air-gap g.
Figure 3B:
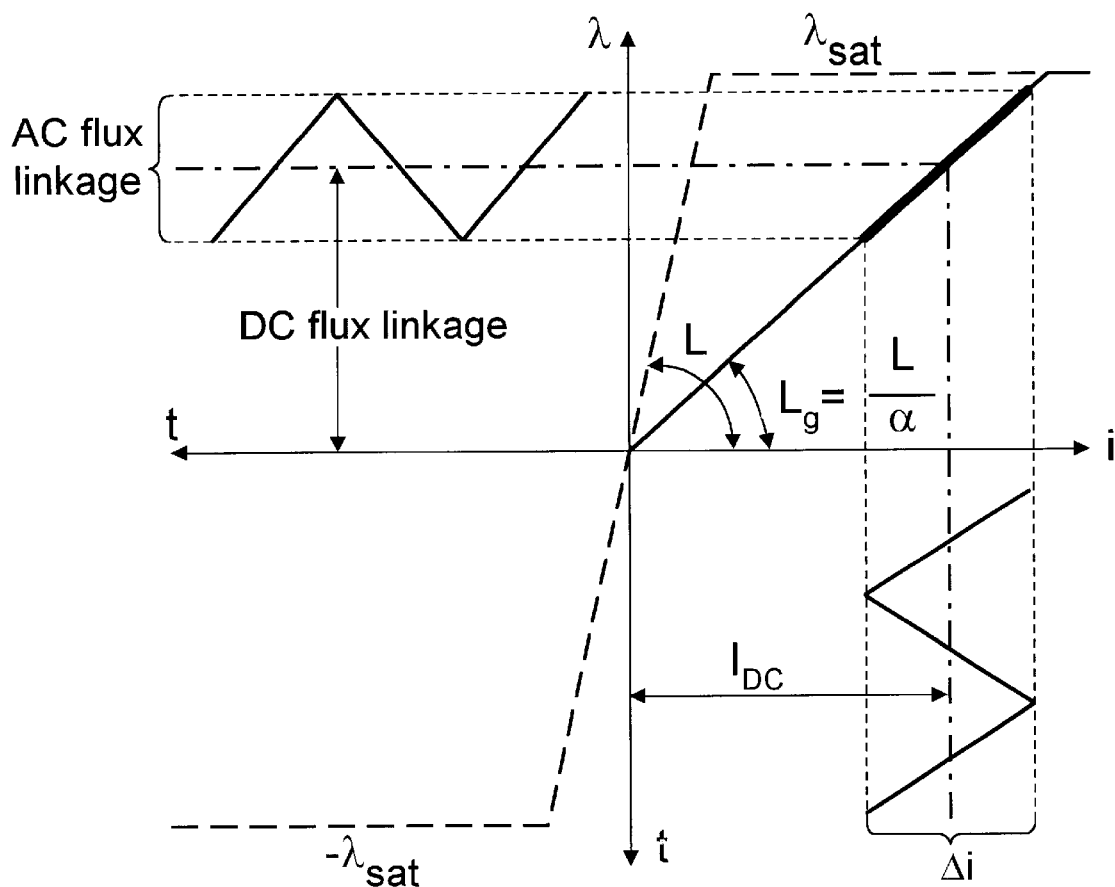

A simple switching converter such as the prior-art buck converter of FIG. 1a was easy to analyze and understand. The new converter even in its simplified form of FIG. 14a is obviously much more complex. As the first step, the existence of steady-state operation must be proved; that is after a number of repetitive switching at constant switching frequency $f_S$, all capacitors in the circuit must be charged to finite DC voltages and all inductors must conduct corresponding finite DC currents. Thus, in order to prove the existence of such a steady state operation, and find the actual DC voltages on capacitors and DC currents in inductors as a function of the steady-state duty ratio D, the input voltage $V_g$, and DC load current $I_2$, the state-space averaging method is employed as described in more details in the book "Advances in Switched-Mode Power Conversion", vol. I, vol. II, and vol. III, by S. Cuk and R.D. Middlebrook, or in the technical paper, "A General Unified Approach to Modeling Switching Converter Power Stages", by the same authors and published in Proceedings of Power Electronics Specialists Conference (PESC), June 1976.

The proper mutual coupling of the three inductor windings in FIG. 14a and FIG. 14b is an integral part of the converter and largely responsible for its unique performance. However, for the purpose of calculating steady-state (DC) quantities by use of the state-space averaging method, the actual mutual coupling between the windings is not needed.

Figure 15A:
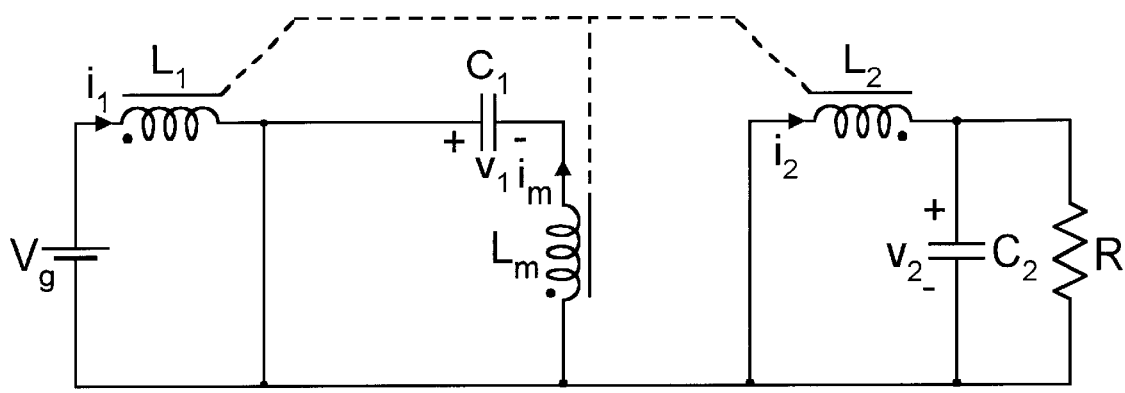
Figure 15B:
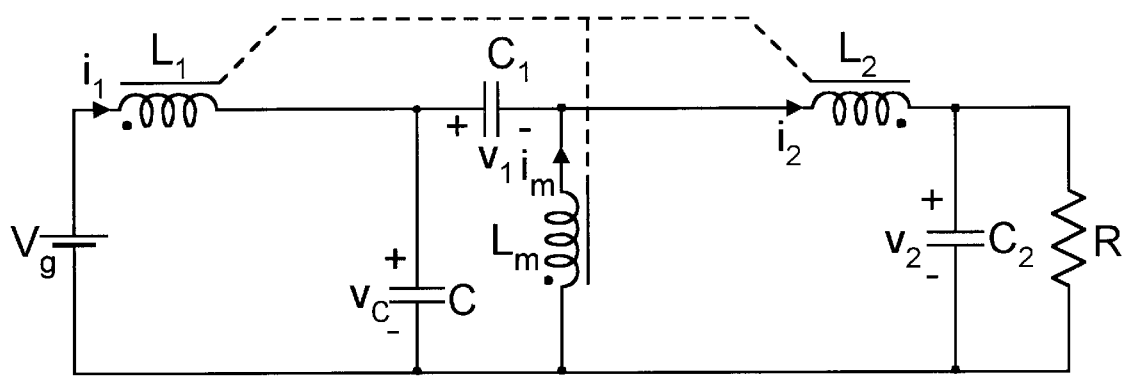

The analysis starts with writing the complete state-space equations for the two switched networks obtained: one for the ON time interval $DT_S$ as shown in FIG. 15a and another one for the OFF time interval $D'T_S$ as shown in FIG. 15b. In both switched networks of FIG. 15a and FIG. 15b, the assumed directions of the inductor currents and polarity of the DC voltages on capacitors are as marked. If the actual calculations result in, for example, DC voltages with a negative sign, then the above assumed polarity is not correct and the opposite voltage polarity is the actual capacitor voltage polarity. The state-space equations are then averaged with respective duty ratios D and D' as the weighting factors and the steady-state criterion imposed. The resulting five equations with five unknowns, DC voltages $V_1$, $V_2$, and $V_C$ and DC currents $I_1$ and $I_m$ are then solved in terms of the known quantities, duty ratio D, input voltage $V_g$, and the load current $I_2$ to result in the following steady-state solution:

$$V_1=V_g \quad V_C=V_g/(1-D) \quad V_2=DV_g \tag{1}$$

$$I_1=DI_2 \quad I_m=(1-D)I_2 \tag{2}$$

$$I_m=(1-D)I_2 \tag{2}$$

Figure 4A:
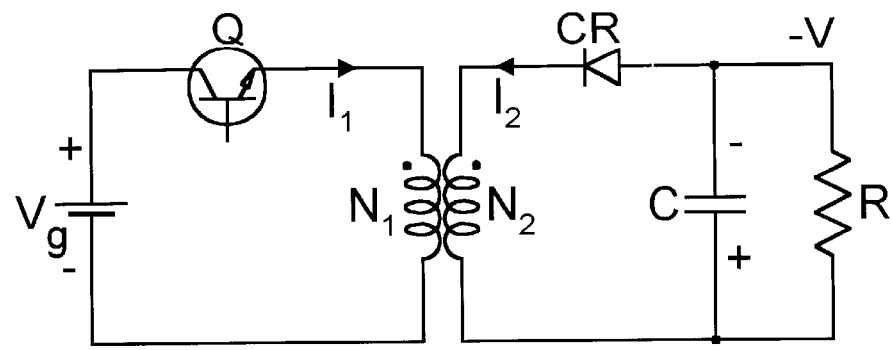
FIG. 4a is a prior-art fly-back converter.
Figure 4A:
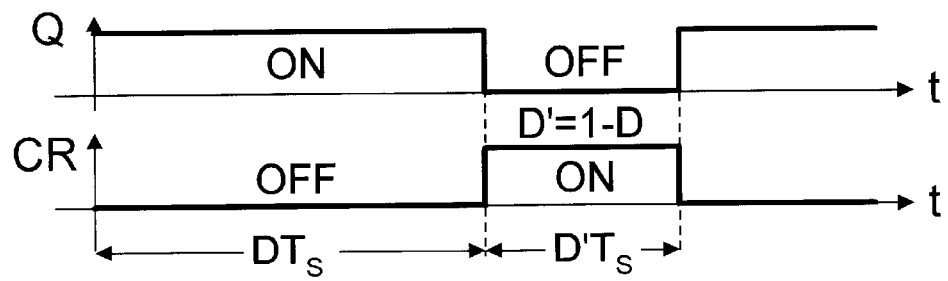
Figure 4B:
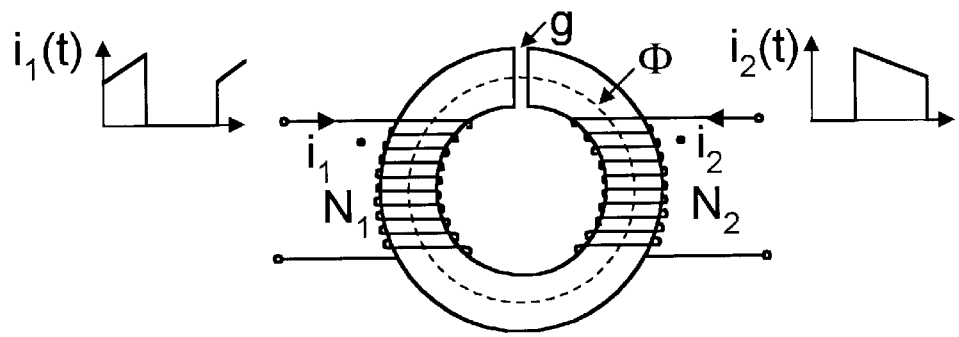
FIG. 4b demonstrates that the transformer of the fly-back converter must have an air-gap.
Figure 5:
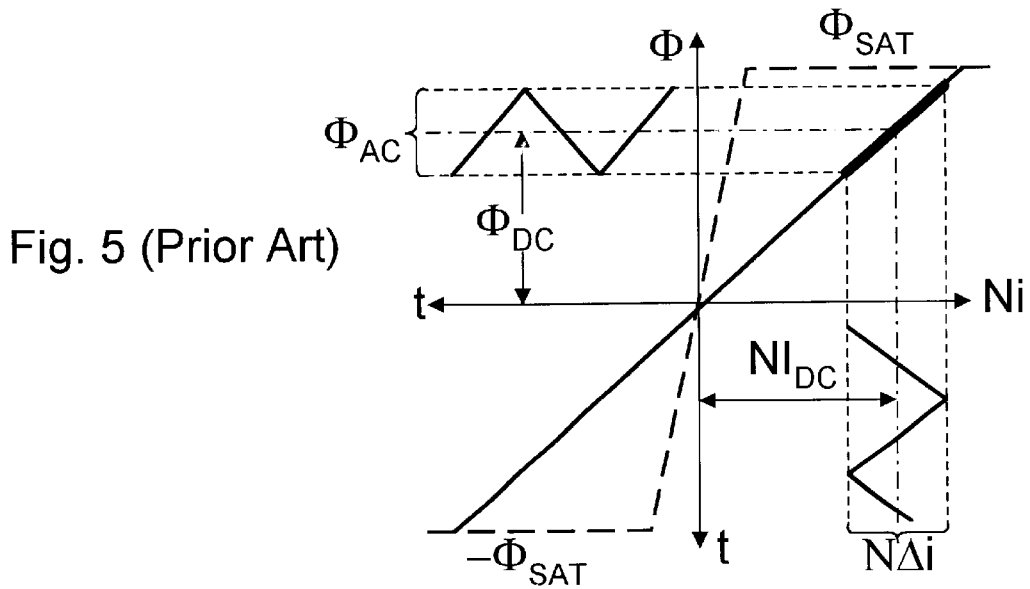
FIG. 5 shows the large reduction of the transformer's magnetizing inductance of the fly-back converter of FIG. 4a due to the needed air-gap in the magnetic core.
Figure 16:
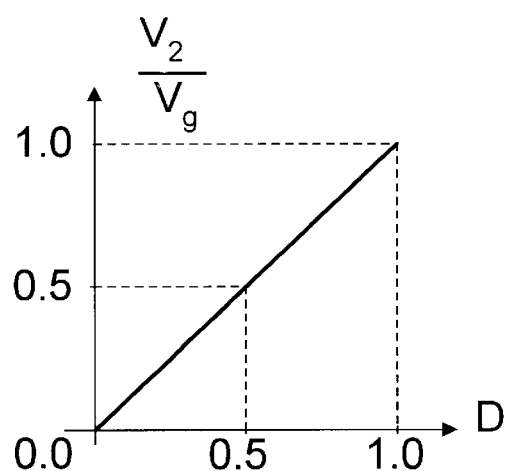

The steady-state solution given by equations (1) and (2) also confirms that this converter does have a finite steady-state, as it was also confirmed by building experimental prototypes and verifying the above steady-state conditions. Note also that since all solutions in (1) and (2) came out with the positive sign, the directions of the inductor currents and polarity of the capacitor voltages assumed as in FIG. 15a and FIG. 15b also correspond to actual direction of inductor currents. The same holds true for the capacitor voltages so that the actual polarity of the capacitor DC voltages is as originally assumed, so that the positive DC voltage source between input terminal and common input terminal results in the positive DC output voltage between the output terminal and common output terminal, where input and output common terminals in this case of the non-isolated converter are connected together to a common point, usually designated as ground. Thus, the converter of FIG. 14a is polarity non-inverting and has the same DC conversion ratio as the conventional buck converter of the prior art, that is $V_2/V_g=D$. This DC conversion ratio is a linear function of duty ratio D as shown in FIG. 16. In many practical applications the galvanic isolation between DC input voltage source and output DC load is not required and a simpler non-isolated configuration is often preferred. However, in the majority of applications where a non-isolated converter is adequate, positive input to positive output voltage conversion is required, so that the polarity non-inverting feature of the present invention is a distinct advantage. For comparison, the prior art converter of FIG. 4a is the flyback converter which in its basic non-isolated configuration is inherently polarity inverting, thus limiting the scope of its application as a non-isolated converter.

It appears that the present invention has the same limitation as the buck converter, that the converter is only capable of the step-down conversion and could not provide a voltage higher than the input DC voltage. This is, however, not the case, and this constraint will be later removed by the introduction of the isolated extension of the present invention as well as the autotransformer extension.

Figure 17A:
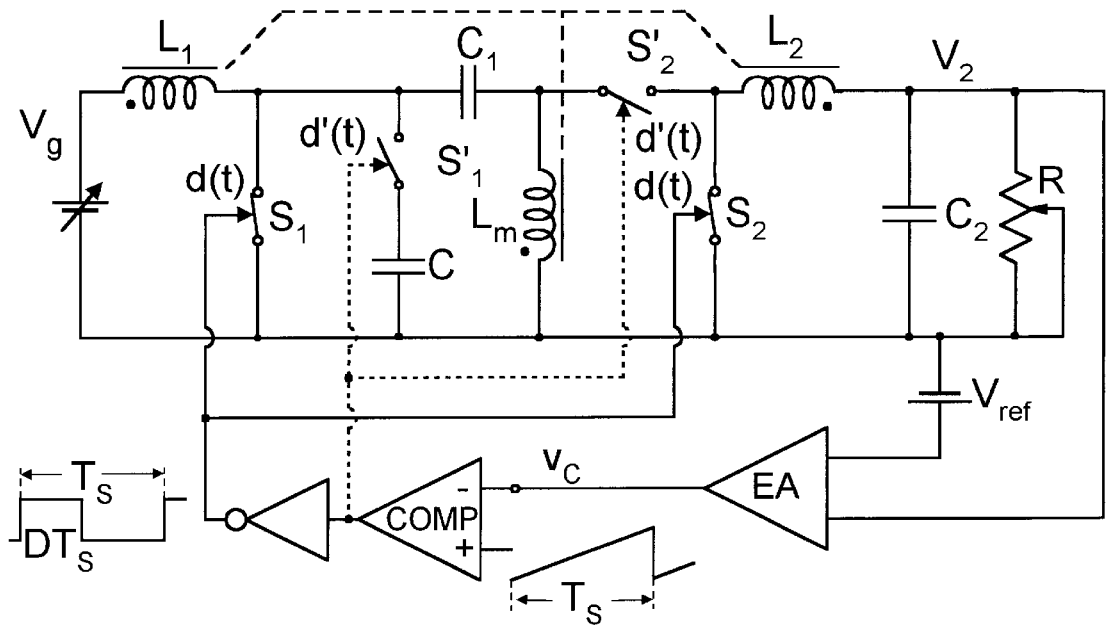
Figure 17B:
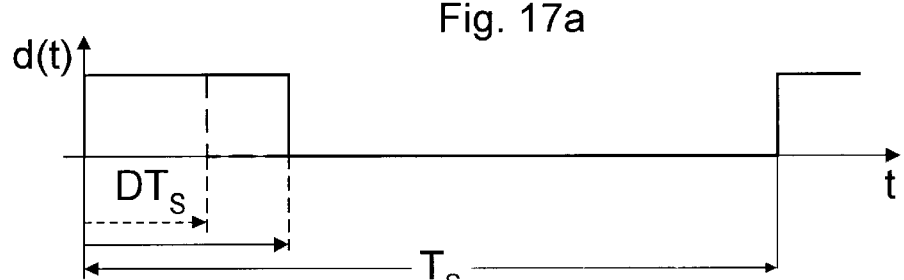

In most practical applications, the output voltage is required to be regulated and kept constant despite a large variation of the input DC source voltage and a large variation of the output DC load current. Both of these variations can be absorbed and the output voltage regulated by closing the conventional feedback control loop around DC-to-DC converter to obtain a regulated DC supply as in FIG. 17a. The feedback control loop modulates the duty ratio D shown in FIG. 17b as needed to provide the regulated output voltage. Thus, it is important that the switching converter operation and its key features are effective over the wide range of operating duty ratio D such as, for example, from D=0.33 to D=0.66 for a 2:1 input DC voltage range. The three fundamental properties of the present invention described below are indeed preserved over the wide range of the operating duty ratio.

Three Fundamental Properties

Relationship among DC Currents of the Three Inductors

From the two DC current equations in (2) one can derive easily a very simple and most remarkable relationship among the three DC inductor currents, which is at the root of the unique performance of this converter. Namely by adding DC currents of the input inductor $I_1$ and the middle inductor $I_m$ from (2) we obtain this key relationship among input inductor, middle inductor and output inductor DC currents:

$$I_1+I_m=I_2 \tag{3}$$

Figure 17C:
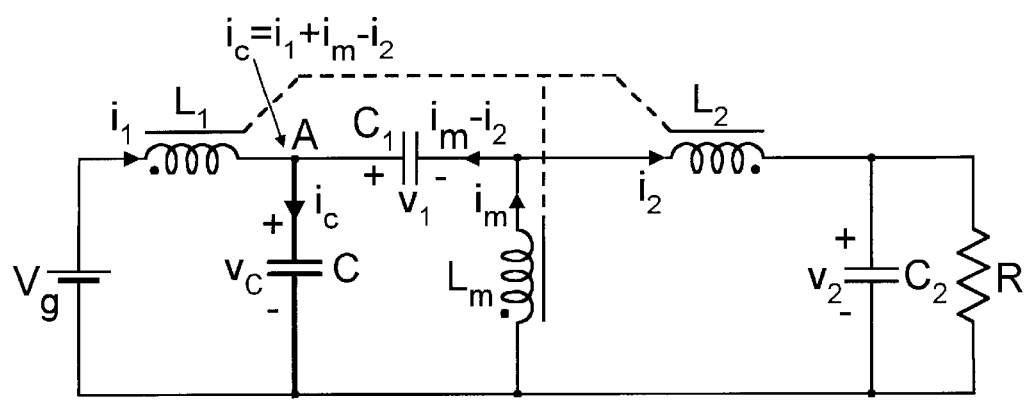
FIG. 17c illustrates the switched network for a complementary interval $D'T_S$ used to establish the fundamental relation among the currents of the three inductors.

A quite unexpected result is obtained: the fundamental relationship (3) is independent of the operating duty ratio D, even though both the input inductor DC current $I_1$ and middle inductor DC current $I_m$ are each strongly dependent on operating duty ratio D as per (2). Note also the essential role played by the middle inductor, which provides just the needed duty ratio dependent DC current so that relationship (3) would hold true for any duty ratio D. Without the recognition of this relationship neither a very compact and highly efficient magnetics could be realized nor the natural soft switching improvement could be made. This very unique and crucial relationship can also be verified in an alternative and simple way by just inspection of the switched-network during complementary OFF time interval $D'T_S=(1-D)T_S$ displayed in FIG. 17c. The summation of the instantaneous currents (both DC currents and superimposed AC ripple currents) at the node A in FIG. 17c leads to the instantaneous capacitor current $i_C(t)$ expressed in terms of the three inductor currents $i_1$, $i_m$ and $i_2$ as:

$$i_C(t)=i_1(t)+i_m(t)-i_2(t) \quad (4)$$

This equation can be further separated into two relationships, one relating the DC components of the inductor currents (which are denoted here and elsewhere in the text with capital letters) and the AC ripple components (which are denoted here and elsewhere in the text with A sign). Thus we have:

$$I_C=I_1+I_m-I_2 \quad (5)$$

$$\Delta i_C(t)=\Delta i^1(t)+\Delta i_m(t)-\Delta i_2(t) \quad (6)$$

Note, however, that the DC component $I_c$ of the current in auxiliary capacitor C must be zero $$I_C=0 \quad (7)$$

since the auxiliary capacitor C is not connected to the converter circuit during the ON time interval $DT_S$, but only during the OFF time complementary interval $D'T_S=(1-D)T_S$ through the complementary input switch $S'_1$. Thus, the auxiliary capacitor during OFF time interval $D'T_S$ must have a net zero DC current $I_C=0$. Otherwise, a positive DC current $I_C$, for example, would every cycle charge this capacitor and thereby would keep increasing its DC voltage $V_C$ up to infinity. Yet, the state-space averaging confirms that this capacitor will have a finite DC voltage given by $V_C=V_g/(1-D)$ as in (1). Thus, with (7), equation (5) reduces to the same result as equation (3).

Relationship among the AC Voltages of the Three Inductors

Figure 18A:
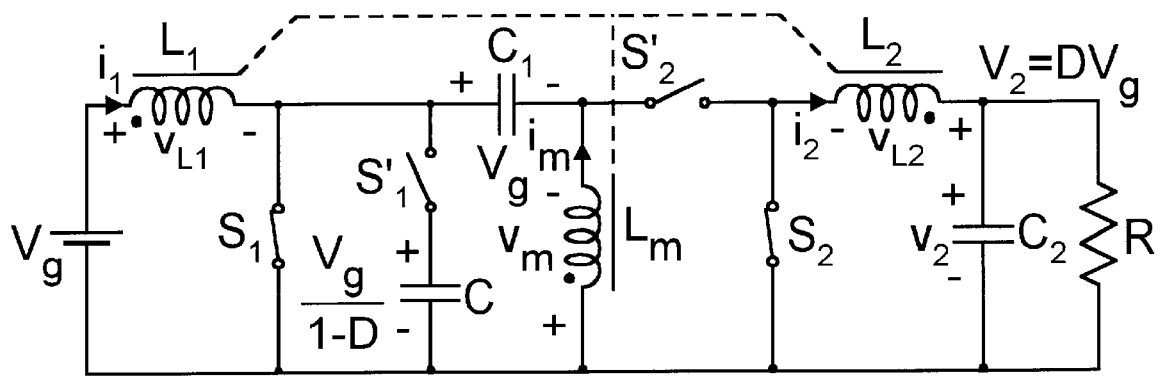
FIG. 18a illustrates the converter of FIG. 14a with directions of the inductor currents and positive polarities of the inductor voltages during $DT_S$ and FIG. 18b shows the AC voltages present on the three inductors of FIG. 18a during a complete cycle of $T_S$.
Figure 18B:
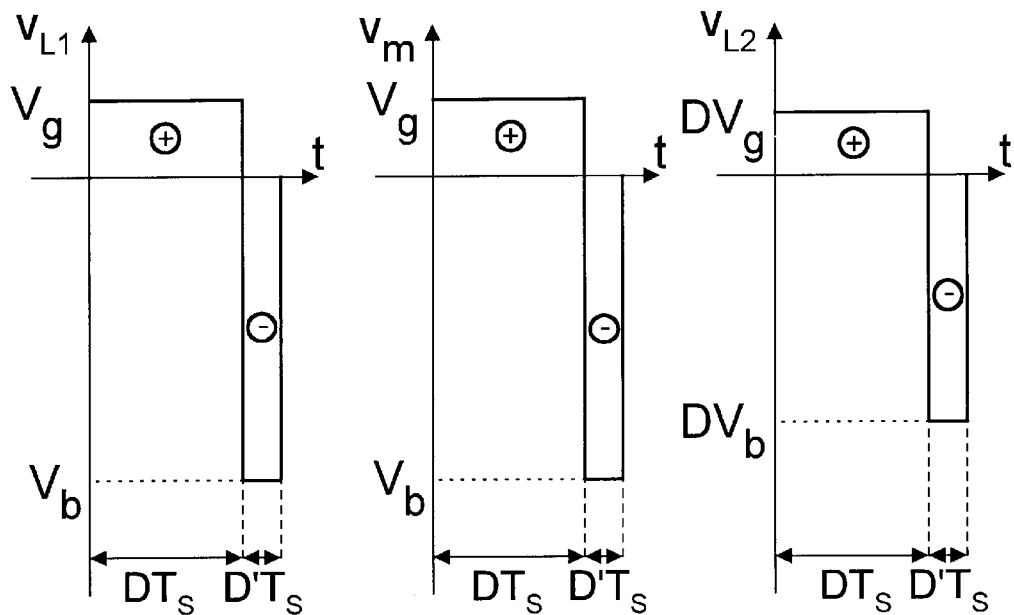

The actual direction of all DC inductor currents is already established by equations (2) and is as in FIG. 18a. Of critical importance for fully understanding the unique performance features of this converter is to also establish the actual polarity of the AC voltages on three inductors. Then the correlation of these actual AC voltages of three inductor windings with the actual directions of their respective DC currents will lead to some really very surprising results. To facilitate the polarity determination of AC voltages on inductors, the DC voltages of all three capacitors are As explicitly shown in terms of $V_g$ and duty ratio D in FIG. 18a. The AC voltages on the inductors are designated as $v_{L1}$, $v_{L2}$, and $v_m$ and their positive polarity marked with positive (+) sign as shown in FIG. 18a which also coincide with their dot-marked designations. The actual time domain voltage waveforms on these inductors can be deduced to be as in FIG. 18b, by simply looking at inductor voltage levels during the time when input switch $S_1$ and output switch $S_2$ are closed ($DT_S$ interval) and when they are open (complementary $D'T_S$ interval) in the schematic of FIG. 18a. Thus one can easily establish that all three inductor AC voltages are in-phase relative to the positive polarity designations marked in FIG. 18a (and the corresponding dot-marked designations). Furthermore, one can ascertain the following important relationship among their magnitudes:

$$v_{L1}=v_m \quad (8)$$

$$v_{L2}=Dv_m \quad (9)$$

The first relationship (8) is also easily seen from the loop consisting of $V_g$, $L_1$, $C_1$, and $L_m$, in which input capacitor $C_1$ and DC voltage source $V_g$ are short for alternating current (AC), which AC-wise puts input inductor $L_1$ in parallel with middle inductor $L_m$ hence they share the identical AC voltage. Furthermore, it is important to observe that this relationship holds true for any operating duty ratio D, since (8) is independent of D.

The relationship (9) can likewise easily be deduced from the voltage waveforms during interval $DT_S$ when input switch $S_1$ and output switch $S_2$ are closed. For $S_1$ closed, $v_{L1}=V_g$; for $S_2$ closed $v_{L2}=DV_g=Dv_{L1}$, hence $v_{L2}=Dv_{L1}=Dv_m$. for interval $D'T_S$. Since both voltages $v_{L1}$ and $v_{L2}$ must be volt-second balanced, their magnitudes in $D'T_S$ interval are respectively $V_b$ and $DV_b$, where $V_b$ is given by:

$$V_b=V_g D/(1-D) \quad (10)$$

Relationship between DC Currents and AC Voltages of the Three Inductors

The previous two sections have dealt with two fundamental relationships among the three inductors:

1. Relationship among the magnitudes of the DC currents of the three inductors;
2. Relationship among the magnitudes of the AC voltages of three inductors as well as their phase relationships (whether they are in phase or out of phase relative to each other).

Clearly, the relationship between the magnitudes of physical quantities of the same kind, such as between DC currents or between AC voltages, is an obvious and a well-defined relationship. When a relationship is invoked between physical quantities of a different kind, such as between DC currents and AC voltages, as suggested by the subtitle, a more subtle relationship exists. At first, this subtitle may appear ill-defined: what kind of relationship could exist among dislike physical quantities, DC and AC quantities, which are heretofore used in separate DC and AC analysis in circuit theory?

As shown before in equations (1) and (2), the new switching converter imposes not only the magnitude of DC currents in each inductor winding of the converter, but also the actual direction of the DC currents in the inductor windings (the positive directions of DC currents are shown by the arrow in the converter of FIG. 18a). In addition, the switching converter also imposes both the magnitude of the DC voltages on all capacitors as in (2), and AC voltages on inductors including the specific polarity of the AC voltages as established by the waveforms in FIG. 18b.

Figure 19A:

Let us now separate the consideration of the DC currents in the windings from the AC voltages of the same windings placed on a common single-loop magnetic core. For simplicity of the discussion, we will at first limit the considerations to just the input inductor and output inductor in FIG. 18a and assume that they carry DC currents only. The presence of the AC voltage will then be taken into account afterwards. What links the DC currents and their direction in the winding to the DC flux orientation around a straight current carrying conductor goes back to the basic electromagnetic laws and Oersted's discovery in 1820 establishing a direct connection between the constant electric current and magnetism. The orientation of the DC flux established around the conductor is uniquely dependent on the direction of the DC current in the wire. If another straight conductor is placed right adjacent to the first conductor, but carrying the current in opposite direction such as shown in FIG. 19a, the two opposing DC currents produce DC fluxes which cancel each other and result in zero DC flux around the conductors.

Figure 19B:
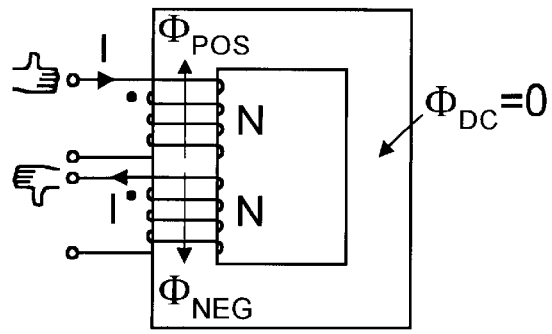

The same holds true, if the two conductors are arranged as in FIG. 19b as two windings on a common core made out of ferromagnetic material. Due to much higher permeability of the magnetic material than the air, almost all DC flux generated by the DC current in each winding is contained in the magnetic core, and thus the leakage flux in the air can be neglected in the first approximation. If each winding in FIG. 19b has the same number of turns N and carries the same DC current I but, as a direct analogy to FIG. 19a, the DC currents flow in opposite direction, the total DC flux in the magnetic core is zero. However, how do we know, what is opposing current direction? Here we can invoke the classical right hand rule. By placing the fingers of the right hand around the winding in the direction of the current flow through the winding turns, the thumb will point the actual direction of the DC flux. Let us now chose the flux direction of the top winding of FIG. 19b to be positive and let us also designate with dot-mark the end of this winding into which the current flows. If a current in another winding placed on the same core generates the DC flux in the same direction, then the end of second winding into which the DC current is flowing will also be designated as dot-marked end. Thus, after determining the dot-marked ends of the windings, we can establish the following simple rule:

The DC current flowing into dot-marked end generates positive DC flux, while the DC current flowing out of the dot-marked end generates negative DC flux.

This rule only correlates the direction of the DC currents and the generated DC fluxes, but not their magnitudes. However, the Ampere's Circuital Law gives also quantitative relationship as well as directional relationship. From Ampere's law the DC flux is directly proportional to DC-ampere-turns NI, i.e., the product of number of turns N and DC current I. Thus, equal number of turns N of the two windings of FIG. 19b will result in equal magnitude but opposing direction of generated DC fluxes and in zero DC flux in the core of FIG. 19b.

Figure 19C:
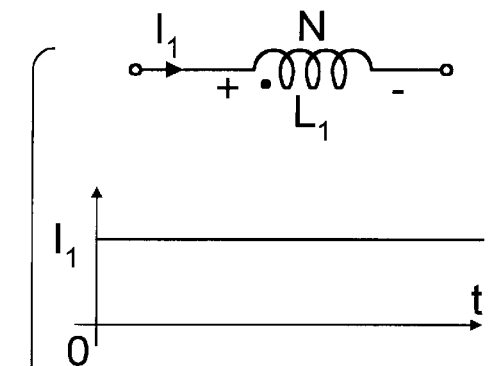
FIG. 19c illustrates how a DC current flowing into a dot-marked end generates positive DC-ampere-turns and positive DC flux.
Figure 19C:
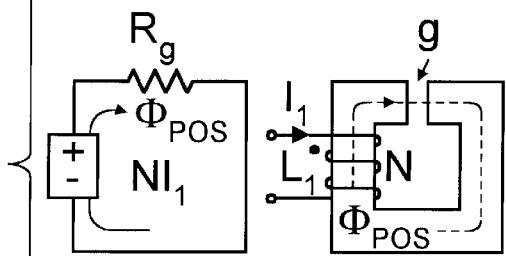
Figure 19C:
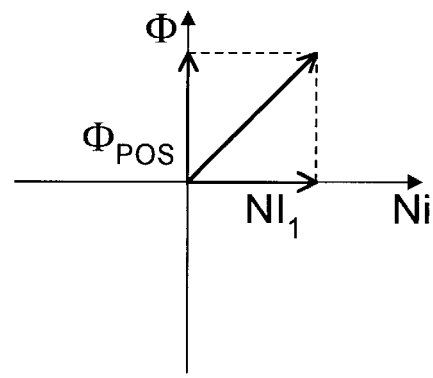
Figure 19D:
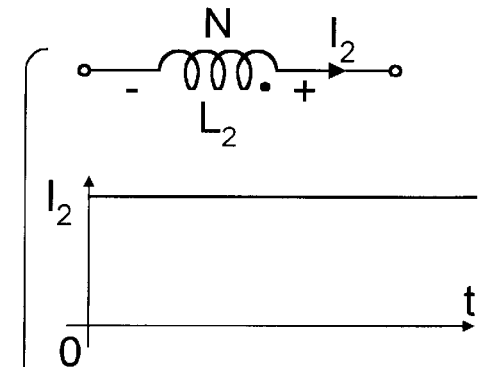
FIG. 19d illustrates how a DC current flowing out of dot-marked end generates negative DC-ampere-turns and negative DC flux.
Figure 19D:
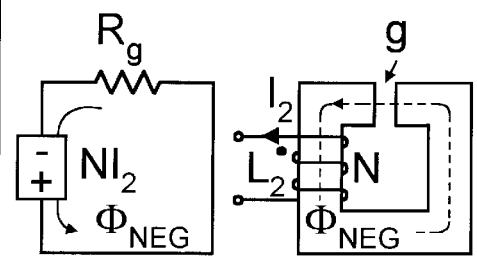
Figure 19D:
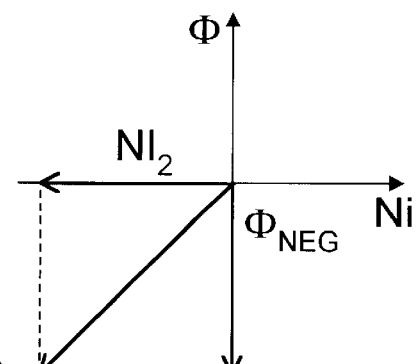

We can now apply these criteria to the input and output inductor windings of the converter of FIG. 18a, which are shown in FIG. 19c, and FIG. 19d respectively. The input inductor DC current flows into dot-marked end and generates positive DC ampere-turns $N_1 I_1$ and results in positive DC flux in the core as seen in FIG. 19c. The output inductor DC current flows out of dot-marked end and thus generates negative DC-ampere-turns $-N_2 I_2$ and results in negative DC flux in the core. The same can be observed from reluctance models of FIG. 19c and FIG. 19d. If the two inductor windings are placed on the common core analogous to FIG. 19b, the total DC-ampere-turns are given by $$\Sigma NI = NI_1 - NI_2 = -N(1-D)I_2 \quad (11)$$

where (2) was used to eliminate $I_1$ dependence. Clearly from (11) the total DC-ampere-turns are reduced, but still not eliminated. In addition they depend on duty ratio D.

Note that the above analysis was entirely based on DC currents alone and did not yet invoke AC voltages on the inductor windings. However, in order to get the DC-ampereturns subtraction as described above, the input and output inductors have to be placed on a common core. However, once the two windings are on a common core, since they have AC voltages imposed on them by the converter switching operation, the AC voltages must in addition obey the Faraday's Law of Electromagnetic Induction, imposing an additional requirement of identical AC voltages per turn of each winding. Since to meet the DC flux criteria equal number of turns are already selected for two windings, this would require that the AC voltages of two windings are matching each other in magnitude as well as in polarity relative to the dot-marked ends (hence, are in phase). However, this was already established by three inductor waveforms in FIG. 18a except for a slight mismatch of the output inductor and input inductor AC voltage magnitudes, which will be discussed later.

Figure 20A:
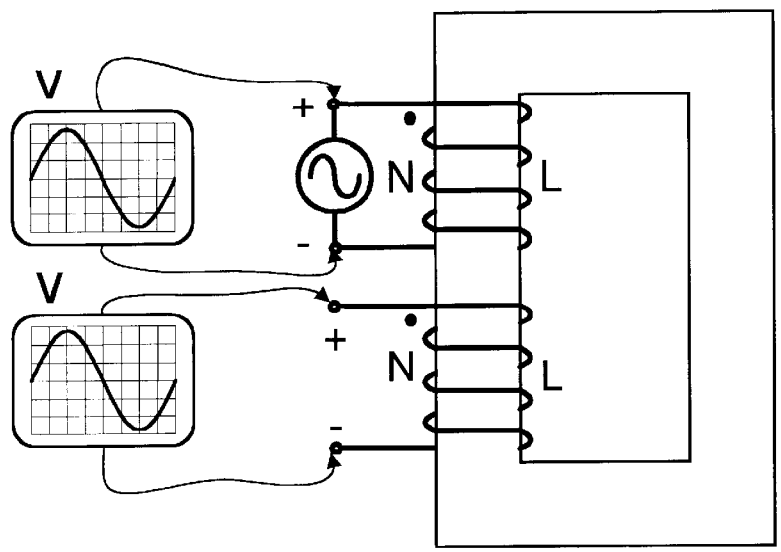
FIG. 20a illustrates the electrical test determining dot-marked ends at which AC voltages are in phase and FIG. 20b illustrates dot-marked end determination for the DC Transformer windings of the present invention of FIG. 21.

The previous right hand rule already determined the dot-marked ends of the windings. We can now confirm those markings by an alternative approach based on simple AC electrical test as per FIG. 20a. One winding in FIG. 20a is excited with an alternating voltage waveform, such as sinusoidal voltage as the simplest test signal, and the voltage of both windings measured at their dot-marked ends. The measured voltages will be in phase confirming dot-marked ends as in FIG. 20a. This now provides the answer for the looked upon correlation suggested in the subtitle between the DC currents and AC voltages of the inductors. This has turned out to be the relationship of the directions of the DC currents relative to the dot-marked ends of the respective windings, and through that directly related to their respective AC voltage polarities. Thus, this AC voltage test can be used to determine dot-marked ends in a simple way and without any reference to right-hand rule.

Figure 20B:
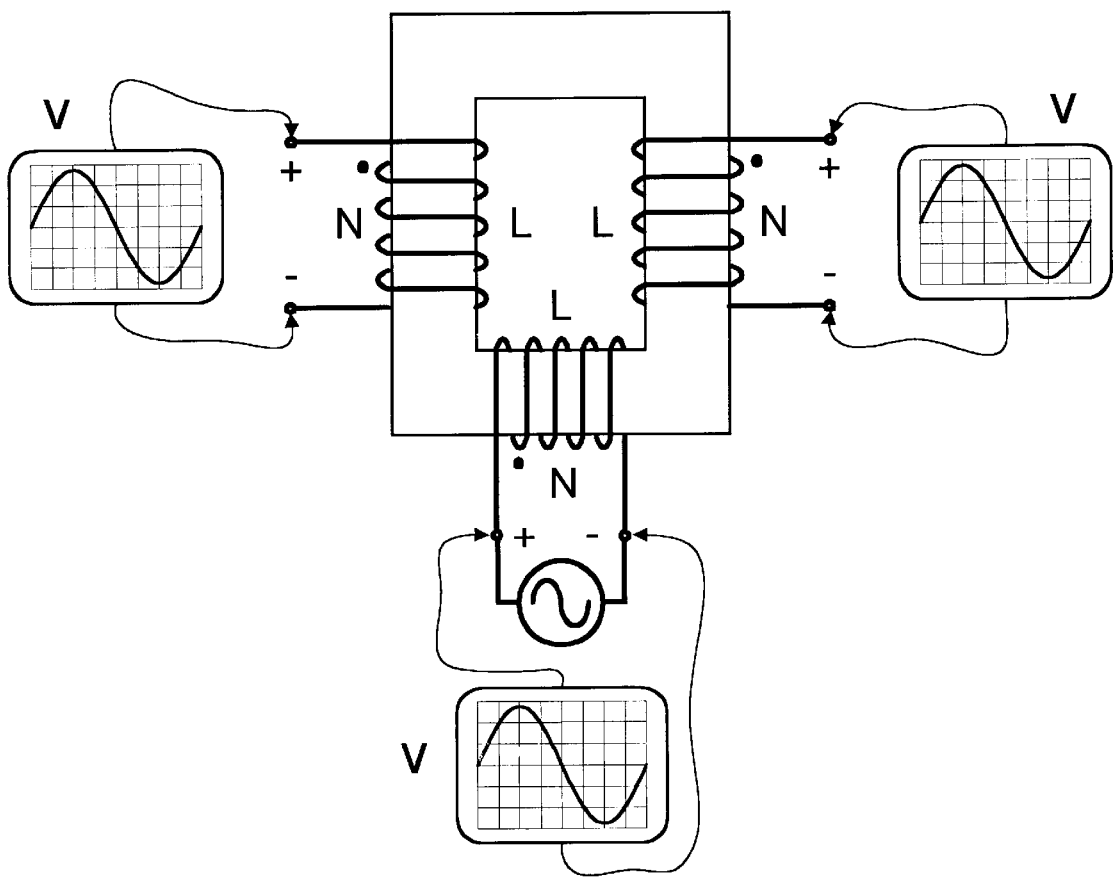

Note, however, that there is still middle inductor winding with its DC current $I_m$ as in FIG. 18a. From (8), the middle inductor has the AC voltage waveform identical to the input inductor and hence when placed on the common core will directly satisfy Faraday's Law. In that case, all three windings of the converter of FIG. 19a with the same number of turns N can be placed on the common core to result in the DC transformer of FIG. 20b. FIG. 20b shows also the AC voltage test to determine the dot-marked ends for all three inductors of FIG. 18a. The middle inductor DC current however, is thus, also flowing into dot-marked end, and from above rule contributes positive DC ampere-turns and from (2) they are equal $$NI_m = N(1-D)I_2 \quad (12)$$

which exactly cancels the negative DC ampere-turns of the combined input inductor and output inductor given by (11) to result in total DC ampere-turns equal to zero and thus in the total DC flux zero in the common magnetic core. Note how the middle inductor DC current, although dependent on the operating duty ratio D supplies just the right DC current to insure that total DC-ampere-turns and total DC flux are zero for any operating duty ratio.

DC Transformer

Referring back to FIG. 18b, the AC voltages of the input inductor $L_1$ and middle inductor $L_m$ are identical (perfectly matching), while the AC voltage of the output inductor $L_2$ at duty ratio D=0.9 is 90% matching in magnitude, thus slightly mismatched from the other two. As shown earlier all three inductor voltages are also in-phase relative to their positive polarity designation in FIG. 18a, and all three windings have the same number of turns N. Since all three voltages are in-phase and nearly matching in magnitude, thus resulting in nearly matching volts/turn, we can couple them into a single magnetic circuit structure without any air-gap as indicated in FIG. 20b, which forms an entirely new magnetic component, named here DC-to-DC Transformer or simply DC Transformer because of its unique operation when subjected to DC currents in all three windings as explained below.

First Step—Determination of Dot-Marked Ends

From the above discussions, the absolute polarity of the AC voltages of the three inductors is critical. The first step is, therefore, to determine the absolute polarity of these voltages by applying the test AC voltage to the middle inductor and then measuring the AC voltages on all three windings as shown in test set-up of FIG. 20. Note that the input inductor and output inductor windings are open, that is there are no loads attached to them. The simplest and most common test AC voltage is a sinusoidal voltage source, which will induce sinusoidal AC voltages in the input and output inductor windings. The inductor winding ends at which said ac voltages are in phase are designated as dot-marked ends and are so marked with round dot symbols, and will be considered as a winding end at which referenced AC voltage is positive, and also the DC current flowing into that dot-marked end will be considered of positive direction. The other end of each winding will from hereon be referred to as unmarked end of the respective winding and will be considered as the winding end at which a referenced AC voltage is negative. Note that for simplicity of testing, the number of turns of the input, output and middle inductor windings are chosen to be equal resulting in equal induced voltages in FIG. 20. The importance of the particular choice of identical number of turns for the operation of the converter is established below.

Second Step—Connection to Input and Output Terminals

The next step is to properly connect the DC Transformer to the terminals: input DC source, output DC load and common terminal, with a special care given to the winding polarities. Note that each winding has two ends, thus, there are eight possible different connections, out of which only two are correct. Thus, in order to make sure that correct winding ends are connected properly, the following simple procedure should be followed: connect the dot-marked end of the input inductor to the positive terminal of input DC voltage source, the dot-marked end of the output inductor to the positive terminal of the output DC load, and finally, the dot-marked end of the middle inductor to the common terminal of the DC input source and common terminal of the output DC load. Clearly, if all these windings are connected in an opposite way (that is, make the same connections as above using the unmarked ends), that connection will be also correct.

The proper connection of the DC Transformer to the input source and output load terminals will insure that the DC-ampere-turns of the input inductor and middle inductor are positive, since their respective DC currents flow into the dot-marked ends of their respective windings, and thus result in positive DC fluxes in the magnetic core. On the other hand, the output inductor DC current flows out of the dot-marked end, and thus will contribute negative DC ampere-turns and result in negative DC flux in the core. Therefore, the potential for the reduction of the DC flux in the magnetic core is established.

Third Step—Choose Equal Number of Turns

Figure 21:
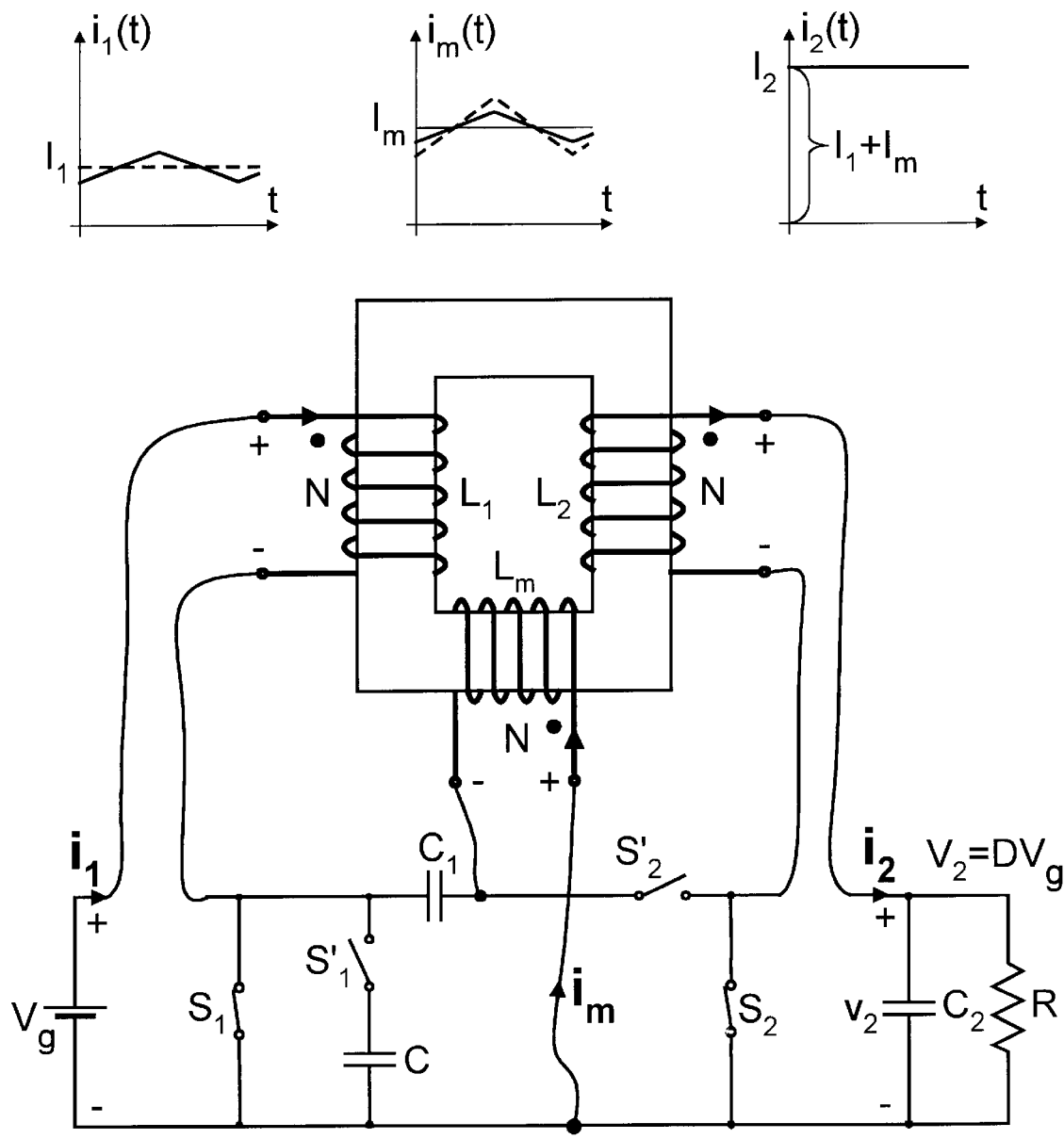
FIG. 21 illustrates a first embodiment of the present invention.

This step is the most crucial, since the first two steps have only established the necessary prerequisites, but are in themselves not sufficient to guarantee the successful implementation and operation of the DC Transformer into the completed switching converter. This third and crucial requirement is:

The input inductor, the middle inductor and output inductor must have identical number of turns N as shown in the working model of the present invention in FIG. 21 and as given by $$N_1=N_2=N_m=N \quad (13)$$

Together with the fundamental relationship given by (3), (13) results in $$\Sigma NI=N_1I_1+N_mI_m-N_2I_2=N(I_1+I_m-I_2)=0 \quad (14)$$

From (14), the net DC ampere-turns in the single-loop magnetic circuit of the present invention in FIG. 21 is zero, resulting in zero DC flux in the magnetic core and therefore in full utilization of the magnetic material since the air-gap in the flux path is completely eliminated. Note that this complete cancellation of the DC ampere-turns is valid for any operating duty ratio D, since the relationship (14), as previous by (3), is independent of the duty ratio D. In fact, the DC flux cancellation is also valid for any number of turns N, as long as all three windings have the same number of turns N.

Note that the equal number of turns condition (13) simultaneously satisfied two necessary requirements:

1. The net DC-ampere-turns in the magnetic core without air-gap must be zero;
2. The external AC voltages on the three windings of the DC Transformer, imposed by the switching action, should stand in the same ratio as their respective number of turns as per Faraday's Law of electromagnetic induction.

The second condition is clearly readily satisfied between the input inductor and middle inductor which stand in 1:1 voltage ratio (see FIG. 18b) just as their windings turns ratio requires. The output inductor AC voltage is somewhat mismatched, since for duty ratio D=0.9, for example, the output inductor winding should have 0.9N turns for perfect match. However, the mismatch in the AC voltages by using also N turns for the output inductor winding will be compensated by the proper placement of that inductor in the single-loop magnetic core structure of the DC Transformer as explained below.

Fourth Step—Optimum Placement of DC Transformer Windings

Figure 24A:
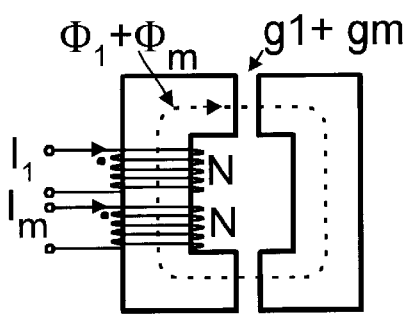
FIG. 24a illustrates an input inductor and a middle inductor for the converter of FIG. 14a combined into one magnetic element which must have an air-gap.
Figure 24B:
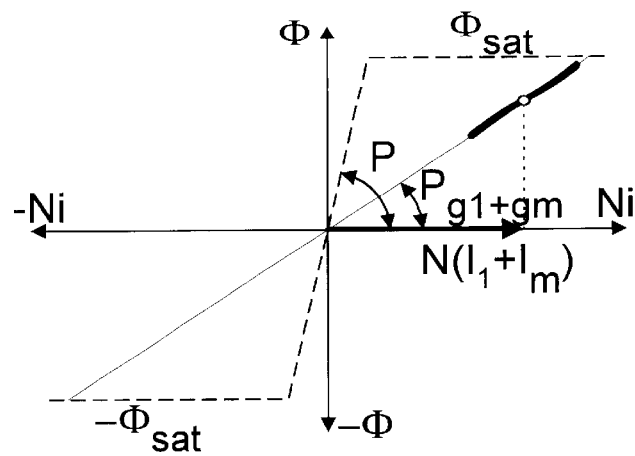
Figure 24C:
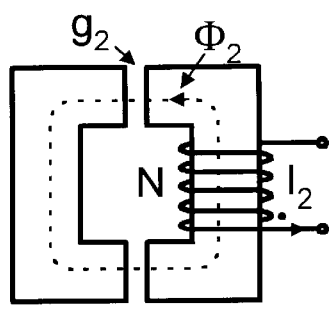
FIG. 24c illustrates that a separate output inductor for the converter of FIG. 14a must have an air-gap and FIG. 24d is a graph showing that the direction of the load current $I_2$ is such that the negative ampere-turns lead to the operation on the negative part of magnetic material saturation characteristic.
Figure 24D:
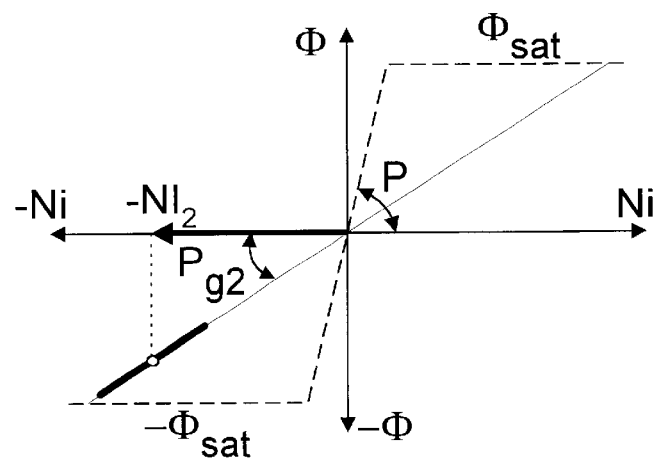
Figure 24E:
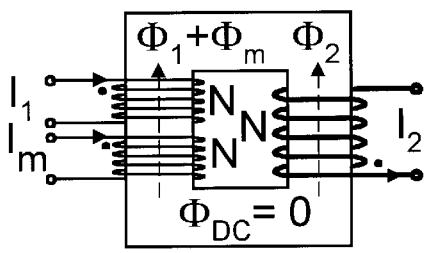
FIG. 24e illustrates another embodiment of the present invention using single-loop magnetic core DC Transformer implementation without any air-gap and FIG. 24f is a graph of the flux vs. ampere-turns characteristic for the DC Transformer of FIG. 24e showing the large slope of the un-gapped material and is centered in the middle of the magnetic material saturation characteristic.

To accommodate the mismatch in their AC voltages, the output inductor and middle inductor windings are best placed on the opposite legs of a UU-like magnetic core as seen in FIG. 24e so as to obtain the high relative leakage inductance between those two windings and hence reduce the output inductor ripple current. This and several other methods to minimize this ripple current in the output inductor and to even achieve near zero ripple current at one operating duty ratio, are introduced in a later section. Similarly, the input inductor and middle inductor are placed side-by-side as in FIG. 24e also to increase the relative leakage between those two windings. However, since their AC voltages are already perfectly matched, the ripple current in the input inductor will be the same as in the middle inductor. By slightly increasing the number of turns of the input inductor winding the input current ripple can be steered into the middle inductor. This situation is shown as dashed lines in the current diagram of FIG. 21. The ampere-turns imbalance due to the increased number of turns is very small and can readily be neglected.

Figure 22:
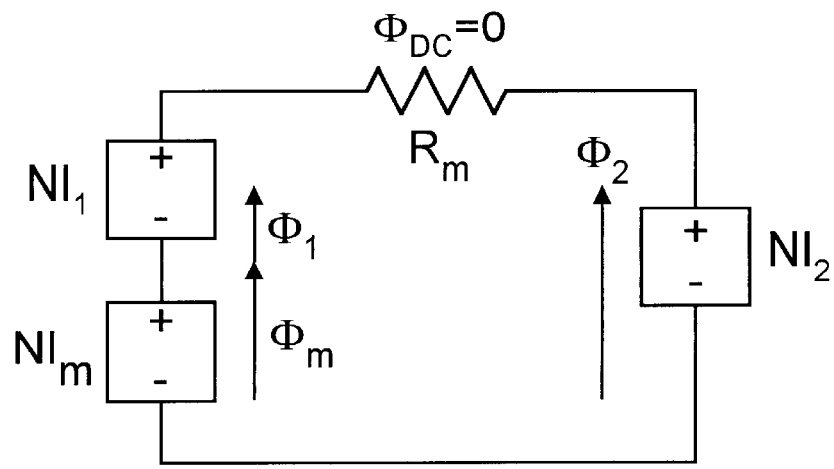
FIG. 22 is a diagram of the DC reluctance model of the DC Transformer in FIG. 21.

The DC reluctance model of the DC Transformer in FIG. 21 is shown in FIG. 22 to lead to zero net DC flux, since positive DC flux generated by input inductor and middle inductor is exactly canceled by the negative DC flux of the output inductor as predicted by (14).

The crucial importance of the recognition of the following two important conditions cannot be overemphasized:

1. All windings must have the same number of turns;
2. Recognition of the critical importance of the directions of the flow of the DC currents in the windings relative to the AC voltage polarity.

Figure 23A:
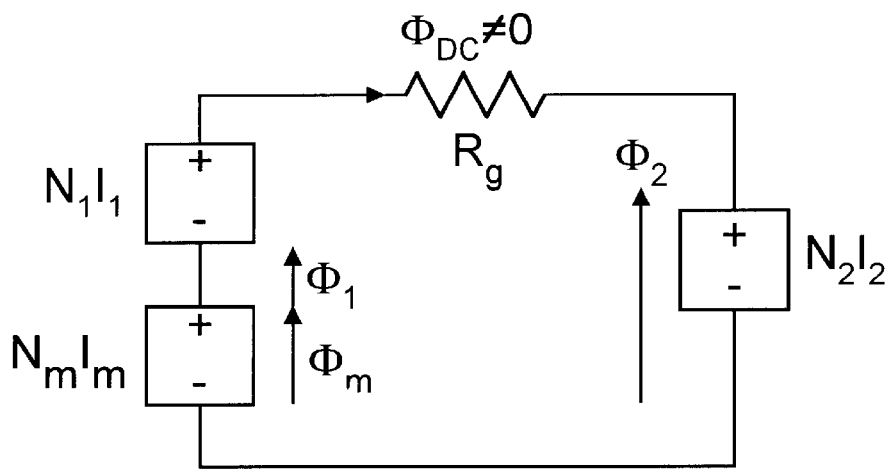
FIG. 23a is a diagram of the DC reluctance model for the case of unequal number of turns of the inductor windings and substantial DC flux in the magnetic core of FIG. 23b which has large air-gap due to the windings' turns mismatch.
Figure 23B:
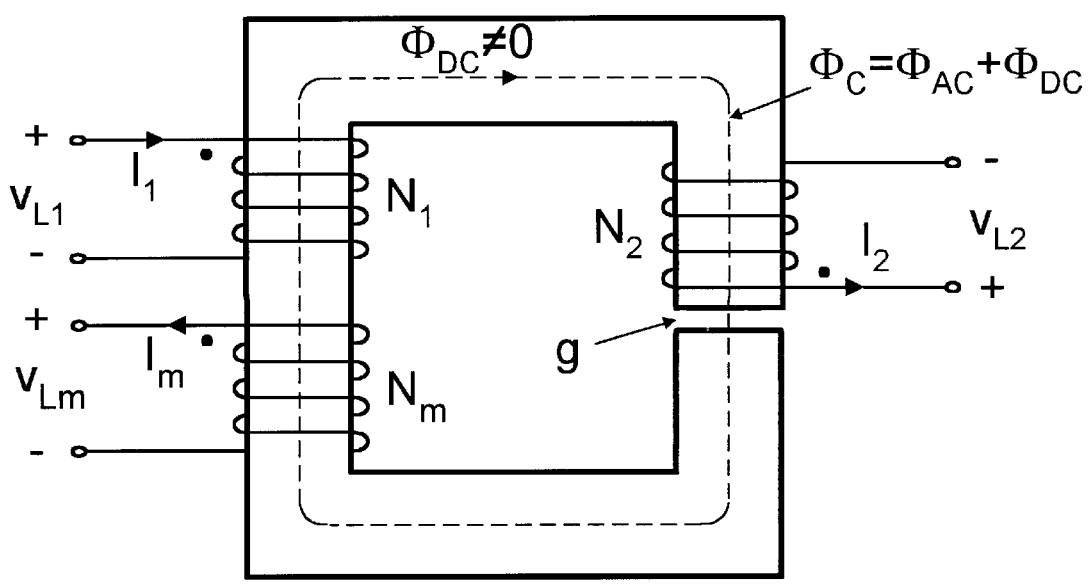

For example, if one were to use different number of turns $N_1$, $N_2$, and $N_m$ for the three inductors, despite the special relationship (3), there will be a potential great mismatch of the DC-ampere-turns as seen in model of FIG. 23a, and a large gap in the magnetic circuit implementation as in FIG. 23b must be used to prevent saturation due to large total DC-ampere-turns. Clearly, such potentially large mismatch in the turns ratio would also lead to a large mismatch of the AC voltages and hence could result in huge ripple currents on all windings making it completely impractical.

Let us now show an alternative way to assemble the DC Transformer step-by-step, as outlined in FIGS. 24a–f. First as in FIG. 24a the inductors $L_1$ and $L_m$ with identical number of turns N, are placed side-by-side into common Coupled-Inductor structure. Since the DC currents $I_1$ and $I_m$ in FIG. 21 are both flowing into the dot-marked ends of their respective windings, their DC-ampere-turns $NI_1$ and $NI_m$ are adding, resulting in the flux vs. ampere-turns characteristic of FIG. 24b, displaying the combined DC flux. Note also that due to the DC currents flowing into the dot-marked ends (positive DC-ampere-turns), the core is biased along the positive-half of the magnetic material saturation characteristic (toward positive saturation end). The corresponding individual air-gaps for each separate winding $g_1$ and $g_m$ are also added to result in a total core air-gap $g_1+g_m$ as shown in the core of FIG. 24a. The separate core for the output inductor $L_2$ is shown to have an air-gap $g_2$ in order to support the total DC-ampere-turns $NI_2$. It is now critically important to observe that the corresponding DC flux in this case will be along the negative-half of the flux vs. ampere-turns magnetics material saturation characteristic. This is because the output inductor DC current $I_2$ is flowing out of the dot-marked end of its winding.

It is now easy to understand why the cores of FIG. 24a and FIG. 24c can be replaced with a single core of the DC Transformer of FIG. 24e without any air-gap. As seen in the combined flux vs. ampere-turn characteristic of FIG. 24f, the positive DC-ampere-turns $N(I_1+I_m)$ exactly cancel the negative DC-ampere-turns $NI_2$ to result in net zero DC flux in the core. Note also that the AC flux excursion will now be along the original steep slope of the characteristic, indicating high permeance of the magnetic core material and high inductance of windings on the magnetic core with no air-gap.

Figure 6A:
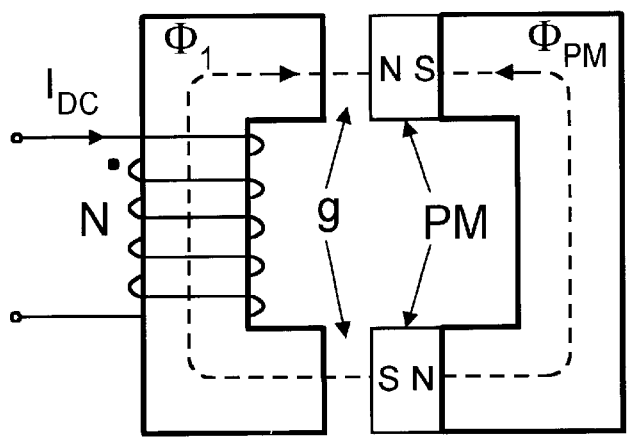
FIG. 6a shows an inductor implemented on a special magnetic core structure which, in addition to the air-gap and ferromagnetic material, has also a small permanent magnet inserted in its flux path in order to provide a fixed reverse bias.
Figure 6B:
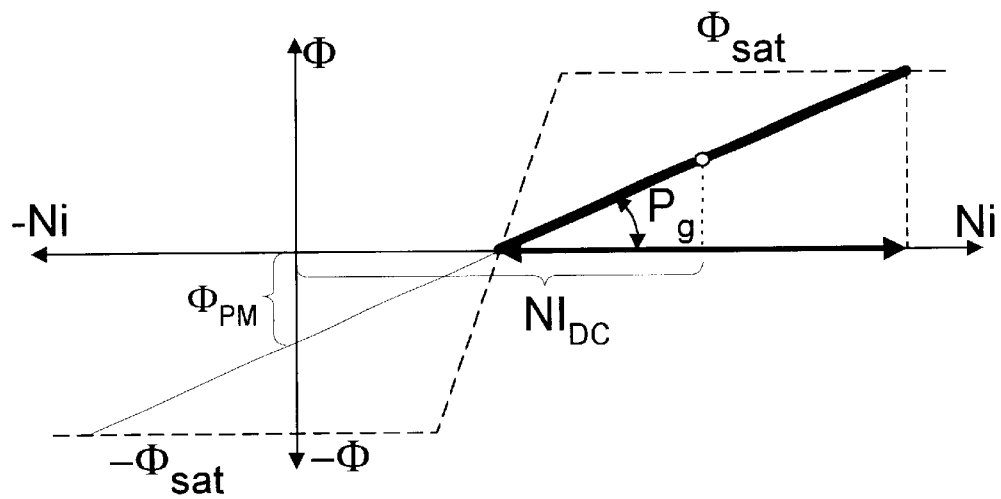
FIG. 6b illustrates the effect of the permanent magnet reverse bias on a positive DC-bias due to high DC current in the winding.
Figure 6C:
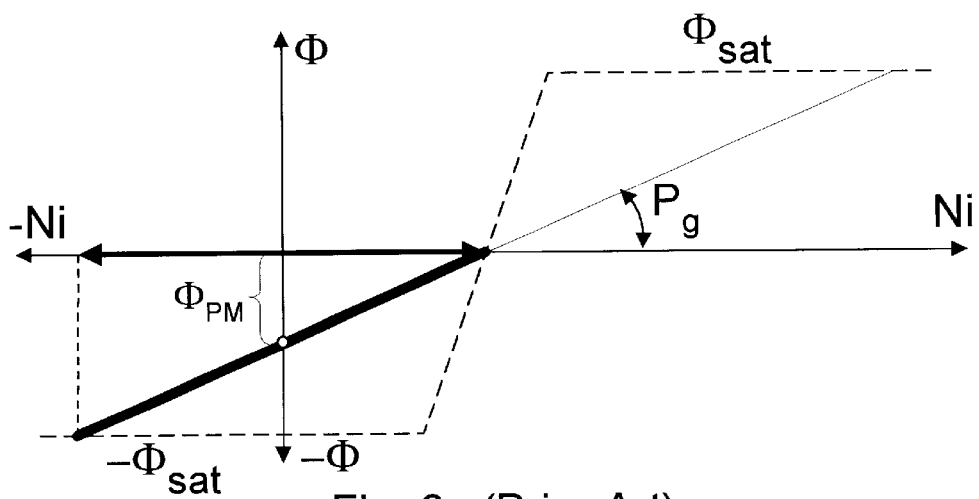
FIG. 6c demonstrates that the flux excursions are constrained to the negative part of the flux saturation characteristic for small or zero DC current in the inductor winding.
Figure 24F:
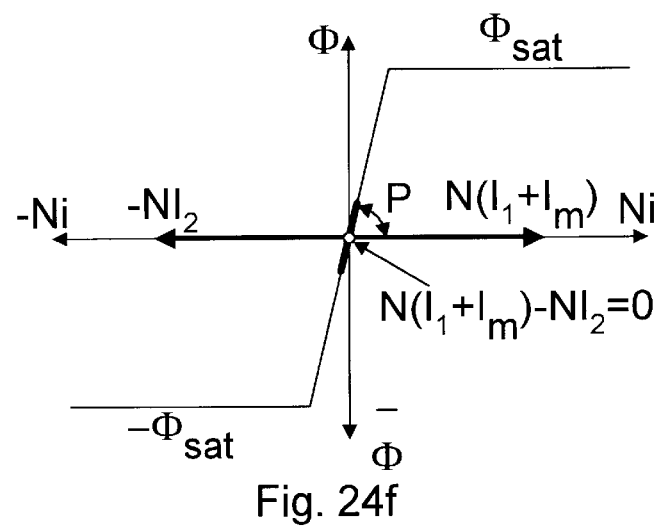

It is now interesting to compare this result with the previous prior-art efforts to reduce the DC flux bias in the core using the permanent magnet inserted in the core structure as was shown in FIG. 6a, FIG. 6b, and FIG. 6c. Note that in that case, the same much reduced winding inductance is obtained due to the still present substantial air-gap. Furthermore this special magnetic core could only support a pre-determined maximum DC current (based on inserted air-gap) and could not handle any amount of overload DC current without saturation. To the contrary, in the DC Transformer case, the maximum permeance of the magnetic core is preserved as seen in FIG. 24f. In addition, theoretically, any amount of the DC overload current could be supported without saturation, since there is an automatic compensation by the windings themselves. In this idealized picture of the single-loop magnetic circuit in which any leakage flux is neglected, the increased DC load current $I_2$ causes proportionally increased DC currents $I_1$ and $I_m$ to compensate for it and to still keep the operation at zero DC-bias and zero DC flux in the core. In reality, the ever present built-in leakage flux will limit the maximum DC overload capability in the DC Transformer in the same manner as it does in an AC transformer. However, experimental data presented in later section indicate that this maximum limit is extremely high.

DC Transformer Model

The magnetic structure of FIG. 21 is justifiably named a DC Transformer because:

1. The absence of the air-gap in the AC transformer indicates that no energy is stored in the magnetic core; similarly the absence of the air-gap in the DC Transformer of FIG. 21 indicates the absence of any DC energy storage. This elimination of DC energy storage is the fundamental reason why the new DC Transformer results simultaneously in substantially reduced size of magnetics, increased efficiency and much increased overload capability.
2. The input inductor winding takes input DC power and converts it through the output inductor into output DC power, much like the AC transformer which absorbs AC input power on the input winding and transforms it into AC output power on the output winding to deliver to AC load.
3. This DC Transformer tolerates large DC currents in all windings without saturation, much like the AC transformer tolerates large AC currents in its windings without saturation.
4. Just as the AC transformer does not require any air-gap for its operation, since the AC ampere-turns of the output winding are opposing the AC ampere-turns of the input winding to result in small magnetizing AC current; the DC Transformer, likewise, results in the cancellation of DC-ampere-turns of all windings and operates without any air-gap.

Figure 25:
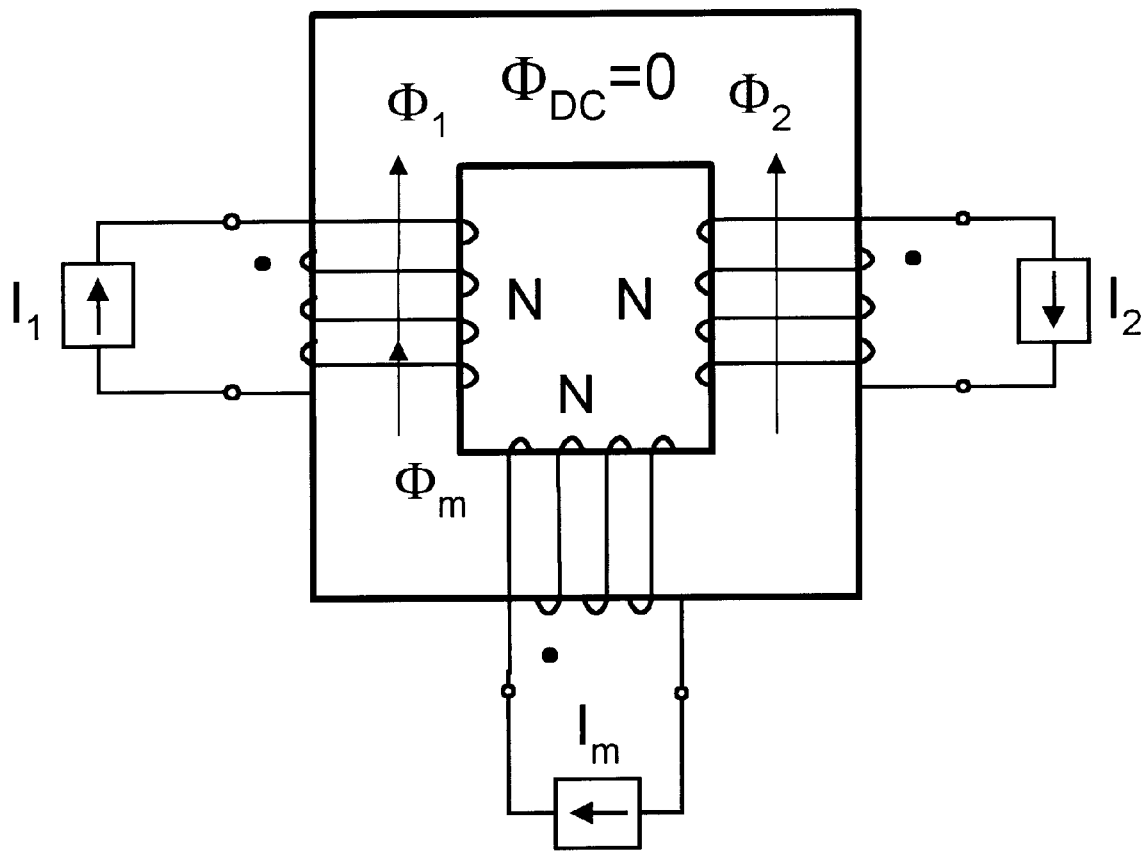
FIG. 25 illustrates a model of the DC Transformer of FIG. 21 with each inductor winding conducting respective DC-bias currents.

The fundamental property of the DC Transformer is once again displayed in FIG. 25 in which each inductor winding is shown excited with the respective DC current source. Together with the designated equal number of turns N, zero DC flux in the core is obtained.

This new magnetic component, the DC Transformer, needs also a new symbol, which should reflect its basic property. The symbol should in a simple graphic form remind of its basic function to alert the user of its properties. The symbol of FIG. 26 has an input winding absorbing a DC current of magnitude $I_1+I_m$ and an output winding delivering the DC current $I_2$. The placement of the dots and the directions of these currents is such to lead to DC-ampere-turns cancellation with designated number of turns N. To signify that the DC power is transferred from input to output winding, a straight line through both windings is drawn as in FIG. 26. This also will come in handy to quickly distinguish this DC Transformer symbol from the classical AC transformer symbol. Finally, to indicate the difference with its later isolated counter-part of FIG. 39b and the lack of galvanic isolation, the common (bottom) terminals are connected together.

Alternative Configurations

Figure 27A:
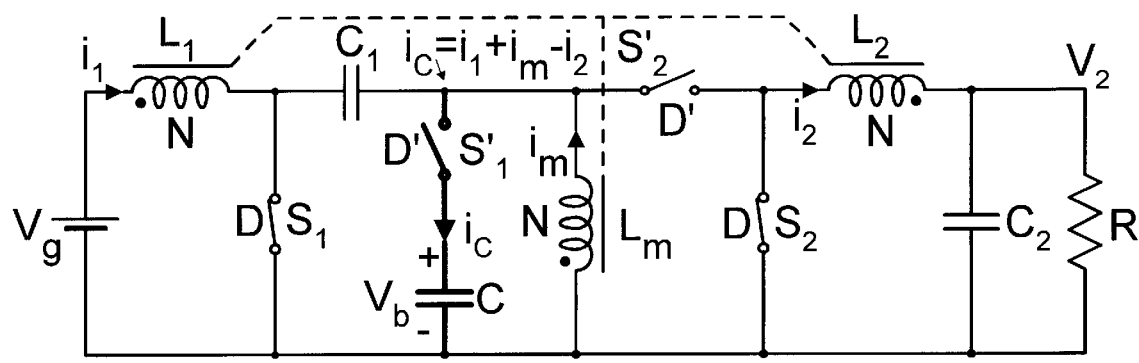
FIGS. 27(a–l) illustrate twelve equivalent transformations of the present invention shown in FIG. 21, all of which share a common property: the current in auxiliary capacitor C always equals $i_1+i_m-i_2$, where the directions of the three inductor currents are designated in FIG. 21. Note: the branch with the auxiliary capacitor and complementary input switch S'$_1$ is highlighted with heavy lines in each figure.
Figure 27B:
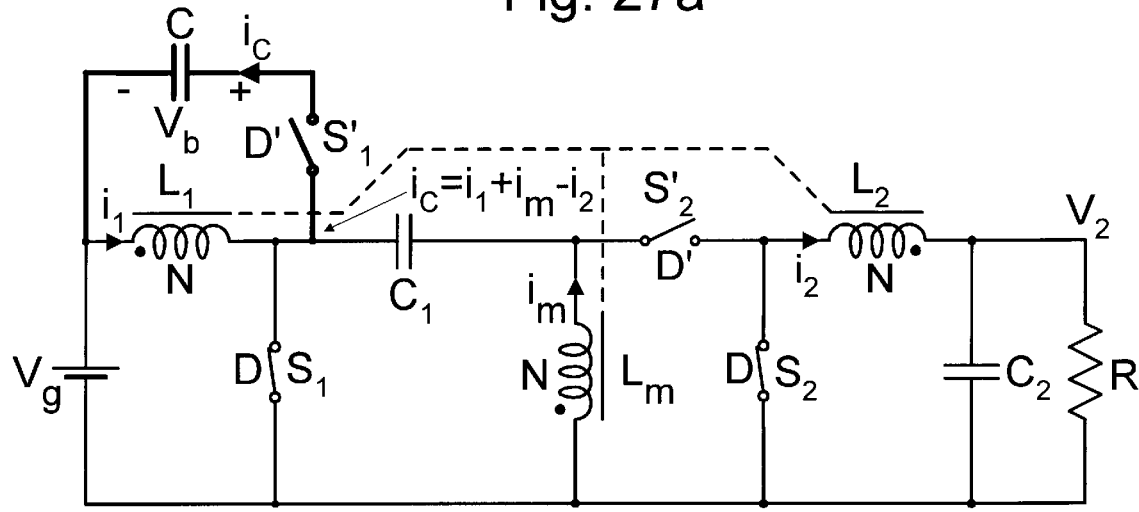
Figure 27C:
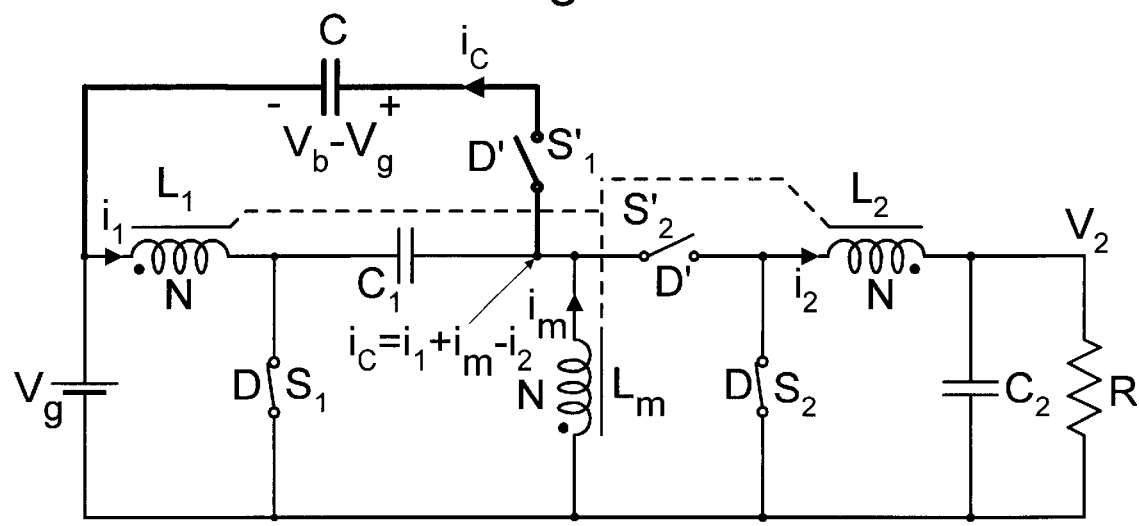
Figure 27D:
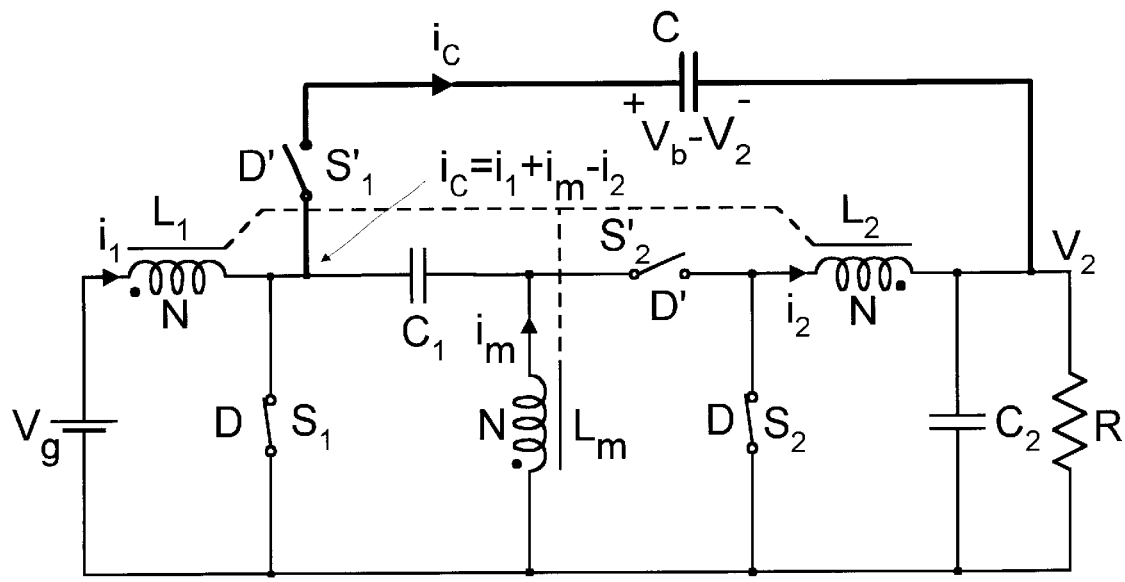
Figure 27E:
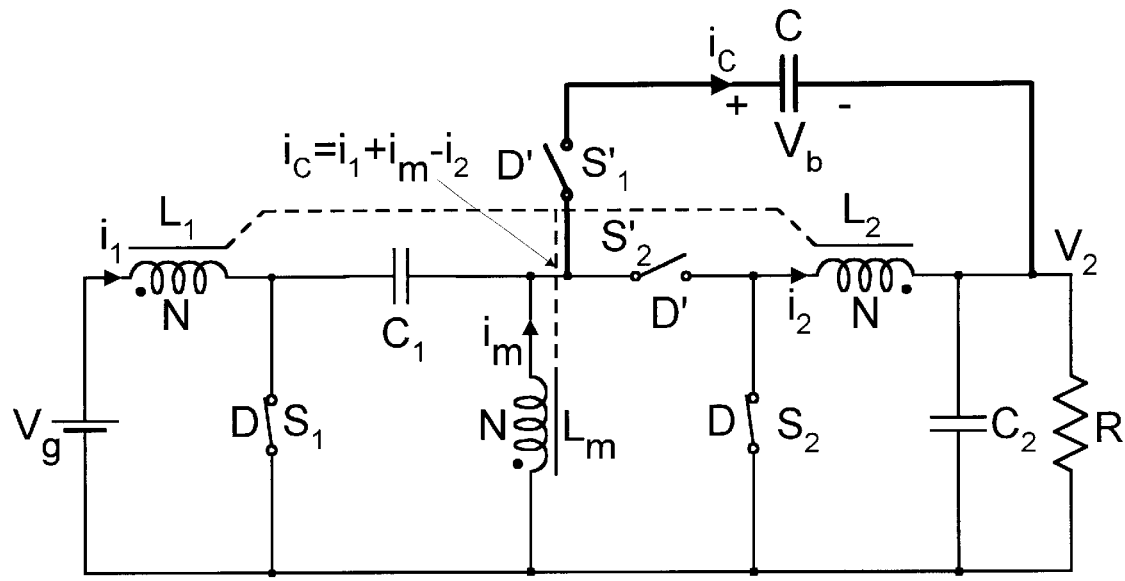

Note that the fundamental relationship (4) and its consequence (3) will all be maintained even if numerous configuration rearrangements are made to the original converter of FIGS. 14a and 14b. The branch with the series connection of the auxiliary capacitor C and complementary input switch S'$_1$, shown highlighted with heavy lines, can be connected in many different ways as illustrated in FIGS. 27a–l without altering the fundamental properties (3) and (4) and hence having same DC Transformer and converter operation. For example, this branch can be connected in parallel with the middle inductor L$_m$ as in FIG. 27a or in parallel with the input inductor L$_1$, as in FIG. 27b. In both cases, the DC voltage on the auxiliary capacitor C will be changed to the new steady-state value V$_b$ given by (10). Another alternative is to connect this branch between the positive terminal of the input voltage source and the unmarked end of the middle inductor L$_m$, as shown in FIG. 27c. Still two other possibilities are as in FIG. 27d and FIG. 27e.

Figure 27F:
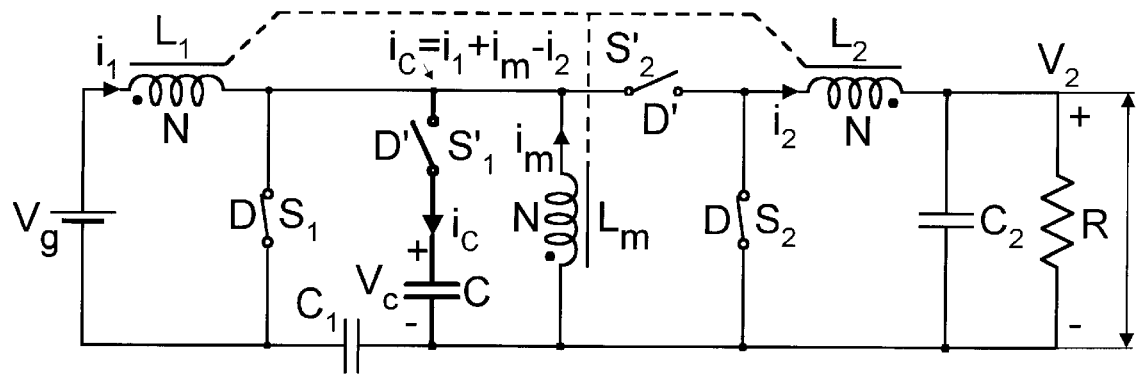

Further modifications can be obtained after moving input capacitor C$_1$ to the bottom return current path as in FIG. 27f. This would have a clear disadvantage that the common ground between input and output is lost and either the source or the load would be floating. Nevertheless, the isolated version obtained from such non-isolated converter would rectify that deficiency, as seen later in section on Isolated DC Transformer switching converter. Then the branch with auxiliary capacitor C and complementary input switch S'$_1$ can be connected in parallel with middle inductor as in FIG. 27f. The advantage of this configuration is that the auxiliary capacitor has reduced DC voltage V$_b$ given by (10), while at the same time, switches S$_1$ and S'$_1$ are in a preferable position for the so-called high-side driver implementation as described later. Other viable transformations of the basic converter configuration are shown in FIGS. 27g–l. In all these equivalent transformations of the basic converter configuration, irrespective of different positions of the auxiliary capacitor C, it always has a DC voltage which is linear combination of voltages V$_g$, V$_b$, V$_C$, and V$_2$. Besides those variants shown in FIG. 27a-l, there is still a large number of ways this branch with auxiliary capacitor C and complementary input switch S'$_1$ can be placed between other nodes of the basic converter circuit and still satisfy fundamental relationship (4). There are literally hundreds of other equivalent transformations of the basic converter configuration shown in FIG. 14a and FIG. 14b, which are obtained by relocation of the other components, such as, for example, the input inductor and/or the output inductor from the top to the bottom leg (return current path) of the converter such as in FIG. 14j. Just as in the case of relocation of input capacitor to the bottom leg, the desirable feature of the common ground between the source and the load will be lost in this non-isolated converter case. Nevertheless, the isolated counterpart will rectify that and result in isolated version with two separate grounds.

Figure 27G:
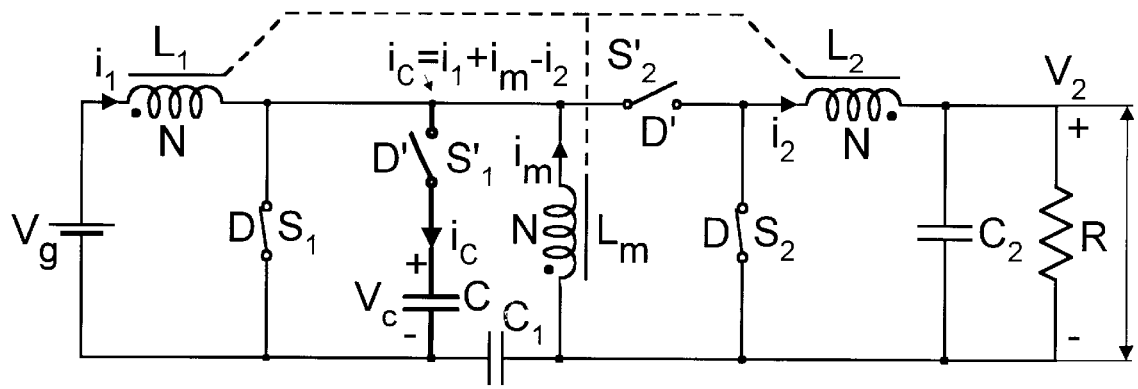
Figure 27H:
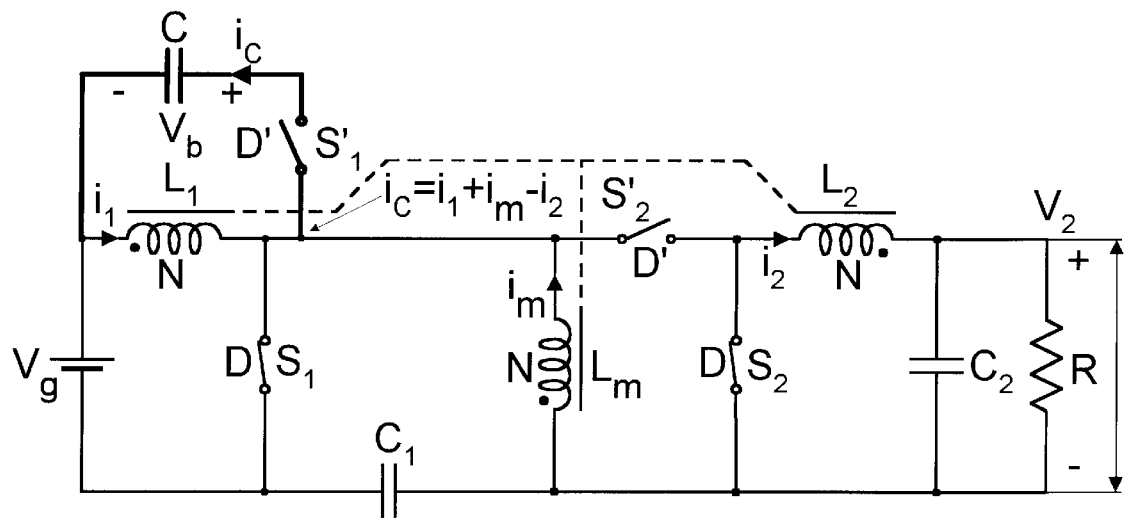
Figure 27I:
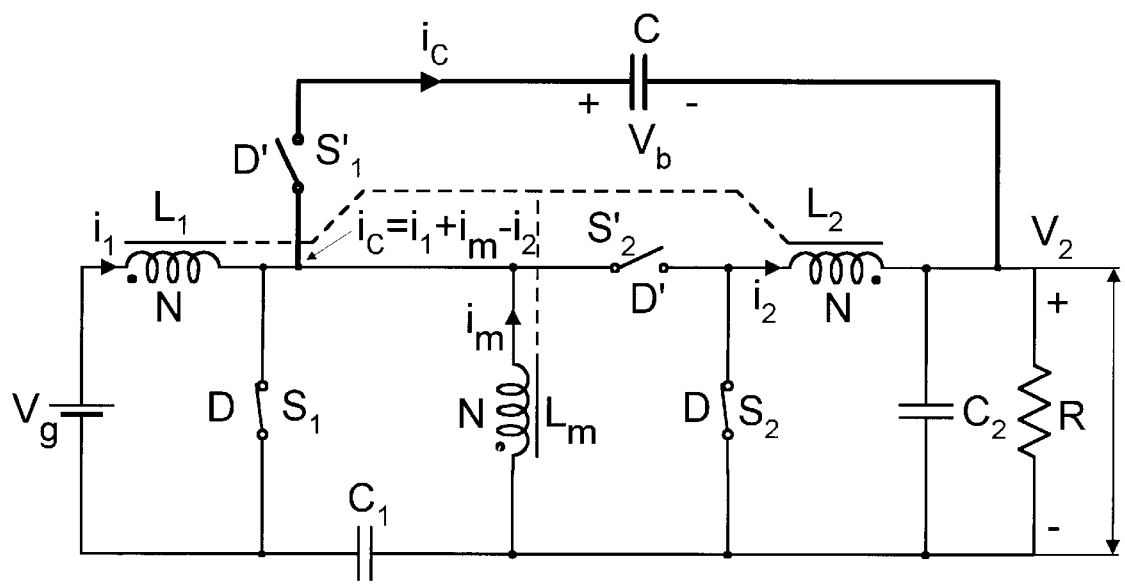
Figure 27J:
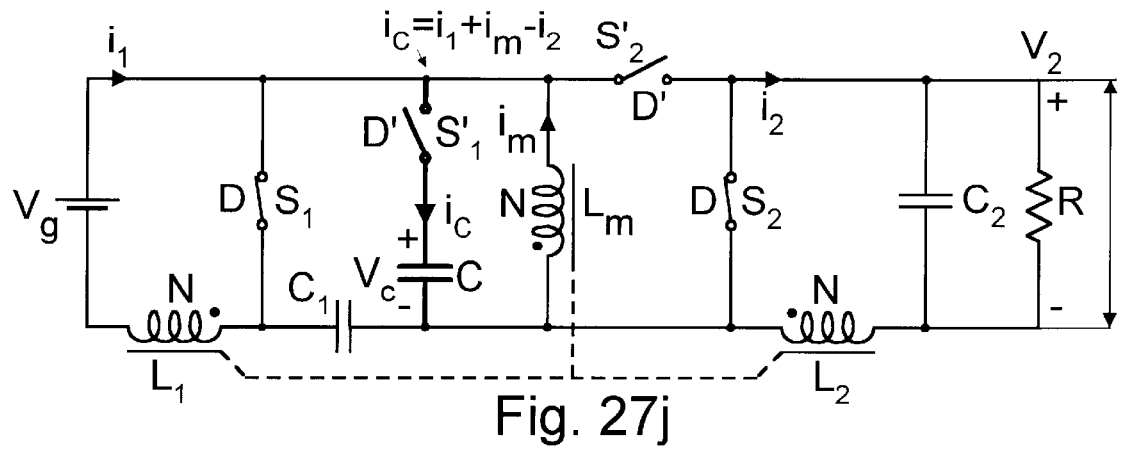
Figure 27K:
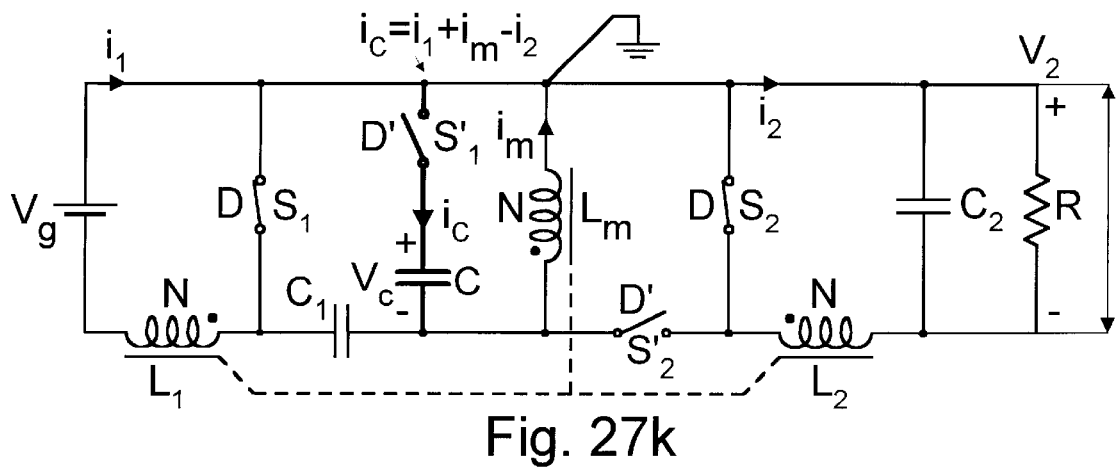
Figure 27L:
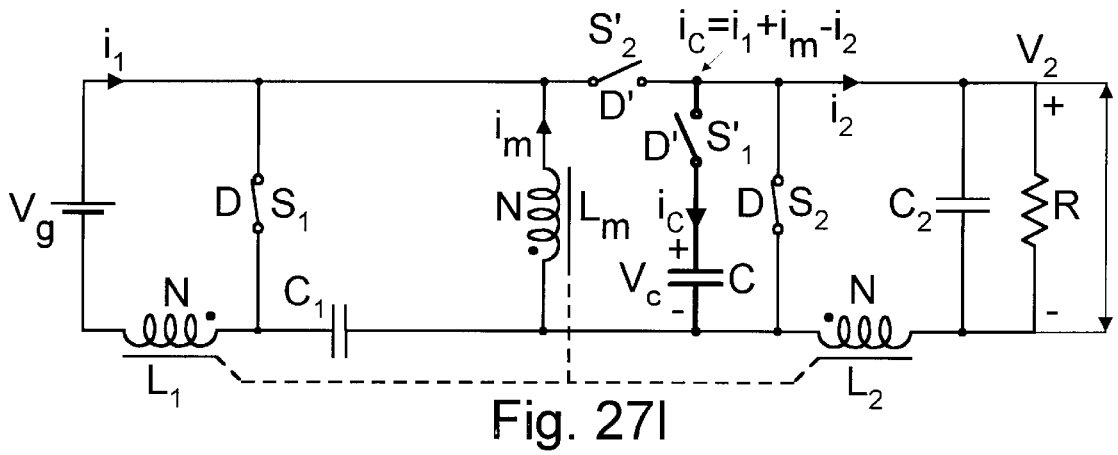

Furthermore, when the complementary output switch S'$_2$ is also relocated to the bottom leg of converter in FIG. 27j, the non-isolated converter of FIG. 27k is obtained. Note that in this converter, the positive terminals of input DC source and output DC load can have a common ground as shown in FIG. 27k, to result in negative input to negative output converter. Yet another variant is shown in FIG. 27l in which branch with auxiliary capacitor and complementary input switch is placed in parallel with output switch.

Note however, that all these relocations of components within same branch, are just the variants of the very same basic new switching converter of FIG. 14a and FIG. 14b. This is easily proved by the state space averaging analysis method (introduced by Cuk as mentioned earlier). The state-space equations for all these converter variants are identical to the state-space equations of the basic new switching converter of FIG. 14a and FIG. 14b, thus, all these converter variants result in identical responses, both dynamic as well as steady-state. For example, the relocation of input inductor L$_1$ to the bottom leg as in FIG. 27j and FIG. 27k, results in the same two loop equations (for DT$_S$ and D'T$_S$ intervals) as for the basic converter of FIG. 14a and FIG. 14b.

Note that all these alternative connections of the branch with auxiliary capacitor C and complementary input switch S'$_1$ and repositioning of other components such as input inductor, input capacitor, output inductor, complementary output switch, etc., as described above would all have one thing in common: the capacitor current i$_C$(t) during complementary interval D'T$_S$ is given by (4). Since this relationship (4) is preserved, all the unique properties of the basic new converter are preserved and present in any of its numerous equivalent transformations of FIGS. 27a–l as well as in many other not shown but satisfying condition (4). We will thus use condition (4) as a fundamental means description for attaching the branch with auxiliary capacitor C and complementary input switch S'$_1$ in all variety of possibilities. The skilled in the art might find some other alternative converter's modifications, whose operation would encompass the same relationship (4), hence they all will be exactly other variants of this original converter configuration.

It should be emphasized that in all the above variants, the current through the branch with the complementary input switch S'$_1$ and auxiliary capacitor C is AC only, since I$_C$=0 as per (7). Thus, the complementary input switch S'$_1$ will also carry only the ripple current AC component, which is small compared to DC load current. Hence the auxiliary switch conduction losses will be very small and negligible in comparison to the conduction losses of the input switch S$_1$ which is the power switch whose current is directly dependent on the DC load current. Just like the complementary input switch S'$_1$, the auxiliary capacitance C is also a comparatively small size and low loss component, since it also carries the same small AC ripple current component only. Hence the auxiliary capacitor has negligible losses even when a relatively small capacitance with larger ESR is used. Thus, the branch with the auxiliary capacitor and complementary input switch S'$_1$ contributes very little to the total converter losses but is critically important, since it enables existence of the two fundamental relationships (3) and (4).

Figure 28A:
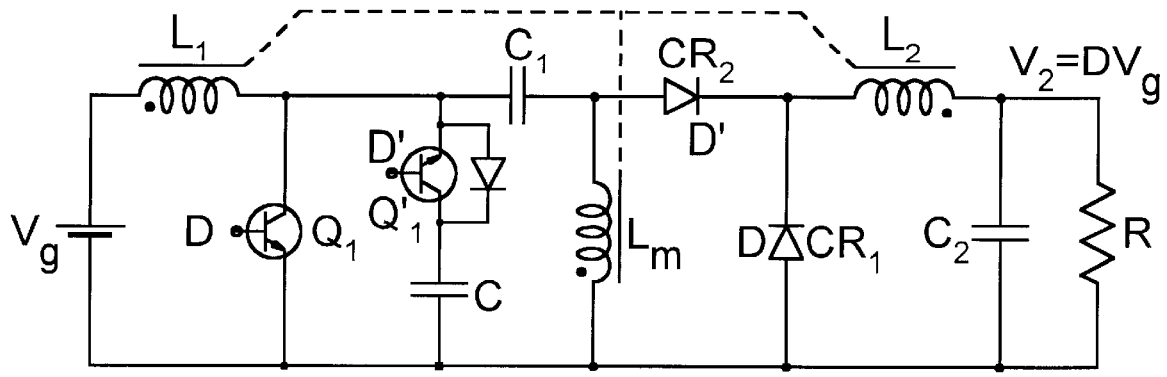
FIG. 28a illustrates the converter of FIG. 21 with bipolar NPN transistors on the input side and current rectifiers on the output side. Note: the extra diode across Q'$_1$ switch to provide current bi-directional flow in that switch.
Figure 28B:
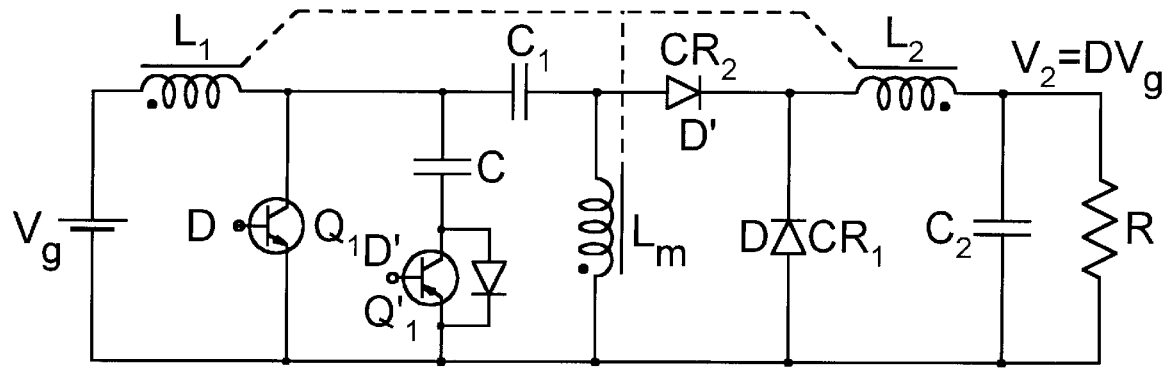
FIG. 28b illustrates the PNP bipolar transistor on the input side to facilitate direct drive with grounded emitter of two bipolar transistors.

However, since this branch current is AC only, the complementary input switch S'$_1$ must be implemented with a current bi-directional switch, such as, for example, an NPN bipolar transistor in parallel with a diode as in FIG. 28a. The input switch S$_1$, however, does not have to be current bi-directional, and could be implemented with another NPN bipolar transistor as shown in FIG. 28a. The switches S$_2$ and S'$_2$ can in their simplest implementation consist of diodes, that is current rectifiers CR$_1$ and CR$_2$ as in FIG. 28a. The NPN bipolar transistor Q'$_1$ in FIG. 28a could be replaced with a PNP transistor Q'$_1$ of FIG. 28b, which is now in a preferable grounded emitter configuration for direct drive, instead of the floating drive required for the circuit of FIG. 28a. With emphasis on higher switching frequency and the simplicity of drives, the bipolar transistors can be replaced with the MOSFET transistors as in FIG. 28c. The added benefit is that the diode is already built into the MOSFET device, and no external diode is needed. Furthermore, the body diode in the input Q$_1$ MOSFET switch will prevent discontinuous conduction mode at light load currents, since the input front end is current bi-directional as a whole.

Figure 28C:
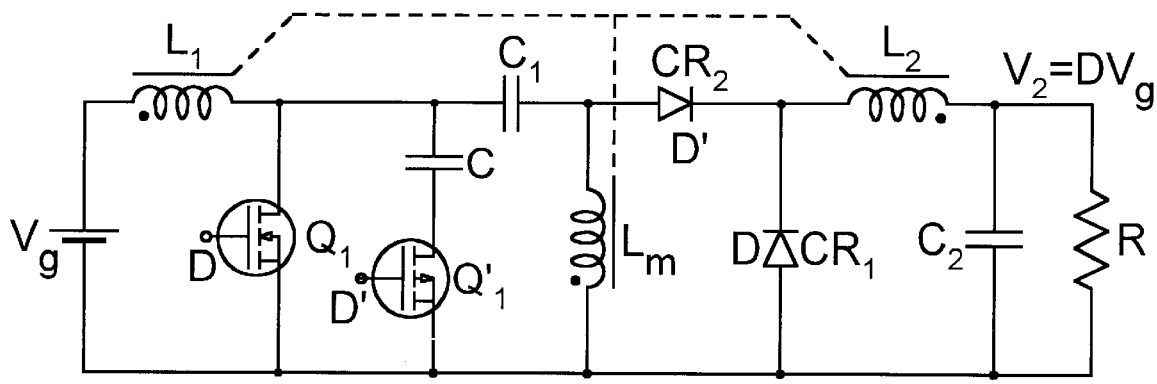
FIG. 28c illustrates the input switch and complementary input switch of FIG. 21 replaced by MOSFET devices.
Figure 28D:
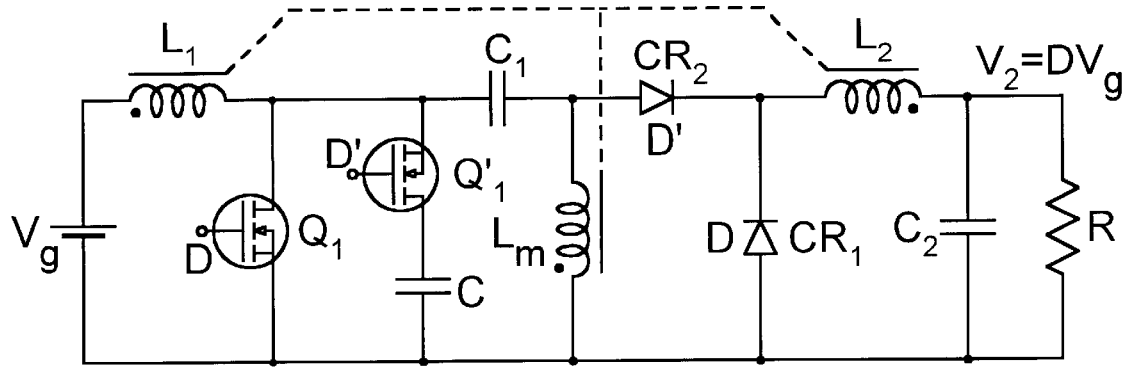
FIG. 28d illustrates the high side driver configuration of two N-channel MOSFET transistors.

The P-channel Q'$_1$ MOSFET of FIG. 28c is replaced by an N-channel Q'$_1$ MOSFET in FIG. 28d. While this switch requires a floating drive as the bipolar counter-part in FIG.

28a, this is still preferred in many applications due to the availability and effectiveness of special Integrated Circuit (IC) driver chips, the so called "high-side drivers", which are designed for just such drive conditions and even provide the necessary timing delays for soft switching implementations.

Figure 28E:
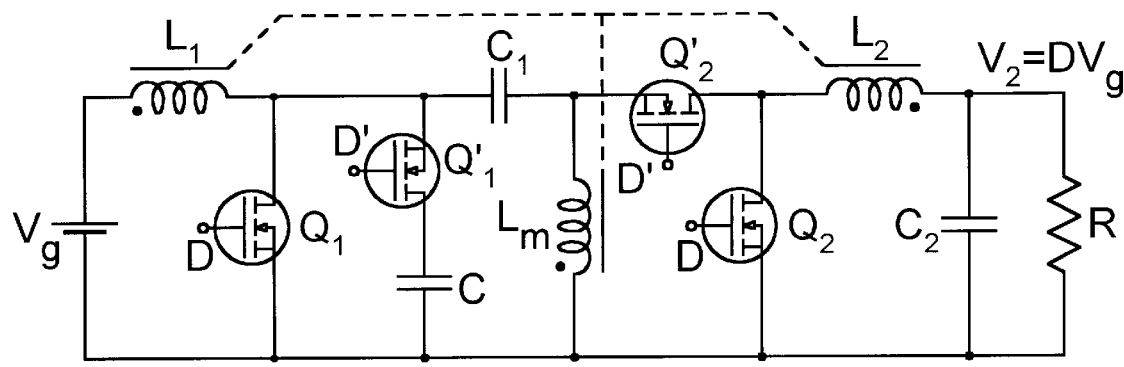
FIG. 28e illustrates an all-MOSFET transistor implementation of the invention in FIG. 21.

Finally, for low voltage applications in which there is a need for reduction of the output conduction losses, the current rectifiers $CR_1$ and $CR_2$ on the output side are replaced by MOSFET devices operating as synchronous rectifiers as in FIG. 28e. Furthermore, the use of all MOSFET devices enables an effective implementation of the soft switching. Some applications might favor the configurations in FIG. 27a or FIG. 27f which have a lower DC voltage on auxiliary capacitor C given by $V_b=DV_g/(1-D)$ compared to its voltage $V_C=V_g/(1-D)$ in configurations of FIGS. 14b. The ratio of their DC voltage ratings is $V_b/V_C=D$. Thus, at duty ratio D=0.5, the voltage rating of the auxiliary capacitor is 2 times lower when placed in position as in FIG. 27a in comparison to its position as in FIG. 14b. Later the isolating embodiment will take advantage of both: low voltage rating of auxiliary capacitor C and high-side-drive configuration. Other positions of auxiliary capacitor lead to even lower voltage ratings of capacitor C.

AC Voltages Mismatch

In addition to many similarities described earlier, there is one important difference between the classical AC transformer and the DC Transformer of FIG. 21. In the AC transformer, the AC power is applied to the input winding and the output winding is acting as a voltage source, sourcing the current to the load. In the DC Transformer, the same would be the case if the AC voltage induced on the output inductor winding through magnetic coupling is exactly the same as AC voltage applied to output inductor winding. Then a perfect AC voltage matching would take place and zero ripple current in the output would be obtained. However, when there is some substantial AC voltage mismatch between internally induced voltage on the winding and externally applied AC voltage, a ripple current will occur proportional to the voltage mismatch and inversely proportional to the inherent leakage inductance.

Figure 29A:
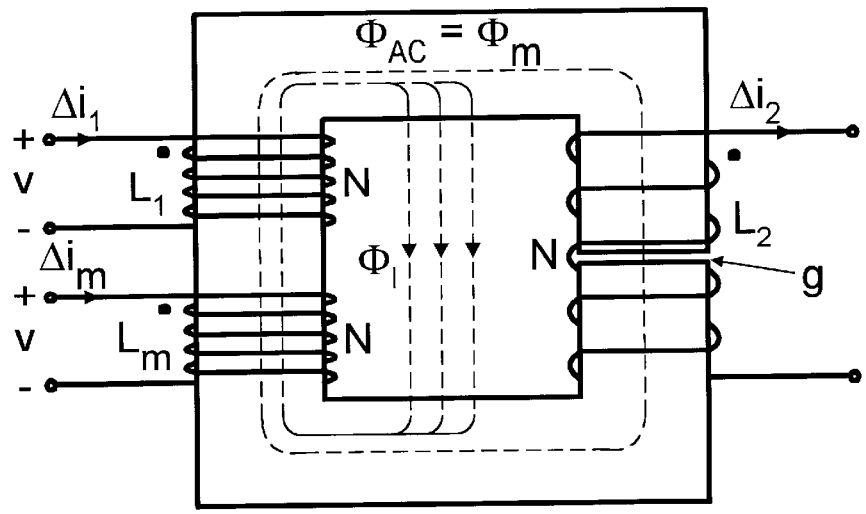

Another embodiment of the present invention is the DC Transformer of FIG. 29a with equal number of turns N as in FIG. 24e but with a small air-gap placed in the flux path to better match the AC voltages and further reduce the ripple current in the output inductor. In the DC Transformer of FIG. 29a, through the magnetic coupling between the inductor windings, the induced voltage in the output inductor is $v_m$, while the AC voltage generated by switching action of converter and applied to the same output inductor winding is $Dv_m$. Let us now show how this AC voltage mismatch on the same output inductor winding can be absorbed gracefully thanks to the intentionally increased leakage flux in the magnetic core of FIG. 29a and by strategically placing the three windings on the magnetic core of FIG. 29a.

The windings for inductors $L_1$ and $L_m$ of FIG. 29a are placed on the same leg of the UU-like magnetic core structure, and intentionally placed side-by-side (not on top of each other) to achieve some leakage inductance between the two. Since their AC voltages are identical over the whole operating range, a near-zero ripple current in input inductor can be obtained by slightly adjusting the turns ratio of the input inductor winding as discussed earlier, and therefore Electromagnetic Interference (EMI) noise will be reduced.

On the other hand, the output inductor winding $L_2$ is placed intentionally on the opposite leg of the UU-like magnetic core of FIG. 29a, to take the advantage of the large leakage flux $\Phi_1$ so created between the middle inductor and output inductor windings. This leakage flux will then provide substantial built-in leakage inductance to reduce output inductor AC ripple current as explained below.

Figure 29B:
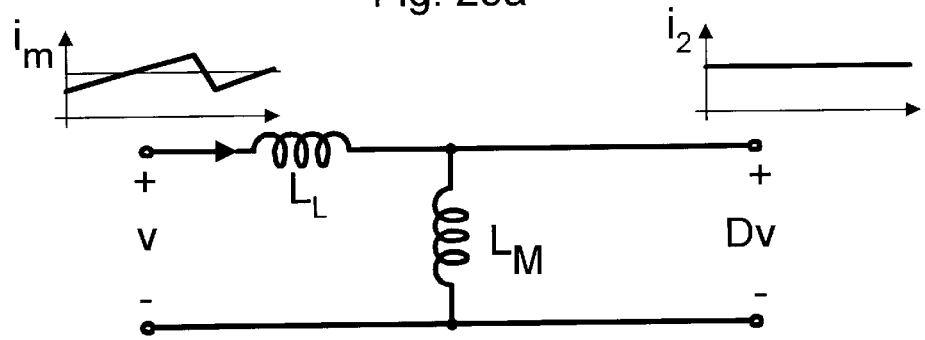
Figure 29C:
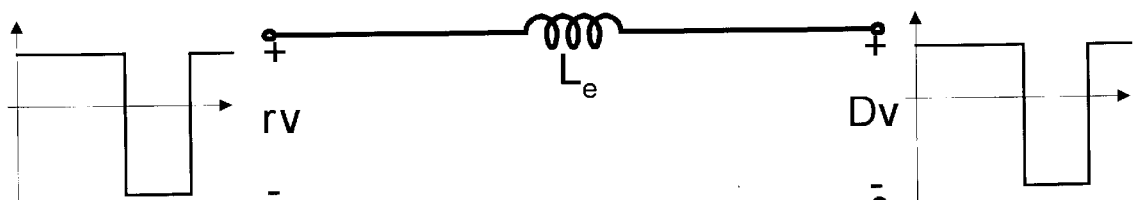
FIG. 29c illustrates a model of FIG. 29a further simplified and FIG. 29d illustrates an equivalent circuit model demonstrating zero-ripple current on the output.

To maximize the benefit of the leakage flux, a small air-gap is placed on the side where the output inductor $L_2$ is as shown in FIG. 29a. This air-gap placement will result in most of the leakage flux associated with windings $L_1$ and $L_m$, and small or negligible leakage flux associated with winding $L_2$, resulting in the equivalent circuit model with large leakage inductance $L_L$ on the side of windings $L_1$, and $L_m$ as shown in FIG. 29b. Note that the small leakage between the windings $L_1$ and $L_M$ is in this analysis neglected to simplify the model and focus on the main effect. Thus, the windings $L_1$ and $L_m$ being excited with identical voltages $v_{L1}=v_{Lm}=V$ are merged into one winding in the model of FIG. 29b. The voltage divider composed of $L_L$ and $L_M$ ($L_M$ is a magnetizing inductance of inductor $L_m$, where $L_m=L_L+L_M$) steps down the input voltage v by an inductive divider ratio $r=L_M/L_m$ to voltage rv. Thus, for r=0.8 and D=0.8 the input and output AC voltages in the model of FIG. 29c are identical presenting a zero net AC voltage to equivalent inductance $L_e=L_L\|L_M$, and hence result in very desirable zero ripple current on the output inductor side. The voltage divider ratio r=0.8 is easy to obtain since the small air-gap can be adjusted until the $L_M$ is just 4 times larger than the built-in leakage inductance $L_L$.

Figure 7A:
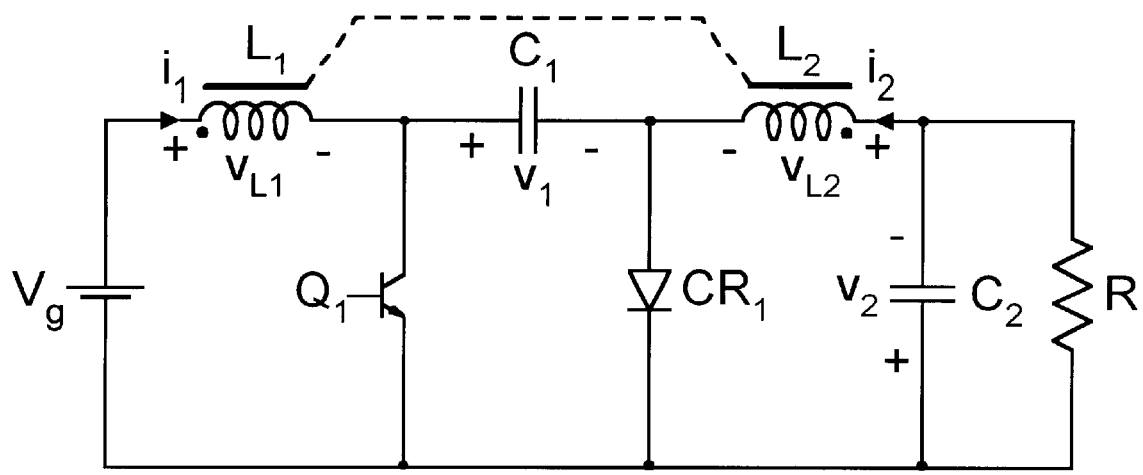
FIG. 7a is the prior-art Coupled-inductor Cuk converter.
Figure 7B:
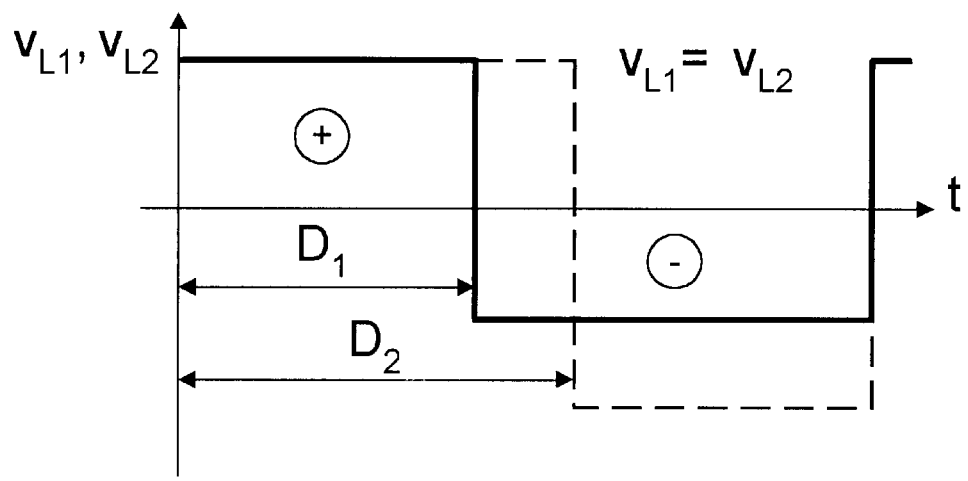
FIG. 7b displays the identical AC voltage waveforms on the two inductors prior to the coupling (for two different duty ratios $D_1$ and $D_2$), as a condition for their integration onto a common magnetic core.
Figure 8A:
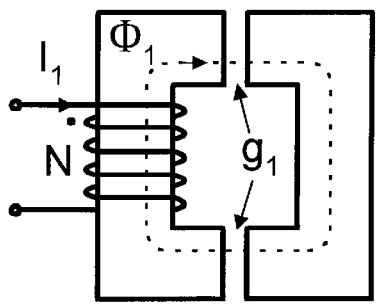
FIG. 8a and FIG. 8b show that each inductor in FIG. 7a, when used separately, must have appropriate air-gap and FIG. 8c and FIG. 8d reflect the inductance value degradation of each inductor due to their respective air-gaps.
Figure 8C:
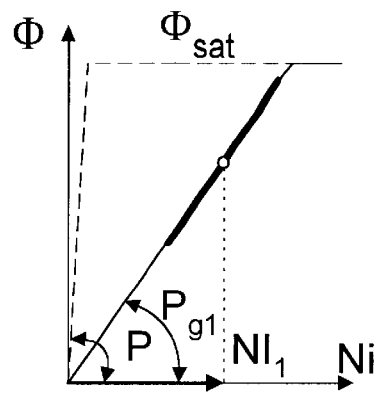
Figure 8B:
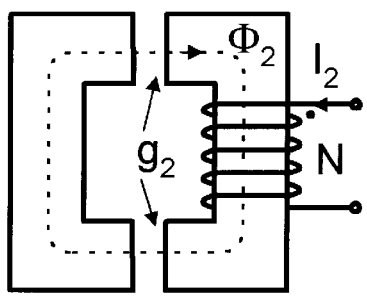
Figure 8D:
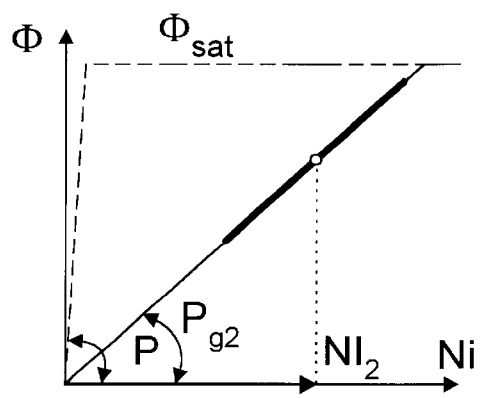
Figure 9A:
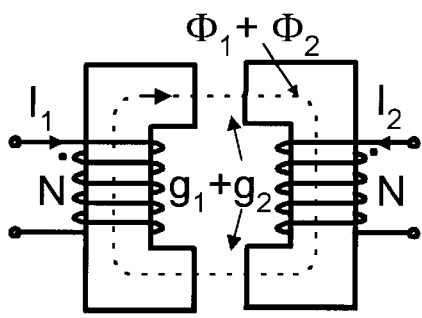
FIG. 9a demonstrates that the coupled-inductor implementation must have an air-gap, which is the sum of the two air-gaps of the original separate inductors of FIG. 8a and FIG. 8b
Figure 9B:
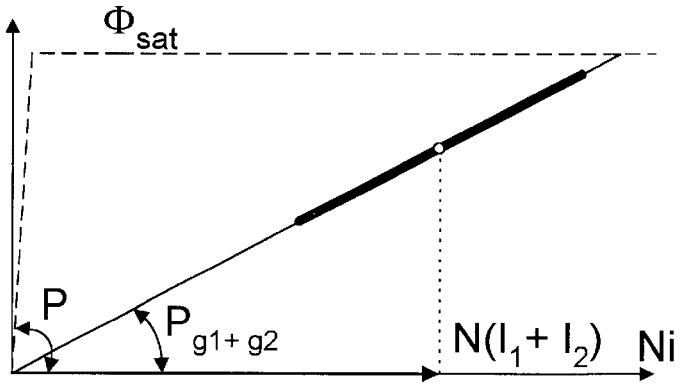
FIG. 9b shows combined flux vs. ampere-turns characteristic, which has an even higher inductance value degradation due to the increased air-gap.
Figure 10A:
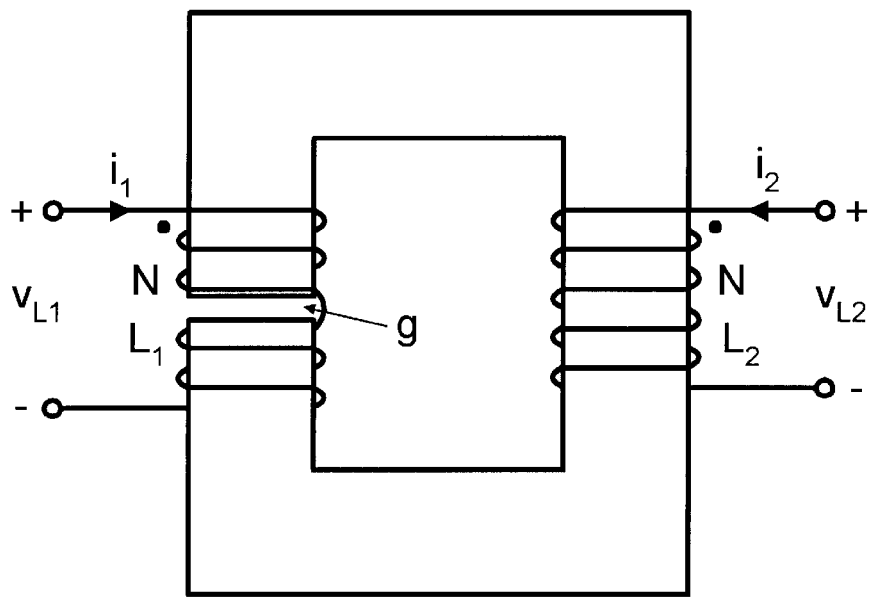
FIG. 10a shows a coupled-inductor implementation with the air-gap concentrated on the side with the input inductor winding, which leads to the circuit model of FIG. 10b with leakage inductance concentrated entirely on the output inductor winding side, thus demonstrating the zero-ripple current in the output inductor winding.
Figure 10B:
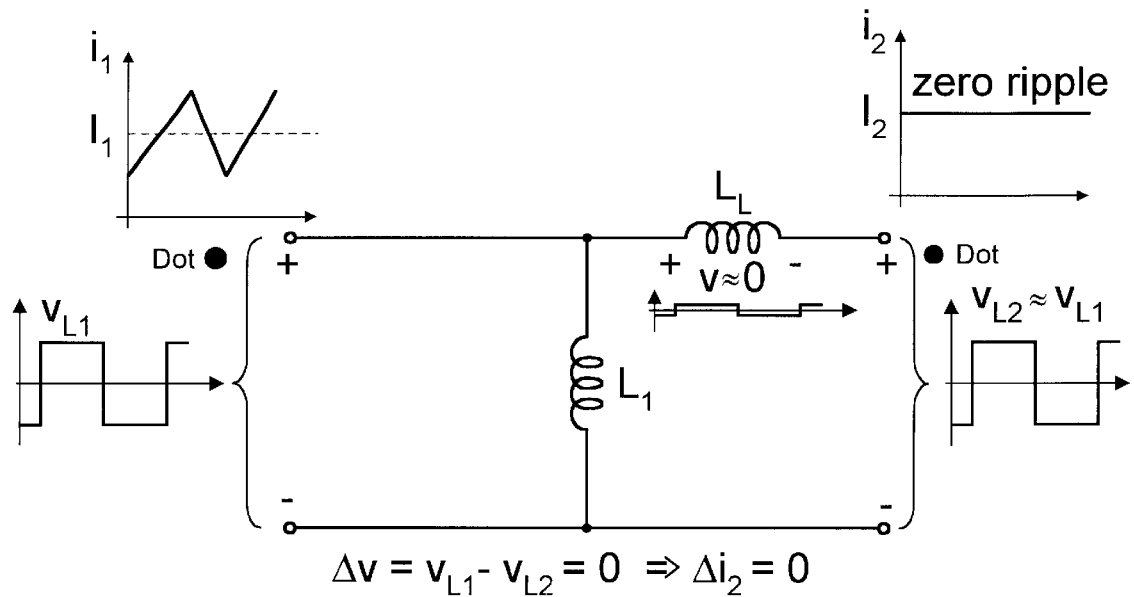
Figure 11A:
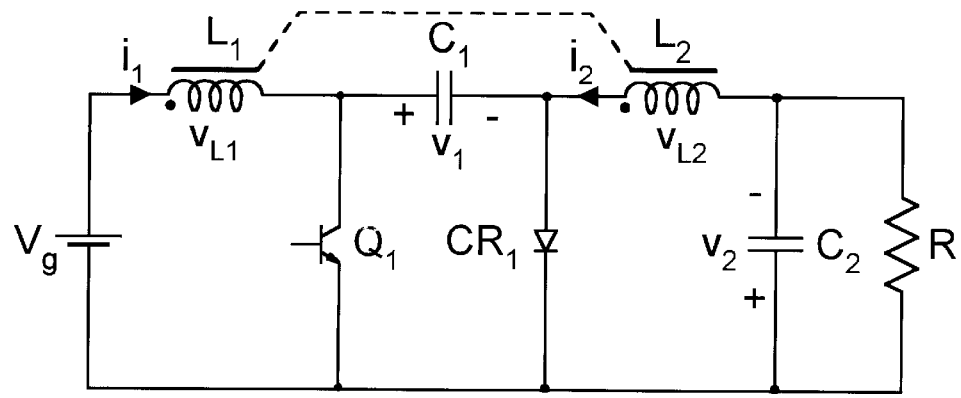
FIG. 11a shows a coupled-inductor magnetics connected with the output inductor winding polarity opposite to the one of FIG. 7a to cause DC-ampere-turns subtraction and FIG. 11b shows that a large voltage mismatch of connection in FIG. 11a leads to a huge ripple currents on both input and output inductors.
Figure 11B:
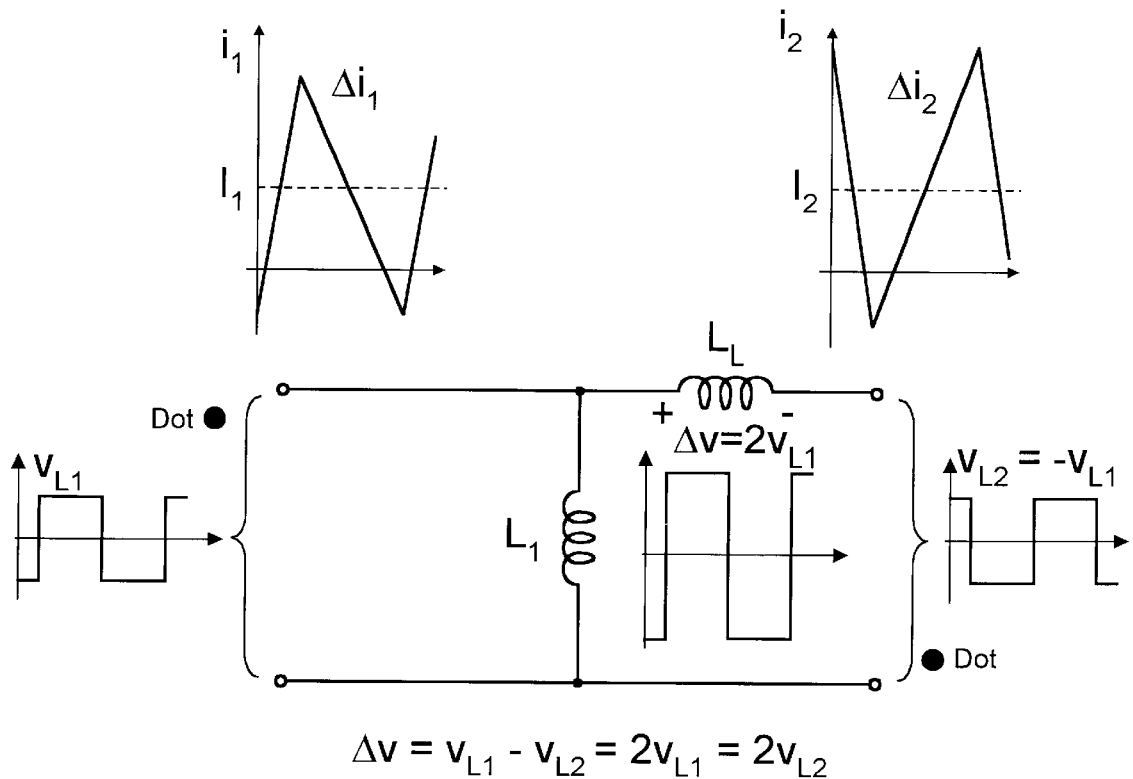
Figure 12A:
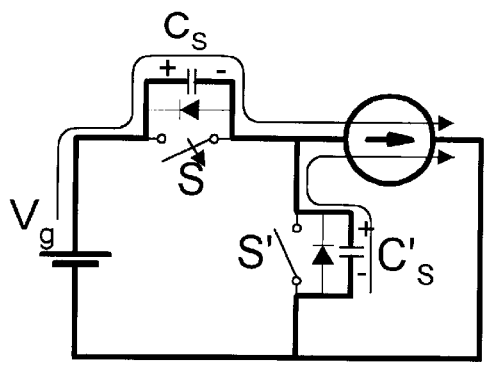
FIGS. 12a, 12b, 12c, 12d illustrate the four circuit models of the prior-art, soft-switching buck converter.
Figure 12C:
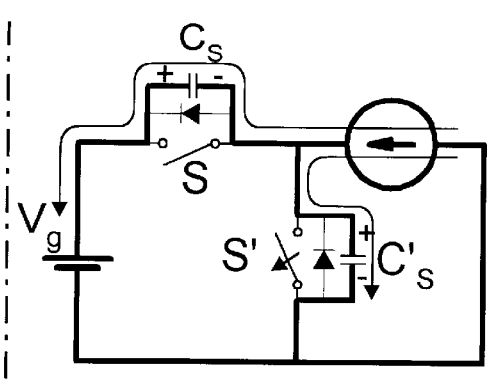
Figure 12B:
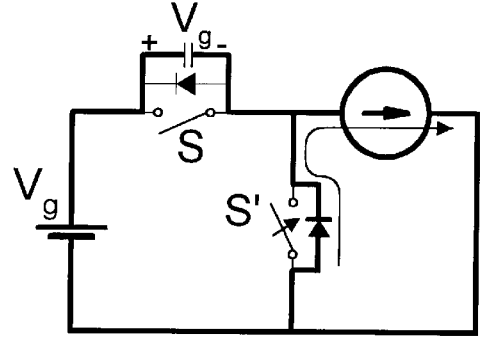
Figure 12D:
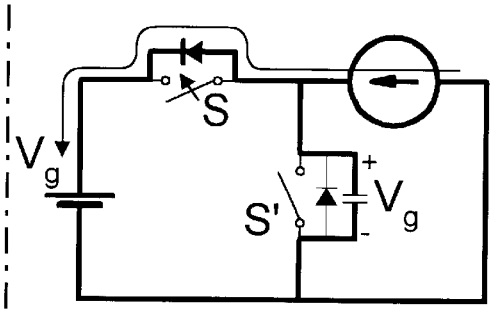

Note that at the same time, due to the very small total air-gap in this structure, the residual ripple current on the input side is also reduced by large factor, since the middle inductor inductance $L_m$ is very large. For comparison purposes, the coupled-inductor implementation of FIG. 7a would also result in near zero ripple current in the output inductor but the ripple current in the input inductor would be larger by an order of magnitude (10 times or more) than is the case with the DC Transformer of FIG. 29a. Thus, both zero-ripple current in output inductor as well as very small ripple current in middle inductor $L_m$ are achieved simultaneously. In addition, due to identical voltage on input inductor $L_1$, its ripple current can also be steered away into the middle inductor winding thus resulting in the ideal zero or near zero ripple current in both input and output inductors and small residual ripple in the middle inductor as illustrated in the current waveforms of FIG. 21 obtained under this matching condition. This leakage flux will also lead to second-order DC flux in the magnetic core leg with windings $L_1$ and $L_m$, thus establishing DC-bias in that leg. By increasing cross section of that leg, DC flux density in said leg can be reduced as desired.

To provide even better matching of the AC voltages, the number of turns of output inductor winding can also be changed slightly from the matching number of turns N, since the already existing small air-gap could tolerate small DC-ampere-turn mismatch. In some practical designs, especially in which large number of turns is used, this design alternative may give some advantages.

Evaluation of the Output Inductor Ripple Current

Figure 29D:
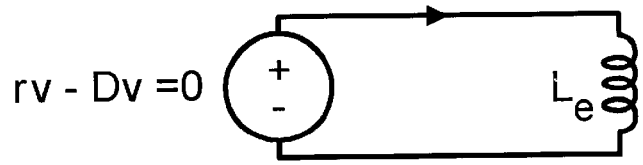

From the model in FIG. 29d, the output ripple current clearly depends on the very small equivalent leakage inductance $L_e$ and not on the large inductance $L_2$ of the output inductor. Thus, it would appear that the ripple current magnitude increases rapidly when operating duty ratio is away from the zero-ripple condition. However, this is not the case. Despite the small value of the leakage inductance $L_e$, the voltage across it is not the full output voltage V, but instead, as in FIG. 29d, the small mismatch voltage, which is quantified in the formula for the maximum output inductor ripple current at duty ratio D given by:

$$\Delta i_{2M} = (D - D_{ZR}) V T_S / L_e \qquad (16)$$

where $D_{ZR}$ is the duty ratio at which zero ripple current is obtained, V is the regulated output DC voltage, $T_S$ is the switching period, and $L_e$ is the effective leakage inductance reflected to the output inductor side. Clearly the voltage mismatch is given by $(D-D_{ZR})V$ and is only the fraction of the output DC voltage V.

Note that $D_{ZR}=0.8$ is already obtained owing just to inherent leakage inductance of the given core and with small air-gap placed on output inductor side as discussed earlier. If the output inductor turns are also adjusted accordingly, it is relatively easy to move duty ratio for zero-ripple current to $D_{ZR}=0.5$ with some trade-off in an increased DC flux in core and a small air-gap introduction. If an input voltage change from 40V to 60V (1.5:1 dynamic range) is needed, this would correspond to duty ratio change from 0.6 to 0.4. Thus, (16) would reduce to $\Delta i_{2M}=0.1\ VT_S/L_e$ in which the voltage mismatch is 10% of the output DC voltage. For example, if the converter is regulated at V=5V, and for $T_S=10\ \mu sec$ (switching frequency of 100 kHz), even a very small leakage inductance of only $L_e=1\ \mu H$, would result in acceptable maximum ripple current of 5 A. Since the converter is capable of delivering high DC load currents of 40A, 60A and higher without saturation, this ripple current is relatively small and has little impact on the overall efficiency.

Figure 30:
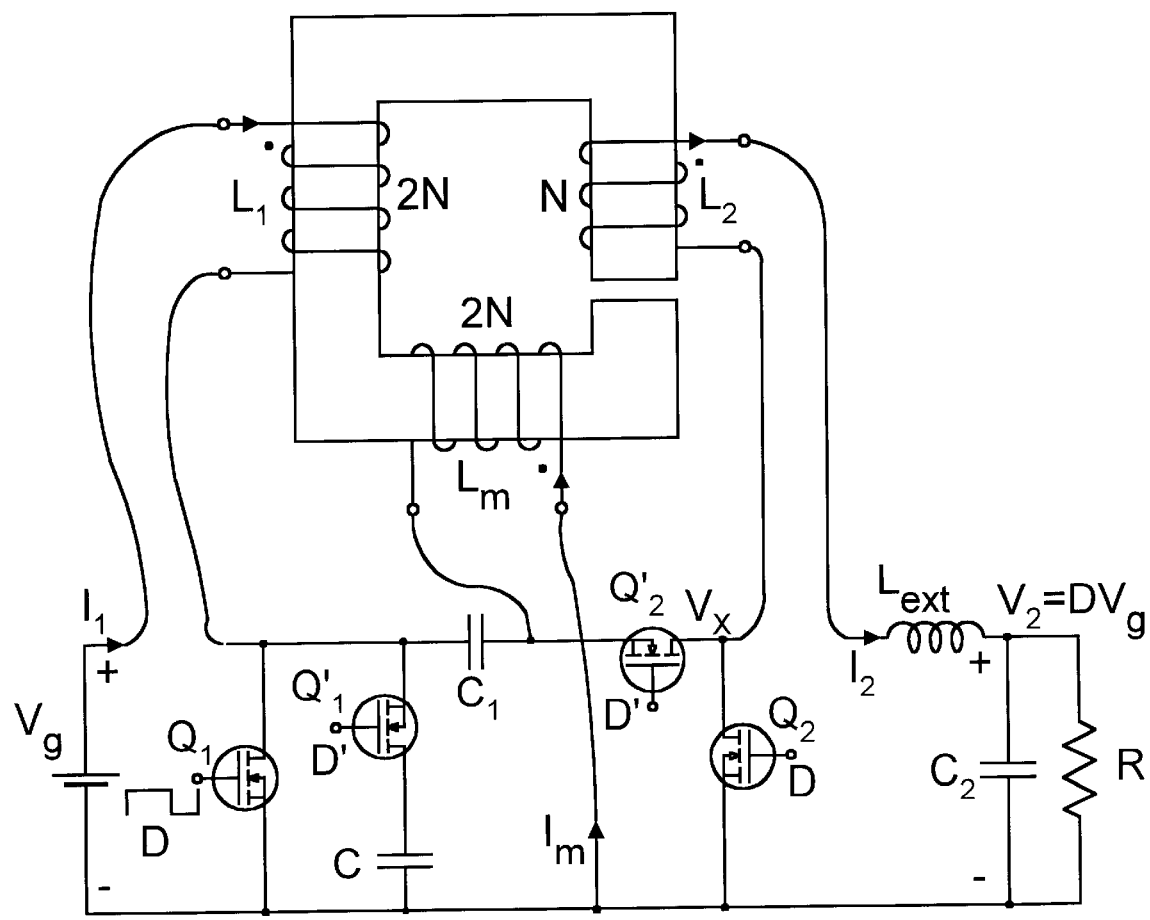
FIG. 30 illustrates another embodiment of the present invention which utilizes the small external inductor $L_{ext}$ to reduce the output inductor ripple current. Note that the number of turns of the input and middle inductors are twice that of the number of turns of the output inductor.
Figure 31:
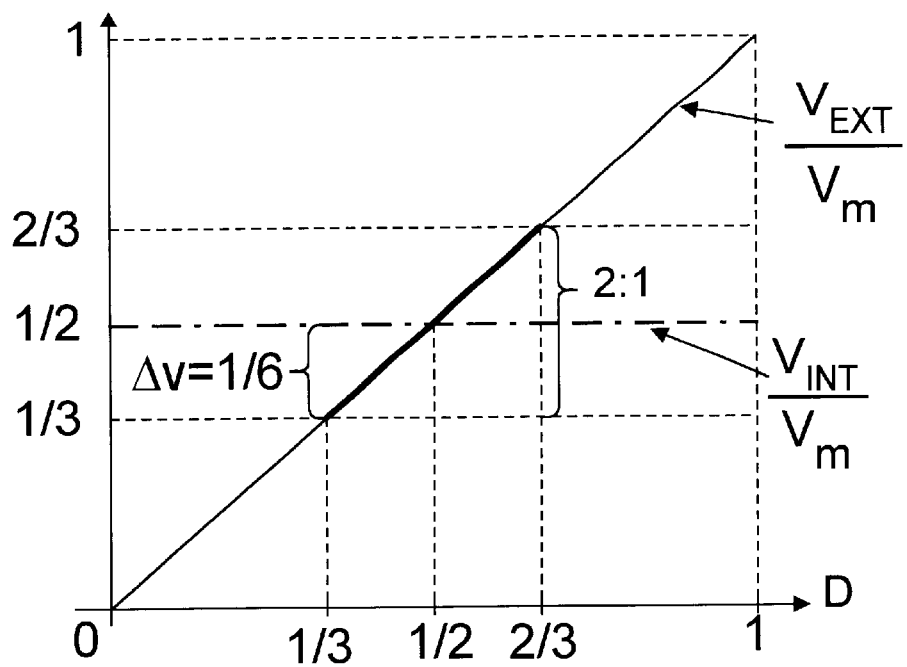
FIG. 31 is a graph of the operating range of the converter in FIG. 30 centered around the duty ratio D=½ with zero output ripple current at D=½.

Yet another embodiment of the present invention is shown in FIG. 30 in which the output inductor number of turns are adjusted relative to the middle inductor and input inductor number of turns so that zero ripple current is obtained at a lower duty ratio such as for example at D=0.5 as seen in FIG. 31 for a 2:1 turns ratio of middle to output inductor. This is because $v_{EXT}=Dv_m$ is plotted as linear function in FIG. 31, while $v_{NT}=0.5 v_m$ is a constant dotted line in FIG. 31 since 2:1 ratio of middle to output inductor is used. Their intersection at D=0.5 shows matching internal AC voltage $v_{INT}$ and external AC voltage $v_{EXT}$, hence zero ripple. Clearly, since identical number of turns are not used as discussed before, zero DC flux feature will be lost, but partial DC-bias cancellation will be in effect. Nevertheless, this would still lead to a substantial reduction of the air-gap from that of the conventional designs in which DC-ampere-turns add, rather than subtract as in this case. Still substantial reduction of the ripple currents in input and middle inductor would be obtained. The DC Transformer implementation would be as in FIG. 30. As shown in FIG. 31 such an arrangement would place zero-ripple current in the output inductor close to the D=0.5 operating point. The main benefit of such an arrangement is that for a 2:1 voltage range, the maximum AC voltage mismatch on the output inductor would be at maximum ⅙ of the output DC voltage. In some applications, the built-in leakage inductance of the magnetic core may be sufficient to result in acceptable ripple currents at the extreme ends of the operating range, from duty ratio D=⅓ to duty ratio D=⅔ or 2:1 conversion ratio. However, even if that is not the case, the ripple currents can be reduced in half for example by the addition of a small external inductor $L_{EXT}$ equal to the leakage inductance inherent to the magnetic core, as illustrated in FIG. 30. Note that such inductor will have much reduced AC volt-second requirements, since it will be subject to only 16% of the total AC flux of the middle inductor. In addition its inductance value needs to be only a fraction, such as 10% of the inductance of the output inductor. This would directly translate into a much smaller magnetic core and relatively negligible copper and core losses of such an external inductor in comparison to the main DC Transformer magnetic core. Another benefit of such implementation is that high design goals can be met with standard magnetic core types and core sizes without resorting to special custom magnetics cores as described next.

A further embodiments of the present invention (shown in FIG. 32 and FIG. 33) is especially suitable for applications in which the regulation of the output voltage over a wide range of the input voltage change, such as 2:1 or even 4:1 is needed and yet reduced ripple current at the output is also needed as well as efficiency improvement and further size reductions desired. The DC Transformer of FIG. 33 has an additional leakage magnetic leg without windings and with a large air-gap in its magnetic flux path to divert some of the AC flux from the main flux path and reduce the AC voltage induced in output inductor winding to the same value as the AC voltage generated by converter on the same winding $v_{EXT}=Dv_m$. For example, if a chosen nominal operating duty ratio is D=0.7, we would design the leakage leg so that 30% of the transformer flux is bypassed into this leg. Then the internally induced voltage on the output inductor will be 70% of the AC voltage on the middle inductor $L_m$ due to diversion of the 30% of AC flux into the leakage leg. But this is exactly what is needed to match this internally induced voltage to the AC voltage generated on the same winding by the switching action and thus obtain zero ripple current in the output inductor. This additional magnetic leakage leg performs a twofold function:

1. Diverts 30% of the main flux into the leakage leg and thereby induces in the output inductor the same AC voltage as the AC voltage applied to it through the converter. This would then result in zero-ripple output inductor current at that particular nominal operating duty ratio.
2. The leakage leg will substantially increase the total leakage inductance and thereby reduce substantially the output ripple current when the duty ratio D is moved away from the nominal value and zero-ripple case.

Figure 32:
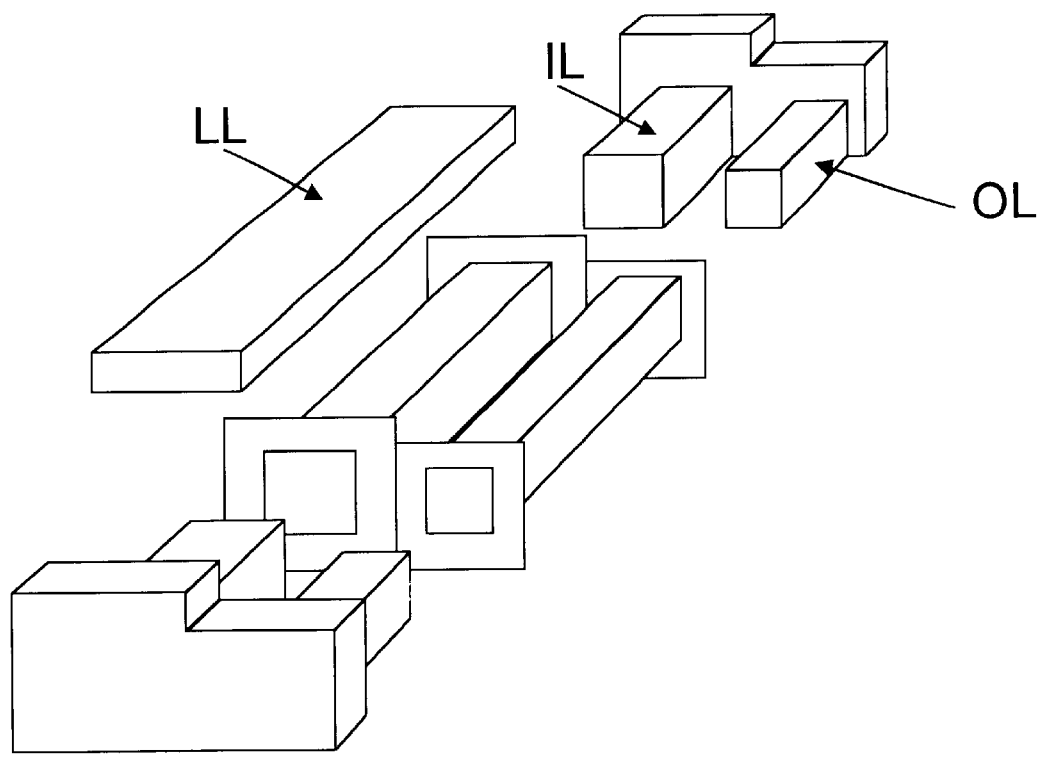
FIG. 32 illustrates in an exploited isometric view an embodiment of the magnetic core structure for the present invention in which the leakage leg LL is built using a custom core configuration for the converter of FIG. 33.
Figure 33:
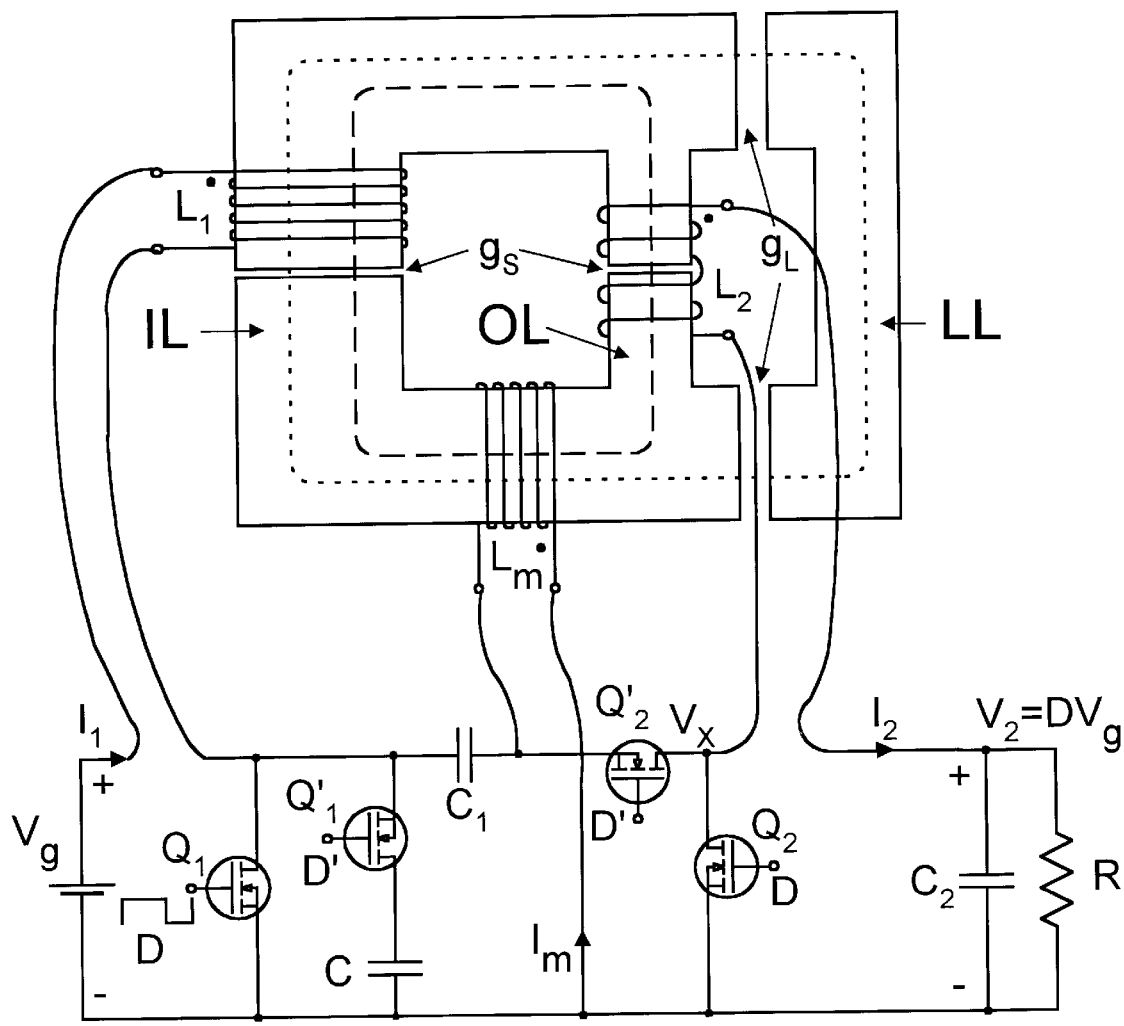
FIG. 33 is a circuit diagram of an embodiment of the present invention, in which the DC Transformer is built with an additional magnetic leakage leg LL.

The needed AC flux diversion from the main AC flux path can be easily accomplished by using a proportionally larger air-gap in the leakage path as illustrated in the conceptual custom DC Transformer core of FIG. 32. Due to smaller AC flux in this leakage leg, it could also be made of a smaller cross-section, which would further increase the air-gap needed in the leakage path relative to the one in the main flux path. An alternative method to reduce the induced voltage at the output inductor winding to match the voltage imposed by the converter is to reduce the number of turns at the output inductor winding. This is particularly useful for higher output voltages, where the number of turns are large. Either method, implementing a leakage leg, using a reduced number of turns, or combination of both, causes some DC flux imbalance. Therefore, there will be no complete DC flux cancellation and some net DC-bias will be introduced. In practical implementation the leakage leg may take only a small portion of the total volume of the DC Transformer core structure as shown in practical custom DC Transformer core of FIG. 32 in which the leakage leg took only approximately 15% of the total magnetics volume. In FIG. 32, LL designates the leakage leg, IL designates the input inductor and middle inductor leg, and OL designates the output inductor leg.

Figure 34:
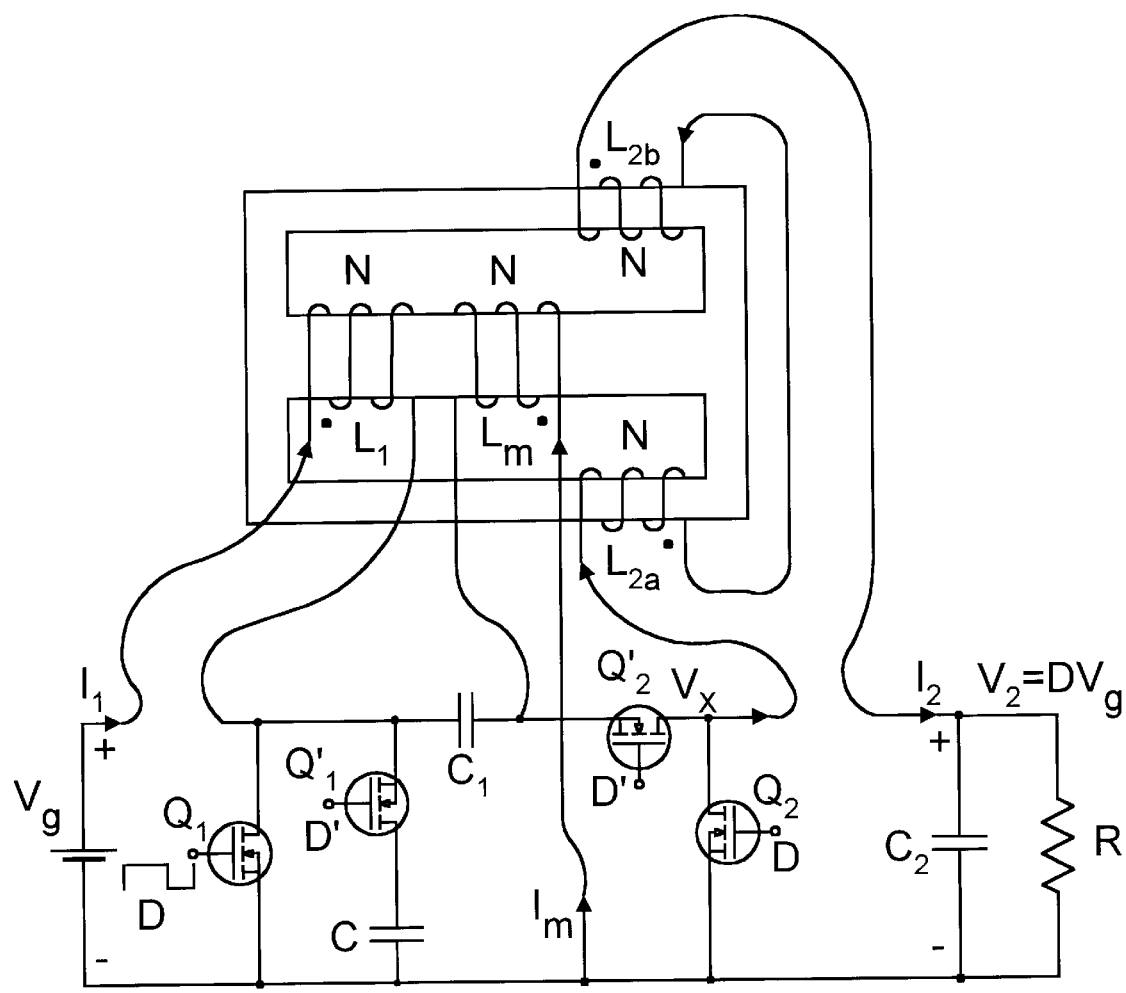
FIG. 34 is a circuit diagram of another embodiment of the present invention in which the output inductor $L_2$ is split into two identical windings $L_{2a}$ and $L_{2b}$ with N turns in series for use with a DC Transformer on an EE-like magnetic core with no air-gap.

Yet another embodiment of the present invention is shown in FIG. 34 in which the DC Transformer is built using the multiple-loop, EE-like magnetic core structure. As before, the input inductor and middle inductor are placed side-by-side on the same leg, that is the center leg of the EE-like magnetic core structure as seen in FIG. 34 and have equal number of turns N. The output inductor is split into two windings in series, each with the same number of turns N so that their AC voltages add. Then each of these output inductor windings is placed on a separate outer magnetic leg of the EE-like magnetic core, with dot-marked ends positioned to enable that the DC fluxes in both outer magnetic loops are zero. Thus, as before, a magnetic core without air-gap may be used. One of the main benefits of the EE-like magnetic core structure is that the leakage inductance is further increased and ripple currents further reduced in comparison with the equivalent single-loop, UU-like magnetic core structures. A further practical benefit is that the assembled EE-like magentic core with windings tends to have a substantially lower profile than UU-like cores.

Other variations of the DC Transformer might be envisioned by those skilled in the art which would utilize the unique advantages of the present invention and its key features based on the recognition of the relationships (3) and (4). Those variations will be just alternative extensions based on the disclosure of the present invention.

Isolated Extensions

In the majority of practical applications galvanic isolation between the input DC source and the output DC load is often required either for safety reasons or from a system point of view. Once an isolated version of the converter is obtained, additional benefits accrue such as: the output DC voltage could be scaled up or down with the transformer turns ratio, negative as well as positive DC output voltages can be provided, multiple outputs with different DC voltages and polarities can be easily obtained, etc.

Figure 35A:
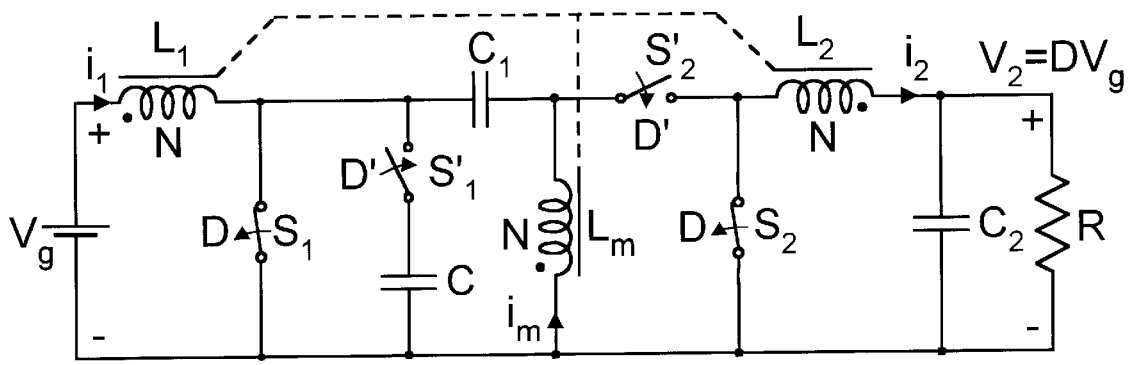
Figure 35B:
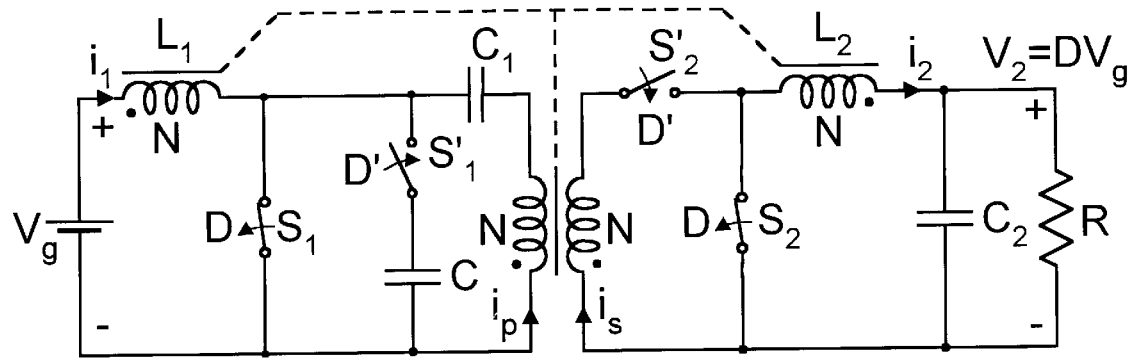
FIG. 35b another embodiment is shown in which the middle inductor in FIG. 35a is replaced with a 1:1 turns ratio isolation transformer.

However, the existence of a non-isolated DC-to-DC converter does not guarantee at all the existence of a galvanic isolated counter-part. In fact, many non-isolated converters do not have a galvanic isolated extension. Some, which do, actually have a rather non-obvious extension, such as the forward converter, which is derived from the prior-art buck converter of FIG. 1a. Yet other converters, such as prior-art flyback converter, have isolated version, which are obtained simply by replacing the inductor of the non-isolated version with an isolation transformer. The present invention belongs to that category. One of the non-isolated versions of the present invention is shown in FIG. 35a. The corresponding isolated extension of FIG. 35b is obtained by simply substituting the original middle inductor with an isolation transformer with the same number of turns N for both primary and secondary winding while keeping the input and output inductor windings with the same number of turns N as well. Thus, all the properties of the non-isolated converter of FIG. 35a are carried over to the isolated counterpart of FIG. 35b.

Figure 36A:
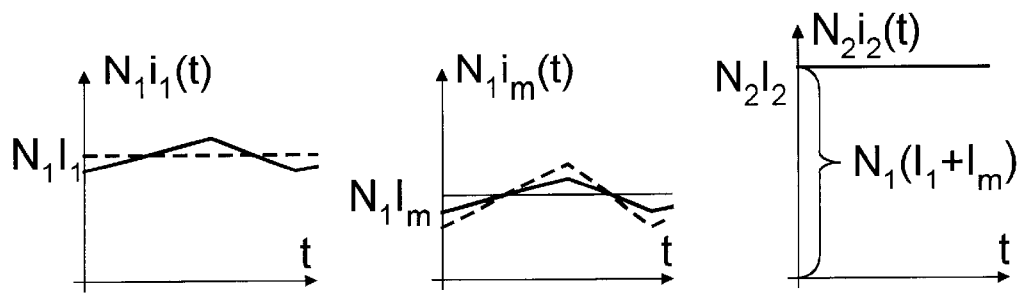
FIG. 36a illustrates the preferred embodiment of the present invention showing an isolated converter and an Isolated DC Transformer with zero total DC-ampere-turns in a single-loop magnetic core.
Figure 36A:
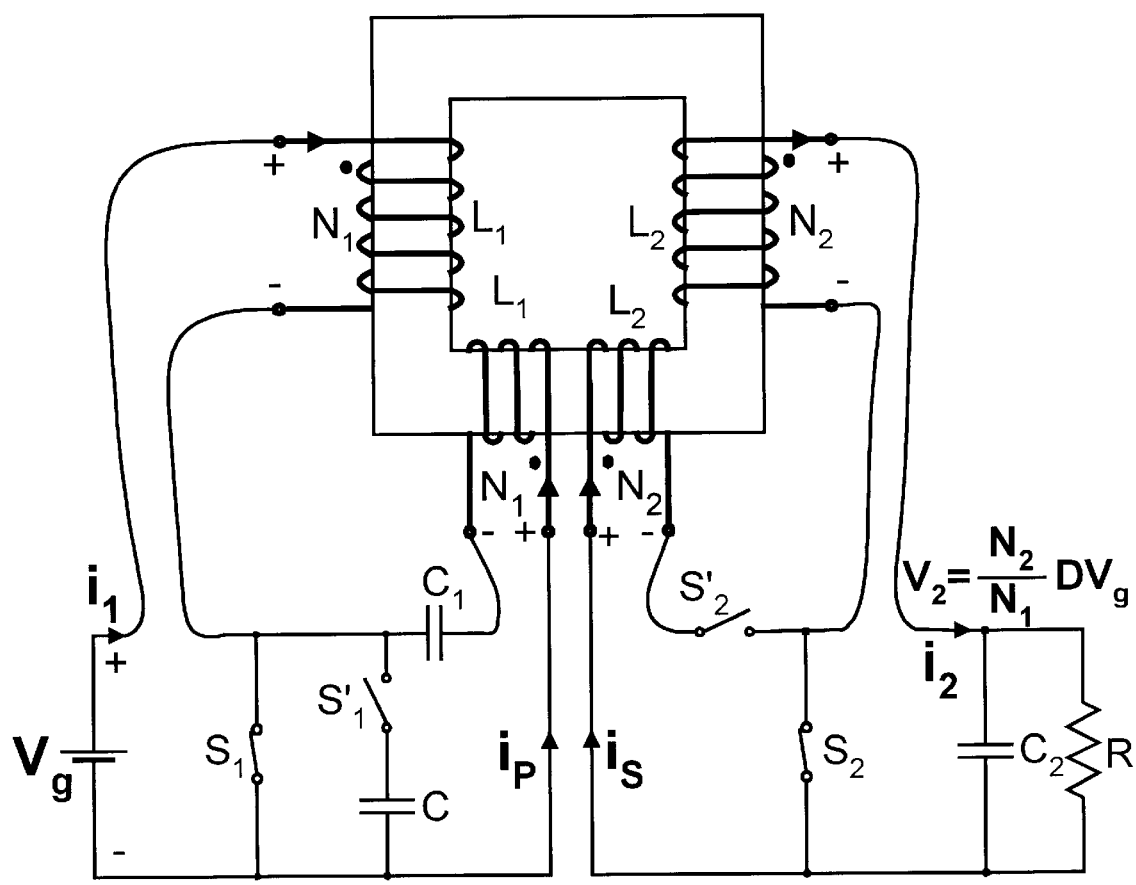
Figure 36B:
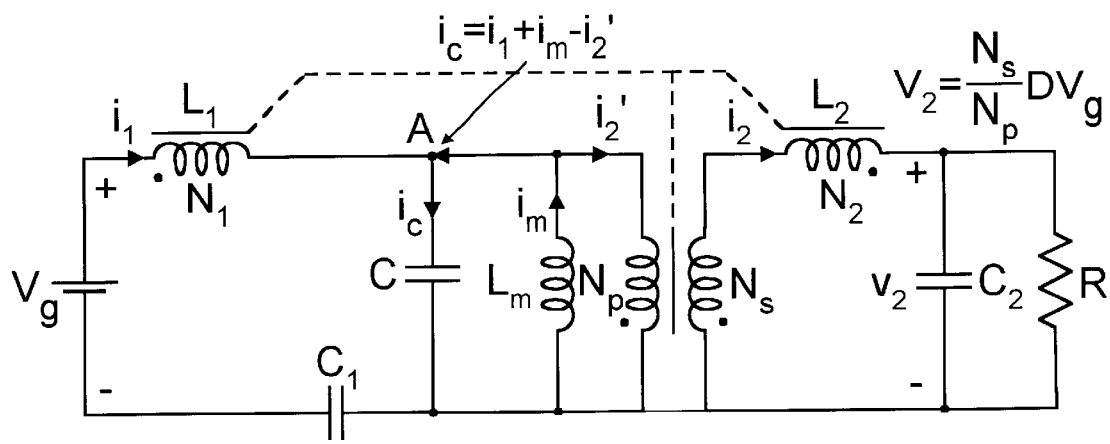
FIG. 36b illustrates an equivalent circuit model for the converter of FIG. 36a during the complementary interval D'$T_S$.

The next modification is to use the isolation transformer to provide additional DC voltage scaling by its secondary to primary turns ratio $N_2:N_1$ as shown in another embodiment of the present invention in FIG. 36a, which will change the output DC voltage to $$V_2 = D\ V_g N_2/N_1 \tag{17}$$

While the non-isolated converter was capable only of a voltage step-down function, the isolated extension of FIG. 36a is also capable of step-up as well as step-up/step-down function. Also in many applications a very large step-down is required, such as when the rectified AC line is used as primary DC source, and low voltage outputs such as 5V, 3.3V and lower, are required. In such applications, additional voltage step-down through the transformer turns ratio is essential, as is also the galvanic isolation feature.

It is important to note that the isolated extension of FIG. 36a now also includes an isolation DC transformer without any air-gap, which is, as before, an integral and inseparable part of the converter. In order to distinguish this magnetic structure from the DC Transformer in FIG. 21, which does not provide galvanic isolation, this new magnetic component is termed Isolated DC-to-DC Transformer or simply Isolated DC Transformer since it does provide galvanic isolation. This indicates also, that as in the non-isolated versions, the total DC flux in the single loop magnetic core must be zero, which is indeed the case, provided that, as shown in FIG. 36, the input inductor number of turns is chosen to be $N_1$, that is the same as number of turns of the primary winding, and the output inductor number of turns is chosen to be $N_2$, that is the same as the number of turns of the secondary winding, so that:

$$N_P = N_1 \text{ and } N_S = N_2 \tag{18}$$

where, $N_P$ and $N_S$ are primary and secondary number of turns of the isolation transformer.

Let us now prove that (18) is indeed a necessary and sufficient condition for complete DC flux cancellation for any duty ratio D. During the complementary time interval $D'T_S$, the isolated converter reduces to the circuit model shown in FIG. 36b, in which the isolation transformer is modeled with its magnetizing inductance $L_m$ and the ideal transformer with $N_S:N_P$ turns ratio. The load current $i_2$ is reflected to the primary side by the turns ratio $N_S/N_P$ and becomes $i_2'$ given by $$i_2' = (N_S/N_P) i_2 \tag{19}$$

The summation of the currents at node A results in $$i_C = i_1 + i_m - i_2' \tag{20}$$

since, as before, $i_C = 0$, we get from (19) and (20)

$$I_1 + I_m = (N_s/N_p) I_2 \tag{21}$$

Let us now find the total DC ampere-turns. For the purpose of calculating its DC-ampere-turns contribution, the isolation transformer can be represented by a magnetizing inductance $L_m$, with $N_P$ number of turns and with DC current $I_m$, hence DC ampere-turns contribution of isolation transformer is $N_P I_m$. Since the dot-marked ends of the middle inductor and its replacement, the isolation transformer, were kept the same, the isolation transformer DC-ampere-turns add to the input inductor DC-ampere-turns, while DC-ampere-turns of the output inductor subtract to result in total DC-ampere-turns given by:

$$\Sigma NI = N_1\ I_1 + N_P\ I_m - N_2\ I_2 = (N_1 - N_P) I_1 + (N_S - N_2) I_2 \tag{22}$$

Note that (22) can be zero for any currents $I_1$ and $I_2$ if, and only if, the following two equations are satisfied simultaneously:

$$N_1 - N_P = 0 \text{ and } N_S - N_2 = 0 \tag{23}$$

which is clearly the same as postulated by (18). Thus, the condition (18) or (23) is both necessary and sufficient for complete cancellation of the DC-ampere-turns in an isolating DC Transformer. Note also that for preservation of zero net DC-ampere-turns, it was not only necessary that the ratio of the output inductor to input inductor number of turns matches the secondary to primary turns ratio of the isolation transformer, but, in fact, a much more restrictive condition is needed, that is equality of the isolation transformer primary winding number of turns and input inductor number of turns, and also equality of the isolation transformer secondary winding number of turns with output inductor number of turns. Due to the DC-ampere-turns cancellation condition from (22) and (23), the air-gap can either be eliminated completely or reduced by an order of magnitude in comparison with conventional solutions.

From another point of view, in the previous state-of-the-art converters employing Coupled-Inductors such as Coupled-Inductors Cuk converter, it was sufficient just to match the ratio of turns of output to input inductor with the isolation transformer secondary to primary turns ratio, since the Coupled-Inductors was only concerned with the AC voltage matching and Coupled-Inductors and isolation transformer were on separate magnetic cores. To the contrary, in the Isolated DC Transformer case, in addition to the matching of the AC voltages, an additional requirement is to have also DC-ampere-turns cancellation. For the latter to take place the absolute number of turns must be matched as per (18) and not just the turns ratio. This is also required by their coupling on the common single-loop magnetic core.

In addition, this result (18) is also ideally desired for low ripple current in the input inductor. Note that the AC voltages on the input inductor and primary of the isolation transformer are identical. Since now the same number of turns is used for input inductor and primary of the isolation transformer, the same volts/turn is preserved, thus leading to their direct 1:1 coupling. Hence due to perfect matching of the AC voltages and finite leakage inductance, near zero-ripple input inductor current and substantial reduction of the conducted EMI noise are achieved by slightly increasing the number of turns in the input inductor. The DC-flux imbalance due to this increase is negligible. This holds over a wide range of operating duty ratio D.

Of course, if one has assumed the special relationship (18) a priori, then (21) would directly prove that DC-ampere-turns cancellation holds. However, that would only prove that (18) is a sufficient condition, but will not reveal that the same condition (18) is also a necessary condition as well. The DC-ampere-turns cancellation is also displayed by the instantaneous ampere-turns waveforms in the Isolated DC Transformer of FIG. 36a. Once again, under condition (18) the isolation transformer in this case provides just the right DC-bias current $I_m$ for any operating duty ratio, that is for any input DC voltage $V_g$ and any DC load current $I_2$, so that total net DC-ampere-turns are obtained in the single-loop magnetic core of the Isolated DC Transformer. This, once again demonstrates that the Isolated DC Transformer is at the heart of the operation of the converter. Thus, the Isolated DC Transformer with a very restricted but well defined choice of number of turns (18) and positioning of the windings around a single-loop magnetic core, is at the root of the unprecedented performance of the converter. The many variants of converter configurations, in fact, have the same purpose to provide the needed DC currents as well as necessary AC voltages to the windings so that current directions and voltage polarities are firmly defined and referenced to the dot-marked ends of respective windings, so that either the Isolated or Non-isolated DC Transformer could function as envisioned and offer the same described performance improvements.

Figure 36C:
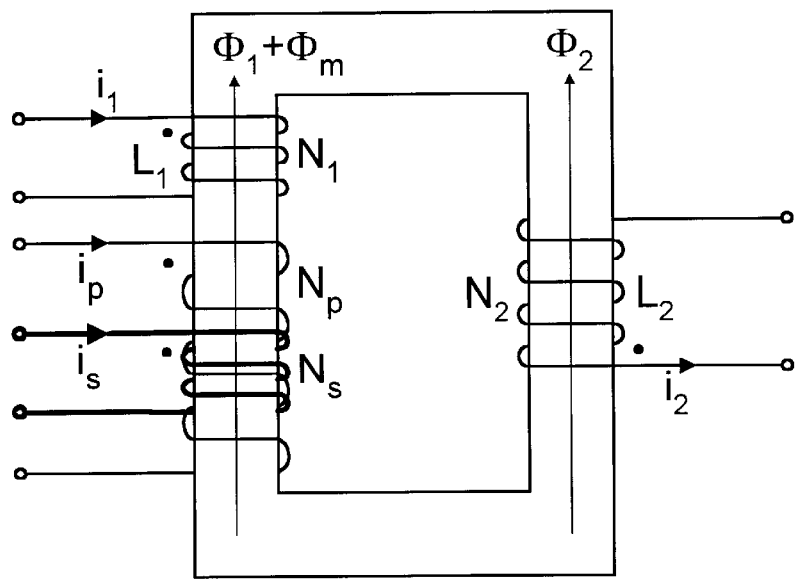

As before for the non-isolated converter of FIG. 21, the isolated converter was shown with the winding placements as in FIG. 36a only for better visualization of the Isolated DC Transformer winding connections, and not to indicate the actual winding placement. FIG. 36c shows such a relative placement. Note that as before, the input inductor and the isolation transformer are placed side-by-side (to promote some leakage between them), while the output inductor is placed on the opposite leg of the UU-like magnetic core structure to substantially increase the leakage between the transformer and output inductor. Finally, the primary and secondary windings of the isolation transformer are shown in FIG. 36c interleaved to minimize the leakage inductance between them, thus using the same techniques as for any other isolation transformer with tight coupling.

Figure 26:
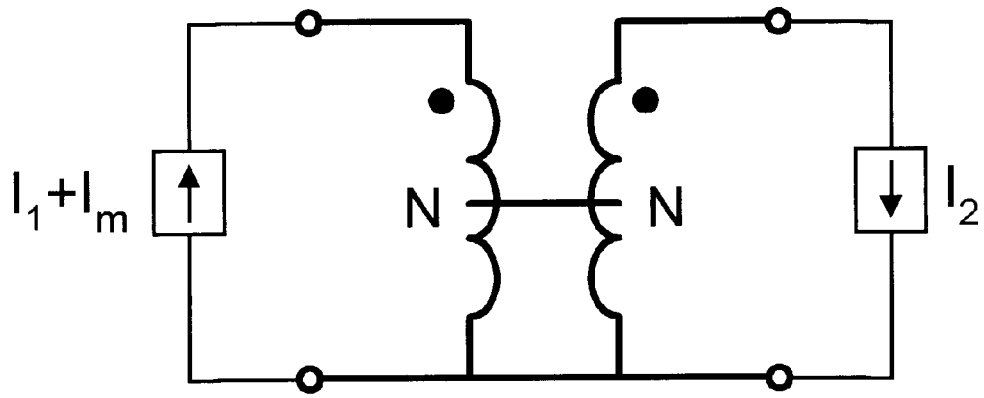
FIG. 26 shows a new symbol of the DC Transformer model of FIG. 25.
Figure 37A:
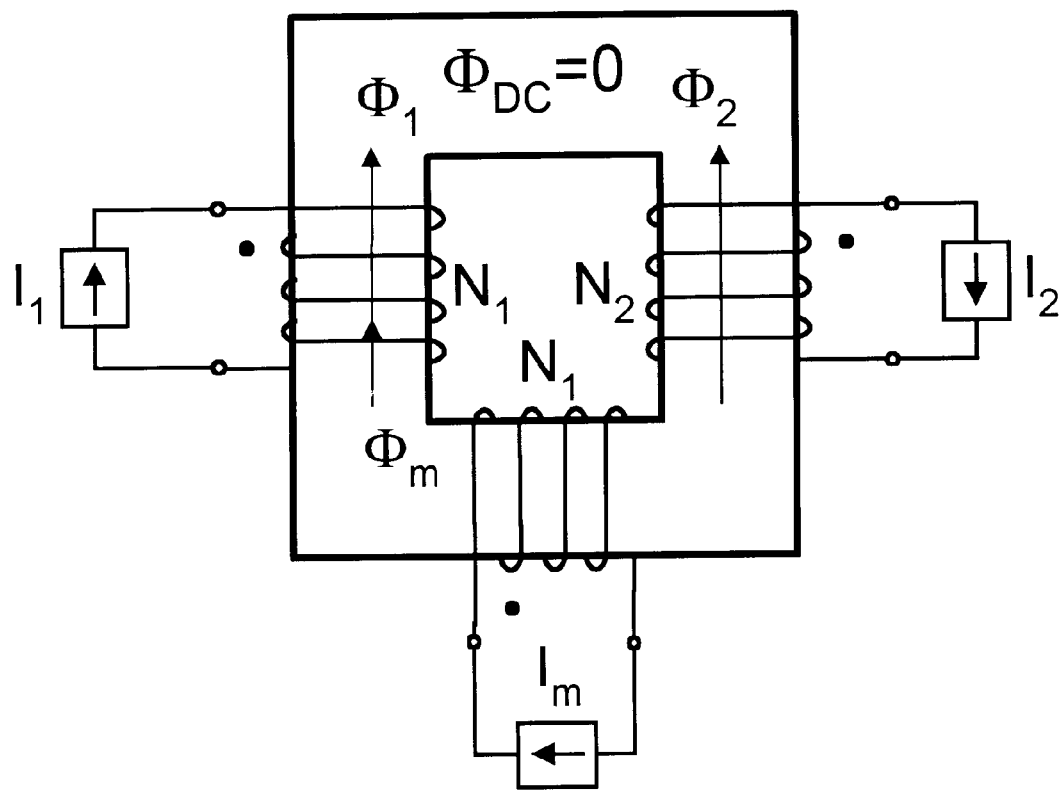
FIG. 37a illustrates a model of the Isolated DC Transformer of FIG. 36a with isolation transformer represented by its magnetizing inductance and DC-bias current $I_m$.
Figure 37B:
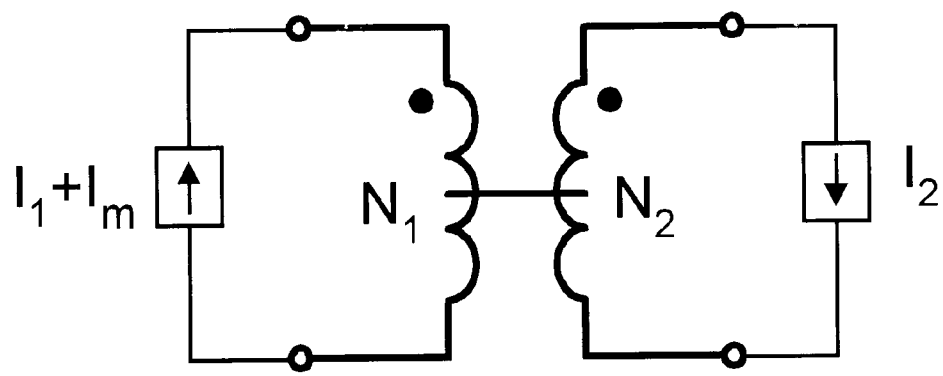

The Isolated DC Transformer as a new magnetics component has the same characteristics as the non-isolated counter-part of FIG. 26, with the exception that it brings added galvanic isolation and voltage scaling capability. Note that the isolation transformer is represented with its magnetizing inductance, which carries DC current $I_m$ flowing into dot marked terminal and has $N_1$ turns as shown in FIG. 37a. Thus, the Isolated DC Transformer could be represented by a new symbol illustrated in FIG. 37b in which the magnetizing current $I_m$ and input inductor current $I_1$ are combined in a single input DC current source $I_1+I_m$.

Just as we have converted the non-isolated converter of FIG. 35a into its counterpart in FIG. 35b, we can now replace the middle inductors of converters in FIGS. 27a–i with an isolation transformer in order to obtain their isolated counterparts. Note, however, that not all non-isolated converter variants will have their isolated counterparts. For example, FIG. 27d and FIG. 27i after such step would still not have the galvanic isolation, since the branch comprised of auxiliary capacitor C and the complementary input switch $S'_1$ is connected between one circuit node on the primary side and another circuit node on the secondary side. Thus, after exclusion of those converter configurations, still a large number of equivalents of the basic non-isolated converter of FIG. 14a and FIG. 14b is possible. Some of the isolated equivalents of the basic converter are shown in FIGS. 38a–h. Note that in the converters of FIG. 39g and FIG. 39h the branch with auxiliary capacitor C and complementary switch $S'_1$ is completely on the secondary side. Thus, the original benefit when this branch was on the primary side is lost: the energy stored in the transformer leakage inductance is not recovered but is lost resulting in reduced overall efficiency. Furthermore, this extra energy loss is exhibited as an un-damped or very lightly damped ringing of the drain-to-source voltage of the input MOSFET-like switch. This, in turn leads to high voltage spikes on this device and its higher voltage rating, as well as much increased radiated EMI noise.

Figure 38A:
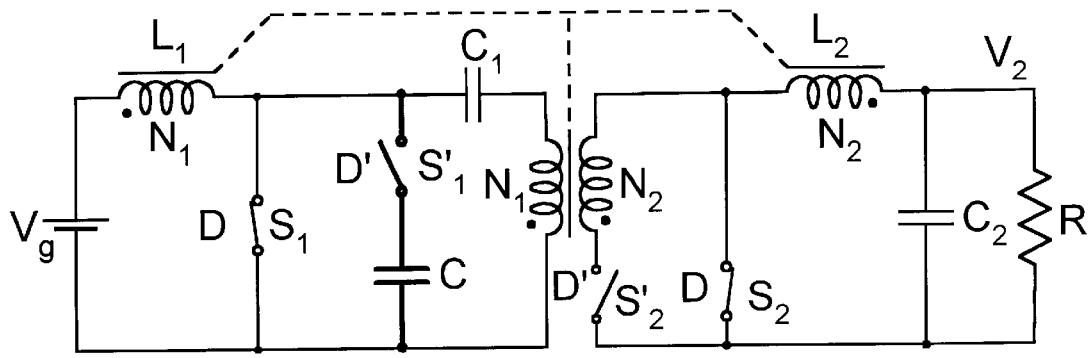
FIG. 38(a–h) illustrates various isolated converter equivalents obtained from the non-isolated converters in FIGS. 27a–l.
Figure 38B:
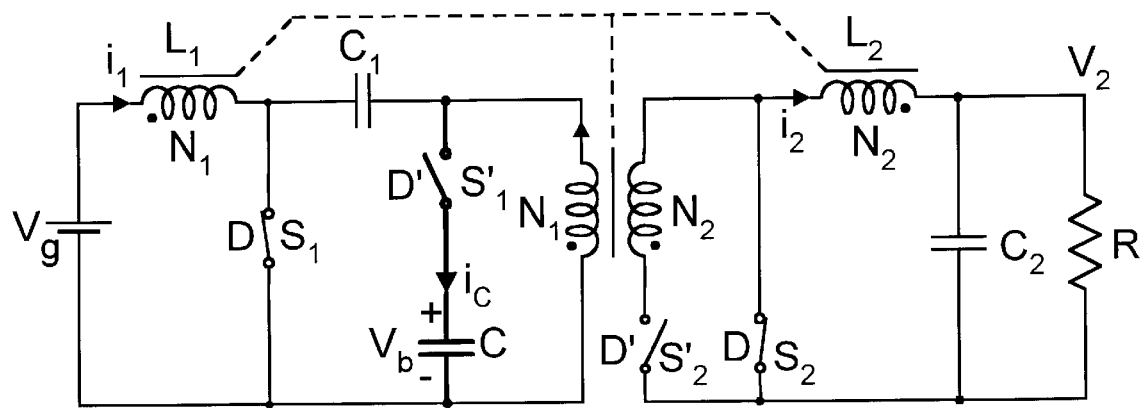
Figure 38C:
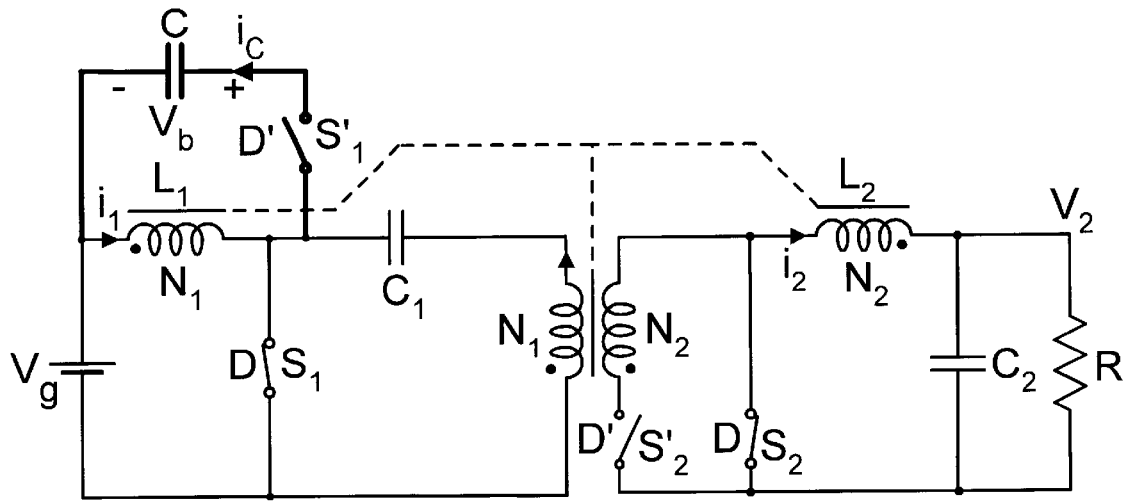
Figure 38D:
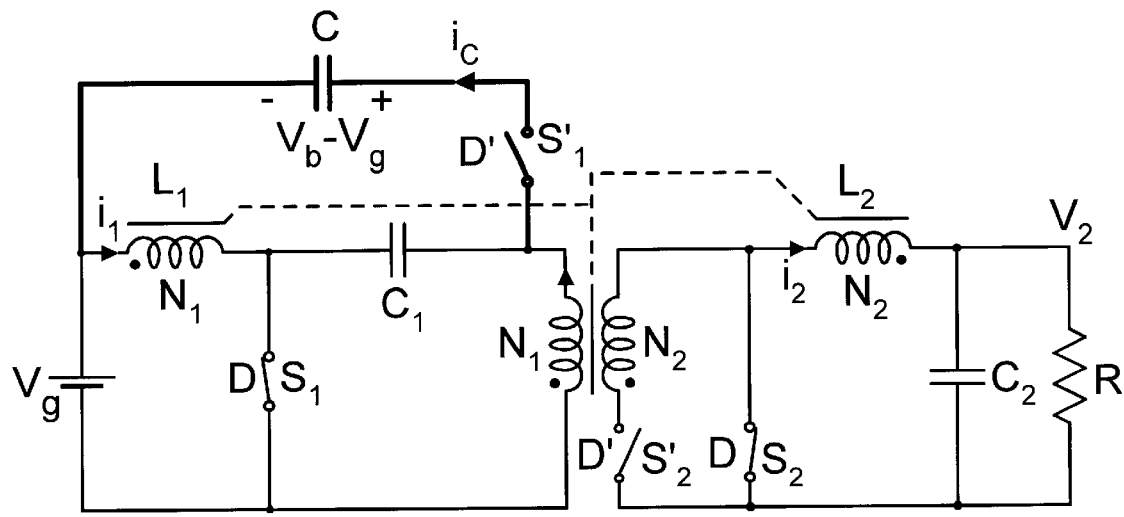
Figure 38E:
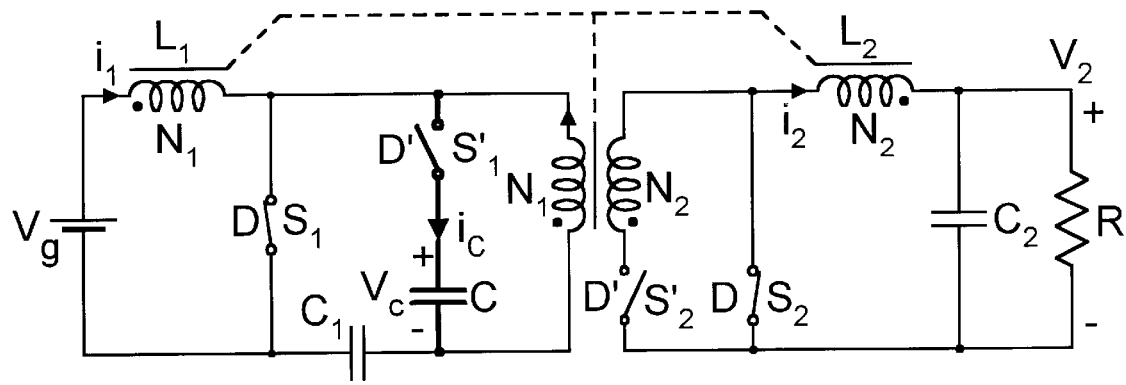
Figure 38F:
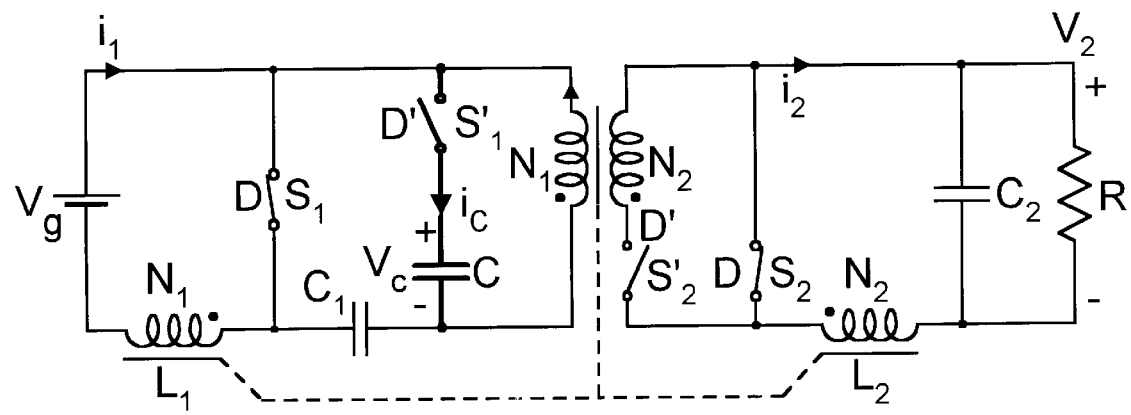
Figure 38G:
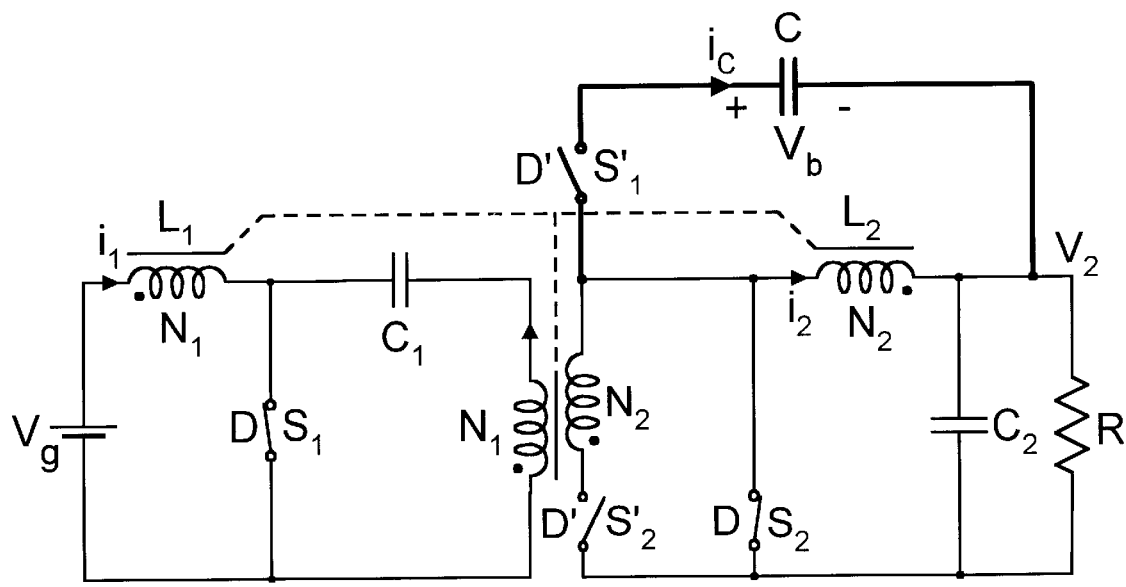
Figure 38H:
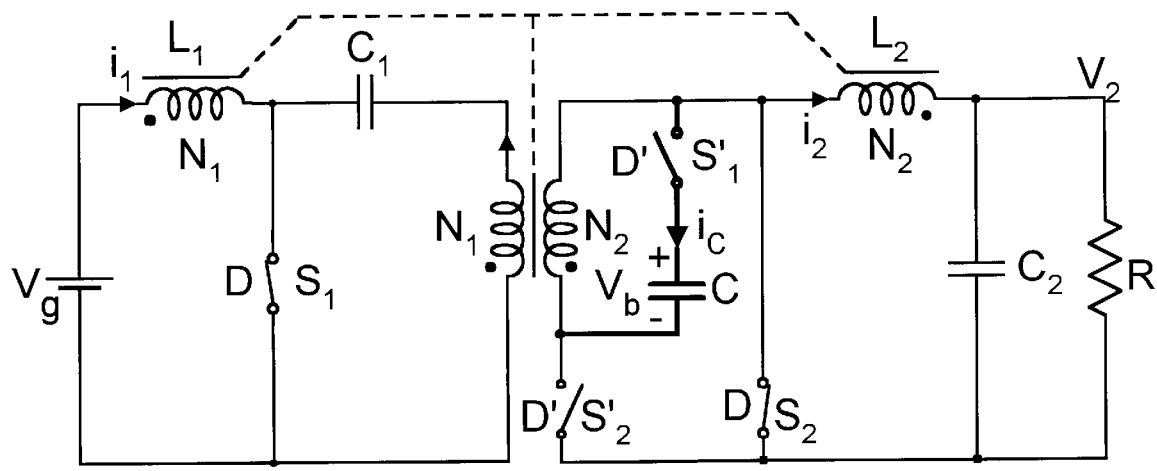
Figure 39A:
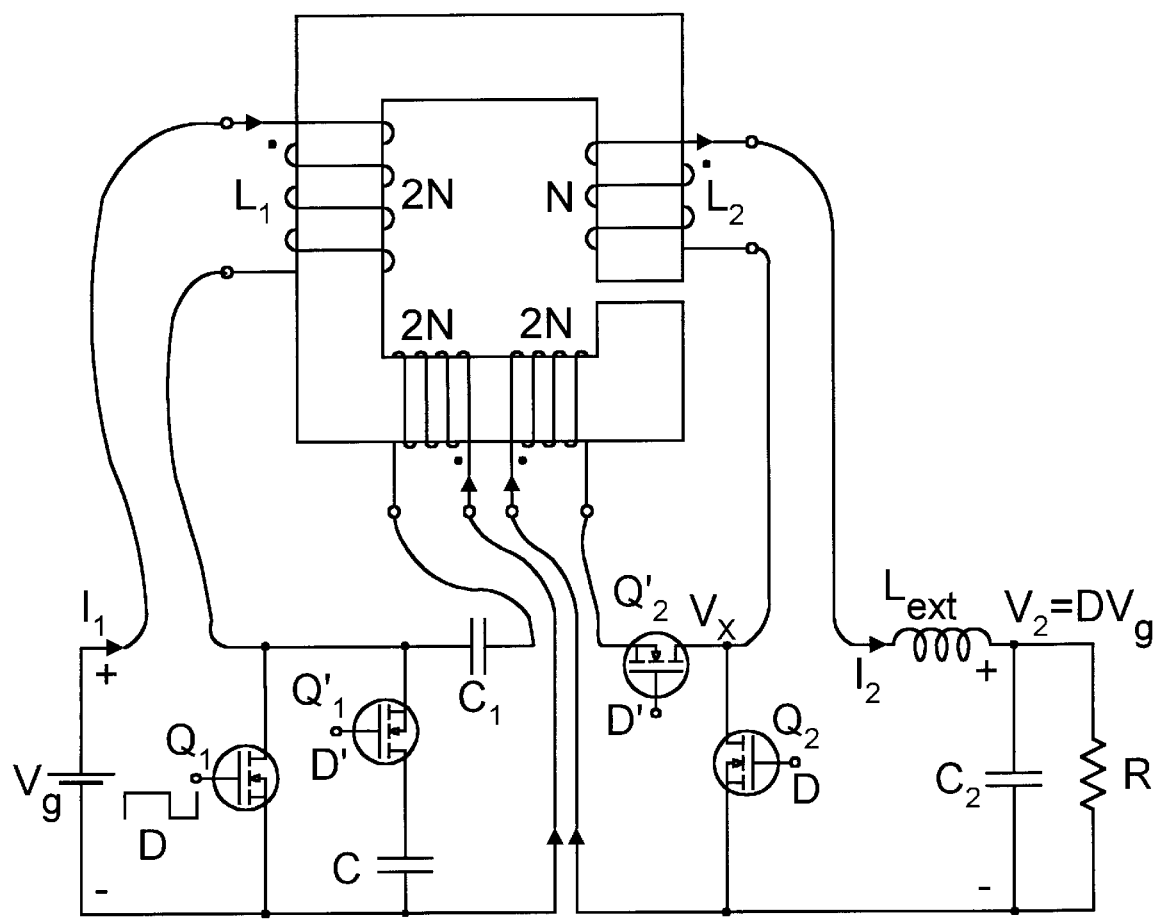
FIG. 39a illustrates the isolated version of the converter in FIG. 30.
Figure 40:
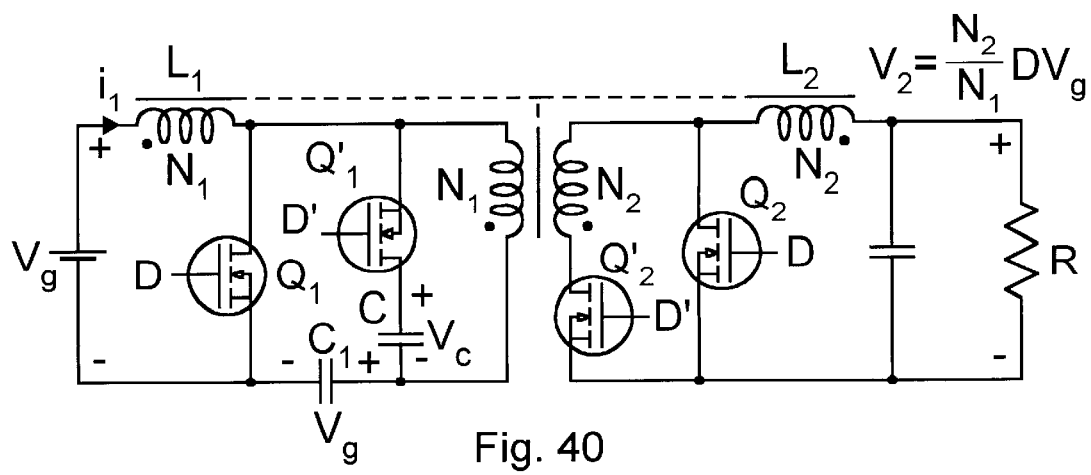

The absence of the common ground in the non-isolated configuration of FIG. 27f is resolved in its isolated counterpart of FIG. 38e in which the transformer primary is floating while source and load have separate grounds. This configuration has the added advantage that the primary side switches could be implemented with N-channel MOSFET devices in high-side configuration as shown in FIG. 40, while the auxiliary capacitor C has lower voltage rating $V_b$ as given by (10). The same advantage is retained in the isolated configuration of FIG. 38e, which is isolated version of its non-isolated counterpart in FIG. 27k. The isolated counterpart of converter in FIG. 27g is identical to the isolated converter in FIG. 38a except for the input capacitor $C_1$, which is now in the bottom leg. Clearly, both converters are obvious modifications of each other.

Just as the non-isolated case had literally hundreds variants obtained using equivalent transformations, so there is equally large number of isolated converters obtained by simply replacing the middle inductor with an isolation transformer. Only a very few of those, will turn out not to have isolation as explained for the converters of FIG. 27d and FIG. 27i.

Figure 39B:
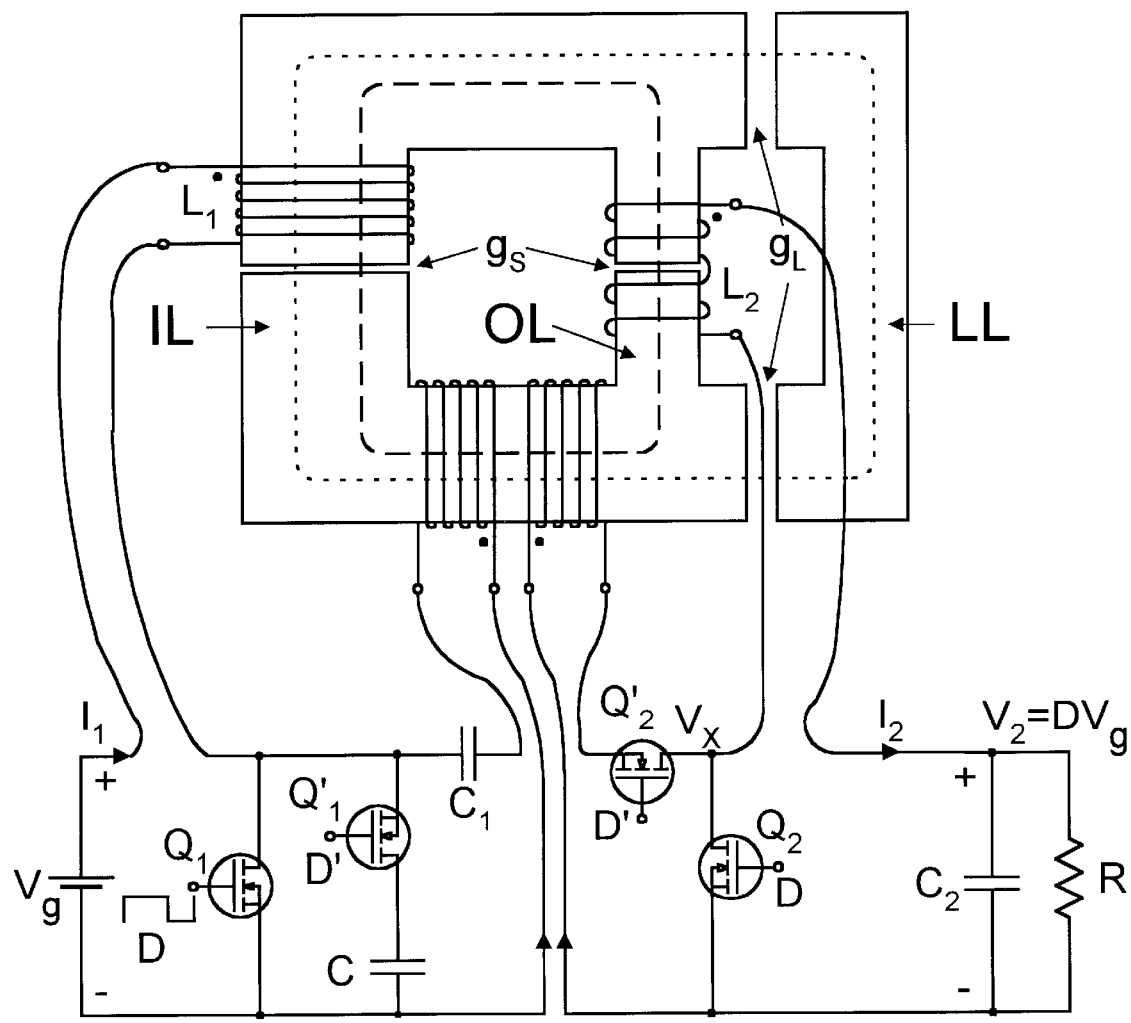
FIG. 39b illustrates the isolated version of the converter in FIG. 33.
Figure 39C:
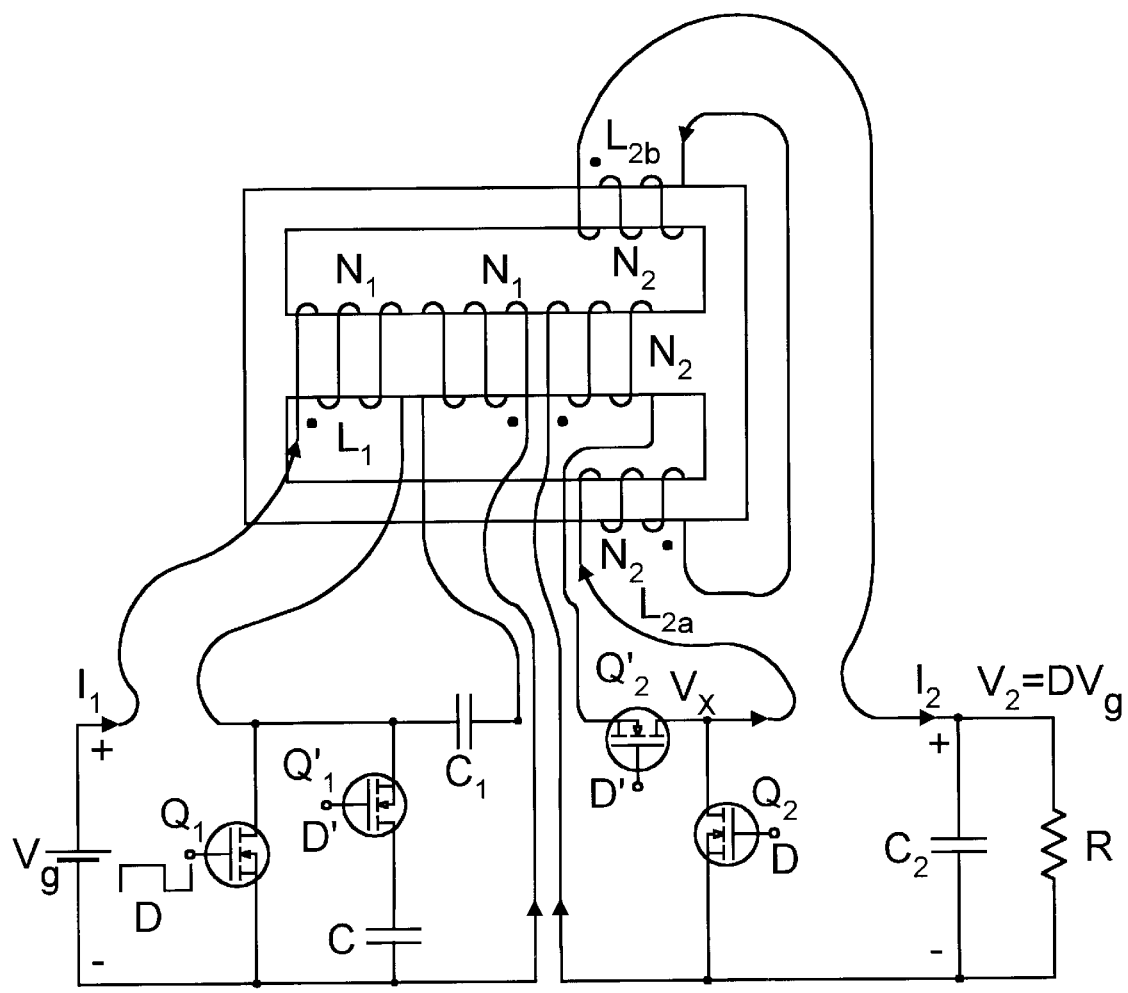
FIG. 39c illustrates the isolated version of the converter in FIG. 34.

The insertion of the isolation transformer did not change the fundamental properties of basic new non-isolated converter of FIG. 14b. Therefore, all magnetic realizations of the DC Transformer discussed at length relative to the non-isolated converter are equally applicable to the isolated counter-parts. For example, an external inductor can be added in series with output inductor as shown in FIG. 30, to result in the same benefits in the isolated counter-part of FIG. 39a. The isolated converter of FIG. 39b is implemented using the magnetic leakage leg in the same way as its non-isolated counter-part in FIG. 33. Finally, the EE-like core structure with no air-gap is implemented in isolated converter of FIG. 39c in the same way as in the non-isolated counter-part in FIG. 34.

From the above discussions it is obvious that the insertion of the isolation transformer did not change the fundamental operation or the key features and performance characteristics of the converter. However, those variants in which the branch with auxiliary capacitor is positioned between primary and secondary side, should be excluded. Nevertheless, there are several additional embodiments of the isolated extension of the present invention of FIG. 36a, which are either not available in the non-isolated configuration or have new interesting features.

Shown in FIG. 40 is an embodiment of the isolated converter in which all four switches of FIG. 38e are replaced with N-channel semiconductor MOSFET-like switching devices. The primary side switches are so connected that a high-side driver IC circuit can be used, which is a distinct practical advantage. Like wise, the secondary side MOSFET-like switching devices are both N-channel MOSFET's with a grounded emitter resulting in a practical direct drive for the secondary side MOSFET switching devices. Note also that the auxiliary capacitor C is at the same time in a position in which it has a low DC voltage rating.

Note: The voltage on capacitor C is even lower if the branch consisting of switch S'$_1$ and capacitor C is connected in parallel with the input inductor L$_1$. However, in this solution the input current will contain the current flowing in this branch plus the input inductor current and thus, will no longer be ripple free.

If the drive and control circuitry to modulate the duty ratio of the input switch is on the primary side, then the secondary side MOSFET switches present somewhat of a problem to drive: both corresponding drive signals must be transferred from the primary side to the secondary side and isolation in the drive control must be provided. Furthermore, once the drive signal is provided on the secondary side, drive power for the secondary side drive circuitry must also be provided, which results in a complex and costly solution. Thus, it is a distinct practical advantage if the secondary side switches can be "self-driven", that is that the existing switching converter circuitry can be used to provide the correct drives without any addition of control or power circuit components. One such "self-driven" configuration is provided with another embodiment of the present invention displayed in FIG. 41a. The secondary side of the transformer already provides aright drive waveform, provided the connection is made as in FIG. 41a: the gate of output MOSFET switch Q$_2$ is connected to the drain of the complementary output MOSFET switch Q'$_2$, while the gate of the complementary output MOSFET switch Q'$_2$ is connected to the drain of the output MOSFET switch Q$_2$. Thus, turning ON and OFF primary switching devices will automatically generate the correct drive waveform on the transformer secondary to drive the output MOSFET switching devices. Thus, the complex drive and control circuit is eliminated.

Figure 41A:
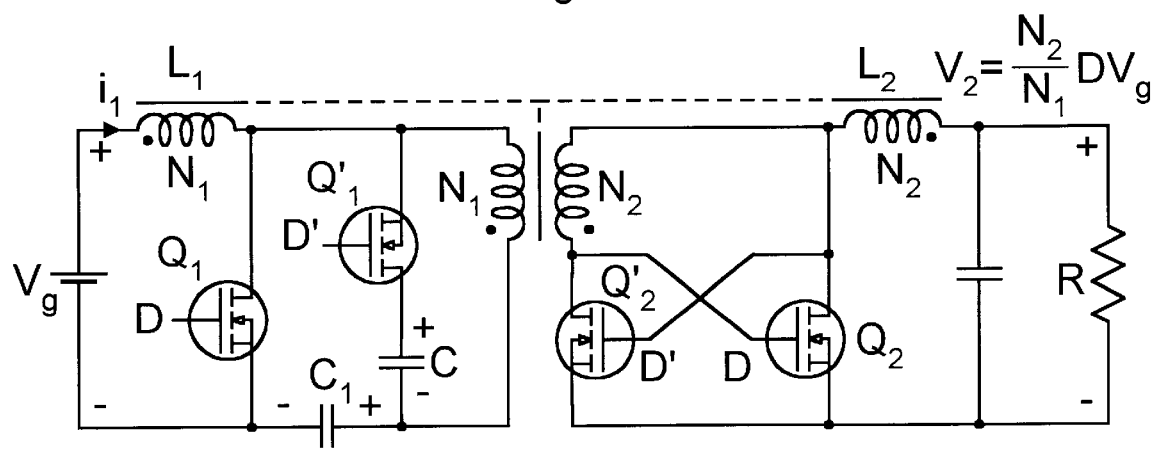
FIG. 41a illustrates a self-driven embodiment of the converter in FIG. 40.
Figure 41B:
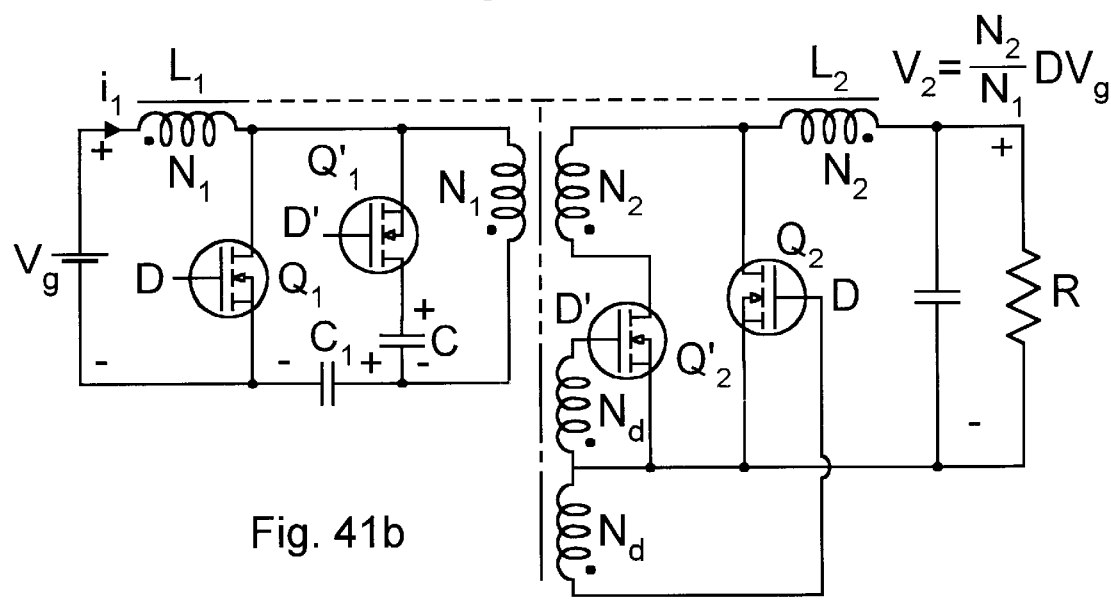
FIG. 41b illustrates a self-driven embodiment of the converter in FIG. 40 with additional drive windings Nd on the isolated DC transformer.

Another "self-driven" embodiment of the present invention is shown in FIG. 41b in which additional drive windings are wound on the same magnetic core of the Isolated DC Transformer. Each drive winding number of turns N$_d$ and polarity of the windings is selected so as to provide the optimum, out-of-phase drive for the two output MOSFET switches. Once again, the complex drive and control circuitry is eliminated and circuit is significantly simplified. It should be noted, that despite such circuit simplification, most of the soft-switching benefits discussed in the next section are still available in this simpler drive implementation.

Finally, in comparison with the "self-driven" configuration of FIG. 41a, the configuration of FIG. 41b is more flexible since the drive turns can be chosen to optimize the drive requirements.

Figure 42:
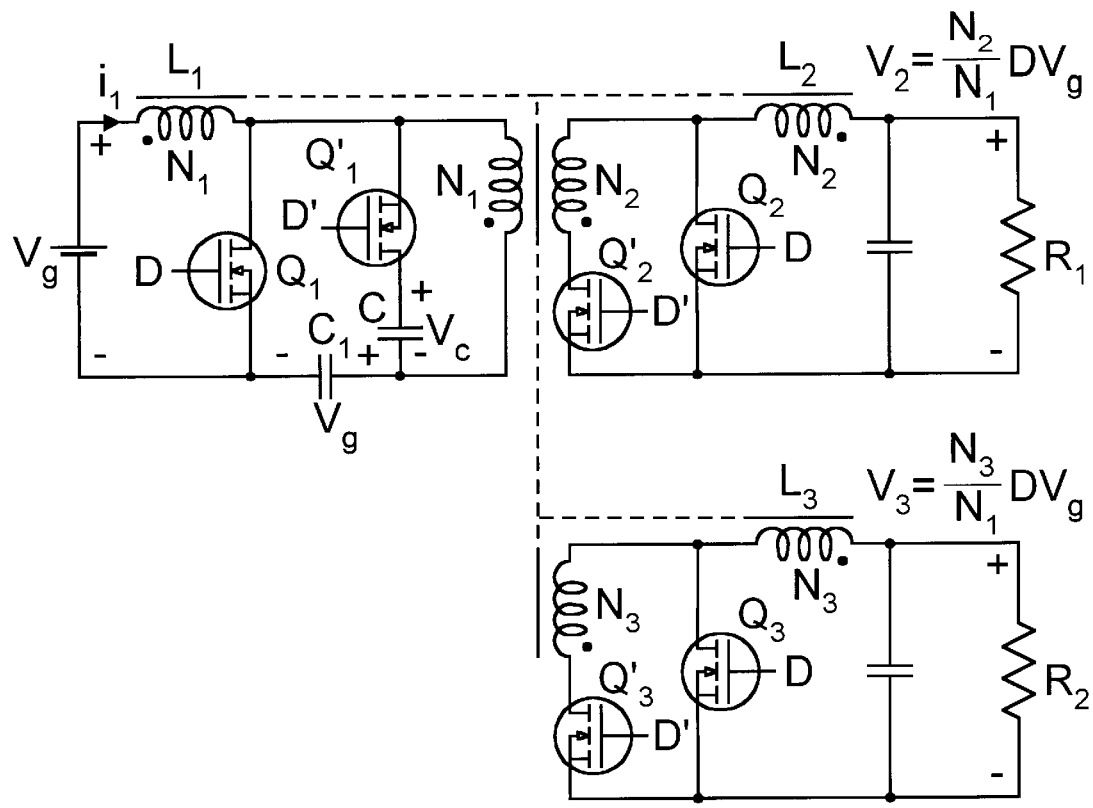
FIG. 42 illustrates a two-output embodiment of the converter in FIG. 40.

Once the isolation transformer is implemented, multiple outputs can be provided, and each separate output can be scaled by the corresponding transformer turns ratio, such as illustrated in FIG. 42. Note that, as long as the number of turns of the output inductor and the transformer secondary of the second output are the same, the net DC ampere-turns are again zero. Thus, once again, the magnetic core without any air-gap can be utilized for this multiple output converter of FIG. 42.

Figure 43:
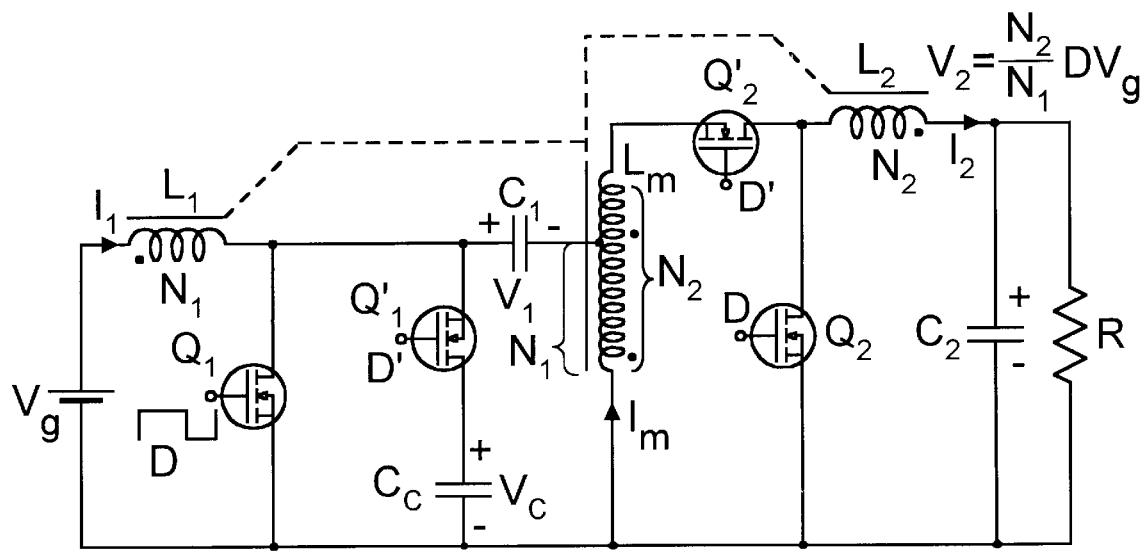
FIG. 43 illustrates another embodiment of the present invention using an autotransformer.

Finally, since each output is isolated, by choosing appropriately the output ground for the second output, a negative polarity output voltage can be obtained as well. In some application where isolation is not required and a positive output voltage polarity is needed from a positive input voltage source, it is beneficial to use another embodiment in which an autotransformer replaces isolation transformer, such as shown in FIG. 43. As in any autotransformer connection, primary and secondary windings share some common number of turns, such as N$_1$ in FIG. 43. This configuration is more efficient than the fully isolated version. As shown in FIG. 43, only one winding with number of turns N$_2$ needs to be provided for the autotransformer, since primary winding is just using a tap at N$_1$ turns. In configuration shown in FIG. 43, N$_2$>N$_1$ and turns ratio provides a voltage step-up. However, when N$_2$<N$_1$ (secondary winding uses a tap on the primary winding), an additional voltage step-down is obtained. In addition the AC copper losses are reduced, since the single autotransformer winding has also lower rms current. An additional voltage scaling of output DC voltage is obtained, just as in the isolation transformer case. Note that zero total DC ampere-turns are also preserved in the autotransformer extension of FIG. 43 under analogous condition to the isolating case: the output inductor must have the same number of turns N$_2$ as autotransformer secondary, while the input inductor must have the same number of turns N$_1$ as the primary of the autotransformer.

In the majority of applications, such as in operation from the rectified AC line, a rather large overall step-down is required, from 400V to 5V or lower voltage, for example. In this case, an additional step-down is provided through the isolation transformer step-down turns ratio. The isolating extension of FIG. 40 and autotransformer extension of FIG. 43 perform in that case also an important practical function of complete decoupling of the converter input side from the converter output side. This desirable performance is due to the output side rectification. The complete decoupling means that the input side will only "see" its low currents and no reflected DC currents from the output side, which in low voltage, high current application could represent major additional current stress on the input side devices. Likewise, the output voltages will not reflect to the input side to increase the voltage rating of the input side devices. Similarly, the voltages on the input side will not reflect to the output side and increase the voltage rating of the output side components. Neither will the input current reflect through the autotransformer turns ratio to increase the total current seen by the output devices. Thus, the input switching devices will operate at low input current, while output devices will operate at low output voltages, without any additional voltage and/or current overhead.

This also reveals which of the MOSFET switching devices in FIG. 40 are most critical for the reduction of the switching losses in case of a large input to output step-down conversion. Input side MOSFET switches are in that case high voltage devices, while output side MOSFET devices are low voltage devices.

When the MOSFET switches are OFF their parasitic drain-to-source capacitance is charged to the OFF state voltage storing energy which is given by $(CV^2)/2$ where V is the device blocking voltage and C is the device drain-to-source parasitic capacitance. Due to quadratic dependence on the blocking voltage, the high voltage devices on input side have considerably higher stored energy than low voltage output devices. Each time the respective MOSFET switch is turned ON the parasitic capacitor is shorted and its stored energy is dissipated as heat, unless other measures are taken to eliminate this loss. Clearly, the high voltage devices on the input side are by far the most critical in terms of this loss contribution. Thus, the next section describes several soft-switching embodiments of the present invention through which these switching losses of the input side, high voltage MOSFET-like switches are either eliminated or substantially reduced.

Reduction of Switching Losses

Fourth Fundamental Property

The DC components of the input and output inductors and their effect on the DC flux in the single magnetic core of the DC Transformer were discussed earlier in reference to FIG. 19c and FIG. 19d. The AC components of the two inductors in the converter of FIG. 18a are displayed in FIG. 44a and FIG. 44b. Note that for the given chosen direction of the two inductor currents and for the positive AC voltage polarity of the two windings chosen as per FIG. 18a, the following equations apply:

$$v_{L1}=L_1 di_1/dt \text{ and } v_{L2}=-L_2 di_2/dt \quad (24)$$

Figure 44A:
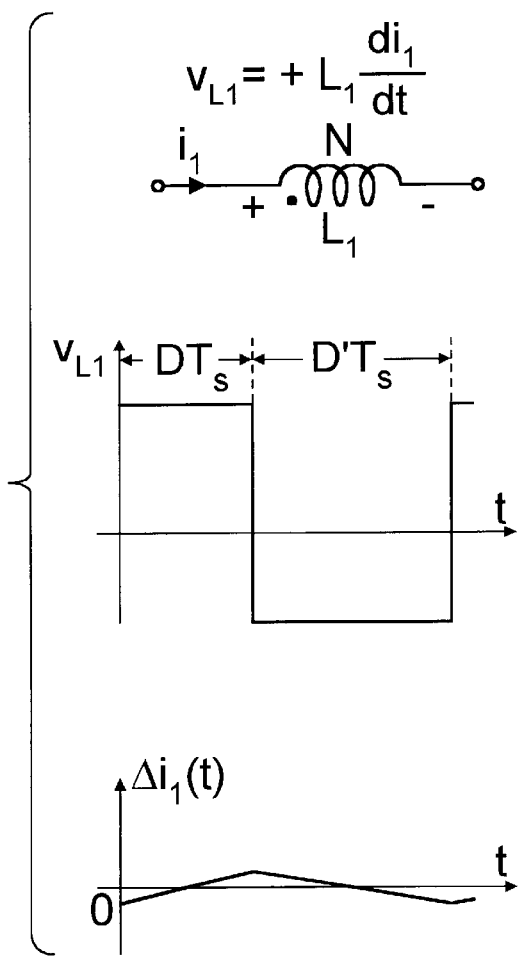
FIG. 44a is a graph of the AC voltage and ripple current waveforms for inductor $L_1$ described by $v_{L1}=L_1 di_1/dt$ and FIG. 44b is a graph of the AC voltage and ripple current waveforms for inductor $L_2$ described by $V_{L2}=-L_2 di_2/dt$.
Figure 44B:
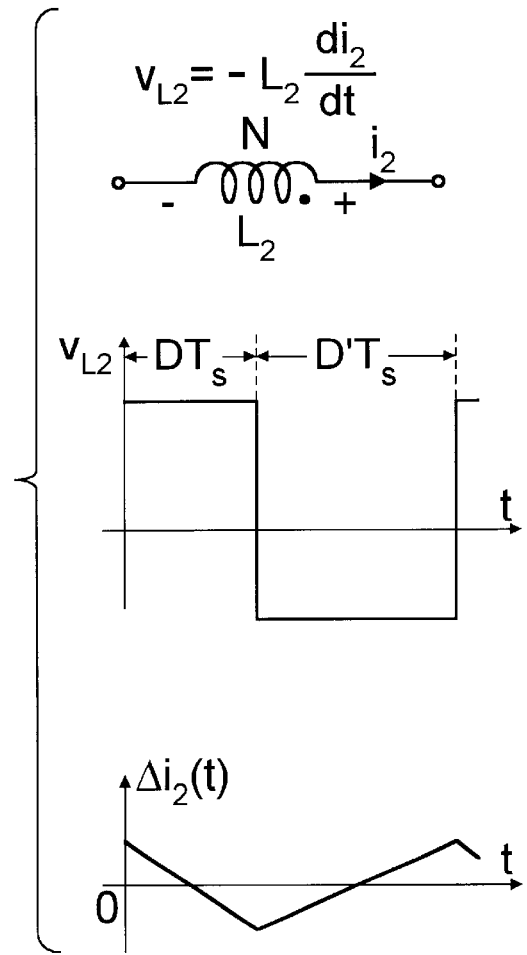

As the result of the difference in sign of these two circuit representations output inductor ripple current is of inverted polarity in comparison with input inductor ripple current as seen in FIG. 44a and FIG. 44b. The instantaneous inductor currents are then obtained by superposition of positive DC currents of FIG. 19c and FIG. 19d with the AC ripple currents of respective inductors of FIG. 44a and FIG. 44b.

Let us now fully explore the time domain interpretation of equations (5), (6), and (7). The sum of inductor currents $i_1(t)+i_m(t)$ is displayed in FIG. 45a, showing its DC current level $I_1+I_m$ and AC ripple current level. Note that since both $i_1(t)$ and $i_m(t)$ flow into the dot-marked winding ends (positive) in FIG. 18, their AC ripple components are adding together and resulting in the total $\Delta i_1(t)+\Delta i_m(t)$ peak-to-peak ripple current which has positive polarity. On the other hand, the output inductor $i_2(t)$ flows out of the dot-marked winding end, thus resulting in the superimposed AC ripple current of opposite polarity (that is out of phase) to that of input and middle inductors, hence as shown in FIG. 45b. The output inductor DC current level $I_2$ is of equal magnitude as $I_1+I_m$, thus after subtraction the net DC current shown in FIG. 45c is zero at all times, demonstrating the relationship (5). The subtraction of the ripple current $\Delta i_2(t)$ of FIG. 45b from the ripple current $\Delta i_1(t)+i_m(t)$ of FIG. 45a results in the time domain total ripple current waveform of FIG. 45d. Note that since the output inductor ripple current is out of phase relative to the input inductor and middle inductor ripple currents, and since we are looking at the difference $\Delta i_1(t)+\Delta i_m(t)-\Delta i_2(t)$, this will result in actual addition of the magnitudes of all three ripple currents as shown in FIG. 45d. The time domain current $i_C(t)$ in capacitor C coincides with the waveform of FIG. 45d during the complementary time interval $D'T_S$ and is obviously zero during the time interval $DT_S$ thus resulting in the time domain waveform of FIG. 45e. This capacitor current has no DC component thus verifying the original assumption.

In the above analysis, the three inductors are at first assumed to be separate inductors. Note, however, that the same final ripple current waveforms of FIG. 45d and FIG. 45e will be obtained when the three inductors are coupled into a single-loop magnetic core of a DC Transformer. This is so, because, irrespective to relative phase of ripple currents in the three inductor windings, their total sum given by $i_1+i_m-i_2$ must at any duty ratio D be equal to the ripple current of the magnetizing inductance of the non-isolated DC Transformer with three inductor windings and will be as shown in FIG. 45d. Thus, even under coupling constraint of DC Transformer, current $I_N$ in FIG. 45e will always be negative for any duty ratio D, thus enabling the soft switching operation in the same way as without coupling. Clearly, the same holds true for the Isolated DC Transformer as well.

Figure 13:
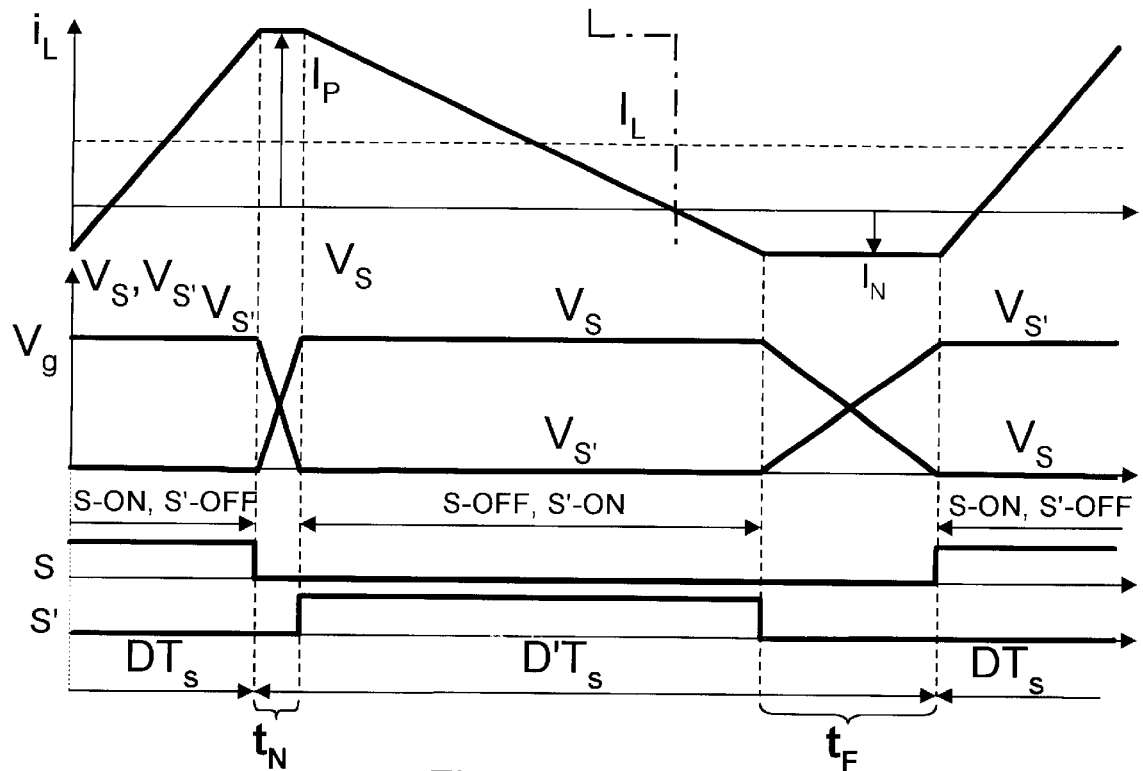
FIG. 13 is a timing diagram illustrating the need for high a ripple current with a required negative value to accomplish the soft switching in the buck converter of FIG. 12a–c.

From the above detailed analysis, it follows that regardless of the magnitudes of the ripple currents in the three inductors, the capacitor time domain current will always be of the same shape as shown in FIG. 45e: positive peak value $I_P$ at the transition from $DT_S$ to $D'T_S$ time interval and equal in magnitude but negative peak $I_N$ during the transition from $D'T_S$ to $DT_S$, where $I_P=|I_N|=\Delta i_C/2$. Note how this already provides automatically the negative peak current $I_N$ for the difficult to implement forced transition (D' to D transition) for soft switching. Common soft switching techniques, until present invention, had to somehow forcefully generate the negative instantaneous output inductor current by, for example, an inordinate increase of the output inductor ripple current as described and shown in FIG. 13.

We will now describe two types of soft switching, which are also made possible by the unique and special relationship of the present invention as disclosed in equation (4) and the waveforms of FIG. 45a, FIG. 45b, and FIG. 45e. Note in particular the negative part of auxiliary capacitor current during second half of complementary interval $D'T_S$. This will enable the usually difficult forced switching transition to be carried out effortlessly.

Figure 46A:
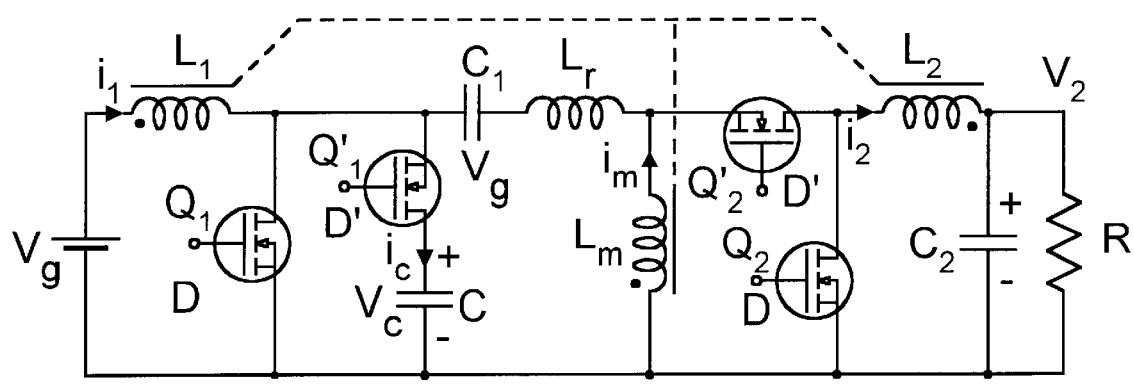
FIG. 46a illustrates an all MOSFET implementation with an added resonant inductor $L_r$ used to assist the soft-switching with reference to FIG. 46b in which each MOSFET transistor is replaced by a composite switch consisting of the parallel connection of an ideal switch, a parasitic body diode and a parasitic capacitance.

Two major soft switching alternatives are introduced. The first one is based on using only the appropriate gate drive timing of the four switches and does not depend on the addition of any external components, such as resonant inductors so that the circuit in FIG. 46a with $L_r=0$ is used. With this version a "partial" soft switching is accomplished, which is adequate for many practical applications. The second alternative accomplishes full soft switching with the assistance of a small additional resonant inductance $L_r$ (FIG. 46a). For both soft switching alternatives the starting point will be the converter circuit of FIG. 46b in which each MOSFET switch is represented by a composite switch consisting of the parallel connection of an ideal switch, a parasitic diode, and a parasitic drain-to-source capacitor.

Figure 46B:
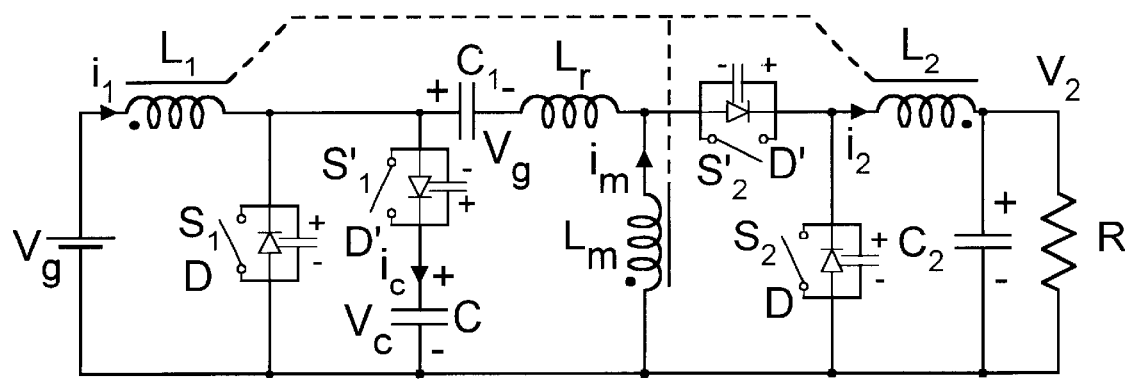

In so-called "hard switching" the energy stored in the parasitic capacitance of each switch when the switch is OFF (hence parasitic capacitor charged to the blocking voltage of switching device) is dissipated each time the respective switch is subsequently turned ON thus resulting in switching losses directly proportional to operating switching frequency. Moreover, the energy stored in the parasitic capacitor is proportional to the square of the blocking voltage or, $(C_P V_{OFF}^2)/2$. That is the reason why the switching losses are more pronounced in the high voltage device, and less so in the low voltage devices. With reference to FIG. 46a and FIG. 46b and previous discussion, the switching losses of $S_1$ and $S'_1$ switches in FIG. 46b will be critical and most important to be reduced utilizing soft-switching, while switching losses of the output switch $S_2$ and the complementary output switch $S'_2$ will be significantly lower and as such much less critical. Thus, the overall and first objective of the soft switching will be to recycle the energy stored in parasitic capacitances of $S_1$ and $S'_1$ switches in a non-dissipative way, that is in a "soft-switching" way, in which each of the two input switches will be turned ON only after their respective voltages have gradually reduced to zero first. An added bonus is if in the process any of the switches on the output side, such as either $S_2$ or $S'_2$ in FIG. 46b also becomes turned ON at zero voltage in a soft-switched way.

We will also clearly distinguish two transitions during which both input switch $S_1$ and complementary input switch $S'_1$ will be OFF and the transfer of the charge stored on one parasitic capacitor to another and vice versa will take place. The first transition termed subsequently D to D' transition, takes place at the end of time interval $DT_S$ and starts when the input switch $S_1$ is turned OFF. This transition, as explained earlier on the example of the prior-art buck converter soft switching, is usually easy to implement and for that reason is termed "natural" transition. The second transition termed subsequently D' to D transition, takes place at the end of time interval $D'T_S$ and is initiated by the turn OFF of the complementary input switch $S'_1$. This transition is sometimes referred to as "forced" transition, since as in the prior art buck converter example, a large ripple current was needed to force the instantaneous current of the output inductor to become negative at least for a short time leading up to this transition, so that the soft switching process could be completed. However, the circuit diagrams applicable during transition intervals are depicting the MOSFET switches which are ON in bold face, and those which are OFF in light drawing. In order to easier follow the circuit operation in various intervals, the MOSFET switches which are OFF during $DT_S$ or $D'T_S$ are omitted from circuit diagrams.

Figure 48A:
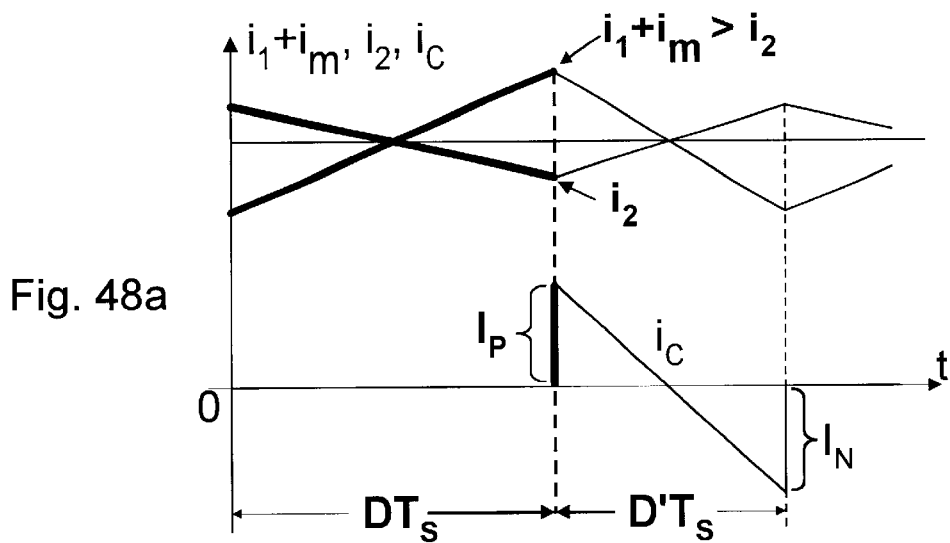
FIG. 48a is a graph of the inductor currents relation applicable at $DT_S$ to D'$T_S$ transition in the circuit of FIG. 46a and FIG. 48b is a graph of characteristic waveforms of switch states and voltages for the $DT_S$ to D'$T_S$ transition interval.

In the present invention, the negative current at the end of the $D'T_S$ time interval already exists as proved earlier in FIG. 45e and also shown in FIG. 48a. Thus neither the large output inductor ripple current is needed, nor even the addition of any resonant element, such as resonant inductor as in many classical soft switching schemes. In fact, as shown below, the unique switching configuration of the present invention, along with the recognition of the key relationship (4) and its consequence in the time domain waveforms of FIG. 48a (and FIG. 45e), makes for a unique possibility of practical soft switching with much reduced switching losses just by use of the proper drive timing of the four switches in FIG. 46a. This method of soft switching is termed here conditionally "partial" soft switching, although in many practical cases it is almost as good as so called "full" soft switching discussed below as well. Due to the lack of a proper or established designation for this type of novel soft-switching without resonant inductance, the name partial soft switching is adopted purely to clearly delineate it from the other soft-switching operation termed here full soft-switching.

Partial Soft Switching

First we will look at the D to D' transition of the circuit in FIG. 46b, with $L_r=0$.

The D to D' Transition

From the steady-state analysis and the waveforms in FIG. 48a it follows that at the end of the time interval $DT_S$, the instantaneous current $i_1+i_m$ is larger than $i_2$ (effectively their difference is equal to $I_P$ as in FIG. 48a). The transition from D to D' interval can be represented by the four equivalent circuits shown in FIGS. 47a, b, c, and d, and their corresponding time intervals $t_a$, $t_b$, $t_c$, $t_d$ shown in FIG. 48b.

Interval $t_a$

Figure 47A:
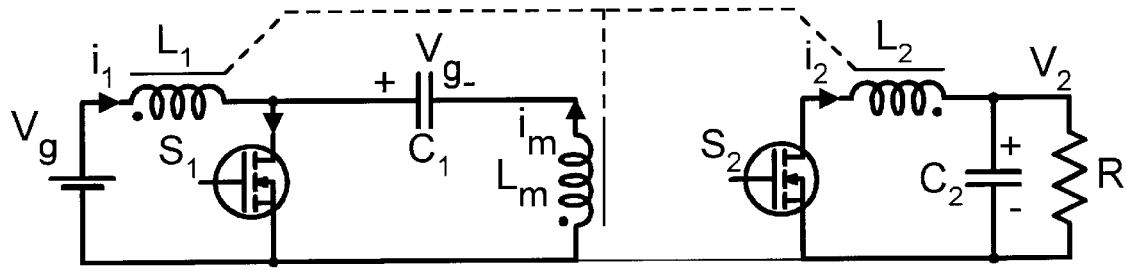
FIGS. 47(a–d) illustrate four converter circuit analysis models relevant to the $DT_S$ to D'$T_S$ transition in the case of resonant inductance $L_r$=0.
Figure 47B:
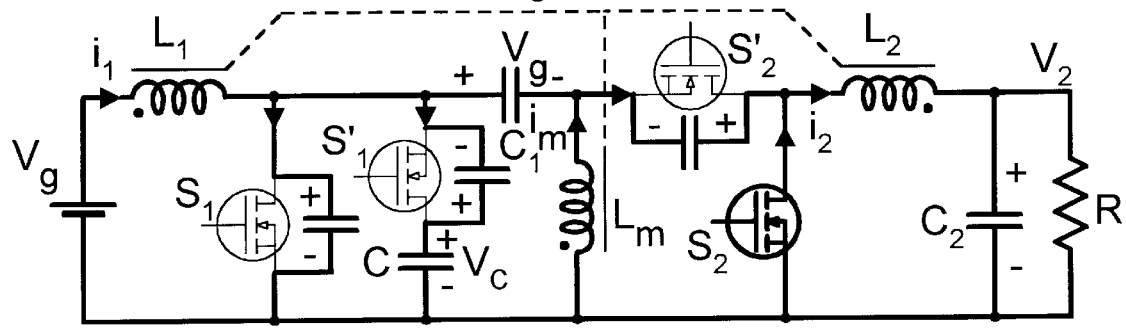
Figure 48B:
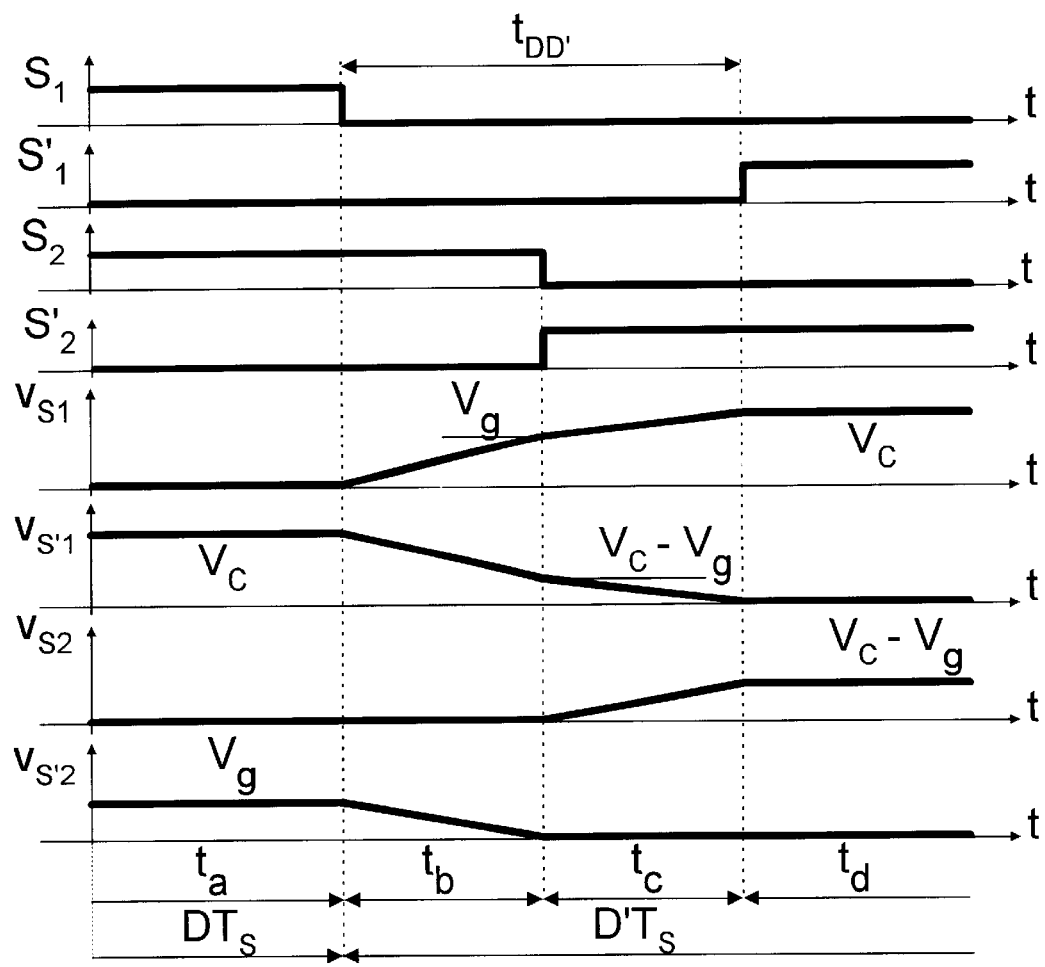

FIG. 47a and $t_a$ interval in FIG. 48b corresponds to the $DT_S$ time interval before the first transition starts. $S_1$ and $S_2$ switches are both ON and $S'_1$ and $S'_2$ are OFF. This interval ends and the first, so-called "natural" transition is initiated when $S_1$ is turned OFF, which results in the circuit of FIG. 47b.

Interval $t_b$

During the interval $t_b$ (first part of total transition interval $t_b+t_c$ as represented by FIG. 48b), the current $i_1+i_m$ is charging the parasitic capacitor of $S_1$ (which initially was fully discharged as switch $S_1$ was ON moments before) and discharging parasitic capacitor across $S'_1$ and $S'_2$ switches. Since this current contains DC component $I_1+I_m$, this results in relatively fast charge and discharge of these parasitic capacitors, hence in fast voltage rise on switch $S_1$. Given the above, these three capacitors are AC-wise connected in parallel. This interval is concluded when the voltage across switch $S'_2$, $V_{S'2}$ drops down to zero and the body diode of $S'_2$ starts to conduct. Hence, switch $S'_2$ is naturally turned ON at zero voltage (soft-switched) by its own parasitic diode. Since the diode conduction at low voltage is rather inefficient due to high voltage drop across the diode, this is also the ideal time to turn ON switch $S'_2$ (or equivalently to turn ON the original $Q'_2$ MOSFET). Due to low ON resistance of the MOSFET and corresponding low voltage drop across it, the current through the diode is by-passed through the MOSFET device thus minimizing the conduction losses of the output rectification. As $S'_2$ is turned ON, switch $S_2$ is simultaneously turned OFF, which results in the circuit model of FIG. 47c valid for interval $t_c$ in FIG. 48b. Note that if the turning OFF of switch $S_2$ was delayed, an intermediate level would follow with all the voltages clamped at the present value, $V_g$ and $V_C-V_g$ for switches $S_1$ and $S'_1$ respectively. Clearly this interval is unproductive and unnecessary since it only delays the completion of the first transition interval and should therefore be avoided by proper drive timing as in FIG. 48b.

Interval $t_c$

Figure 47C:
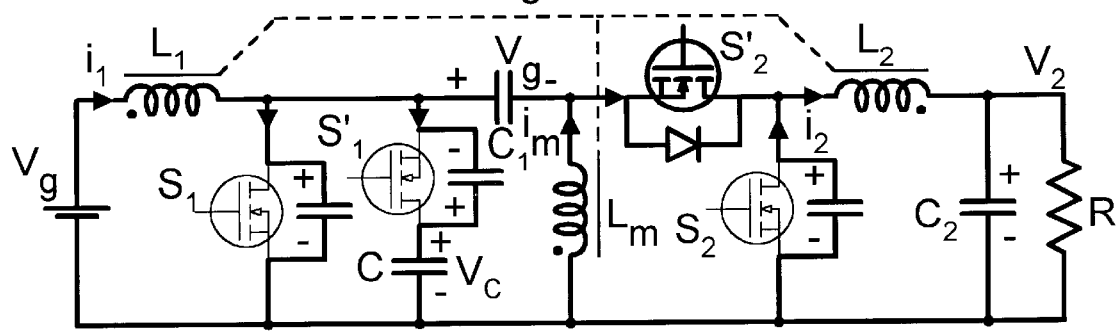

The interval $t_c$ in FIG. 48b (second part of the transition interval #1) is then characterized by the equivalent circuit of FIG. 47c during which three switches $S_1$, $S'_1$ and $S_2$ are OFF and only switch $S'_2$ is ON, by-passing its own body diode (shown also in FIG. 47c in bold to signify the fact that it started conduction first and triggered the turn-ON of $S'_2$, whose conduction resulted in this state). Note that now due to the fundamental relation (4), where $I_1+I_m=I_2$, the current $i_1+i_m-i_2$ now consists only of their respective AC ripple components $\Delta i_1+\Delta i_m-\Delta i_2$ resulting in reduced slopes of voltage rise on switch $S_1$ compared to previous interval $t_b$. This total AC ripple current starts to charge the capacitance across $S_2$ while at the same time it continues to charge the capacitance across $S_1$ and discharge the capacitance across $S'_1$, albeit at a much slower rate than in the previous $t_b$ interval. The end of this interval has arrived when voltage on switch $S'_1$ reaches zero and the body diode of that switch starts to conduct as shown in FIG. 48d which shows the converter circuit at the beginning of interval $t_d$. This has the effect of clamping the voltage on switch $S_1$ at the $V_C$ level. At this point switch $S'_1$ can be turned ON at zero voltage hence with zero switching loss and also bypass the internal body diode to reduce the conduction losses.

Interval $t_d$

Figure 47D:
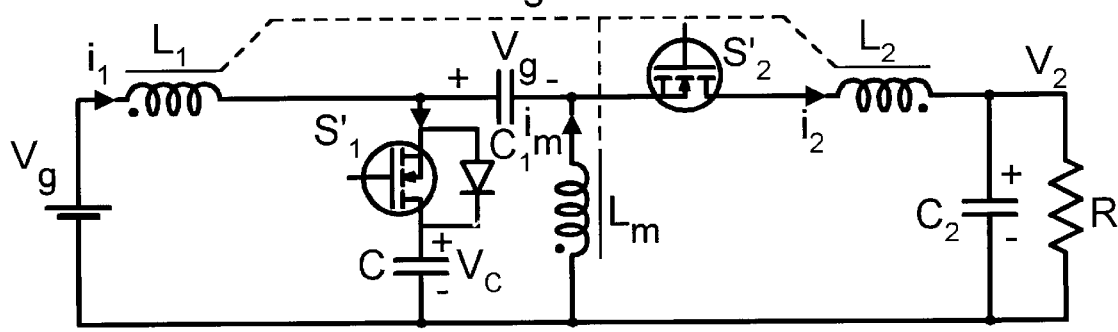

The circuit in FIG. 47d signifies that the D to D' transition has been completed and that now the switches $S'_1$ and $S'_2$ are simultaneously ON, as compared to the beginning state in FIG. 47a during which the switches $S_1$ and $S_2$ were simultaneously ON. In summary, during this first transition, all switches are turned ON at zero voltage and full soft-switching of the D to D' transition is achieved, hence without switching losses.

The D' to D Transition

Figure 49A:
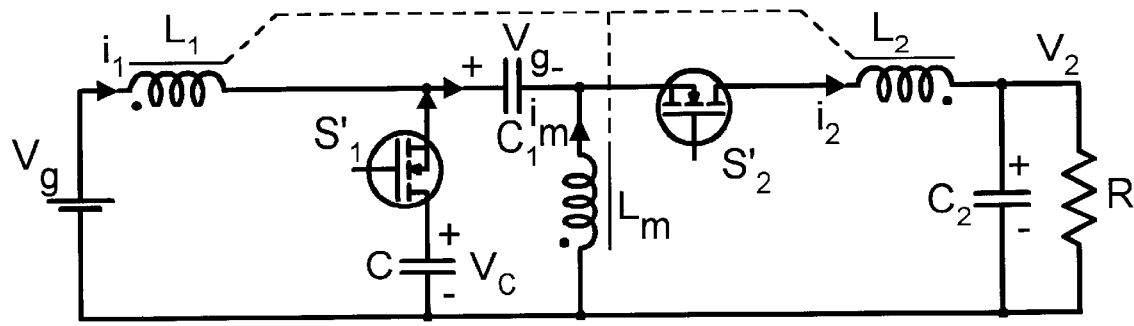
FIGS. 49(a–d) illustrate four converter circuit analysis models relevant to the D'$T_S$ to $DT_S$ transition in the case of resonant inductance $L_r$=0.
Figure 50A:
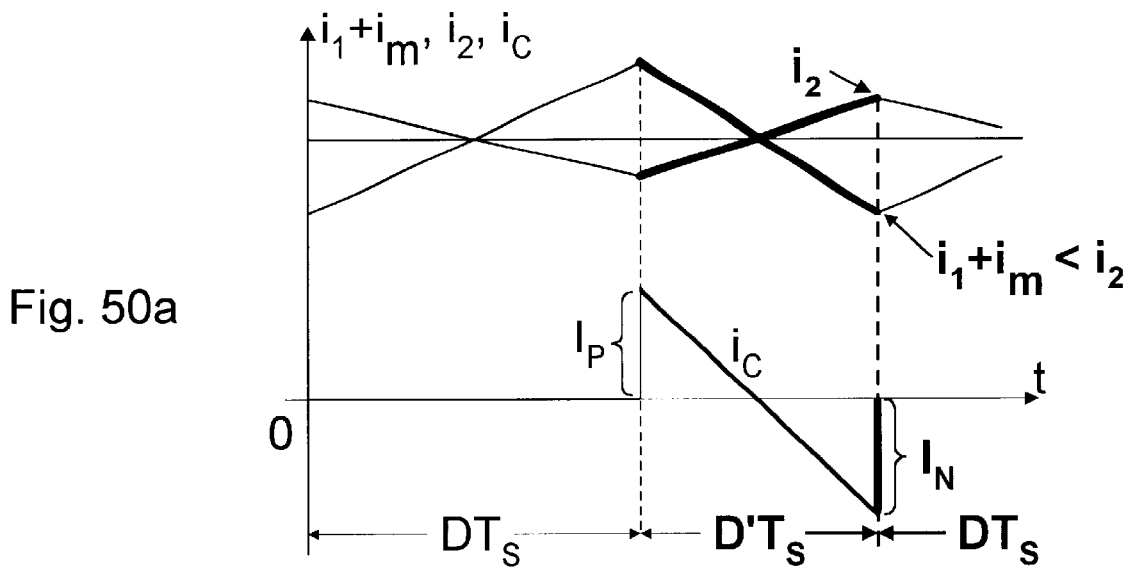
FIG. 50a is a graph of the inductor currents relation applicable for D'T$_S$ to DT$_S$ transition in the circuit of FIG. 46a and FIG. 50b is a graph of characteristic waveforms for the D'T$_S$ to DT$_S$ transition.

For this transition at the end of $D'T_S$ interval current $i_1+i_m$ is less than current $i_2$, as seen from the waveforms in FIG. 50a. The D' to D transition is thus represented by circuits in FIGS. 49a, b, c, d, and their respective intervals $t_a$, $t_b$, $t_c$, $t_d$ shown in FIG. 50b.

Interval $t_a$

Figure 49B:
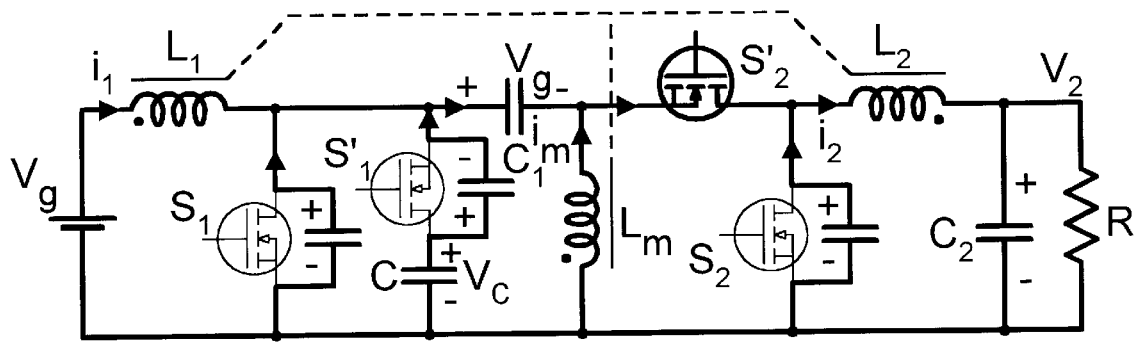
Figure 50B:
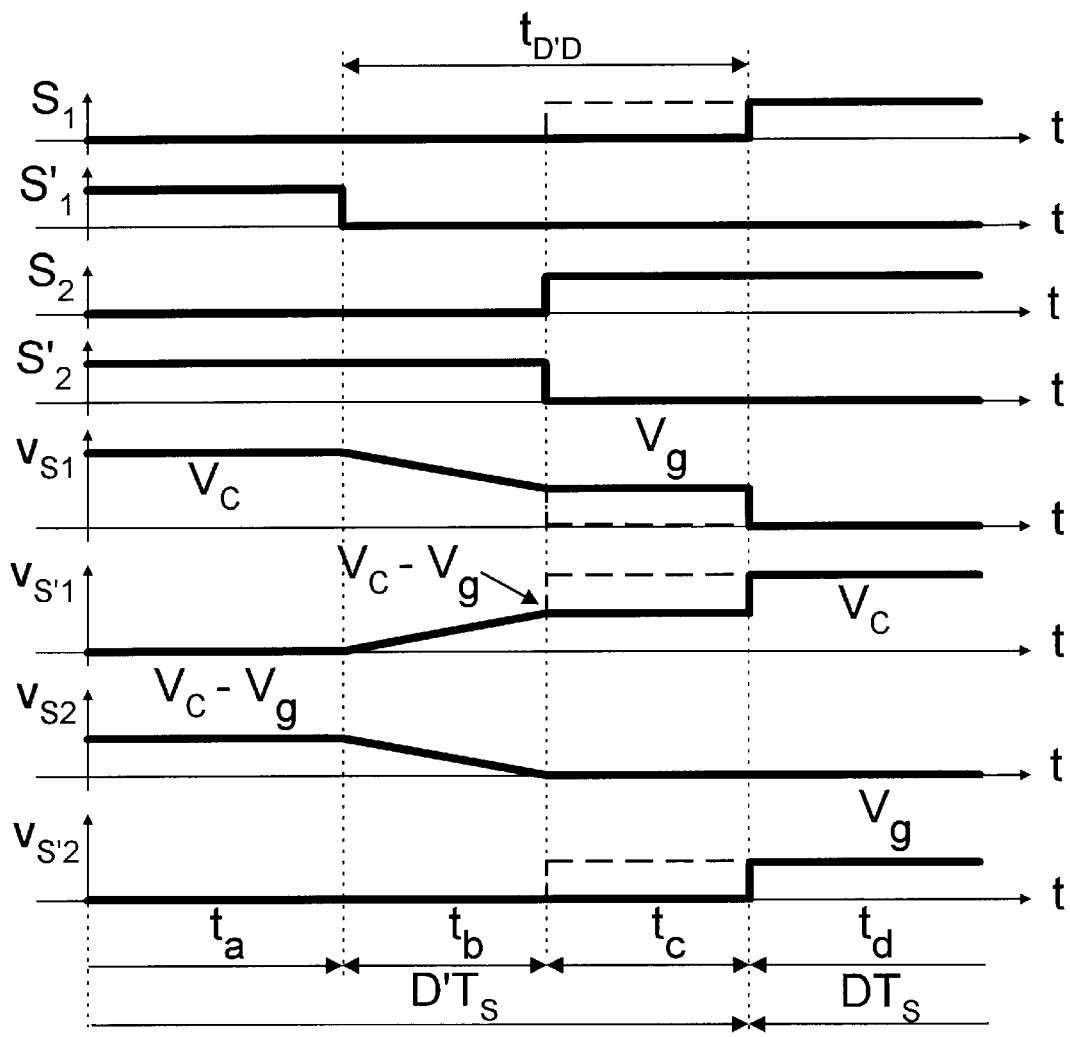

FIG. 50a and $t_a$ interval in FIG. 50b corresponds to the $D'T_S$ time interval just before the D' to D transition starts. The switches $S'_1$ and $S'_2$ are both ON and $S_1$ and $S_2$ are OFF. This interval ends and the second transition, usually called "forced" transition is initiated when switch $S'_1$ is turned OFF, which results in the circuit of FIG. 49b representing the first part $t_b$ of the forced transition.

Interval $t_b$

During this interval $t_b$ (the first part of the total transition interval $t_b+t_c$) as represented by the circuit in FIG. 49b, the current $i_2-i_1-i_m$ is charging the parasitic capacitor across $S'_1$ and is discharging the parasitic capacitors across $S_1$ and $S_2$. Since the total DC component of this current is zero, only the total AC ripple component is left. Thus this results in a relatively slow charge and discharge of these parasitic capacitors, hence in a slow voltage rise on switch $S'_1$. Given the above assumptions, these three capacitors are AC-wise connected in parallel. This interval is concluded when the voltage across switch $S_2$, $V_{S2}$ drops down to zero and the body diode of $S_2$ starts to conduct. Hence, switch $S_2$ is naturally turned ON at zero voltage (soft-switched) by its own parasitic body diode. Since the diode conduction at low voltage is rather inefficient due to the high voltage drop across the diode, this is also the ideal time to turn ON switch $S_2$ (or equivalently to turn ON the original $Q_2$ MOSFET). Due to the low ON-resistance of the MOSFET and the corresponding low voltage drop across it, the current through the diode is by-passed through the MOSFET device thus minimizing the conduction losses of the output rectification.

Interval $t_c$

Figure 49C:
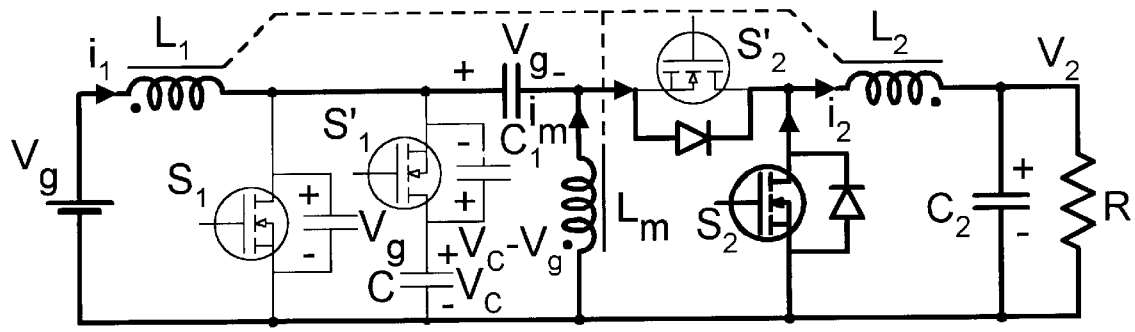

As switch $S_2$ is turned ON, switch $S'_2$ is simultaneously turned OFF, which results in the circuit model of FIG. 49c valid for interval $t_c$ in FIG. 50c. Note that now if the turning ON of $S_1$ switch was delayed as shown by heavy lines in FIG. 50b, all voltages would be clamped at the present value, that is $V_g$ across switch $S_1$ and $V_C-V_g$ across switch $S'_1$, while switch $S'_2$ will stay at zero voltage level. The remaining part of the transition interval cannot be completed in a soft switching manner. Thus, switch $S_1$ must be turned ON "hard" at reduced voltage and its parasitic capacitor discharged abruptly. This third interval $t_c$ should ideally be eliminated, since it only delays the completion of the transition interval without having any useful function. The dotted lines in FIG. 50b illustrate the case when the switch $S_1$ is turned ON exactly at the end of $t_b$ interval and thus interval $t_c$ is completely eliminated.

Interval $t_d$

Figure 49D:
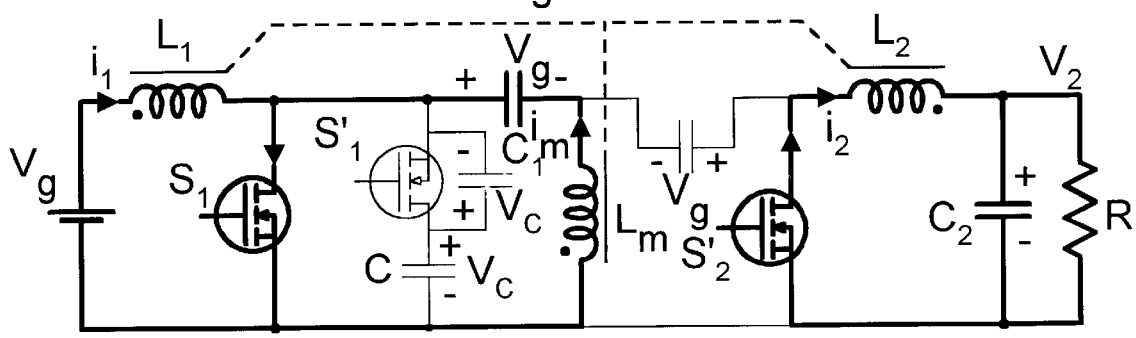

The losses associated with the hard turn ON of switch $S_1$ are mainly composed of the reverse recovery losses in the parasitic body diode of switch $S'_2$ and the $(CV^2)/2$ losses in the parasitic capacitors across switches $S_1$, $S'_1$ and $S'_2$ whose effective voltage is $V_g$. FIG. 49d hence shows the final stage after completion of D' to D transition in which switches $S_1$ and $S_2$ are turned ON. FIG. 49d also shows the final voltage of the parasitic capacitor of switch $S'_1$ to be $V_C$ and the final voltage of parasitic capacitor of switch $S'_2$ to be $V_g$, which are their starting values for the next D to D' transitions.

It is now interesting to see how effective this type of soft switching is. It is clear that the D to D' transition results in full soft switching, while the D' to D transition results in partial soft switching which cannot discharge the parasitic capacitor of switch $S_1$ below the input $V_g$ voltage. A very simple analysis reveals that this soft switching, although relatively simple to implement, is also very effective, especially for operation at higher duty ratios. For example for D=0.8, $V_C=V_g/(1-D)=5V_g$. Hence the parasitic capacitor across switch $S_1$ is discharged form a high voltage $V_C=5V_g$ down to the $V_g$ level in a soft-switching manner. Hence, only the fraction of the energy stored on the switches $S_1$, $S'_1$, and $S'_2$ is lost as given by the voltage ratio squared. In this case this translates into a 25 times energy loss reduction or 96% saving of the energy which would have been lost if the D' to D transition was fully hard switched, that is switch $S_1$ turned ON with full voltage of $V_C=5V_g$ on it. Clearly for many practical applications such a result is more than adequate. Note that at lower duty ratios, such as D=0.6, still a 6.25 times reduction of losses is achieved or 84% of the hard switching losses were recovered losslessly.

As the operating point is moved to lower duty ratios, such as D=0.25 for example, the hard switching interval $t_C$ starts even at a higher percentage, that is at 75% of the total blocking voltage $V_C=V_g/(1-D)=1.33V_g$ hence 44% of the total hard switching losses of that transition are recovered losslessly. The following improvement discussed below and termed full soft switching either completely eliminates the remaining hard switching part of the D' to D transition or substantially reduces it by the use of a small resonant inductor to aid in this transition.

Full Soft Switching—Simplified Model

First we will give a simplified model of the soft switching assisted with a resonant inductor placed in the branch with capacitor $C_1$, which will through appropriate equivalent circuit models give the main qualitative and quantitative results of the operation. This will then be followed by a complete and detailed discussion of various stages of the two transition intervals along with detailed waveforms of this full soft switching performance improvement.

The D to D' Transition

Figure 51A:
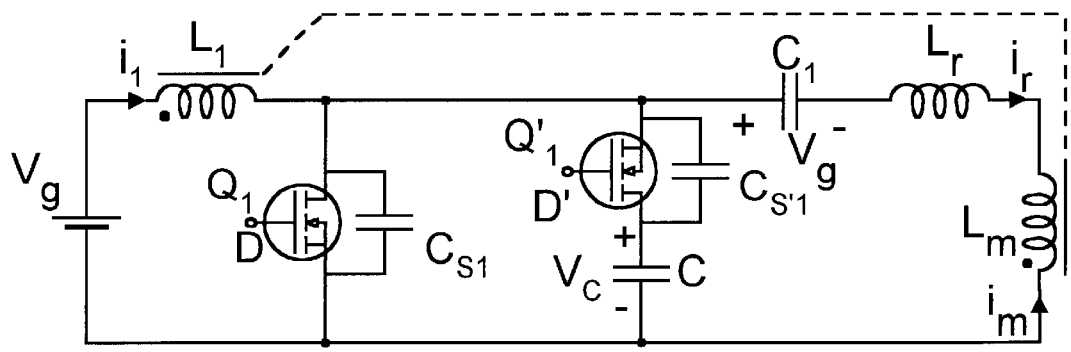
FIG. 51a illustrates a simplified model of the full soft switching of the two MOSFET switches Q$_1$ and Q'$_1$ with assistance of the resonant inductance L$_r$ for the DT$_S$ to D'T$_S$ transition.
Figures 51B, 51C:
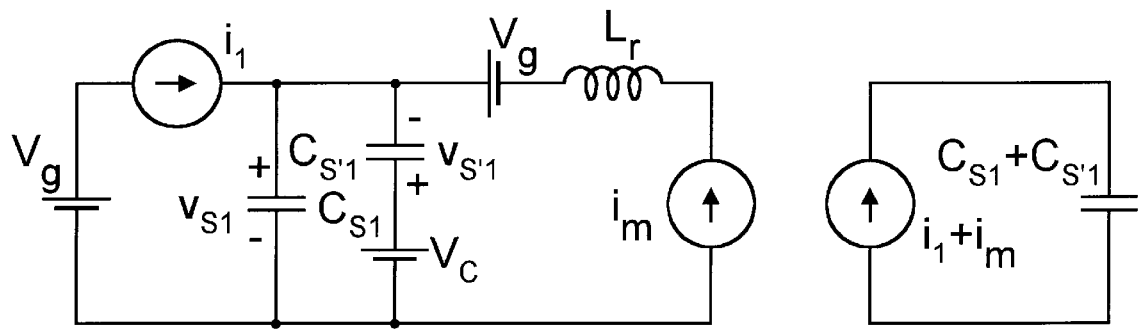
FIG. 51b is an equivalent circuit model of the circuit in FIG. 51a, where large inductances are replaced by current sources and large capacitances by voltage sources.
FIG. 51c is a simplified circuit model of the circuit in FIG. 51b.
Figure 51D:
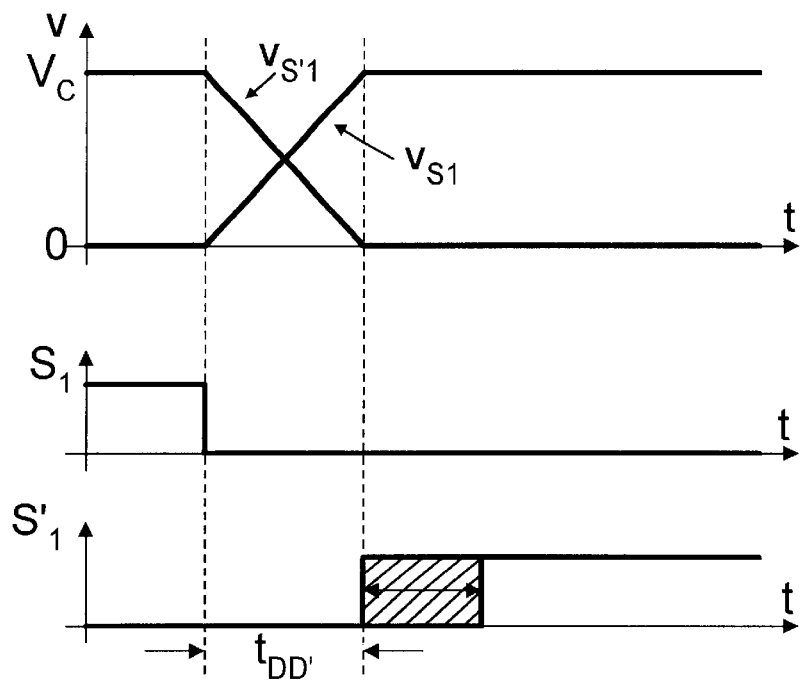
FIG. 51d shows then the voltage waveforms of the switches S$_1$ and S'$_1$ during DT$_S$ to D'T$_S$ transition based on the model in FIG. 51c.

This transition starts by turning OFF switch $S_1$. The simplified model referring to the front end of the converter is shown in FIG. 51a. Since the duration of the transition intervals is very short compared to the whole $DT_S$ or $D'T_S$ time intervals, it is very accurate to consider all three inductors with large inductances $L_1$, $L_2$, and $L_m$ as constant current sources with values $i_1$, $i_2$, and $i_m$ as depicted in the first equivalent circuit model of FIG. 51b. Note, however, that the resonant inductor $L_r$ being small is still retained in the model. In addition, all non parasitic capacitors with large capacitances, for the same reason, can be considered as constant voltage sources, with their DC voltages equal to the steady-state values. The model in FIG. 51b can be further simplified by removing the DC voltage sources, to the model of FIG. 51c, which shows the current source $i_1+i_m$ charging parasitic capacitor of switch $S_1$ and discharging the parasitic capacitor of switch $S'_1$. Note the absence of resonant inductor $L_r$ in this model. Since the currents $i_1$ and $i_m$ have also their DC components $I_1$ and $I_m$, the large DC current sources prevail the small resonant inductance $L_r$ and this D to D' transition is essentially identical to previous D to D' transition for a case with no resonant inductance. Thus, this transition interval is rather short and leads to linear rise of voltage $v_{S1}$ and linear fall of voltage $v_{S'1}$ as shown in FIG. 51d. The slope of the rise is given by $$\text{volt/time}=(I_1+I_m)/(C_{S1}+C_{S'1}) \qquad (25)$$

where $C_{S1}$ and $C_{S'1}$ are the respective parasitic capacitances of the switches. Hence this transition is clearly dependent on the peak switch current and is hence, load current dependent and as such faster than the other transition, which is shown below to be independent of DC load current, and as such slower.

When the capacitor across switch $S'_1$ is fully discharged, the parasitic body diode of switch $S'_1$ is automatically turned ON and the voltage is clamped at zero on switch $S'_1$ and at $V_C$ on switch $S_1$. Thus, at this instance, switch $S'_1$ can be turned ON at zero voltage and hence with zero switching losses, since just prior to that instance all of its charge was transferred to the parasitic capacitor of switch $S_1$ which was open. Note that the shaded area in FIG. 51d designates that the switch $S'_1$ (MOSFET $Q'_1$) could be turned ON even later. However, it is desirable, but not critical, to turn it ON as soon as zero voltage is reached in order to bypass internal body diode conduction and hence reduce the conduction losses.

The D' to D Transition

This transition, as in the case of partial soft switching with $L_r=0$, starts by turning OFF switch $S'_1$. Before, with $L_r=0$ this transition resulted in only a "partial" soft switching discharge of the parasitic capacitor of switch $S_1$ and a reduction of the $v_{S1}$ voltage on switch $S_1$ to the level of $V_g$ as seen on waveforms of FIG. 50b at the end of interval $t_b$ at which point the converter state was frozen and unable to further continue the discharge on switch $S_1$. Note from the model in FIG. 49c, that at that instant the voltage on middle inductor $L_m$ was reduced to zero, which forced the body diode of switch $S_2$ to turn ON (since its reverse bias was reduced to zero), and despite switch $S'_2$ being turned OFF at that instant, its body diode continued to conduct, thus clamping the middle inductor voltage to ground anyway and maintaining this frozen state as per interval $t_c$ in FIG. 50b. In the previous case the impasse was broken by deliberate turning ON of $S_1$, thus causing partial hard switching and an overall partial soft switching.

This time, however, we are going to deliberately turn ON switch $S_2$ (whose body diode was responsible for this stalling in the first place) at the same time as the switch $S'_1$ was turned OFF. Note that $\frac{1}{2}CV^2$ losses are much lower on switch $S_2$ than on $S_1$ since $S_2$ is a low voltage switch. This will have a twofold effect:

1. it will eliminate or bypass the first soft-switching interval $t_b$ of D' to D transition in FIG. 50b;
2. turn ON of $S_2$ will immediately start the resonant discharge of the parasitic capacitor of $S_1$ switch from its initial value given by $V_C$ at that instant. Due to the resonant discharge, this voltage will be able to go below $V_g$ level by as much as $V_C$ level is larger than $V_g$, making even zero voltage switching, hence full soft switching possible and thus eliminate previous stalling condition at the $V_g$ level.

Figure 52A:
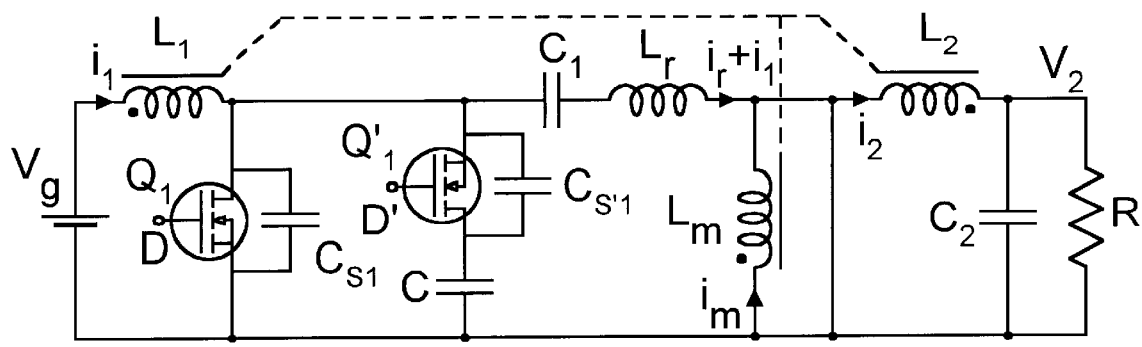
FIG. 52a illustrates a simplified model of the full soft switching of the two MOSFET switches Q$_1$ and Q'$_1$ with assistance of the resonant inductance L$_r$ for the D'T$_S$ to DT$_S$ transition.
Figures 52B, 52C:
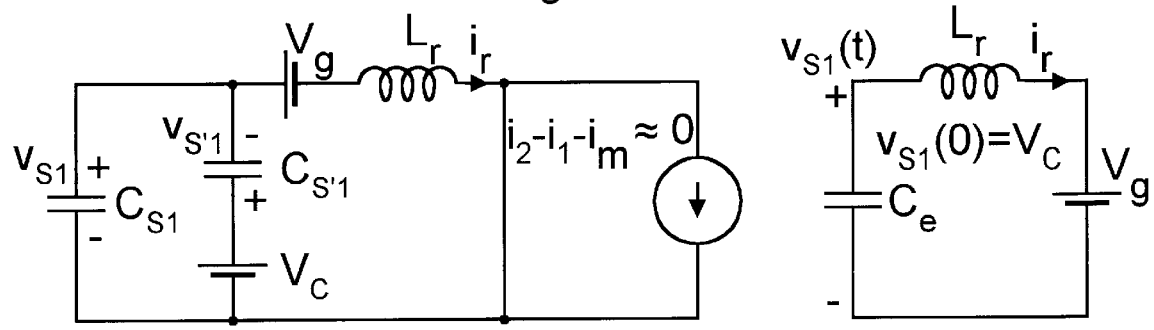
Figures 52D, 52E:
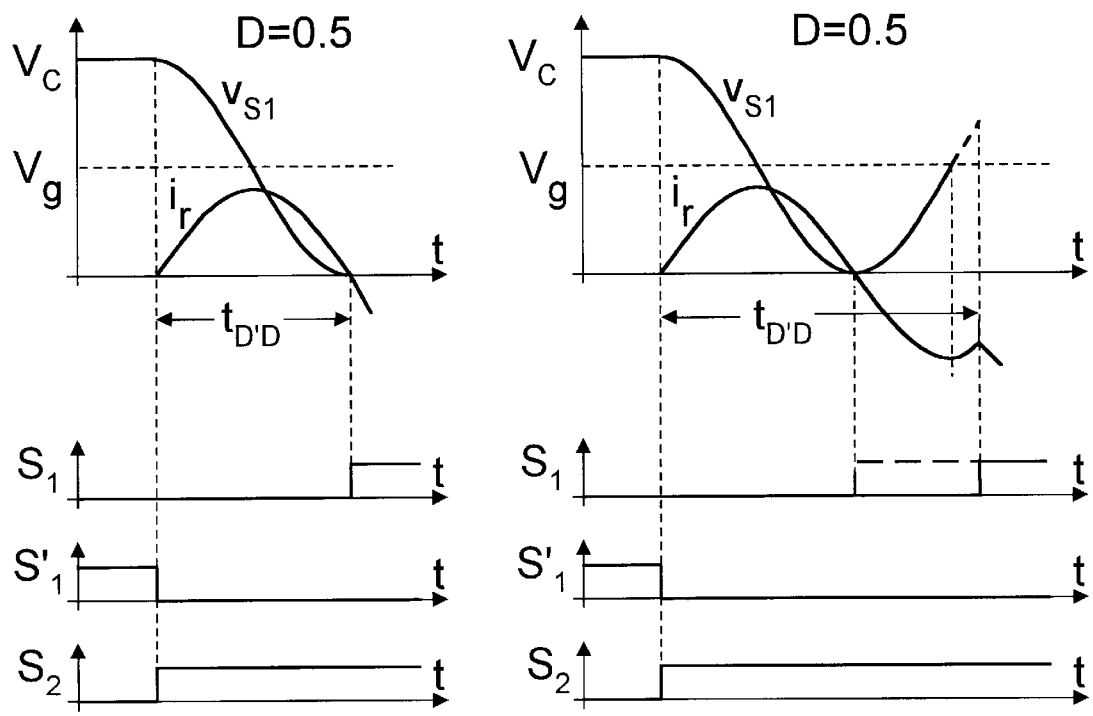
FIG. 52d illustrates the voltage waveforms of the input switch and the current of the resonant inductor L$_r$ during the D'T$_S$ to DT$_S$ transition for duty ratio D=0.5 and at optimum turn-ON of input switch S$_1$ when its voltage is zero.
FIG. 52e shows that a delay in the turn-ON of input switch S$_1$ from the optimum instant results in hard-switching and switching losses.

Thus, the simplified model for this transition starts with both switches $Q_1$ and $Q'_1$ OFF and both switches $Q_2$ and $Q'_2$ ON to result in the model of FIG. 52a. Using usual substitution of the large inductors with DC current sources, and the large capacitors with DC voltage sources corresponding to their DC steady state values, yet a further simplified model of FIG. 52b is obtained. The voltage source $V_C$ in FIG. 52b is absorbed into initial condition on capacitor $C_{S'1}$, resulting in the same initial condition $V_C$ as on capacitor $C_{S1}$. Thus, the two parallel capacitors are then combined into a single equivalent capacitor $C_r=C_{S1}+C_{S'1}$, with identical initial condition $v_{S1}(0)=V_C$. Note that the current source $i_2-i_1-i_m$ in FIG. 52b consists actually of only the respective ripple currents, since the total DC current as per relation (4) is zero. This is also why this transition interval is independent of the DC load current. Note that the resulting total ripple current is small in magnitude and in the first order analysis can be neglected compared to the large initial condition on the capacitors having a large DC voltage value of $V_C$. Thus, the model reduces to the simple equivalent circuit of FIG. 52c. The capacitor $C_r$ and inductor $L_r$ will then exchange their energies in a resonant fashion through a sinusoidal oscillation of the capacitor voltage and corresponding sinusoidal oscillation of inductor current as seen in the waveforms of FIG. 52d illustrating operation at D=0.5 duty ratio. The resonant frequency at which oscillations are taking place is given by $$\omega_r^2=1/(L_r C_e) \qquad (26)$$

where $$C_r=C_{S1}+C_{S'1} \qquad (27)$$

Note that the DC voltage source $V_g$ is left in the model of FIG. 52c to signify the center voltage around which the positive and negative part of the sinusoidal oscillations of the voltage on switch $S_1$ will take place. This is significant for complete understanding of the effectiveness of the soft switching over a duty ratio range, as was also analyzed before for partial soft switching.

The voltage on switch $S_1$ can at best be reduced to the level $|V_C-V_g|$ below $V_g$ with the given assumption that $i_r(0)=0$ and $S'_1$ and $S_2$ are switching at the same time. Thus for a duty ratio of D=0.5, for which $V_C=2V_g$, the resonant transition can reduce the capacitor voltage all the way down to zero volts for a full soft switching as seen in FIG. 52d. Note the importance of "catching" this transient at just the right moment by turning ON switch $S_1$ when the minimum voltage on $S_1$ is obtained. If that moment was missed and turn-ON was delayed as illustrated by dotted lines in FIG. 52e, the oscillations in the voltage could bring the voltage $v_{S1}$ almost back to the initial value $V_C$. Clearly, turn ON at such a voltage would result in almost no reduction of losses compared to the hard switching case and make it even much worse than the partial soft switching case discussed earlier. Thus, in this resonant inductance case, a precise timing of the drive for switch S' is critical for the full benefit to take place.

For duty ratios higher than D=0.5, the method is equally effective, since the resonant transition is always guaranteed to bring the voltage down to the zero level as seen in FIG. 53b. However, for duty ratios lower than D=0.5 this resonant inductor assisted soft switching is progressively less efficient. For example for D=0.25 (FIG. 53a), since $V_C=1.33V_g$, the lowest level that the resonant discharge voltage can reach is $\frac{2}{3}V_g$ at which point $S_1$ must be turned ON, and hard switching losses associated with that must be accepted. Hence this would only give rather marginal improvements in this range in comparison with the previous simple partial soft switching without use of resonant inductor.

Of course, to make the full comparison, one has to take into account extra losses of the resonant inductor as well as the additional space for it. However, this is only true for the non-isolated extension of FIG. 21 and its derivatives. In the isolated converter of FIG. 36 and its derivatives, a resonant inductor is already built-in and is a part of the isolation transformer structure itself. In fact, the isolation transformer leakage inductance plays the same role as this external resonant inductor, which can therefore be eliminated and full soft switching is still preserved.

A simplified timing diagram which combines both transitions is shown in FIG. 53c and illustrates on the same scale that the D to D' transition is several times faster than D' to D transition. This is understandable, since the D to D' transition is DC load current dependent, and faster at the higher DC load current, and at no-load has a similar slope as D' to D transition. On the other hand, the D' to D transition is independent of the DC load current since it is based on the resonance of the charge stored in parasitic capacitor, which does not depend on DC load current. In fact, one of the main drawbacks of the conventional soft switching method employed in the so called quasi-resonant and multi-resonant converters is that the soft switching is available only for the limited range of the load currents and limited range of the conversion voltage ratios.

The simplified model was focused on explaining the fundamental operation and mechanism of the resonant inductor assistance in completing the D' to D transition in a soft switching manner and overcoming the shortcomings of the previous operation without resonant inductor. The simplified model uncovered full soft switching of $S'_1$ and $S_1$ switches during both D to D' and D' to D transitions respectively. The detailed model below will in addition uncover that the $S'_2$ switching losses are also eliminated during D to D' transition, since $S'_2$ will be turned ON when the voltage across it reaches zero. Only one switch, $S_2$ switch, will be subject to hard-switching during D' to D transition. But even this switch will be turned ON typically at voltages lower than previously. In practical low voltage applications, the hard-switching losses on this switch will in most cases be negligible.

Full Soft Switching—Complete Model

The same assumptions as in the simplified model are made regarding the large inductors and large non-parasitic capacitors.

The D to D' Transition

Figure 54A:
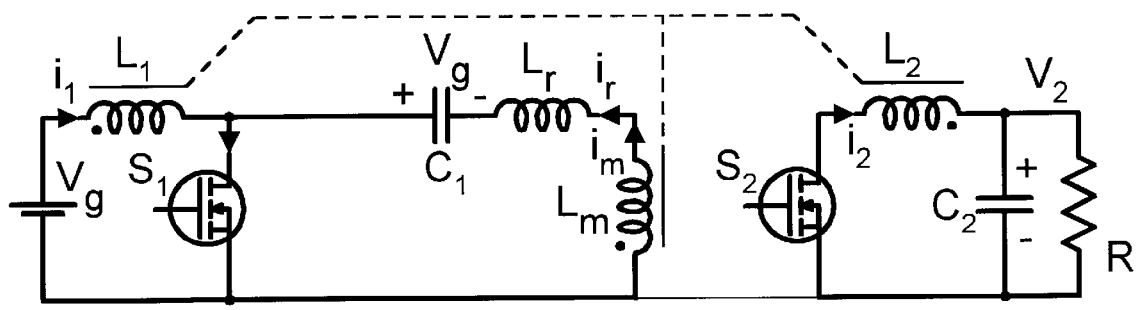
FIGS. 54 (a–e) illustrate the five converter circuit analysis models relevant for the DT$_S$ to D'T$_S$ transition in the case resonant inductance L$_r$ is included.
Figure 54B:
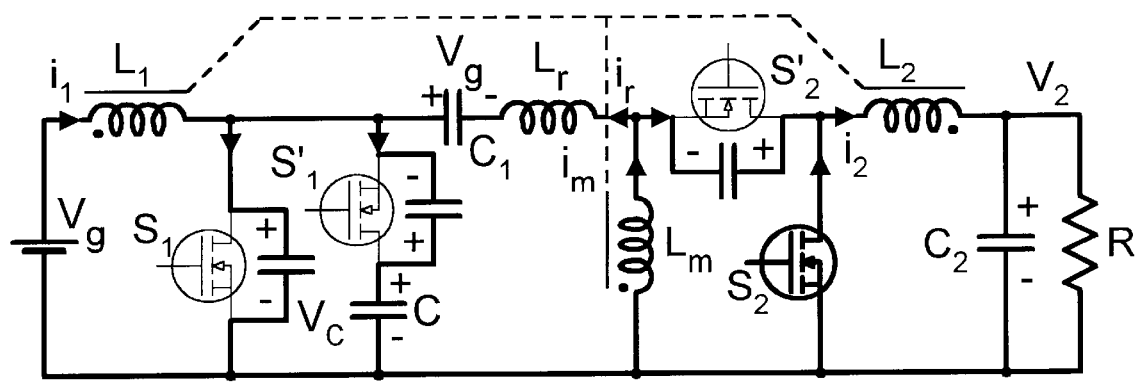
Figure 55A:
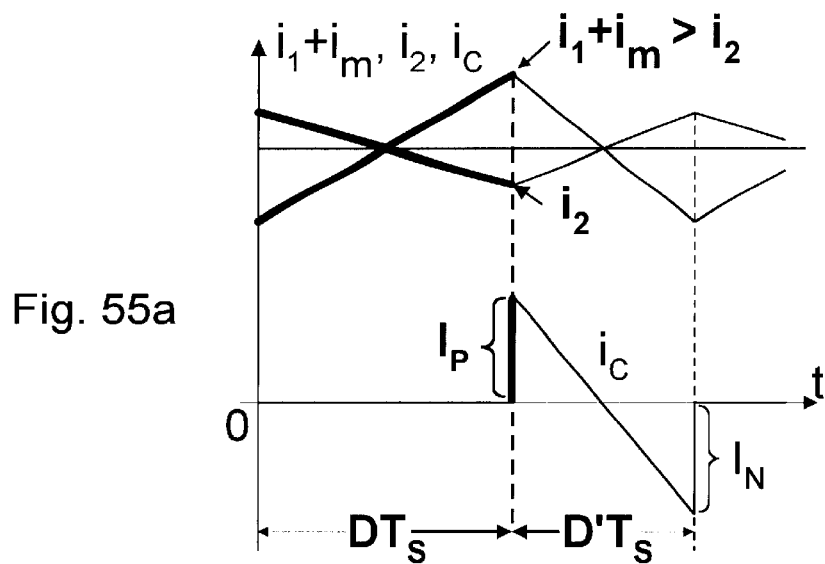
FIG. 55a is a graph of the inductor currents relation applicable for DT$_S$ to D'T$_S$ transition and FIG. 55b is a timing diagram for the characteristic switching waveforms for the DT$_S$ to D'T$_S$ transition.
Figure 55B:
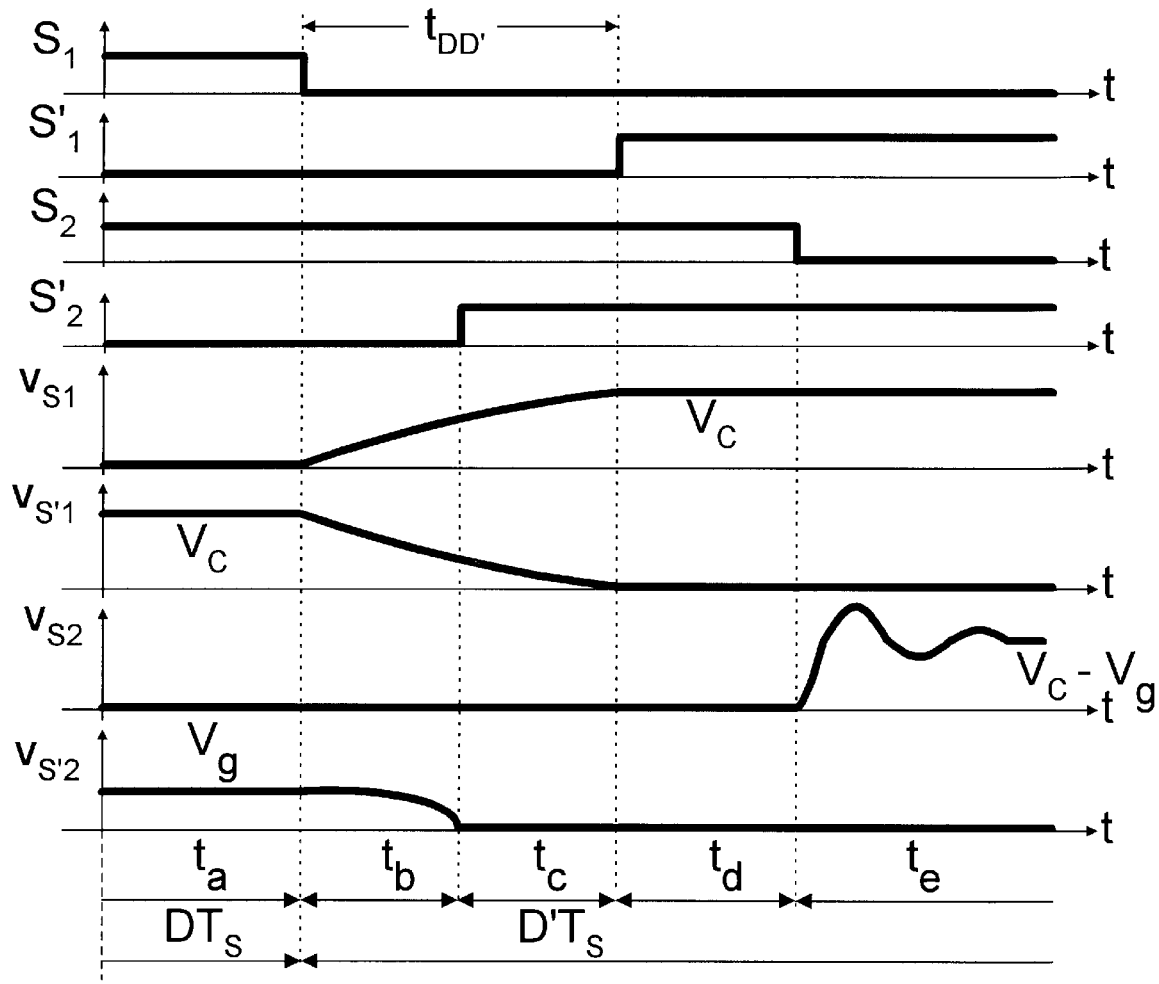

The transition from the D to D' interval is represented by 5 characteristic circuits of FIG. 54a, b, c, d, e, and corresponding waveforms of FIG. 55a and FIG. 55b. FIG. 55b has a timing diagram broken down into five intervals, $t_a$, $t_b$, $t_c$, $t_d$, $t_e$ with each interval corresponding to respective circuit model, such as $t_a$ to FIG. 54a, $t_b$ to FIG. 54b, etc. From the waveforms in FIG. 55a the following inequality applies:

$$i_1 + i_m > i_2 \qquad (28)$$

The description of the circuit operation in each interval follows:

Interval $t_a$

This corresponds to end of $DT_S$ interval before the transition starts. $S_1$ and $S_2$ are ON and $S'_1$ and $S'_2$ are OFF as in FIG. 54a. This interval ends and the transition is initiated when S is turned OFF.

Interval $t_b$

As in the simplified model the transition is initiated by turning OFF $S_1$ and circuit of FIG. 54b applies. The sum of currents $i_1$ and $i_r$ is charging the capacitor across $S_1$ and discharging capacitor across $S'_1$.

The initial value of the current $i_r$ is $i_m$, thus initially no current is flowing toward $S'_2$. As the voltage across $S_1$ rises also the voltage $v_r$ on resonant inductor starts to increase. This voltage causes $i_r$ to become smaller. As a result the current in switch $S'_2$ can no longer be zero and the capacitance of that switch has also been discharged from its initial value $V_g$. This interval ends when this capacitance is completely discharged and the body diode of $S'_2$ starts to conduct. At this time switch $S'_2$ is turned ON at zero voltage (hence without switching losses).

Interval $t_c$

Figure 54C:
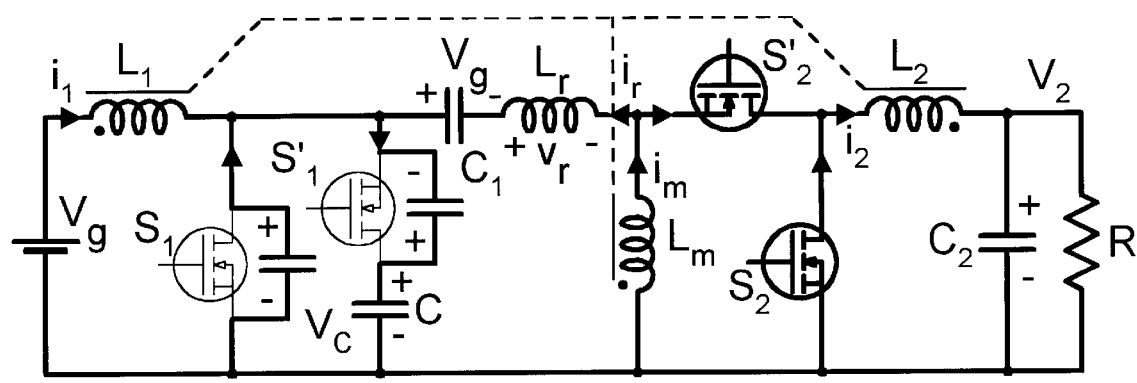

The currents $i_1$ and $i_r$ continue to charge the capacitance of $S_1$ and discharge the capacitance of $S'_1$ as in FIG. 54c. The voltage $v_r$ builds up further, which further decreases the magnitude of $i_r$. This interval is concluded when voltage on switch $S'_1$ reaches zero and the body diode of $S'_1$ starts to conduct. Now $S'_1$ can be also be turned ON without switching loss.

Interval $t_d$

Figure 54D:
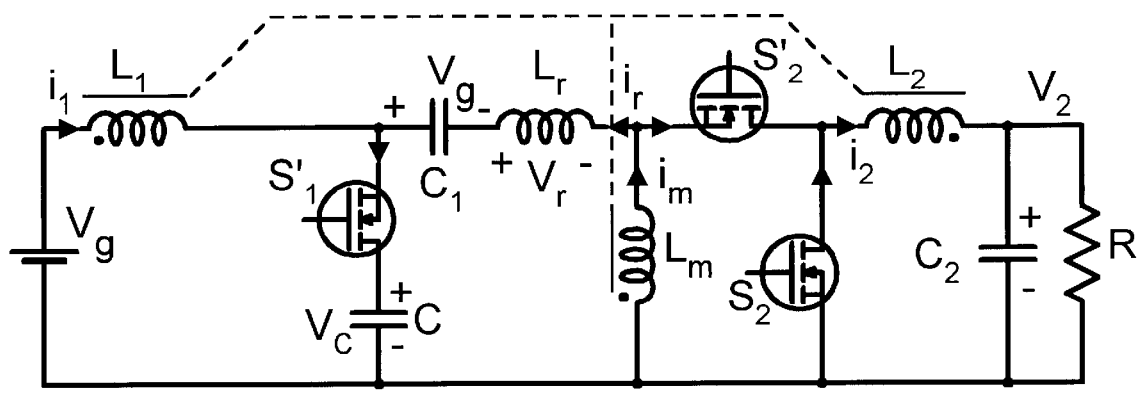

The voltage $v_r$ is now given by $V_C - V_g$ and thus $i_r$ continues to decrease linearly as in FIG. 54d. At some point during this or the last two subintervals $i_r$ has become negative (initially it was $i_m$) When $i_r$ reaches the value of $i_m - i_2$ the current of switch $S_2$ becomes zero. The switch $S_2$ has to be turned OFF at this point.

Interval $t_e$

Figure 54E:
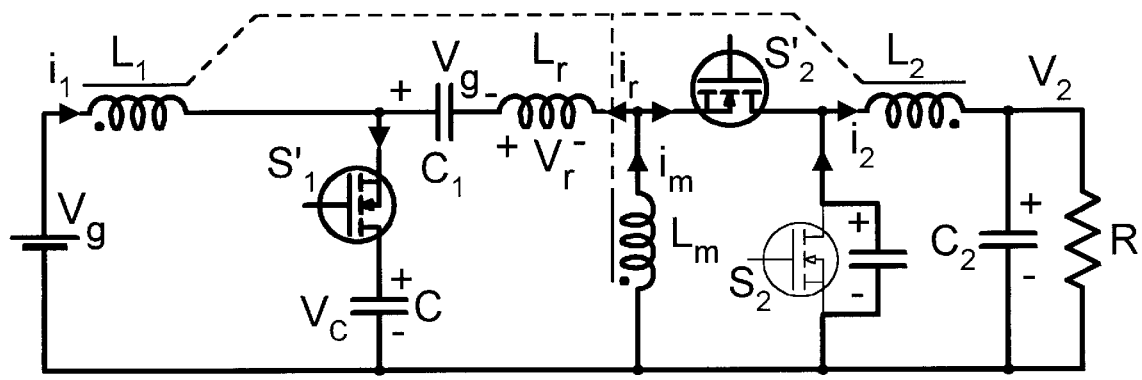

The current of switch $S_2$ which now becomes negative charges capacitance of switch $S_2$ as per FIG. 54e. The initial value of $i_r$ in this interval is also the final value after the D to D' transition has been completed. Thus, in order to charge the capacitance of $S_2$ to its final value $(V_C - V_g)$ the current $i_r$ has to overshoot somewhat. This in turn causes the voltage on $S_2$ to overshoot. The result is an oscillation between $L_r$ and $C_{S2}$ which if not damped would continue indefinitely. If the inherent parasitic resistance associated with the oscillating elements does not sufficiently damp the oscillation, an additional R-C damping network is added which also damps a similar oscillations at the end of D' to D transition. Once the oscillation dies out the $D'T_S$ interval is reached and the D to D' transition has been concluded.

The D' to D Transition

Figure 56A:
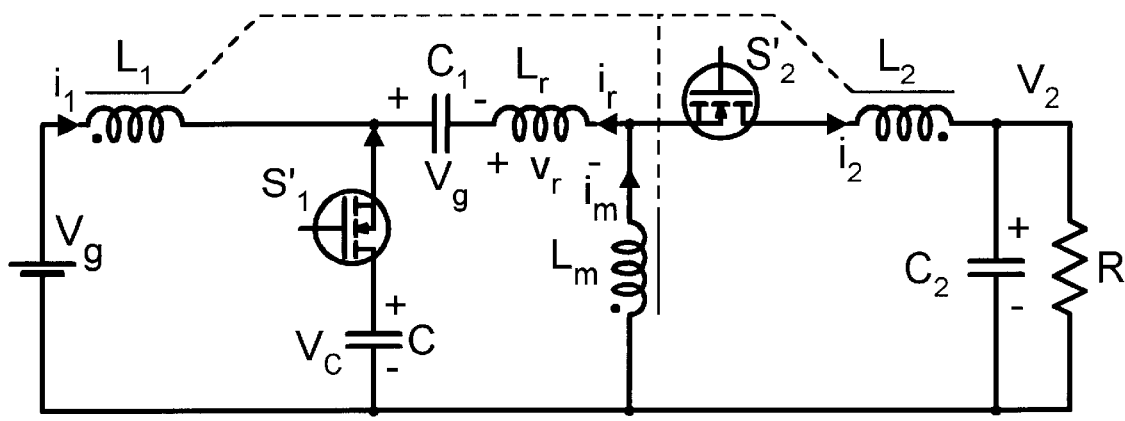
FIGS. 56 (a–e) illustrate the five converter circuit analysis models relevant for the D'T$_S$ to DT$_S$ transition in case the resonant inductance L$_r$ is included.
Figure 56B:
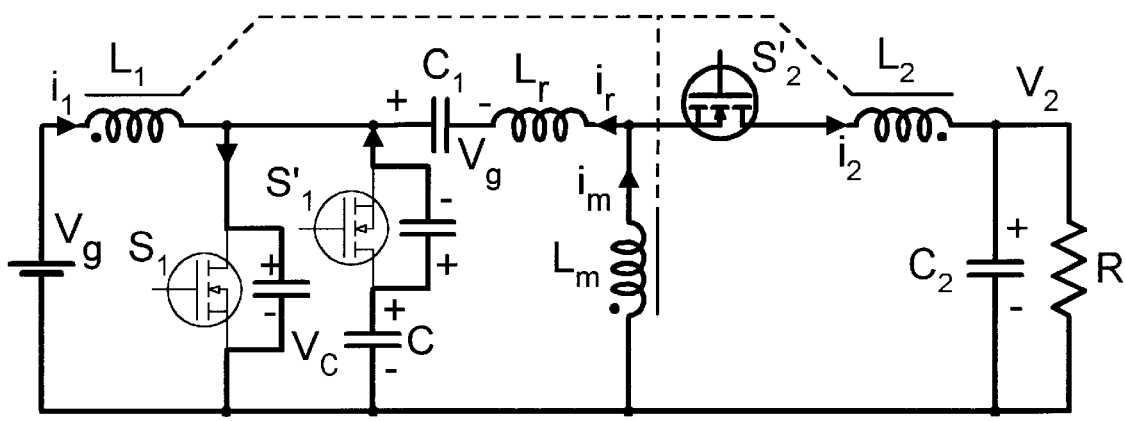
Figure 56C:
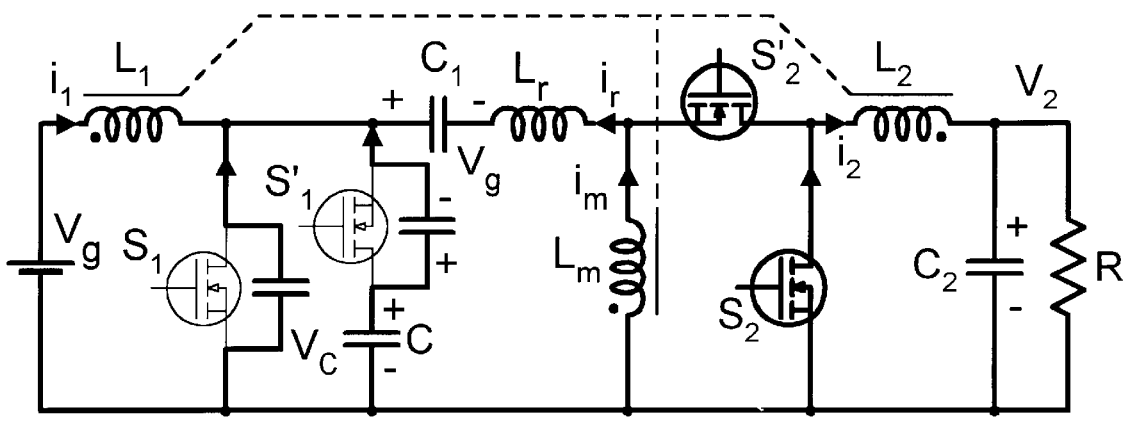
Figure 56D:
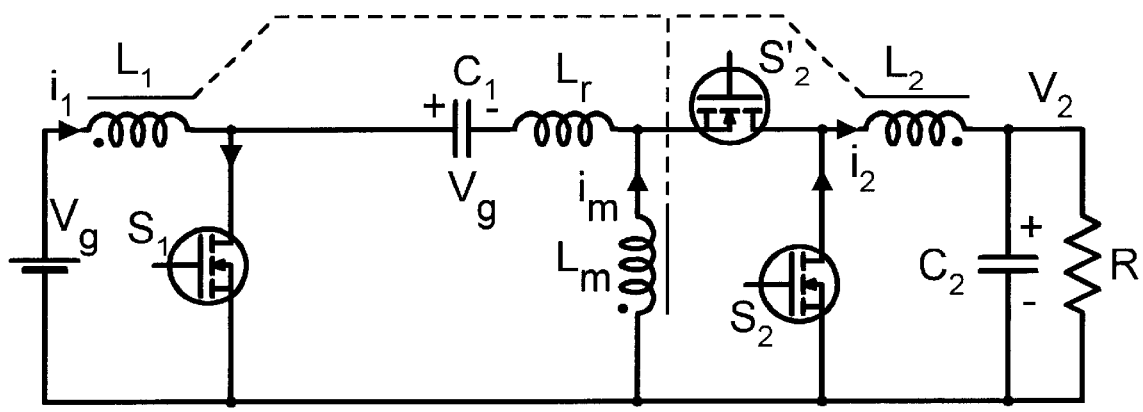
Figure 56E:
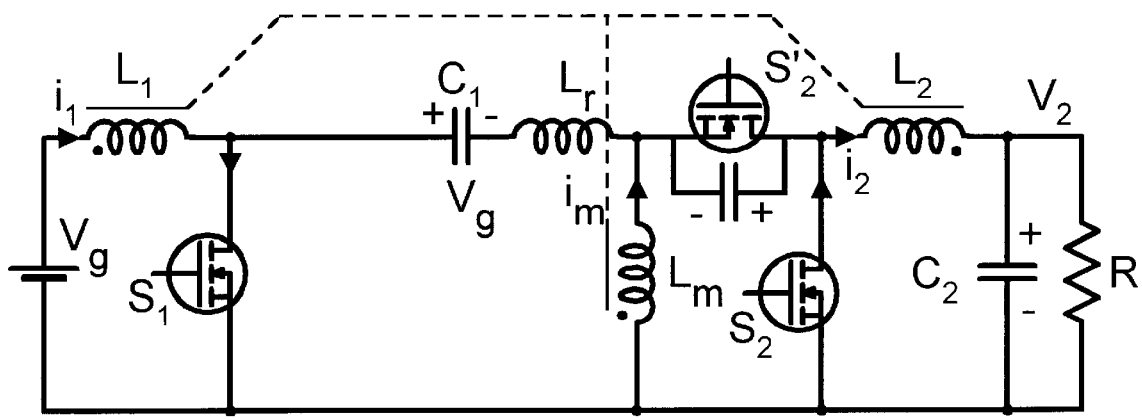
Figures 57A, 57B:
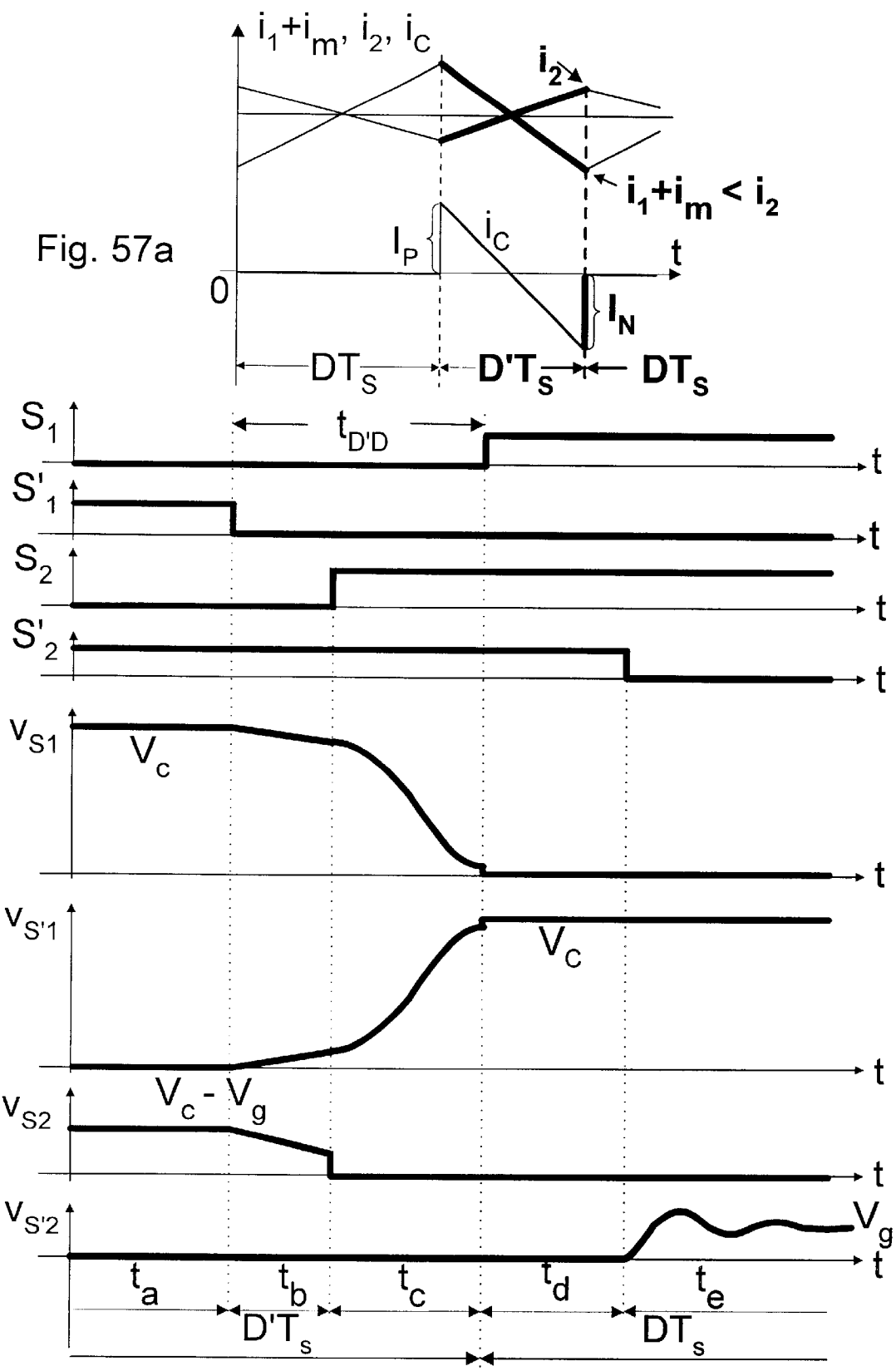
FIG. 57a is a graph of the inductor currents relation applicable to the D'T$_S$ to DT$_S$ transition and FIG. 57b is a timing diagram for the characteristic waveforms for the D'T$_S$ to DT$_S$ transition.

For this transition, the five circuit models are shown in FIGS. 56a, b, c, d, e, and the corresponding waveforms in FIG. 57a and FIG. 57b. The five intervals in FIG. 57b correspond to the five circuits in FIG. 56(a–e). From FIG. 57a it follows that for this transition it holds that $$i_1 + i_m < i_2 \qquad (29)$$

Interval $t_a$

This represents the $D'T_S$ interval just before the transition starts. $S_1$ and $S_2$ are OFF and $S'_1$ and $S'_2$ are ON. This interval ends and the D' to D transition is initiated when $S'_1$ is turned OFF.

Interval $t_b$

The AC ripple current $i_1 + i_m - i_2 = I_N$ is now discharging the capacitance of $S_1$ and charging the capacitance of $S_2$. Compared with the D to D' transition this current is much lower, since it is only the algebraic sum of the AC (ripple currents) parts of total inductor currents. Since this current is relatively low so is the stored energy in $L_r$. Unless the duty ratio is very high, this energy is not sufficient to completely discharge the capacitance of $S_1$ and charge the capacitance of $S_2$. In order to increase $i_r$ (and store additional energy in $L_r$) $S_2$ is deliberately turned ON as also explained in the simplified model. Turning ON $S_2$ then concludes this interval. However, here we consider the additional degree of freedom to delay the turning ON of $S_2$ by some time. This allows to store exactly the required amount of energy in $L_r$ to complete the soft-switching most efficiently. In some cases this may require to turn ON $S_2$ even before $S'_1$ is turned OFF. The corresponding waveforms are not shown here.

Interval $t_c$

Now the capacitance of $S_1$ in parallel with the capacitance of $S_2$ resonates with $L_r$ in such a way that $i_r$ initially increases and $v_r$ decreases. When the voltage on $S_1$ arrives at its lowest value $S_1$ must be turned ON, which concludes this interval. The minimum value of $S_1$ voltage depends on the timing of switch $S_2$, that is, the length of the previous interval $t_b$. The shorter the second interval the lower the minimum value because the resonance process starts with a higher initial voltage value. The minimum value of the voltage on switch $S_1$ can be made zero by appropriate timing of $S_2$. However, the experiments have shown that values of approximately $¼V_C$ result in higher efficiency. The $½CV^2$ losses are reduced by a factor of 16 over the hard switching case. A further reduction, however, causes increased losses due to a larger circulating current necessary to achieve a lower voltage on $S_1$.

Interval $t_d$

At the beginning of this interval $i_1$ is equal to $-i_r$ (because the current in $S_1$ and $S'_1$ were zero at the time $S_2$ was turned ON). Therefore, the initial value of the current in $S'_2$ is $i_1+i_m$ and the initial value of the current in switch $S_2$ is $i_2-i_1-i_m$ (which is positive according to FIG. 57a and inequality (29)). The voltage $v_r$ equals now $-V_g$ and therefore $i_r$ increases linearly and eventually becomes positive. Since $i_m$ is constant, the current in $S'_2$ has to decrease at the same rate as $i_r$. Before or at the latest when it reaches zero level switch $S'_2$ must be turned OFF. Note that switch $S'_2$ could have been turned OFF at the same time as $S_1$ was turned ON. However, that would force a rather large current through the body diode of the same switch $S'_2$ and thus cause additional conduction losses. Thus, by keeping ON switch $S'_2$ the longest possible, the body diode is bypassed and overall efficiency improved.

Interval $t_e$

The current in $S'_2$, which is now becoming negative is charging the capacitance of $S'_2$. Similar to the final interval in the D to D' transition $i_r$ has to overshoot in order to charge the capacitance of $S'_2$. This again results in an oscillation between that capacitance and $L_r$. The same R-C network as described above damps this ringing. Once the oscillation dies out the $DT_S$ interval is reached and thus the D' to D transition has been concluded.

Experimental Verification

A number of experiments were conducted to verify the performance of two classes of the converters brought by their basic embodiments as follows:

1. DC Transformer switching converter of FIG. 21 with no galvanic isolation;
2. Isolated DC Transformer switching converter of FIG. 36a with galvanic isolation.

DC Transformer Switching Converter

Several experiments were conducted to verify the following key features of the DC Transformer switching converter of FIG. 21:

1. High DC overload capability;
2. Soft switching performance without resonant inductor using only timing control;
3. Zero ripple current in output inductor.

The prototype of the DC Transformer switching converter of FIG. 21 was built for a nominal 50 W, 10V output. The input voltage was in the range of 13V to 20V depending on the type of the test employed. The switching frequency used was fixed at 200 kHz. The following component values were used for the breadboard prototype:

$S_1$ and $S'_1$ were IRF3710 (100V/28 mΩ); $S_2$ and $S'_2$ were SUP70N06-14 (60V/14 mΩ) C=2×4.4 µF/100V; $C_1$=5×10 µF/50V; $C_2$=2200 µF/25V;

DC Transformer had a volume of 0.83 in$^3$.

Overload Current Test

Figure 58A:
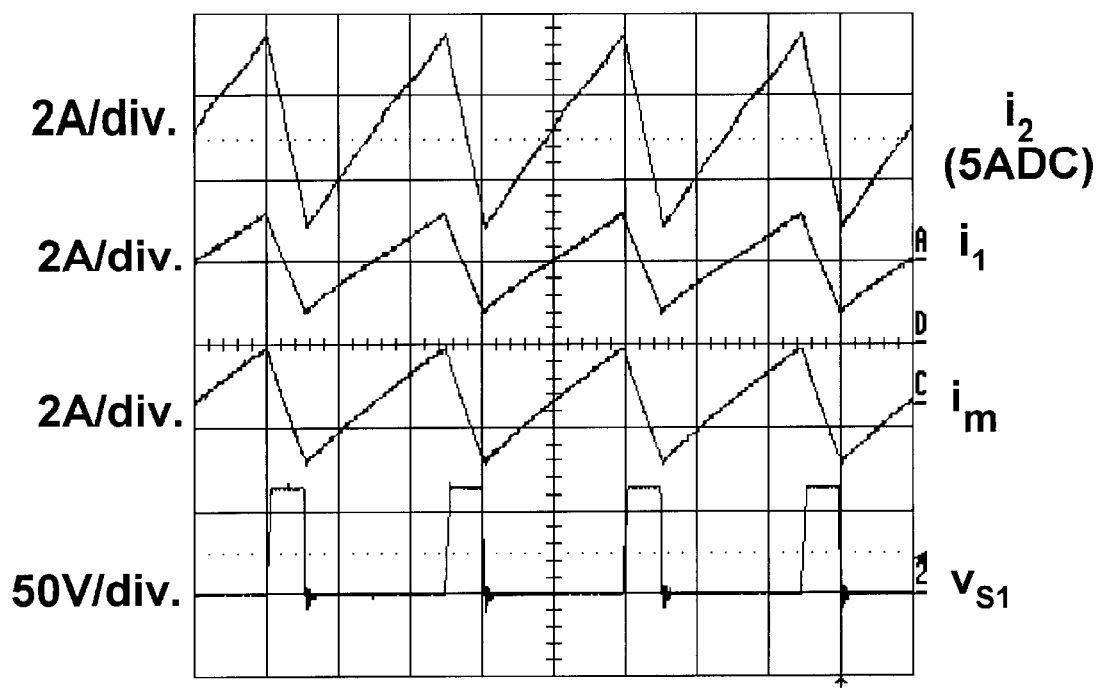
FIG. 58a shows oscilloscope traces of the three inductor current waveforms measured on the prototype of a 50 W, 20V to 10V converter with a DC Transformer without any air-gap and at 5 A nominal load current.

For these tests the simpler soft switching method was employed, with only proper drive timing of the switches and no additional resonant inductor, hence for the overload current testing $L_r$=0. In order to test the large overload capability, first the DC Transformer was built with no air-gap in either leg of the UU-like magnetic core structure. The converter was adjusted to operate at a nominal duty ratio of D=0.8 and an output current of 5 A at 10V, hence the input voltage of approximately 13V. The ripple currents of the three inductors under these nominal conditions are shown in FIG. 58a with 2 µs/div time scale. Note that the output inductor current due to still present AC voltage mismatch is 4 A peak-to-peak, while $i_1$ and $i_m$ are 2 A and 3 A peak-to-peak respectively.

The efficiency was measured to be 95.45% under these nominal conditions and 5 A load current. Note that the breadboard prototype design was built for the purpose of testing the overload current capability and not to optimize efficiency since the state-of-the-art components, such as lowest ON-resistance devices were not used.

Figure 58B:
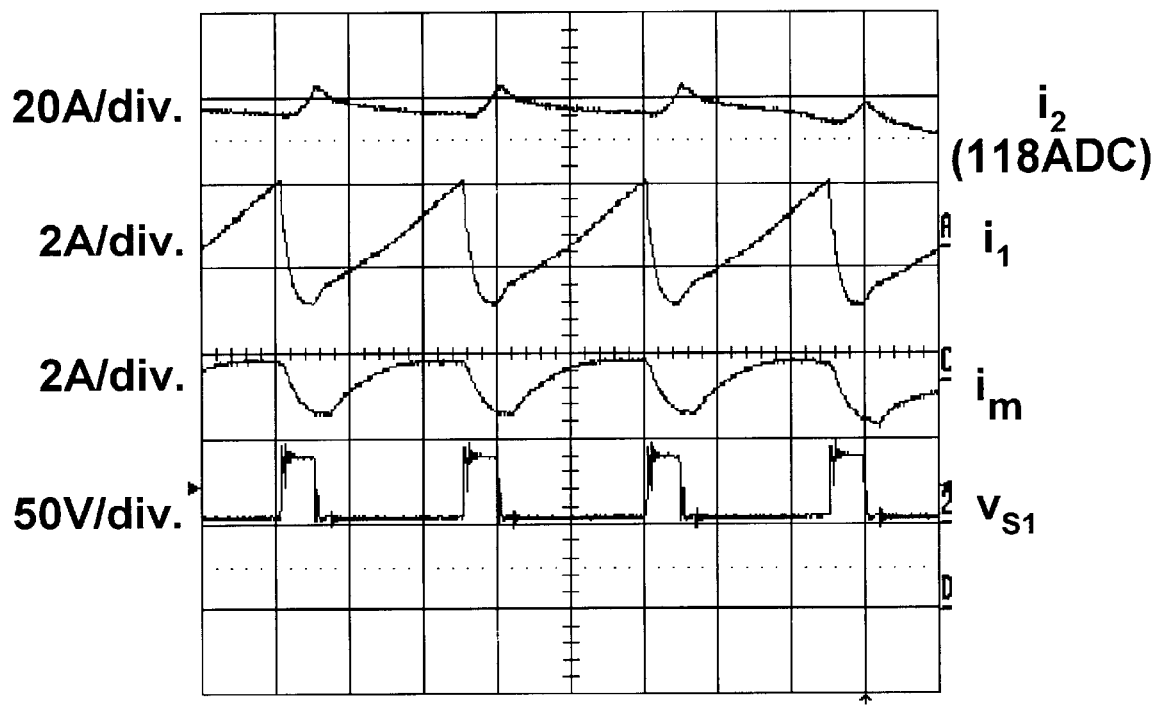
FIG. 58b shows oscilloscope traces of the three inductor currents under the same condition as in FIG. 58a except output is subjected to a large pulsed overload of 118 A load current for 2 ms at 1 Hz repetition rate.

The prototype design was then subjected to a large pulse overload current using pulse frequency of 1 Hz and pulse duration (overload duration) of 2 ms to test the overload current capability. As seen in FIG. 58b (2 µs/div time scale), the overload capability of 118 A was verified for an effective overload of approximately 2,300% (Two Thousand Three Hundred Percent). Note that only a slight saturation of the output inductor current was recorded (increase of $i_2$ ripple current), while the other two inductor currents $i_1$ and $i_m$ changed only slightly.

To put the magnitude of this overload in perspective, let us compare this design with another one in the which DC Transformer is not used, but two separate magnetic cores were used: one for combining input inductor and middle inductor into a single core of FIG. 24a, and another separate magnetic core with corresponding air gap as in FIG. 24c for the output inductor with its DC bias. The two separate magnetic cores would each have to support 5 times 120 A or 600 ampere-turns in order to avoid saturation. Thus, to avoid saturation each core must have a total air-gap of 120 mils or 3 cm (!), based on the 2 mil per 10 DC ampere-turns air-gap criteria, which would lead to DC flux density of 0.25 T (tesla). At such an air-gap, ferromagnetic material might as well be completely left out since it contributes practically nothing to raise the inductance level beyond that of an air-core coil. As a result, the AC ripple currents in all windings would be huge and impractical. Yet the DC Transformer of the present invention was capable of supporting all that 2,300% output DC current overload with no air-gap whatsoever and with all ripple currents still at the same level as with the nominal 5 A load current.

Soft-Switching Test

Figure 59A:
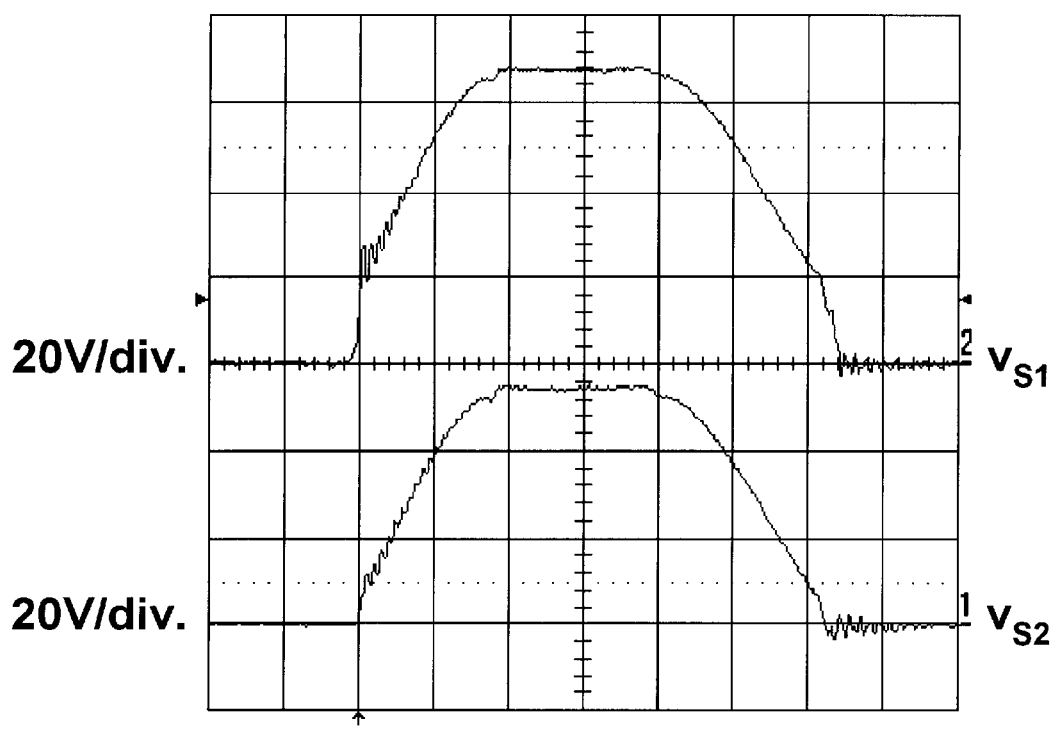
FIG. 59a shows oscilloscope traces of the measured VDS waveforms on the S$_1$ and S$_2$ switches with DC Transformer without air-gap.
Figure 59B:
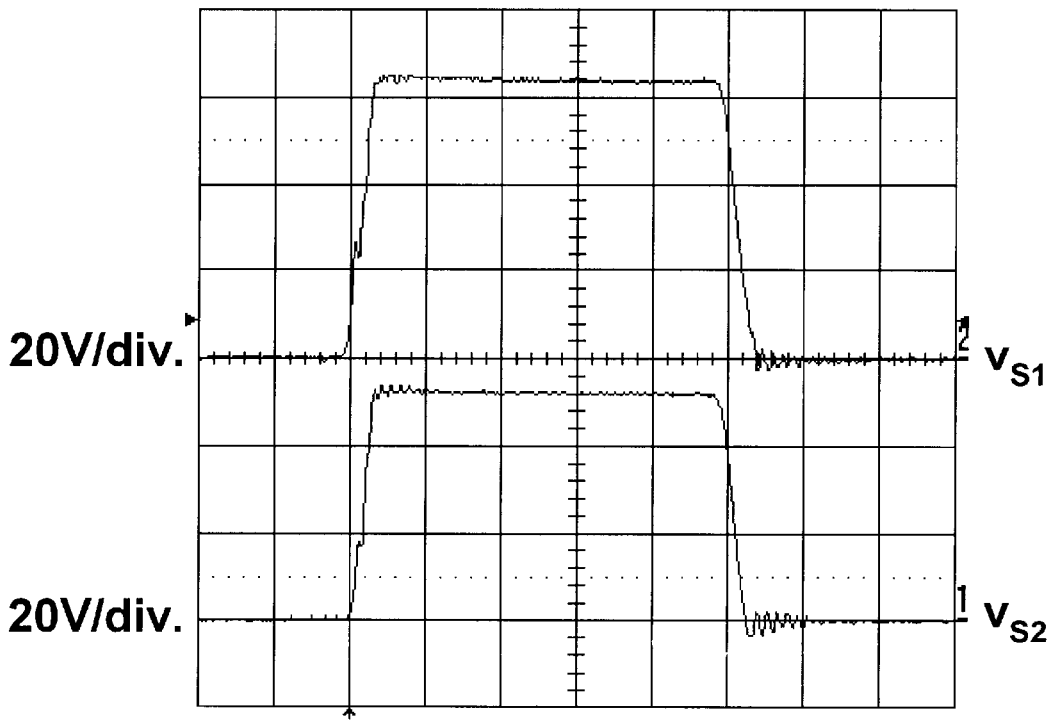
FIG. 59b shows oscilloscope traces of the measured VDS waveforms on the S$_1$ and S$_2$ switches with a 6 mil air-gap on the DC Transformer leg with output inductor.

FIG. 59a displays the soft switching performance and the voltages of switches $S_1$ and $S_2$ obtained with the DC Transformer core without air-gap. FIG. 59b shows the same waveforms under the same conditions, except that the DC Transformer was changed to include 6 mil air-gap. Note the considerable faster transitions in the latter case, due to the reduced magnetizing inductance of the DC Transformer, which in turn, led to proportionally increased AC ripple currents and faster transition. If the converter were adjusted to have zero ripple current in the output inductor, by increasing the air-gap, even faster transitions would be obtained. Thus, the operation at or near zero ripple current of the output inductor is beneficial since it leads to faster soft switching transitions, hence allows well defined edges and higher duty ratio even at very high switching frequencies.

Output Inductor Zero Ripple Current Test

Figure 60A:
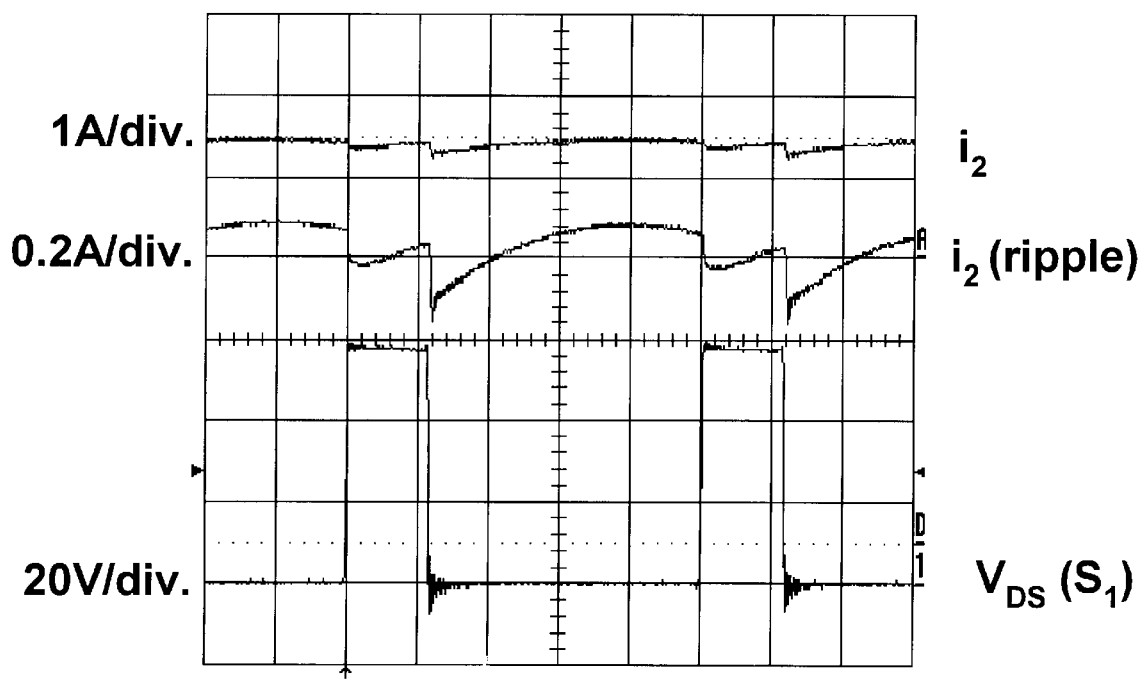
FIG. 60a shows oscilloscope traces where the top trace is the 5 A full load current, middle trace is output ripple current magnified to show remaining 230 mA ripple current when the converter is operating at zero ripple for 13.3V input.
Figure 60B:
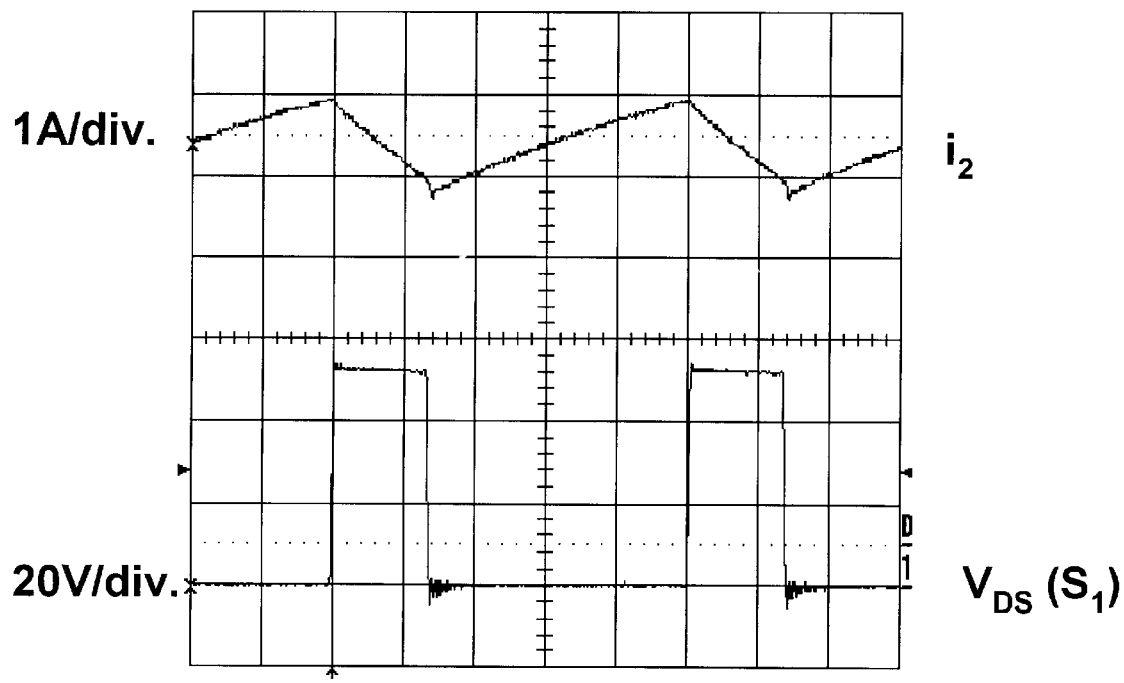
FIG. 60b shows oscilloscope traces where the top trace shows 1 A peak-to-peak output ripple current when operating at 14V input voltage and away from zero ripple condition.

The DC Transformer design is slightly modified next to allow the observation of the zero output ripple current phenomena at lower duty ratio. Thus, to the original design with a 6 mil concentrated air-gap, another 6 mil paper spacer was added to result in total air-gap of 12 mil on the magnetic leg with the output inductor $L_2$ and a 6 mil air-gap on the magnetic leg with the inductor $L_m$. When the input voltage was changed to 13.3V the output zero-ripple current was observed as shown in FIG. 60a with 1 µs/div time scale. The top trace in FIG. 60a shows the total current $i_2$ with a DC current of 5 A and a superimposed ripple current. The second trace in FIG. 60a shows the enlarged waveform of the ripple current only, showing about 0.2 A peak-to-peak ripple including the jumps due to non-idealities. The jumps are mainly due to the fact that during the soft-switching transition the voltages on the inductors temporarily do not match. The jumps are not observed if the inductors are not coupled. FIG. 60b with 1 µs/div time scale is included for reference purposes, which shows the output ripple current increased to 1 A when the operating point was moved away by increase of the input voltage to 14V.

Isolated DC Transformer Switching Converter

Several experiments were conducted to verify the following key features of the Isolated DC Transformer switching converter of FIG. 36a:

1. Input inductor and output inductor ripple current measurements;
2. Soft-switching assisted with leakage inductance of the isolation transformer;
3. High efficiency over wide input voltage range.

The prototype of a practical off-line converter operating from a rectified AC line is built to test the Isolated DC Transformer switching converter. The input DC voltage from 210V to 390V is converted to an output DC voltage of 5V at a nominal power of 100 W and operating at switching frequency of 200 kHz. The components with following values were used for the converter of FIG. 36a:

C=47 nF; $C_1$=1 µF; $C_2$=3×1200 µF; Q1→STU10NB80; $Q_1'$→STP4NB80FP; $Q_2$ & $Q_2'$→STV160NF03L

The Isolated DC Transformer was built using the custom magnetic core configuration of FIG. 32 and using the Isolated DC Transformer switching converter of FIG. 39b. The custom core with three magnetic legs was built using ferrite ferromagnetic material. Volume of the Isolated DC Transformer was 0.79 in³.

Input and Output Inductor Ripple Current Measurements

Figure 61A:
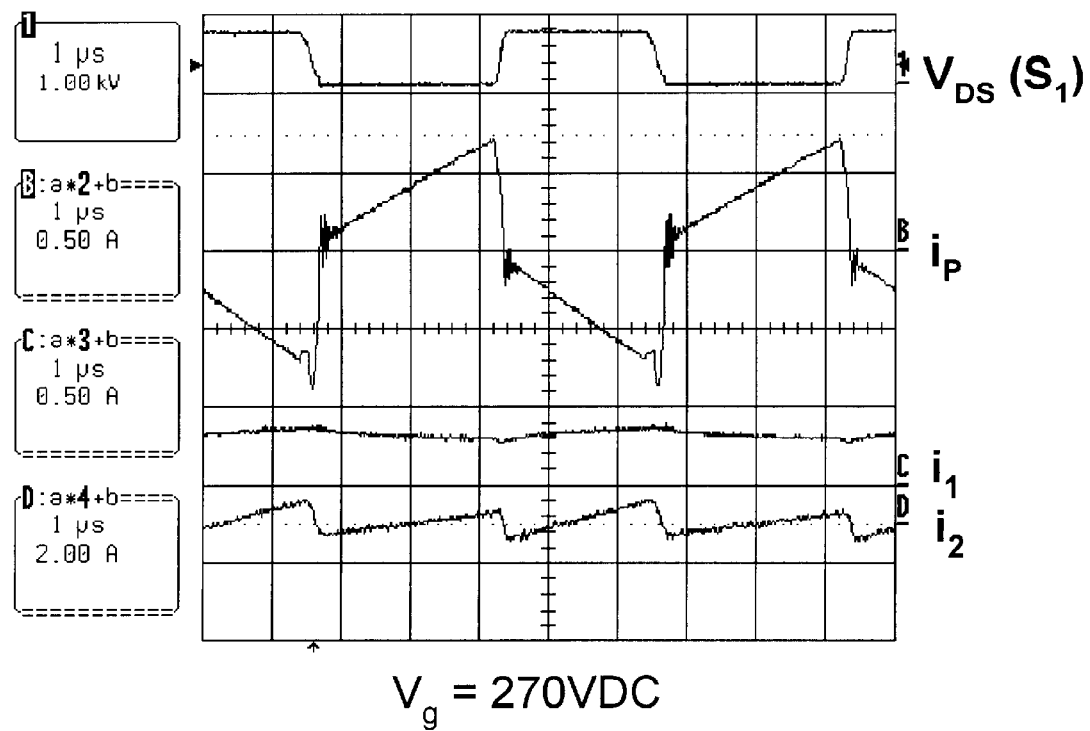
FIG. 61a shows oscilloscope traces of the input and output inductor ripple currents for 270VDC input voltage.

First the ripple current performance was measured at two operating points. The waveforms shown are in the following order. Top trace is drain-to-source voltage of the main switch $S_1$. Second trace is the isolation transformer primary current, third trace is the input inductor current ripple at 0.5 A/div, and the bottom trace is output inductor current ripple at 2 A/div. FIG. 61a displays these waveforms obtained at 270V DC input voltage. The input inductor ripple current is only approximately 100 mA peak-to-peak, hence it is practically zero-ripple current. The output inductor ripple current is also very small measuring approximately 1 A peak-to-peak. This is a quite low ripple current, considering that the nominal DC load current is 20 A.

Figure 61B:
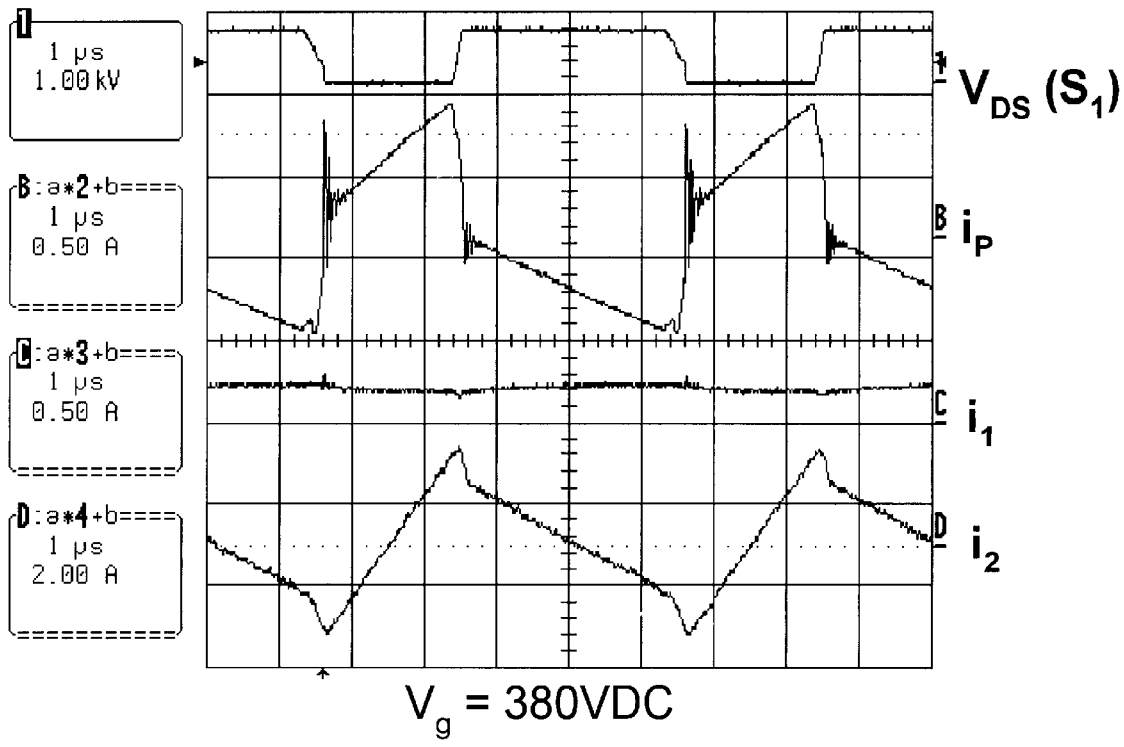
FIG. 61b shows oscilloscope traces of the input and output inductor ripple currents for 380VDC input voltage.

Another set of measurements is shown in FIG. 61b obtained for an input DC voltage of 380V. Note that, as predicted, for this wide change in the duty ratio, the input inductor ripple current remained practically unchanged at the same low ripple of 100 mA, which enables excellent EMI noise characteristic. Note also the absence of any spikes in either input inductor or output inductor current, which clearly demonstrates the effectiveness of the soft-switching performance of the converter. The output inductor ripple current has, however, increased to 4 A peak-to-peak.

Soft-switching Using Transformer Leakage Inductance

Figure 62A:
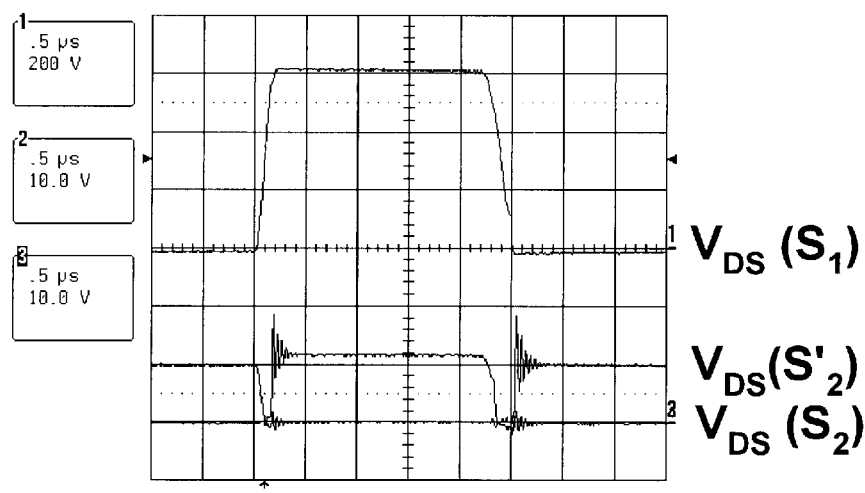
FIG. 62a shows oscilloscope traces of soft-switching waveforms.
Figure 62B:
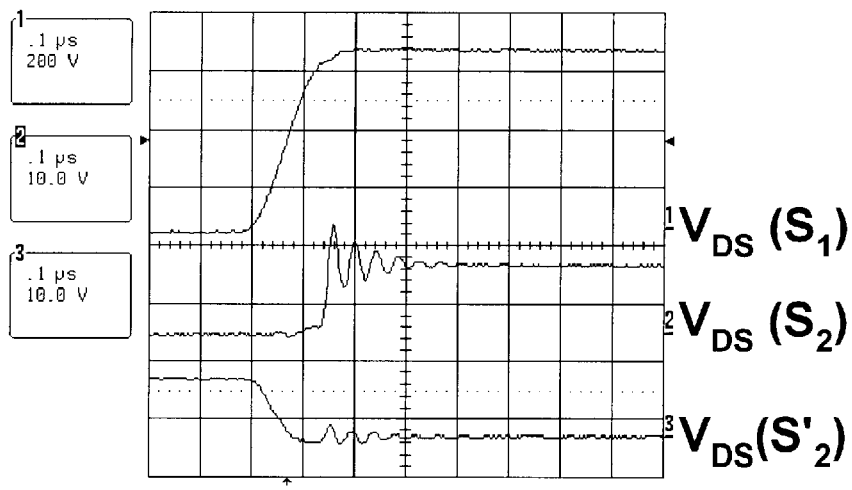
FIG. 62b shows oscilloscope traces of the D to D' transition enlarged.
Figure 62C:
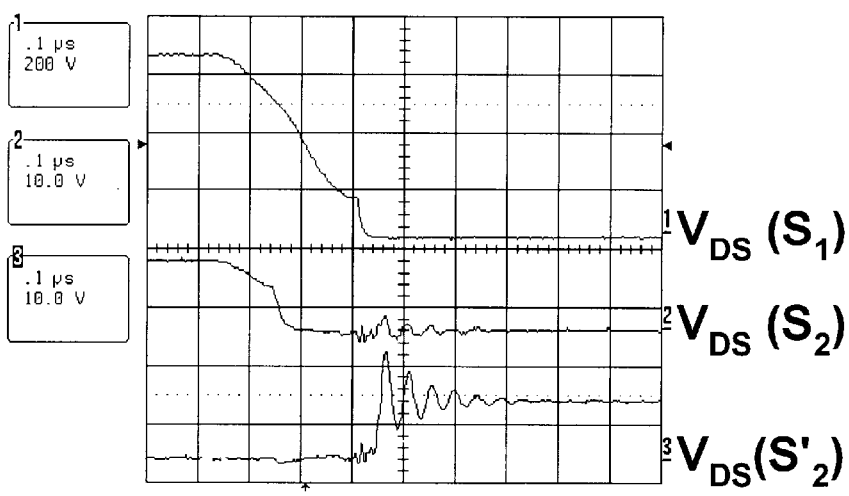
FIG. 62c shows oscilloscope traces of the D' to D transition enlarged.

In the case of the isolation transformer, the resonant inductor is not needed, since the leakage inductance of the isolation transformer is used instead. The soft switching performance is recorded in FIG. 62a, FIG. 62b, and FIG. 62c. The top trace in these figures represents the drain to source voltage of the main switch $S_1$, and the bottom two traces the drain-to-source voltages of the two synchronous rectifier switches $S_2$ and $S'_2$. FIG. 62a displays both of the transition edges (D to D' transition and D' to D transition). FIG. 62b shows the same traces as FIG. 62a but magnified to expose D to D' transition. Finally, FIG. 62c shows the magnified traces for the D' to D transition. As seen from the waveforms, the soft switching with leakage inductance assistance is shown to be very effective in reducing the switching losses and resulting in well defined and fast transition edges.

In addition to its primary function of either elimination or large reduction of the switching losses the soft switching by either of two mechanisms disclosed, has two additional equally important practical benefits:

1. The soft switching transitions of the input high voltage devices result in their spike-free voltage waveforms, hence in a much reduced voltage stress of these devices compared to hard-switching mode. Consequently, lower voltage rated devices could be utilized leading to their lower conduction losses as well, lower temperature rise, and ultimately more reliable operation;
2. The soft transition edges for both D to D' transition and D' to D transition lead to much reduced Electromagnetic Interference (EMI) problems, which are very severe in hard-switching mode due to the high overshoot voltage spikes and ringing in the voltage waveforms. This ultimately eliminates the need for spike filters and heavy EMI filters which would further boost the overall efficiency over their hard-switching counterparts.

Efficiency Measurements

Figure 63:
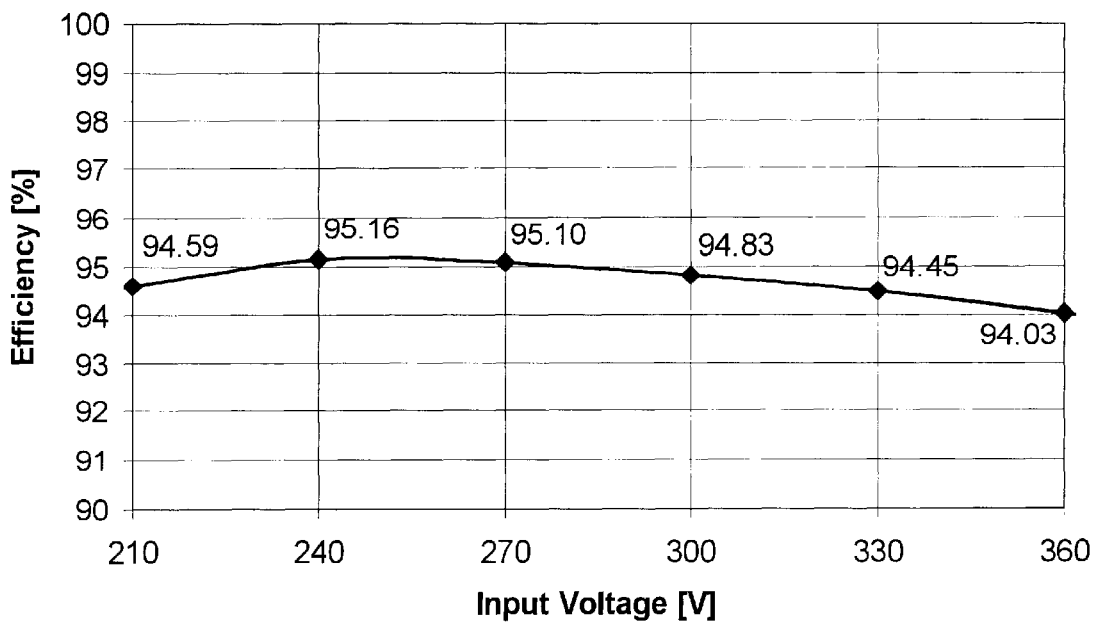
FIG. 63 is a graph of the efficiency of the experimental prototype over an input DC voltage range from 210V to 360V.

The efficiency measurements are taken over the operating range from 210V DC to 360V DC and the obtained data are displayed in FIG. 63. To highlight the performance of the converter itself, the efficiency measurement did not include the drive losses, but only power stage losses. Although the measurements were made for 100 W output power, due to its inherent high DC overload capability, the converter could be operated at 150 W continuously with only a slight drop of approximately 1% in efficiency. The high efficiency of 95% over the wide voltage range is clearly attributed to the novel Isolated DC Transformer switching converter.

Efficiency Optimization

Figure 64:
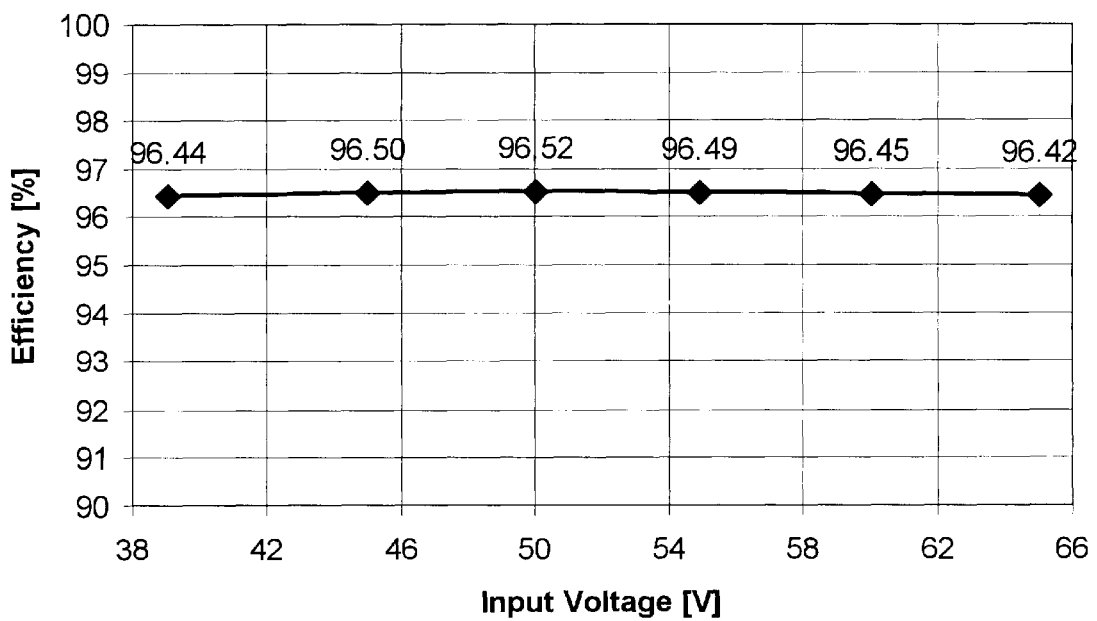
FIG. 64 is a graph of the efficiency of the experimental prototype over an input DC voltage range from 38V to 66V.

The experimental prototype of an isolated 50V to 5V, 100 W converter operated at 150 kHz switching frequency was built with objective to optimize the efficiency. The Isolated DC Transformer switching converter of FIG. 39a was selected, which included in series with the output a small external inductor built on an RM-7 standard core with 0.23 in$^3$ volume. The Isolated DC Transformer was built with 3 turns for secondary of isolation transformer and two turns for output inductor. This choice together with the built-in leakage inductance resulted in zero ripple output inductor current at duty ratio $D_{ZR}$=0.55. The core for DC Transformer was standard UU core 42220 from Magnetic, Inc., with P type ferromagnetic material. Two such UU cores stacked together and fully wound resulted in a total volume of 1.76 in$^3$. The efficiency characteristic over the 38V to 66V input DC voltage range is shown in FIG. 64. Note that the high efficiency of over 96.4% is maintained throughout the operating range.

Conclusion

Even a cursory look at the present state-of-the-art switching DC-to-DC converters, regardless of their power, reveals that the magnetic components dominate both the overall size and weight of the converters, and contribute more than half of the total losses.

Almost all attempts in the past to reduce the size of the magnetic components, and thus overall converter size and weight resulted in an inordinate increase of switching frequency. While increase in switching frequency initially allows a smaller size of magnetic components, the much increased power losses in magnetic components (core losses, skin effect and proximity effect) as well as switching and drive losses of semiconductor devices, lead quickly to diminishing returns: the increased losses demand a larger size and weight in the heat-sinks for heat dissipation to reduce the components temperature rise to acceptable levels. In the end, the overall size of the converter is hardly reduced despite smaller magnetics. Thus, the successful solution must offer both a large reduction in size of the magnetic component and substantial improvement in efficiency at moderate switching frequencies.

The present invention fulfills both of these requirements. The new magnetics of the DC Transformer, in conjunction with the special switching circuitry, enables all of the otherwise separate magnetic components of the converter to be combined onto a single common magnetic core in an unprecedented way. Very detrimental large DC bias currents present in each magnetic winding and hence their corresponding large DC flux are processed in such a way that the total DC flux in the common magnetic core is reduced to zero for any operating duty ratio D. The large air-gap considered heretofore as an inevitable part of switching converter magnetics is eliminated entirely in the new DC Transformer. What seemed unavoidable in the past, namely the detrimental storage of the DC energy in the air-gaps previously always present, was also completely eliminated. The resulting magnetic structure behaves like an AC transformer with no DC flux bias at all, hence the switching converter operates with corresponding size reduction and efficiency improvements. Furthermore, due to automatic DC ampere-turns cancellation, the new DC Transformer has been demonstrated to easily operate with tremendous DC overload capability, which is an order of magnitude larger than the nominal load current.

Another aspect of the present invention is the implementation of special soft-switching operation, which turns ON high voltage switching devices at zero voltage, hence no switching losses, while the low voltage switching devices have negligible switching losses. This, together with operation at moderate switching frequencies, results in the further improvement of the efficiency and reduction in size of the converter as well as in much reduced radiated EMI noise and low stresses on semiconductor switching devices, thus increasing converter reliability.

The new converter with its unique DC Transformer structure and special soft-switching operation has resulted in unexpected and surprising result, namely the substantial reduction of the magnetic components in size and weight with concurrent dramatic efficiency improvement and increase of overload capability as demonstrated by the experimental isolated 50V to 5V, 100 W converter with over 96.5% efficiency. For comparison, the present state-of-the-art converters operate at 90% efficiency and have power losses, which are 200% to 300% higher than the power losses of the present invention.

Finally, the present invention provides additional performance improvements, such as zero-ripple current at the input over a wide operating range, as well as zero ripple current at the output for a limited operating range, which contribute to reduced conducted EMI noise.

Although the particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A switching DC-to-DC converter for providing power from a DC voltage source connected between an input terminal and a common input terminal to a DC load connected between an output terminal and a common output terminal, said switching DC-to-DC converter comprising:

an input inductor winding, a middle inductor winding, and an output inductor winding, placed on a common magnetic core to form a DC Transformer, and each winding having one dot-marked end and an other unmarked end whereby any AC voltage applied to said middle inductor winding induces AC voltages in said input and output inductor windings so that said applied AC voltage and said induced AC voltages are in phase at dot-marked ends of said input, output and middle inductor windings;

said input inductor winding connected at a dot-marked end thereof to said input terminal to form an input winding of said DC Transformer;

said output inductor winding connected at a dot-marked end thereof to said output terminal to form an output winding of said DC Transformer;

said middle inductor winding connected at a dot-marked end thereof to said common input terminal and said common output terminal to form a middle winding of said DC Transformer;

an input capacitor, having one end connected to said unmarked end of said input inductor winding and an other end of said input capacitor connected to said unmarked end of said middle inductor winding;

an input switch with one end connected to said common input terminal and an other end connected to said unmarked end of said input inductor winding;

an output switch with one end connected to said common output terminal and an other end connected to an unmarked end of said output inductor winding;

a complementary output switch, having one end connected to said unmarked end of said output inductor winding and an other end of said complementary output switch connected to said unmarked end of said middle inductor winding;

a branch comprised of a complementary input switch and an auxiliary capacitor, having one end of said complementary input switch connected to one end of said auxiliary capacitor, while an other end of said complementary input switch and an other end of said auxiliary capacitor comprise ends of said branch;

switching means for keeping both said input switch and said output switch closed for a duration of time interval $DT_S$ and, keeping both said complementary input switch and said complementary output switch closed for a duration of complementary time interval $D'T_S$, where D is a duty ratio and D' is a complementary duty ratio within one complete and controlled switch operating cycle $T_S$;

means for connecting said ends of said branch to said switching DC-to-DC converter whereby during said complementary time interval $D'T_S$, current through said branch is equal to the sum of input inductor current flowing into said dot-marked end of said input inductor winding and middle inductor winding and middle inductor current flowing into said dot-marked end of said middle inductor winding reduced by output inductor current flowing out of said dot-marked end of said output inductor winding;

wherein said input switch, said output switch, and said complementary output switch are semiconductor switching devices, capable of conducting the current in one direction while in an ON state, and sustaining voltage in one direction while in an OFF state;

wherein said complementary input switch is a semiconductor current bidirectional switching device, capable of conducting the current in both directions while in an ON state, and sustaining voltage in one direction, while in an OFF state;

wherein said switching devices turn ON and OFF at high switching frequency;

wherein a DC-to-DC voltage conversion ratio of said switching DC-to-DC converter depends linearly on said duty ratio D;

wherein for said duty ratio D from 0 to 1, both a DC current in said input inductor winding and a DC current in said middle inductor winding flow into said dot-marked ends of respective windings, whereas a DC current in said output inductor winding flows out of said dot-marked end of said output inductor winding;

wherein for said duty ratio D in range from 0 to 1, the sum of said DC currents of said input inductor winding and said middle inductor winding is equal to the magnitude of said DC current of said output inductor winding;

wherein said DC Transformer includes an equal number of turns for said input, output, and middle inductors windings and, at said duty ratio D, DC ampere-turns of said input inductor winding and said middle inductor winding are positive and generate positive DC fluxes which add together, while DC ampere-turns of said output inductor winding are negative and generate negative DC flux to result in net zero DC flux in said common magnetic core, and wherein said common magnetic core has no air-gap;

whereby said net zero DC flux in said common magnetic core enables increased inductances of said input, middle, and output inductors and said switching DC-to-DC converter has increased overload capability, and whereby said DC Transformer combines said input inductor winding, said output inductor winding, and said middle inductor winding to obtain efficient DC-to-DC power transfer from said input inductor winding to said output inductor winding with reduced energy storage within said common magnetic core of said DC Transformer, thereby reducing size and weight of said switching DC-to-DC converter by reducing said common magnetic core size and weight while simultaneously increasing efficiency and overload capability of said switching DC-to-DC converter, and providing reduction of electromagnetic interference.

2. A converter as defined in claim 1, further including a separate resonant inductor in series with said input capacitor, wherein said switching means includes electronically controlling operation of said semiconductor switching devices whereby transitions D to D' and D' to D are obtained during each successive switch operating cycle $T_S$ in which said input switch and said complementary input switch are both OFF during said transitions D to D' and D' to D, wherein said transitions D to D' and D' to D are shorter than said time interval $DT_S$ and said complementary time interval $D'T_S$;

wherein said input switch, said output switch, and said complementary output switch are current bidirectional switching devices;

wherein switch timing by said switching means of respective switches is as follows:

said transition D to D' is initiated by turning said input switch OFF and, when voltage on said complementary output switch is reduced to zero, said complementary output switch is by said switching means turned ON at zero voltage for reduced switching losses, and said transition D to D' continues until the voltage on said complementary input switch reduces to zero, at which instant said complementary input switch is also turned ON by said switching means at zero voltage for reduced switching losses while said output switch is simultaneously turned OFF, and said transition D' to D is initiated by turning said complementary input switch OFF and simultaneously turning ON said output switch in order to force resonant discharge of parasitic capacitance across said input switch until fully discharged, at which instant said input switch is turned ON by said switching means at zero voltage and with reduced switching losses while said complementary output switch is simultaneously turned OFF for completing a soft switching cycle, and whereby said soft switching cycle is based on the fundamental property of said converter in which said complementary input switch during said complementary time interval $D'T_S$ carries only AC current necessary to complete said transitions D to D' and D' to D with reduced switching losses and voltage stress on said semiconductor switching devices and increased efficiency of said converter with reduced electromagnetic interference.

3. A converter as defined in claim 2, wherein said DC Transformer has a UU magnetic core;

wherein said input inductor winding and said middle inductor winding are placed side-by-side on one leg of said UU magnetic core;

wherein said output inductor winding is placed on an other leg of said UU magnetic core;

whereby leakage inductance between said input inductor winding and said middle inductor winding caused by deliberate side-by-side positioning of said windings along one leg of said UU magnetic core provides substantially zero-ripple current in said input inductor winding, and whereby leakage inductance between said output inductor winding and said middle inductor winding caused by deliberate positioning of said windings on opposite legs of said UU magnetic core provides reduced ripple current in said output inductor winding.

4. A converter as defined in claim 3, wherein an air-gap is positioned on said other leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding;

whereby, for one fixed duty ratio D, said DC current in said output inductor winding has a substantially zero-ripple current.

5. A converter as defined in claim 4, including an external inductor connected in series with said output inductor winding to reduce a ripple current in said output inductor winding, whereby said separate external inductor has inductance an order of magnitude smaller than inductance of said output inductor winding and has to support an order of magnitude lower AC voltage than said output inductor winding, thereby resulting in an order of magnitude smaller core size and weight than said DC Transformer.

6. A converter as defined in claim 4, including a separate leakage magnetic leg with no windings and an air-gap in a magnetic flux path with said UU magnetic core, wherein said air-gap is adjusted to provide said output inductor winding with substantially zero-ripple current at a fixed duty ratio D, whereby said leakage magnetic leg increases the leakage inductance between said output inductor winding and said input and middle inductor windings, and provides reduction of ripple current in said output inductor winding.

7. A converter as defined in claim 2, wherein said DC Transformer has an EE magnetic core;

wherein said input inductor winding and said middle inductor winding are placed side-by-side on the center leg of said EE magnetic core;

wherein an additional output inductor winding with same number of turns as said output inductor winding is connected in series with said output inductor winding so that their respective AC voltages are in phase at dot-marked ends and add;

wherein said additional output inductor winding is placed on one outer leg of said EE magnetic core and said output inductor winding is placed on an outer leg of said EE magnetic core, and whereby leakage inductance between said input inductor winding and said middle inductor winding caused by deliberate side-by-side positioning of said windings along said center leg of said EE magnetic core provides substantially zero-ripple current in said input inductor winding, and whereby leakage inductances between said additional output inductor winding, said output inductor winding and said middle inductor winding caused by deliberate positioning of said additional output inductor winding and said output inductor winding on said outer legs of said EE magnetic core provide reduced ripple current in said additional output inductor winding and said output inductor winding.

8. A converter as defined in claim 7, wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

wherein said AC voltage dividers matched induced AC voltages on said additional output inductor winding and said output inductor winding to respective applied AC voltages to said additional output inductor winding and said output inductor winding, and whereby, for one fixed duty ratio D, said DC current in said output inductor winding has a substantially zero-ripple current.

9. A converter as defined in claim 1, wherein said switching means includes electronically controlling operation of said semiconductor switching devices whereby transitions D to D' and D' to D are obtained during each successive switch operating cycle $T_S$ in which said input switch and said complementary input switch are both OFF during D to D' and D' to D, wherein said transitions D to D' and D' to D are shorter than said time interval $DT_S$ and said complementary time interval $D'T_S$;

wherein said input switch, said output switch, and said complementary output switch are semiconductor current bidirectional switching devices;

wherein switch timing by said switching means of respective switches is as follows:

said transition D to D' is initiated by turning said input switch OFF and, when voltage on said complementary output switch is reduced to zero, said complementary output switch is by said switching means turned ON at zero voltage for reduced switching losses, and simultaneously said output switch is turned OFF and said transition D to D' continues until the voltage on said complementary input switch reduces to zero, at which instant said complementary input switch is also turned ON by said switching means at zero voltage for reduced switching losses, and said transition D' to D is initiated by turning said complementary input switch OFF, and when voltage on said output switch is reduced to zero, said output switch is turned ON by said switching means at zero voltage for reduced switching losses, and simultaneously said complementary output switch is turned OFF while said input switch is turned ON with reduced voltage across said input switch for reduced switching losses, and said transition D' to D is independent of DC load current, and whereby a soft switching cycle is based on the fundamental property of said converter in which said complementary input switch during said complementary time interval $D'T_S$ carries only AC current necessary to complete said transitions D to D' and D' to D with reduced switching losses and voltage stress on said semiconductor switching devices and increased efficiency of said converter with reduced electromagnetic interference.

10. A converter as defined in claim 9, wherein said DC Transformer has a UU magnetic core;

wherein said input inductor winding and said middle inductor winding are placed side-by-side on one leg of said UU magnetic core;

wherein said output inductor winding is placed on an other leg of said UU magnetic core;

whereby leakage inductance between said input inductor winding and said middle inductor winding caused by deliberate side-by-side positioning of said windings along one leg of said UU magnetic core provides substantially zero-ripple current in said input inductor winding, and whereby leakage inductance between said output inductor winding and said middle inductor winding caused by deliberate positioning of said windings on opposite legs of said UU magnetic core provides reduced ripple current in said output inductor winding.

11. A converter as defined in claim 10, wherein an air-gap is positioned on said other leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding;

whereby, for one fixed duty ratio D, said DC current in said output inductor winding has a substantially zero-ripple current.

12. A converter as defined in claim 11, including an external inductor connected in series with said output inductor winding to reduce a ripple current in said output inductor winding, whereby said external inductor has inductance an order of magnitude smaller than inductance of said output inductor winding and has to support an order of magnitude lower AC voltage than said output inductor winding, thereby resulting in an order of magnitude smaller core size and weight than said DC Transformer.

13. A converter as defined in claim 11, including a separate leakage magnetic leg with no windings and an air-gap in a magnetic flux path with said UU magnetic core, wherein said air-gap is adjusted to provide said output inductor winding current with substantially zero-ripple current at a fixed duty ratio D, whereby said leakage magnetic leg increases the leakage inductance between said output inductor winding and said input and middle inductor windings, and provides reduction of ripple current in said output inductor winding.

14. A converter as defined in claim 9, wherein said DC Transformer has an EE magnetic core;

wherein said input inductor winding and said middle inductor winding are placed side-by-side on the center leg of said EE magnetic core;

wherein an additional output inductor winding with same number of turns as said output inductor winding is connected in series with said output inductor winding so that their respective AC voltages are in phase at dot-marked ends and add;

wherein said additional output inductor winding is placed on one outer leg of said EE magnetic core and said output inductor winding is placed on an other outer leg of said EE magnetic core, and whereby leakage inductance between said input inductor winding and said middle inductor winding caused by deliberate side-by-side positioning of said windings along said center leg of said EE magnetic core provides substantially zero-ripple current in said input inductor winding, and whereby leakage inductances between said additional output inductor winding, said output inductor winding and said middle inductor winding caused by deliberate positioning of said additional output inductor winding and said output inductor winding on said outer legs of said EE magnetic core provide reduced ripple current in said additional output inductor winding and said output inductor winding.

15. A converter as defined in claim 14, wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

wherein said AC voltage dividers match induced AC voltages in said additional output inductor winding and said output inductor winding to respective applied AC voltages to said additional output inductor winding and said output inductor winding, and whereby, for one fixed duty ratio D, said DC current in said output inductor winding has a substantially zero-ripple current.

16. A converter as defined in claim 1, wherein said switching means includes electronically controlling operation of said semiconductor switching devices whereby transitions D to D' and D' to D are obtained during each successive switch operating cycle $T_S$, wherein said transitions D to D' and D' to D are shorter than said time interval $DT_S$ and said complementary time interval $D'T_S$;

wherein said input switch is a semiconductor current bidirectional switching device; and wherein said output switch and said complementary output switch are two-terminal current rectifiers, which are in an ON or OFF state in response to operating state of said converter and conditions caused by electronically controlled switching of said input switch and said complementary input switch, thereby resulting in a hard-switching losses during said transitions D to D' and D' to D, whereby control and drive circuitry for said output switch and said complementary output switch is not needed.

17. A converter as defined in claim 16, wherein said DC Transformer has a UU magnetic core;

wherein said input inductor winding and said middle inductor winding are placed side-by-side on one leg of said UU magnetic core;

wherein said output inductor winding is placed on an other leg of said UU magnetic core;

whereby leakage inductance between said input inductor winding and said middle inductor winding caused by deliberate side-by-side positioning of said windings along one leg of said UU magnetic core provides substantially zero-ripple current in said input inductor winding, and whereby leakage inductance between said output inductor winding and said middle inductor winding caused by deliberate positioning of said windings on opposite legs of said UU magnetic core provides reduced ripple current in said output inductor winding.

18. A converter as defined in claim 17,
wherein an air-gap is positioned on said other leg of said UU magnetic core with said output inductor winding to provide an AC voltage divider between leakage and magnetizing inductances of said output inductor winding, and
wherein said AC voltage divider matches induced AC voltage in said output inductor winding to applied AC voltage to said output inductor winding;
whereby, for one fixed duty ratio D, said DC current in said output inductor winding has a substantially zero-ripple current.

19. A converter as defined in claim 18,
including an external inductor connected in series with said output inductor winding to reduce a ripple current in said output inductor winding
whereby said external inductor has inductance an order of magnitude smaller than inductance of said output inductor winding and has to support an order of magnitude lower AC voltage than said output inductor winding, thereby resulting in an order of magnitude smaller core size and weight than said DC Transformer.

20. A converter as defined in claim 18,
including a separate leakage magnetic leg with no windings and an air-gap in a magnetic flux path with said UU magnetic core, wherein said air-gap is adjusted to provide said output inductor winding with substantially zero-ripple at a fixed duty ratio D,
whereby said leakage magnetic leg increases the leakage inductance between said output inductor winding and said input and middle inductor windings, and provides reduction of ripple current in said output inductor winding.

21. A converter as defined in claim 16,
wherein said DC Transformer has an EE magnetic core;
wherein said input inductor winding and said middle inductor winding are placed side-by-side on the center leg of said EE magnetic core;
wherein an additional output winding with same number of turns as said output inductor winding is connected in series with said output inductor winding so that their respective AC voltages are in phase at dot-marked ends and add;
wherein said additional output inductor winding is placed on one outer leg said EE magnetic core and said output inductor winding is placed on an other outer leg of said EE magnetic core, and
whereby leakage inductance between said input inductor winding and said middle inductor winding caused by deliberate side-by-side positioning of said windings along said center leg of said EE magnetic core provides substantially zero-ripple current in said input inductor winding, and
whereby leakage inductances between said additional output inductor winding, said output inductor winding and said middle inductor winding caused by deliberate positioning of said additional output inductor winding and said output inductor winding on said outer legs of said EE magnetic core provide reduced ripple current in said additional output inductor winding and said output inductor winding.

22. A converter as defined in claim 21,
wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;
wherein said AC voltage dividers match induced AC voltages in on said input inductor, said middle inductor, and said additional output inductor winding and said output inductor winding to respective applied AC voltages to said additional output inductor winding and said output inductor winding, and
whereby, for one fixed duty ratio D, said DC current in said output inductor winding has a substantially zero-ripple current.

23. An isolated switching DC-to-DC converter for providing power from a DC voltage source connected between an input terminal and a common input terminal to a DC load connected between an output terminal and a common output terminal, said isolated switching DC-to-DC converter comprising:
an input inductor winding, an isolation transformer with primary and secondary windings, and an output inductor winding, placed on a common magnetic core to form an Isolated DC Transformer, and each winding having one dot-marked end and an other unmarked end whereby an AC voltage applied to said primary winding of said isolation transformer induces AC voltages in said secondary winding of said isolation transformer and said input and output inductor windings so that said applied AC voltage and said induced AC voltages are in phase at said dot-marked ends of said input inductor winding, said output inductor winding and said primary and secondary windings of said isolation transformer;
said input inductor winding connected at a dot-marked end thereof to said input terminal to form an input winding of said Isolated DC Transformer;
said output inductor winding connected at a dot-marked end thereof to said output terminal to form an output winding of said Isolated DC Transformer;
said primary winding of said isolation transformer connected at a dot-marked end thereof to said common input terminal to enable galvanic isolation in said Isolated DC Transformer;
said secondary winding of said isolation transformer connected at a dot-marked end thereof to said common output terminal to enable galvanic isolation in said Isolated DC Transformer;
an input capacitor connected between an unmarked end of said input inductor winding and an unmarked end of said primary winding of said isolation transformer;
an input switch with one end connected to said common input terminal and an other end connected to said unmarked end of said input inductor winding;
an output switch with one end connected to said common output terminal and an other end connected to an unmarked end of said output inductor winding;
a complementary output switch, having one end connected to said unmarked end of said output inductor winding and an other end of said complementary output switch connected to an unmarked end of said secondary winding of said isolation transformer;
a branch comprised of a complementary input switch and an auxiliary capacitor connected in series, wherein one end of said branch is connected to dot-marked end of said primary winding of said isolation transformer and an other end of said branch is connected to said unmarked end of said input inductor winding;

switching means for keeping both said input switch and said output switch closed for a duration of time interval $DT_S$ and, keeping both said complementary input switch and said complementary output switch closed for a duration of complementary time interval $D'T_S$, where D is a duty ratio and D' is a complementary duty ratio within one complete and controlled switch operating cycle $T_S$;

wherein said input switch, said output switch, and said complementary output switch are semiconductor switching devices, capable of conducting the current in one direction while in an ON state, and sustaining voltage in one direction while in an OFF state;

wherein said complementary input switch is a semiconductor current bidirectional switching device, capable of conducting the current in both directions while in an ON state, and sustaining voltage in one direction, while in an OFF state;

wherein said semiconductor devices turn ON and OFF at high switching frequency;

wherein said primary winding and said secondary winding are tightly coupled for reduced leakage between said primary winding and said secondary winding;

wherein a DC-to-DC voltage conversion ratio of said converter depends linearly on said duty ratio D;

wherein turns ratio of said secondary winding to said primary winding of said isolation transformer provides additional control of DC-to-DC voltage conversion ratio of said isolated switching DC-to-DC converter;

wherein for said duty ratio D from 0 to 1, a DC current in said input inductor winding and DC currents in said primary and secondary windings flow into said dot-marked ends of their respective windings, whereas a DC current in said output inductor winding flows out of said dot-marked end of said output inductor winding;

wherein said input inductor winding has the same number of turns as said primary winding of said isolation transformer, and said output inductor winding has the same number of turns as said secondary winding of said isolation transformer, whereby at said duty ratio D, net zero DC flux is obtained in said common magnetic core;

wherein said common magnetic core has no air-gap, whereby said net zero DC flux in said common magnetic core enables increased inductances of said input and output inductors and said isolation transformer thereby providing said isolated switching DC-to-DC converter with increased overload capability, and whereby said Isolated DC Transformer combines said input inductor winding, said output inductor winding, and said primary and secondary windings of said isolation transformer to provide a galvanic isolation between said input DC voltage source and said DC load and efficient DC-to-DC power transfer from said input inductor winding to said output inductor winding with reduced energy storage within said common magnetic core of said Isolated DC Transformer, thereby reducing size and weight of said isolated switching DC-to-DC converter by reducing said common magnetic core size and weight while simultaneously increasing efficiency and overload capability of said isolated switching DC-to-DC converter, and providing reduction of electromagnetic interference.

24. A converter as defined in claim 23, further including a separate resonant inductor in series with said input capacitor, wherein said switching means includes electronically controlling operation of said semiconductor switching devices whereby transitions D to D' and D' to D are obtained during each successive switch operating cycle $T_S$ in which said input switch and said complementary input switch are both OFF during said transitions D to D' and D' to D, wherein said transitions D to D' and D' to D are shorter than said time interval $DT_S$ and said complementary time interval $D'T_S$;

wherein said input switch, said output switch, and said complementary output switch are current bidirectional switching devices;

wherein switch timing by said switching means of respective switches is as follows:

said transition D to D' is initiated by turning said input switch OFF and, when voltage on said complementary output switch is reduced to zero, said complementary output switch is by said switching means turned ON at zero voltage for reduced switching losses, and said transition D to D' continues until the voltage on said complementary input switch reduces to zero, at which instant said complementary input switch is also turned ON by said switching means at zero voltage for reduced switching losses while said output switch is simultaneously turned OFF, and said transition D' to D is initiated by turning said complementary input switch OFF and simultaneously turning ON said output switch in order to force resonant discharge of parasitic capacitance across said input switch until fully discharged, at which instant said input switch is turned ON by said switching means at zero voltage and with reduced switching losses while said complementary output switch is simultaneously turned OFF for accomplishing a soft switching cycle, and whereby said soft switching cycle is based on the fundamental property of said converter in which said complementary input switch during said complementary time interval $D'T_S$ carries only AC current necessary to complete said transitions D to D' and D' to D with reduced switching losses and voltage stress on said semiconductor switching devices and increased efficiency of said converter with reduced electromagnetic interference.

25. A converter as defined in claim 24, wherein said Isolated DC Transformer has a UU magnetic core;

wherein said input inductor winding and windings of said isolation transformer are placed side-by-side on one leg of said UU magnetic core;

wherein said output inductor winding is placed on an other leg of said UU magnetic core;

whereby leakage inductance between said input inductor winding and said isolation transformer windings caused by deliberate side-by-side positioning of said windings along one leg of UU magnetic core provides substantially zero-ripple current in said input inductor winding, and whereby leakage inductance between said output inductor winding and said isolation transformer windings caused by deliberate positioning of said windings on opposite legs of said UU magnetic core provides reduced ripple current in said output inductor winding.

26. A converter as defined in claim 25, wherein an air-gap is positioned on said other leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding;

whereby, for one fixed duty ratio D, said DC current in said output inductor winding has a substantially zero-ripple current.

27. A converter as defined in claim 26, including an external inductor connected in series with said output inductor winding to reduce a ripple current in said output inductor winding, whereby said external inductor has inductance an order of magnitude smaller than inductance of said output inductor winding and has to support an order of magnitude lower AC voltage than said output inductor winding, thereby resulting in an order of magnitude smaller core size and weight than said Isolated DC Transformer.

28. A converter as defined in claim 26, including a separate leakage magnetic leg with no windings and an air-gap in a magnetic flux path with said UU magnetic core, wherein said air-gap is adjusted to provide said output inductor winding with substantially zero-ripple at a fixed duty ratio D, whereby said leakage magnetic leg increases the leakage inductance between said output inductor winding, said input inductor winding, and said isolation transformer windings, and provides reduction of ripple current in said output inductor winding.

29. A converter as defined in claim 24, wherein said Isolated DC Transformer has an EE magnetic core;

wherein said input inductor winding and winding of said isolation transformer are placed side-by-side on the center leg of said EE magnetic core;

wherein an additional output inductor winding with same number of turns as said output inductor winding is connected in series with said output inductor winding so that their respective AC voltages are in phase at dot-marked ends and add;

wherein said additional output inductor winding is placed on one outer leg of said EE magnetic core and said output inductor winding is placed on an other outer leg of said EE magnetic core, and whereby leakage inductance between said input inductor winding and said isolation transformer windings caused by deliberate side-by-side positioning of said windings along said center leg of said EE magnetic core provides substantially zero-ripple current in said input inductor winding, and whereby leakage inductances between said additional output winding, said output inductor winding and said isolation transformer windings caused by deliberate positioning of said additional output inductor winding and said output inductor winding on said outer legs of said EE magnetic core provide reduced ripple current in said additional output inductor winding and said output inductor winding.

30. A converter as defined in claim 29, wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

wherein said AC voltage dividers match induced AC voltages on said additional output inductor winding and said output inductor winding to respective applied AC voltages to said additional output inductor winding and said output inductor winding, and whereby, for one fixed duty ratio D, said DC current in said output inductor winding has a substantially zero-ripple current.

31. A converter as defined in claim 23, wherein said switching means includes electronically controlling operation of said semiconductor switching devices whereby transitions D to D' and D' to D are obtained during each successive switch operating cycle $T_S$ in which said input switch and said complementary input switch are both OFF during said transitions D to D' and D' to D, wherein said transitions D to D' and D' to D are shorter than said time interval $DT_S$ and said complementary time interval $D'T_S$;

wherein said input switch, said output switch, and said complementary output switch are semiconductor current bidirectional switching devices;

wherein switch timing by said switching means of respective switches is as follows:

said transition D to D' is initiated by turning said input switch OFF and, when voltage on said complementary output switch is reduced to zero, said complementary output switch is by said switching means turned ON at zero voltage for reduced switching losses, and simultaneously said output switch is turned OFF and said transition D to D' continues until the voltage on said complementary input switch reduces to zero, at which instant said complementary input switch is also turned ON by said switching means at zero voltage for reduced switching losses, and said transition D' to D is initiated by turning said complementary input switch OFF, and when voltage on said output switch is reduced to zero, said output switch is turned ON by said switching means at zero voltage for reduced switching losses, and simultaneously said complementary output switch is turned OFF while said input switch is turned ON with reduced voltage across said input switch for reduced switching losses, and said transition D' to D is independent of DC load current, and whereby a soft switching cycle is based on the fundamental property of said converter in which said complementary input switch during said complementary time interval $D'T_S$ carries only AC current necessary to complete said transitions D to D' and D' to D with reduced switching losses and voltage stress on said semiconductor switching devices and increased efficiency of said converter with reduced electromagnetic interference.

32. A converter as defined in claim 31, wherein said Isolated DC Transformer has a UU magnetic core;

wherein said input inductor winding and windings of said isolation transformer are placed side-by-side on one leg of said UU magnetic core;

wherein said output inductor is placed on an other leg of said UU magnetic core;

whereby leakage inductance between said input inductor winding and said isolation transformer windings caused by deliberate side-by-side positioning of said windings along one leg of said UU magnetic core provides substantially zero-ripple current in said input inductor winding, and whereby leakage inductance between said output inductor winding and said isolation transformer windings caused by deliberate positioning of said windings on opposite legs of said UU magnetic core provides reduced ripple current in said output inductor winding.

33. A converter as defined in claim 32,
wherein an air-gap is positioned on said leg of said UU magnetic core with said output inductor winding to provide an AC voltage divider between leakage and magnetizing inductances of said output inductor winding, and wherein said AC voltage divider matches induced AC voltage in said output inductor winding to applied AC voltage to said output inductor winding;

whereby, for one fixed duty ratio D, said DC current in said output inductor winding has a substantially zero-ripple current.

34. A converter as defined in claim 33,
including an external inductor connected in series with said output inductor winding to reduce a ripple current in said output inductor winding, whereby said external inductor has inductance an order of magnitude smaller than inductance of said output inductor winding and has to support an order of magnitude lower AC voltage than said output inductor winding, thereby resulting in an order of magnitude smaller core size and weight than said Isolated DC Transformer.

35. A converter as defined in claim 33,
including a separate leakage magnetic leg with no windings and an air-gap in a magnetic flux path with said UU magnetic core, wherein said air-gap is adjusted to provide said output inductor winding current with substantially zero-ripple at a fixed duty ratio D, whereby said leakage magnetic leg increases the leakage inductance between said output inductor winding, said input inductor winding, and said isolation transformer windings, and provides reduction of ripple current in said output inductor winding.

36. A converter as defined in claim 31,
wherein said Isolated DC Transformer has an EE magnetic core;

wherein said input inductor winding and windings of said isolation transformer are placed side-by-side on the center leg of said EE magnetic core;

wherein an additional output inductor winding with same number of turns as said output inductor winding is connected in series with said output inductor winding so that their respective AC voltages are in phase at dot-marked ends and add;

wherein said additional output inductor winding is placed on one outer leg of said EE magnetic core and said output inductor winding is placed on an other outer leg of said EE magnetic core, and whereby leakage inductance between said input inductor winding and said isolation transformer windings caused by deliberate side-by-side positioning of said windings along said center leg of said EE magnetic core provides substantially zero-ripple current in said input inductor winding, and whereby leakage inductances between said additional output inductor winding, said output inductor winding and said isolation transformer windings caused by deliberate positioning of said additional output inductor winding and said output inductor winding on said outer legs of said EE magnetic core provide reduced ripple current in said additional output inductor winding and said output inductor winding.

37. A converter as defined in claim 36,
wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

wherein said AC voltage dividers match induced AC voltages on said additional output inductor winding and said output inductor winding to respective applied AC voltages to said additional output inductor winding and said output inductor winding, and whereby, for one fixed duty ratio D, said DC current in said output inductor winding has a substantially zero-ripple current.

38. A converter as defined in claim 23,
wherein said switching means includes electronically controlling operation of said semiconductor switching devices whereby transitions D to D' and D' to D are obtained during each successive switch operating cycle $T_S$, wherein said transitions D to D' and D' to D are shorter than said time interval $DT_S$ and said complementary time interval $D'T_S$;

wherein said input switch is a semiconductor current bidirectional switching device;

wherein said output switch and said complementary output switch are two-terminal current rectifiers, which are in an ON or OFF state in response to operating state of said converter and conditions caused by electronically controlled switching of said input switch and said complementary input switch, thereby resulting in a hard-switching and associated switching losses during said transitions D to D' and D' to D, whereby control and drive circuitry for said output switch and said complementary output switch is not needed.

39. A converter as defined in claim 38,
wherein said Isolated DC Transformer has a UU magnetic core;

wherein said input inductor winding and windings of said isolation transformer are placed side-by-side on one leg of said UU magnetic core;

wherein said output inductor winding is placed on an other leg of said UU magnetic core;

whereby leakage inductance between said input inductor winding and said isolation transformer windings caused by deliberate side-by-side positioning of said windings along one leg of said UU magnetic core provides substantially zero-ripple current in said input inductor winding, and whereby leakage inductance between said output inductor winding and said isolation transformer windings caused by deliberate positioning of said windings on opposite legs of said UU magnetic core provides reduced ripple current in said output inductor winding.

40. A converter as defined in claim 39,
wherein an air-gap is positioned on said other leg of said UU magnetic core with said output inductor winding to provide an AC voltage divider between leakage and magnetizing inductances of said output inductor winding, and wherein said AC voltage divider of AC voltages on said matches induced AC voltage in said output inductor winding to applied AC voltage to said output inductor winding;

whereby, for one fixed duty ratio D, said DC current in said output inductor winding has a substantially zero-ripple current.

41. A converter as defined in claim 40, including an external inductor connected in series with said output inductor winding to reduce a ripple current in said output inductor winding, whereby said external inductor has inductance an order of magnitude smaller than inductance of said output inductor winding and has to support an order of magnitude lower AC voltage than said output inductor winding, thereby resulting in an order of magnitude smaller core size and weight than said Isolated DC Transformer.

42. A converter as defined in claim 40, including a separate leakage magnetic leg with no windings and an air-gap in a magnetic flux path with said UU magnetic core, wherein said air-gap is adjusted to provide said output inductor winding current with a substantially zero-ripple at a fixed duty ratio D, whereby said leakage magnetic leg the leakage inductance between said output inductor winding, said input inductor winding, and said isolation transformer windings, and provides reduction of ripple current in said output inductor winding.

43. A converter as defined in claim 38, wherein said Isolated DC Transformer has an EE magnetic core;

wherein said input inductor winding and windings of said isolation transformer are placed side-by-side on the center leg of said EE magnetic core;

wherein an additional output inductor winding with same number of turns as said output inductor winding is connected in series with said output inductor winding so their respective AC voltages are in phase at dot-marked ends and add;

wherein said additional output inductor winding is placed on one outer leg of said EE magnetic core and said output inductor winding is placed on an other leg of said EE magnetic core, and whereby leakage inductance between said input inductor winding and said isolation transformer windings caused by deliberate side-by-side positioning of said windings along said center leg of said EE magnetic core provides substantially zero-ripple current in said input inductor winding, and whereby leakage inductances between said additional output inductor winding, said output inductor winding and said isolation transformer windings caused by deliberate positioning of said additional output inductor winding and said output inductor winding on said outer legs of said EE magnetic core provide reduced ripple current in said additional output inductor winding and said output inductor winding.

44. A converter as defined in claim 43, wherein air-gaps are positioned on each of said outer legs of said EE magnetic core with said additional output inductor winding an said output inductor winding to provide AC voltage dividers between leakage and magnetizing inductances of said additional output inductor winding and said output inductor winding;

wherein said AC voltage dividers match induced AC voltages on said additional output inductor winding and said output inductor winding to respective applied AC voltages to said additional output inductor winding and said output inductor winding, and whereby, for one fixed duty ratio D, said DC current in said output inductor winding has a substantially zero-ripple current.

45. A converter as defined in claim 23, wherein said input switch, said complementary input switch, said output switch and said complementary output switch are MOSFET devices;

wherein a gate of said output MOSFET device is connected to a drain of said complementary output MOSFET device, and a drain of said output MOSFET device is connected to a gate of said complementary output MOSFET device, wherein control and drive circuitry for said input MOSFET device and said complementary input MOSFET device said common input terminal;

whereby said secondary winding provides a drive voltage for both said output MOSFET device and said complementary output MOSFET device, enabling self-driven operation of both said output MOSFET device and said complementary output MOSFET device with simplified control and drive circuitry isolated from said input DC voltage source; and whereby a signal processing circuitry required to transfer proper drive signals to said output MOSFET device and said complementary output MOSFET device through said galvanic isolation between said input DC voltage source and said DC load is not needed.

46. A converter as defined in claim 23, further including two drive windings on a secondary side of said isolation transformer, connected in series and with a junction therebetween connected to said common output terminal;

wherein said input switch, said complementary input switch, said output switch and said complementary output switch are MOSFET devices;

wherein a dot-marked end of one drive winding is connected to a gate of said output MOSFET device;

wherein an unmarked end of other drive winding is connected to a gate of said complementary output MOSFET device;

wherein said two drive windings provide out-of-phase drive voltages to both said output MOSFET device and said complementary output MOSFET device for their self-driven operation with a control and drive circuitry galvanically isolated from said input DC voltage source;

wherein said control and drive circuitry for said input MOSFET device and said complementary input MOSFET device use said common input terminal, whereby a signal processing circuitry required to transfer proper drive signals to said output MOSFET device and said complementary output MOSFET device through said galvanic isolation between said input DC voltage source and said DC load is not needed.

47. A converter as defined in claim 23, further including additional secondary windings and separate output circuits for separate DC load outputs;

wherein an multiple-output isolation transformer includes said additional secondary windings for said additional DC load outputs;

wherein each of said separate output circuits is connected between said additional secondary windings of said multiple-output isolation transformer and said DC load outputs;

wherein said primary winding, said secondary winding, and said additional secondary windings of said multiple-output isolation transformer are placed on said common magnetic core with said input inductor winding, said output inductor winding, and additional output inductors' windings of said separate output circuits for said DC load outputs to form a multiple-output Isolated DC Transformer;

wherein said switching means keeps said input switch, said output switch, and each output switch of said separate output circuits closed for a duration of time interval $DT_S$ and keeps said complementary input switch, said complementary output switch, and each complementary output switch of said separate output circuits closed for a duration of complementary time interval $D'T_S$, where D is a duty ratio and D' is a complementary duty ratio within one complete and controlled switch operating cycle $T_S$;

wherein said primary winding, said secondary winding, and said additional secondary windings on said common magnetic core are tightly coupled for reduced leakage between said primary winding, said secondary winding, and said additional secondary windings;

wherein turns ratios of said additional secondary windings to said primary winding of said multiple-output isolation transformer provide additional control of DC-to-DC voltage conversion ratio of said converter for each said additional DC load respectively;

wherein said additional output inductors' windings for each said additional DC load have the same number of turns as respective said additional secondary windings of said multiple-output isolation transformer, whereby at said duty ratio D, zero DC flux is obtained in said common magnetic core;

wherein said common magnetic core has no air-gap, whereby said zero DC flux in said common magnetic core enables increased inductances of said input and output inductors and said multiple-output isolation transformer, thereby providing said converter with increased overload capability, and whereby said multiple-output Isolated DC Transformer combines said input inductor winding, said output inductor winding, and said primary and secondary windings of said multiple-output isolation transformer to provide galvanic isolation between said input DC voltage source, said DC load, and said additional DC loads and in addition an efficient DC-to-DC power transfer from said input inductor winding to said output inductor winding and said additional output inductors windings with reduced energy storage within said common magnetic core of said multiple-output Isolated DC Transformer, thereby reducing size and weight of said converter by reducing said common magnetic core size and weight while simultaneously increasing efficiency and converter overload capability, and providing reduction of electromagnetic interference.

48. A converter as defined in claim 1,
wherein said middle inductor comprises an autotransformer;
wherein a dot-marked end of a winding of said autotransformer is connected to said common input terminal and said common output terminal, an unmarked end of said winding of said autotransformer is connected to said other end of said complementary output switch, and a tapped end of said winding of said autotransformer is connected to said other end of said input capacitor;

wherein said winding of said autotransformer is placed on said common magnetic core with said input inductor winding and said output inductor winding to form a DC Transformer;

wherein a DC-to-DC voltage conversion ratio of said converter depends linearly on said duty ratio D;

wherein ratio of number of turns of said winding of said autotransformer to number of turns between dot-marked end and tapped end of said winding of said autotransformer provides additional control of DC-to-DC voltage conversion ratio of said converter;

wherein said input inductor winding has the same number of turns as said number of turns between dot-marked end and tapped end of said winding of said autotransformer, and said output inductor winding has the same number of turns as said winding of said autotransformer, whereby for said duty ratio D in range from 0 to 1, substantially zero DC flux is obtained in said common magnetic core;

wherein said common magnetic core has no air-gap, whereby said substantially zero DC flux in said common magnetic core enables increased inductances of said input and output inductors and said autotransformer thereby providing said converter with increased overload capability, and whereby said DC Transformer combines said input inductor winding, said output inductor winding, and said winding of said autotransformer to provide increased conversion ratio between said input DC voltage source and said DC load and efficient DC-to-DC power transfer from said input inductor winding to said output inductor winding with reduced energy storage within said common magnetic core of said DC Transformer, thereby reducing size and weight of said switching DC-to-DC converter by reducing said common magnetic core size and weight while simultaneously increasing efficiency and converter overload capability, and providing reduction of electromagnetic interference.

49. A converter as defined in claim 1,
wherein one end of said input capacitor is connected to said common input terminal and an other end of said input capacitor is connected to said common output terminal;
wherein said dot-marked end of said middle inductor winding is connected to said common output terminal, and
wherein said unmarked end of said middle inductor winding is connected to said unmarked end of said input inductor winding.

50. A converter as defined in claim 23,
wherein one end of said branch is connected to said dot-marked end of said primary winding of said isolation transformer and an other end of said branch is connected to said unmarked end of said primary winding of said isolation transformer.

51. A converter as defined in claim 23,
wherein one end of said branch is connected to said dot-marked end of said input inductor winding and an other end of said branch is connected to said unmarked end of said input inductor winding.

52. A converter as defined in claim 23,
wherein one end of said branch is connected to said dot-marked end of said input inductor winding and an other end of said branch is connected to said unmarked end of said primary winding of said isolation transformer.

53. A converter as defined in claim 23,
wherein one end of said input capacitor is connected to said common input terminal;
wherein said dot-marked end of said primary winding of said isolation transformer is connected to an other end of said input capacitor;
wherein said unmarked end of said primary winding of said isolation transformer is connected to said unmarked end of said input inductor winding, and
wherein one end of said branch is connected to said dot-marked end of said primary winding of said isolation transformer and an other end of said branch is connected to said unmarked end of said primary winding of said isolation transformer.

54. A converter as defined in claim 23,
wherein one end of said branch is connected to said unmarked end of said secondary winding of said isolation transformer and an other end of said branch is connected to said output terminal.

55. A converter as defined in claim 23,
wherein one end of said complementary output switch is connected to said common terminal;
wherein said dot-marked end of said secondary winding of said isolation transformer is connected to an other end of said complementary output switch;
wherein said unmarked end of said secondary winding of said isolation transformer is connected to an other end of said unmarked end of said output inductor winding, and
wherein one end of said branch is connected to said unmarked end of said secondary winding of said isolation transformer and an other end of said branch is connected to said dot-marked end of said secondary winding of said isolation transformer.

56. A converter as defined in claim 23, further comprising means for connecting said ends of said branch to said converter preserving galvanic isolation and having AC current through said branch during said complementary time interval D'T$_S$;
whereby substantially zero DC flux in said common magnetic core provides said converter with increased overload capability, and
whereby said Isolated DC Transformer combines said input inductor winding, said output inductor winding, and said primary and secondary windings of said isolation transformer to provide a galvanic isolation between said input DC voltage source and said DC load and efficient DC-to-DC power transfer from said input inductor winding to said output inductor winding with reduced DC energy storage within said common magnetic core of said Isolated DC Transformer, thereby reducing size and weight of said converter by reducing said common magnetic core size and weight while simultaneously increasing efficiency and converter overload capability, and providing reduction of electromagnetic interference.

57. A converter as defined in claim 56, further including a leakage inductance (L$_r$) of said isolation transformer effectively connected in series with said input capacitor,
wherein said input switch, said complementary input switch and said output switch are controllable CBS (Current Bidirectional Switch) switches, each said controllable CBS switch having an anti-parallel diode and a capacitance in parallel;
wherein said complementary output switch is a current rectifier switch having a capacitance in parallel;
wherein said switching means includes electronically operation of said controllable CBS switches whereby transition D to D' and transition D' to D are obtained during each successive switching cycle, wherein said transitions D to D' and D' to D are shorter than said switching cycle;
wherein a positive current in said branch is provided during said transition D to D' and a negative current is provided in said branch during said transition D' to D;
wherein switch sequence and timing for said switching means is as follows:
said transition D to D' is initiated by turning said input switch OFF and, when voltage on said current rectifier switch is reduced to substantialy zero, said current rectified switch is turned ON at substantially zero voltage for substantially zero switching losses, and said transition D to D' continues until the voltage on said complementary input switch reduces to substantially zero, at which instant said complementary input switch is turned ON by said switching means at substantially zero voltage for substantially zero switching losses while said output switch is simultaneously turned OFF by said switching means, and
said transition D' to D is initiated by turning OFF said complementary input switch, and by turning ON said output switch before said anti-parallel diode of said output switch starts to conduct a resonant circuit comprising said leakage inductance (L$_r$) and equivalent capacitance (C$_r$) is provided creating substantially lossless exchange of charge among said capacitances of said controllable CBS switches, and when voltage across said input switch is at minimum, said input switch is turned ON by switching means with reduced switching losses and said complementary output switch ceases conduction to complete said transition D' to D.

58. A converter as defined in claim 57 wherein said complementary output switch is a controllable CBS switch having an anti-parallel diode and a capacitance in parallel, said complementary output controllable CBS switch being turned ON and OFF as a synchronous rectifier to reduce conduction losses by bypassing said anti-parallel diode of said complementary output controllable CBS switch.

59. A converter as defined in claim 58,
wherein said Isolated DC Transformer has a UU magnetic core;
wherein said input inductor winding and windings of said isolation transformed are integrated side-by-side on one leg of said UU magnetic core;
wherein said output inductor winding is integrated on an other leg of said UU magnetic core;
whereby leakage inductance between said input inductor winding and said isolation transformer windings caused by deliberate side-by-side positioning of said windings along one leg of said UU magnetic core reduces current ripple in said input inductor winding substantially to zero, and
whereby leakage inductance between said output inductor winding and said isolation transformer windings caused by deliberate positioning of said windings on opposite legs of said UU magnetic core reduces current ripple in said output inductor winding.

60. A converter as defined in claim 59,
wherein an air-gap is positioned on said other leg of said UU magnetic core with said output inductor winding to provide an AC voltage divider between leakage and magnetizing inductances of said output inductor winding, and whereby, for one fixed duty ratio D, said DC current in said output inductor winding has a substantially zero-ripple current.

61. A converter as defined in claim 60, including an external inductor connected in series with said output inductor winding to reduce current ripple in said output inductor winding, and whereby said external inductor has inductance an order of magnitude smaller than inductance of said output inductor winding and has to support an order of magnitude lower AC voltage than said output inductor winding, thereby resulting in an order of magnitude smaller core size and weight than said Isolated DC Transformer.

62. A converter as defined in claim 60, including a separate leakage magnetic leg with no windings and an air-gap in magnetic flux path of said separate leakage magnetic leg, wherein said air-gap is adjusted to provide said output inductor winding with a substantially zero-ripple current at a fixed duty ratio D, whereby said leakage magnetic leg increases the leakage inductance between said output inductor winding, said input inductor winding, and said isolation transformer windings, and provides reduction of current ripple in said output inductor winding.

63. A converter as defined in claim 58, wherein said Isolated DC Transformer has an EE magnetic core;

wherein said input inductor winding and windings of said isolation transformer are integrated side-by-side on the center leg of said EE magnetic core;

wherein an additional output inductor winding with same number of turns as said output inductor winding is connected in series with said output inductor winding so that their respective AC voltages are in phase at dot-marked ends and add;

wherein said additional output inductor winding is placed on one outer leg of said EE magnetic core and said output inductor winding is placed on an other outer leg of said EE magnetic core, and whereby leakage inductance between said input inductor winding and said isolation transformer windings caused by deliberate side-by-side positioning of said windings along said center leg of said EE magnetic core reduces current ripple in said input inductor winding to substantially zero, and whereby leakage inductances between said additional output inductor winding, said output inductor winding and said isolation transformer windings caused by deliberate positioning of said additional output inductor winding and said output inductor windings on said outer legs of said EE magnetic core provide reduced ripple current in said additional output inductor winding and said output inductor winding.

64. A converter as defined in claim 63, wherein air-gaps are positioned on each of said outer legs of said EE magnetic core with said additional output inductor winding and said output inductor winding to provide AC voltage dividers between leakage and magnetizing inductances of said additional output inductor winding and said output inductor winding;

whereby, for one fixed duty ratio D, said DC current in said output inductor winding has a substantially zero-ripple current.

65. A converter as defined in claim 58, wherein said isolation transformer is a multiple output isolation transformer integrated on said common magnetic core to form a Multiple-output Isolated DC Transformer;

wherein said means for connecting said ends of said branch to said converter preserves galvanic isolation of said multiple-output isolcation transformer whereby during said complementary time interval $D'T_S$, current through said branch is AC current;

wherein turns ratios of said secondary windings to said primary winding of said multiple-output isolation transformer provide additional control of DC-to-DC voltage conversion ration of said converter;

wherein each output inductor winding for each of multiple DC loads has the same number of turns as respective secondary winding of said multiple-output isolation transformer, whereby substantially zero DC flux is obtained in said common magnetic core for said duty ratio D in range from 0 to 1;

whereby said substantially zero DC flux in said common magnetic core provides said converter with increased current overload capability.

66. A method for power conversion comprising:

providing an input switch, a complementary input switch, and an output switch being controllable CBS (Current Bidirectional Switch) switches, each side controllable CBS switch having an anti-parallel diode and a capacitance in parallel;

providing a complementary output switch being a current recifier having a capacitance in parallel;

controlling an ON-time and an OFF-time of said controllable CBS switches regulating an output load voltage, each said controllable CBS switch being turned ON and OFF during transition D to D' and transition D' to D which are shorter than said ON-time and OFF-time;

providing a positive current in a branch with said complementary input switch during said transition D to D' and a negative current in said branch with said complementary input switch during said transition D' to D;

controlling sequence and timing of turn-ON and turn-OFF signals for said controllable CBS switches during said transition D to D', recycling charge among said capacitances of said switches and turning ON said complementary input switch substantially losslessly at substantially zero voltage;

initiating said transition D' to D by turning OFF said complementary input switch;

providing a resonant circuit during said transition D' to D interval by turning ON said output switch before said anti-parallel diode of said output switch starts to conduct;

exchanging charge between said capacitances of said controllable CBS switches substantially losslessly facilitated by said negative current and a voltage across said input switch present when said output switch is turned ON;

turning ON said input switch when voltage across said input switch is at minimum reducing switching losses;

integrating three inductor windings on said common magnetic core into a DC Transformer;

subjecting said three inductor windings to AC voltages in phase at dot-marked ends of said inductor windings;

subjecting two of said three inductor windings to DC currents flowing into said dot-marked ends thereof, thereby to generate a DC flux in one direction in said common magnetic core;

subjecting a third of said three inductor windings to DC current flowing out of said dot-marked end thereof, thereby to generate a DC flux in opposite direction in said common magnetic core, resulting in subtraction of said DC fluxes in said common magnetic core;

providing a selected number of turns for each of said three inductor windings to produce equal volts-per-turn and zero total DC Ampere turns resulting in substantially zero total DC flux in said common magnetic core.

67. A method for power conversion as defined in claim 66 wherein said complementary output switch is a controllable CBS switch having an anti-parallel diode and a capacitance in parallel, said complementary output controllable semiconductor CBS switch being turned ON and OFF as a synchronous recifier to reduce conduction losses by bypassing said anti-parallel diode.

68. A method as defined in claim 67 wherein said common magnetic core is a UU magnetic core further comprising:

integrating said two inductor windings on one leg of said UU magnetic core side-by-side to provide higher leakage inductance between said two inductor windings, reducing ripple current in one of said two inductor windings substantially to zero;

integrating said third inductor winding on an other leg of said UU magnetic core to provide higher leakage inductance between said third inductor winding and said two inductor windings reducing ripple current in said third inductor winding.

69. A method as defined in claim 68 further including an air-gap in said other leg of said UU magnetic core, providing an AC voltage divider between leakage and magnetizing inductances of said third inductor winding further reducing current ripple in said third inductor winding.

70. A method as defined in claim 69 further including an external inductor connected in series with said third inductor winding further reducing current ripple in said third inductor winding.

71. A method as defined in claim 69 further including a separate leakage magnetic leg with an additional air-gap in magnetic flux path of said separate leakage magnetic leg further reducing current ripple in said third inductor winding.

72. A method as defined in claim 67 wherein said common magnetic core is an EE magnetic core further comprising:

integrating said two inductor windings side-by-side on the center leg of said EE magnetic core;

splitting said third inductor winding into two windings having the same number of turns as said third inductor winding;

integrating said split inductor windings onto two outer magnetic legs of said EE magnetic core;

connecting said split inductor windings in series having their respective AC voltages in phase at dot-marked ends of said split inductor windings;

reducing current ripples in said split inductor windings and in one of said two inductor windings.

73. A method as defined in claim 72 further including air-gaps in each of said outer legs of said EE magnetic core, having AC voltage dividers to reduce current ripple in said split inductor windings.

74. A method as defined in claim 67 wherein one of said two inductor windings is replaced with an autotransformer windings, reducing DC energy storage in an Autotransformer DC Tansformer.

75. A method as defined in claim 66 wherein one of said two inductor windings is replaced with an isolation transformer windings, reducing DC energy storage in an Isolated DC Transformer.

76. A method as defined in claim 75 wherein said complementary output switch is a controllable semiconductor CBS switch having an anti-parallel diode and a capacitance in parallel, said complementary output controllable semiconductor CBS switch being turned ON and OFF as a synchronous rectifier to reduce conduction losses by bypassing said anti-parallel diode.

77. A method as defined in claim 76 wherein said common magnetic core is a UU magnetic core further comprising:

integrating said isolation transformer windings with an other of said two inductor windings on one leg of said UU magnetic core side-by-side to provide higher leakage inductance between said isolation transformer windings and said other of said two inductor windings, reducing ripple current in said other of said two inductor windings substantially to zero;

integrating said third inductor winding on an other leg of said UU magnetic core to provide higher leakage inductance between said third inductor winding and said isolation transformer windings and said other of said two inductor windings reducing ripple current in said third inductor winding.

78. A method as defined in claim 77 further including an air-gap in said other leg of said UU magnetic core, providing an AC voltage divider between leakage and magnetizing inductances of said third inductor winding further reducing current ripple in said third inductor winding.

79. A method as defined in claim 78 further including an external inductor connected in series with said third inductor winding further reducing current ripple in said third inductor winding.

80. A method as defined in claim 78 further including a separate leakage magnetic leg with an additional air-gap in magnetic flux path of said separate leakage magnetic leg further reducing current ripple in said third inductor winding.

81. A method as defined in claim 76 wherein said common magnetic core is an EE magnetic core further comprising:

integratingg said isolation transformer windings with said other of said two inductor windings side-by-side on the center leg of said EE magnetic core;

splitting said third inductor winding into two windings having the same number of turns as said third inductor winding;

integrating said split inductor windings onto two outer magnetic legs of said EE magnetic core;

connecting said split inductor windings in series having their respective AC voltages in phase at dot-marked ends in said split inductor windings;

reducing current ripples in said split inductor windings and in one of said two inductor windings.

82. A method as defined in claim 81 further including air-gaps in each of said outer legs of said EE magnetic core, having AC voltage dividers to reduce current ripple in said split inductor windings.

83. A method as defined in claim 76 wherein said isolation transformer is a multiple-output isolation transformer, whereby reducing DC energy storage in a Multiple-output Isolated DC Transformer.

84. A method for substantially lossless switching comprising:

providing an input switch, a complementary input switch, and an output switch being controllable CBS (Current Bidirectional Switch) switches, each said controllable CBS switch having an anti-parallel diode and a capacitance in parallel;

providing a complementary output switch being a current rectifier switch having a capacitance in parallel;

controlling an ON-time and an OFF-time of said controllable CBS switches regulating an output load voltage, each said controllable CBS switch being turned ON and OFF during transition D to D' and transition D' to D which are shorter than said ON-time and OFF-time;

providing a positive current in a branch with said complementary input switch during said transition D to D' and a negative current in said branch with said complementary input switch during said transition D' to D;

controlling sequence and timing of turn-ON and turn-OFF signals for said controllable CBS switches during said transition D to D', recycling charge among said capacitances of said switches and turning ON said complementary input switch substantially losslessly at substantially zero voltage;

initiating said transition D' to D by turning OFF said complementary input switch;

providing a resonant circuit during said transition D' to D by turning ON said output switch before said anti-parallel diode of said output switch starts to conduct;

exchanging charge between said capacitances of said controllable CBS switches substantially losslessly facilitated by said negative current and a voltage across said input switch present when said output switch is turned ON;

turning ON said input switch when voltage across said input switch is at minimum reducing switching losses.

85. A method as defined in claim 84 wherein said complementary output switch is a controllable semiconductor CBS switch having an anti-parallel diode and a capacitance in parallel, said complementary output CBS switch being turned ON and OFF as a synchronous rectifier to reduce conduction losses by bypassing said anti-parallel diode.

86. A method for reducing DC energy storage in a common magnetic core resulting in a DC Transformer, comprising:

integrating three inductor windings on said common magnetic core;

subjecting said three inductor windings to AC voltages in phase at dot-marked ends of said inductor windings;

subjecting two of said three inductor windings to DC currents flowing into said dot-marked ends thereof, thereby to generate a DC flux in one direction in said common magnetic core;

subjecting a third of said three inductor windings to DC current flowing out of said dot-marked end thereof, thereby to generate a DC flux in opposite direction in said common magnetic core, resulting in subtraction of said DC fluxes in said common magnetic core;

providing a selected number of turns for each of said three inductor windings to produce equal volts-per-turn and reduced total DC Ampere turns resulting in reduced total DC flux in said common magnetic core.

* * * * *